US008396353B2

(12) United States Patent
Kikuchi et al.

(10) Patent No.: US 8,396,353 B2
(45) Date of Patent: *Mar. 12, 2013

(54) INFORMATION RECORDING MEDIUM, INFORMATION RECORDING METHOD, INFORMATION PLAYBACK METHOD, INFORMATION RECORDING APPARATUS, AND INFORMATION PLAYBACK APPARATUS

(75) Inventors: Shinichi Kikuchi, Kawasaki (JP);
Masahiro Nakashika, Kawasaki (JP);
Yasufumi Tsumagari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1135 days.

This patent is subject to a terminal disclaimer.

(21) Appl. No.: 10/945,004

(22) Filed: Sep. 21, 2004

(65) Prior Publication Data
US 2005/0123284 A1 Jun. 9, 2005

(30) Foreign Application Priority Data

Nov. 10, 2003 (JP) .................. 2003-380265
Mar. 15, 2004 (JP) .................. 2004-073587

(51) Int. Cl.
*H04N 5/84* (2006.01)
*H04N 5/89* (2006.01)
(52) U.S. Cl. ........................................ 386/334
(58) Field of Classification Search .......... 386/95, 386/46, 52, 45, 26, 213, 214, 216, 217, 219, 386/220, 239, 248, 329, 330, 334, 332
See application file for complete search history.

(56) References Cited

U.S. PATENT DOCUMENTS

| 5,647,048 | A  | * | 7/1997  | Ting et al. .......... 386/343 |
| 5,949,955 | A  | * | 9/1999  | Nakai .............. 386/243 |
| 6,044,157 | A  | * | 3/2000  | Uesaka et al. ......... 380/201 |
| 6,112,012 | A  | * | 8/2000  | Fujinami et al. ......... 386/337 |
| 6,141,483 | A  | * | 10/2000 | Yamada et al. ......... 386/46 |
| 6,188,650 | B1 | * | 2/2001  | Hamada et al. ......... 369/30.36 |
| 6,278,838 | B1 | * | 8/2001  | Mendenhall et al. ...... 386/344 |
| 6,373,803 | B2 | * | 4/2002  | Ando et al. .......... 369/59.25 |
| 6,449,227 | B1 | * | 9/2002  | Heo .............. 369/47.15 |
| 6,553,180 | B1 | * | 4/2003  | Kikuchi et al. ......... 386/95 |
| 6,633,725 | B2 |   | 10/2003 | Hughes, Jr. et al. |

(Continued)

FOREIGN PATENT DOCUMENTS

CN 1153981 A 7/1997
EP 1 091 577 A2 4/2001

(Continued)

OTHER PUBLICATIONS

Storing Digital Broadcast Signals Using an Advanced Optical Storage Device: Data Allocation and Simultaneous Record and Playback by S. B. Luitjens, J. F. R. Blacquiere, K. van Gelder, D. P. Kelly, and M Kato (IEEE Transactions on Consumer Electronics, vol. 48, No. 1 Feb. 2002).*

*Primary Examiner* — Tat Chio
(74) *Attorney, Agent, or Firm* — Oblon, Spivak, McClelland, Maier & Neustadt, L.L.P.

(57) ABSTRACT

To relatively simplify the apparatus arrangement while supporting many variations of streams to be processed, management information of a disc includes option support information that designates a combination of a base format and one or more options. An apparatus using this disc can specify predetermined types of decode formats on the basis of the contents of this option support information.

5 Claims, 118 Drawing Sheets

U.S. PATENT DOCUMENTS

| | | | |
|---|---|---|---|
| 6,885,809 B1 * | 4/2005 | Asada | 386/46 |
| 7,106,946 B1 * | 9/2006 | Kato | 386/69 |
| 7,263,723 B2 * | 8/2007 | Okamoto et al. | 726/31 |
| 7,646,963 B2 * | 1/2010 | Kato et al. | 386/94 |
| 2001/0012447 A1 * | 8/2001 | Horiguchi et al. | 386/125 |
| 2001/0038746 A1 | 11/2001 | Hughes, Jr. et al. | |
| 2003/0142955 A1 * | 7/2003 | Hashizume et al. | 386/52 |
| 2003/0231334 A1 * | 12/2003 | Nagai et al. | 358/1.14 |
| 2004/0193947 A1 * | 9/2004 | Park et al. | 714/6 |
| 2004/0240856 A1 | 12/2004 | Yahata et al. | |

FOREIGN PATENT DOCUMENTS

| | | |
|---|---|---|
| JP | 08-063899 | 3/1996 |
| JP | 2002-84479 | 3/2002 |
| JP | 2002-140884 | 5/2002 |

* cited by examiner

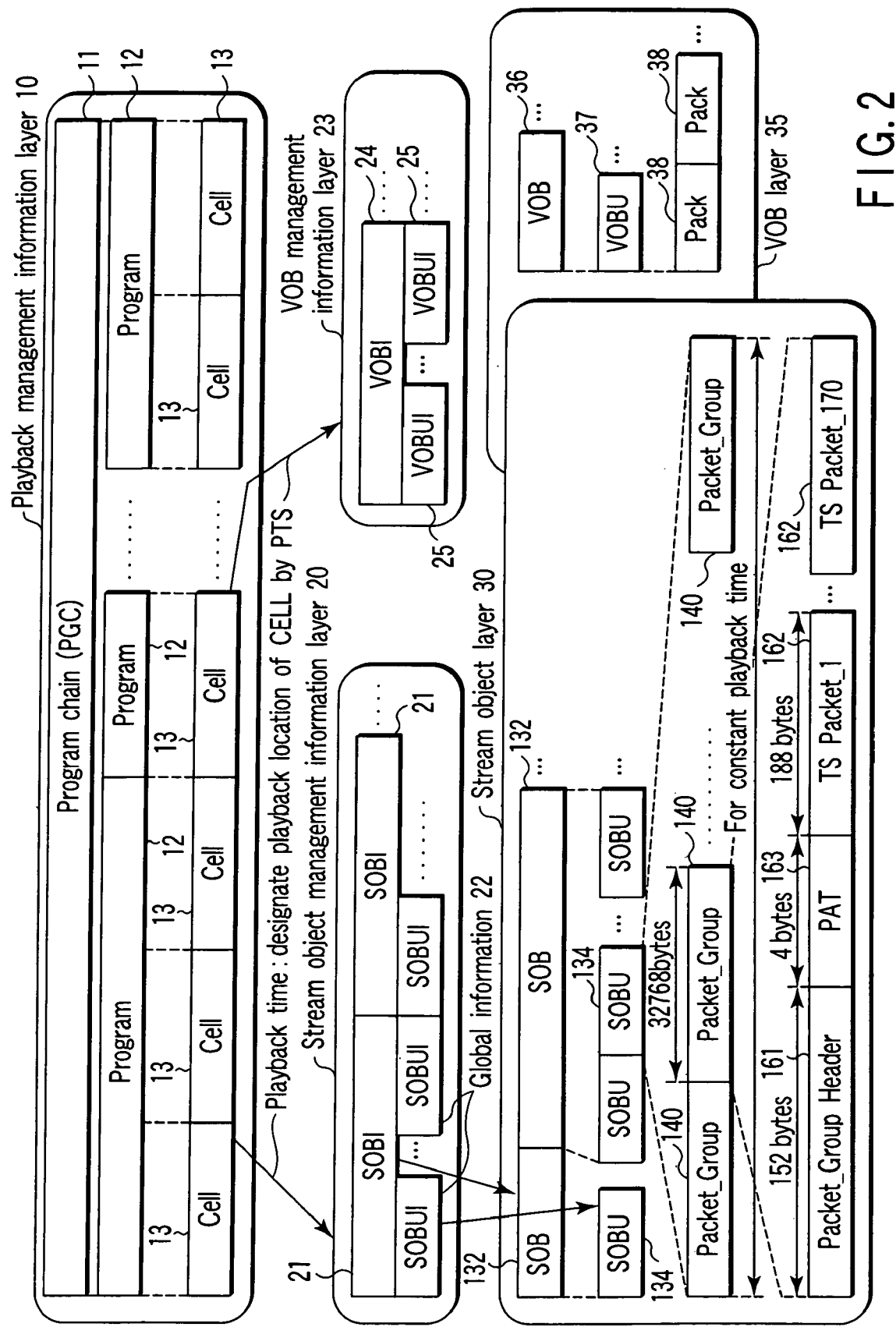
F I G. 2

Option support flag : 00=Base only, 01=Base+Option1, 02=Base+Option2, 03=Base+Option1+Option2

Region number : 00=JPN(ARIB), 01=U.S.A.(ATSC), 02=Europe(DVB)・・・, 0xffff=universal

| | | |
|---|---|---|
| SOB_TY | 13222101 | SOB_TY: b15=0: Normal SOB, b15=1: Temporary erase SOB<br>b14=0: Without GPI, b14=1: With GPI |
| PKT_TY | 13222102 | PKT_TY: 01=MPEG-TS 0xff=Non cognizant |
| PKT_SZ | 13222103 | PKT_SZ: 00BCh=188 |
| PKT_GP_SZ | 13222104 | PKT_GP_SZ: Packet Group size=8LB |
| PKT_Ns | 13222105 | PKT_Ns: Number of Packets per PKT GRP=0xAA |
| COUNTRY_CODE | 13222106 | Country_code: Recorded country code |
| AP_FORMAT | 13222107 | AP_FORMAT: 1=ISDB-S  2=ISDB-T |
| SERVICE_ID | 13222108 | Information of recorded PSI and SI |
| PMT_PID | 13222109 | SERVICE_ID, SERVICE_TYPE, PMT_ID, NETWORK_ID, |
| NETWORK_ID | 13222110 | TS_ID, FORMAT_ID, SOB_DEF_PID |
| TS_ID | 13222111 | Default PID |
| PCR_PID | 13222112 | In case of ARIB, PID with smaller component tag value |
| SOB_DEF_PID | 13222113 | Component group descriptor value is preferentially used |
| Format_ID | 13222114 | SOB_DURATION: SOB playback time (total of SOBU_ENTs) |
| CP_CTL_INFO | 13222115 | SOB_ES_Ns |
| SOB_REC_TM | 13222116 | Number of ESs |
| SOB_REC_TM_SUB | 13222117 | SOB_V_ES_Ns (Number of pieces of SOB_V_ESI) |
| SOB_DURATION | 13222118 | Number of video ESs |
| SOB_S_PTM | 13222119 | SOB_A_Es_Ns |
| SOB_E_PTM | 13222120 | Number of audio ESs (number of pieces of SOB_A_ESI) |
| LOCAL_TM_ZONE | 13222121 | SOB_ES_Ns≧ SOB_V_ES_Ns+SOB_A_ES_Ns |
| PCR_POS_COUNT | 13222122 | SOB_V_ES_Ns+SOB_A_Es_Ns≧ ES_TMAP_Ns |
| PCR_POS_SHIFT | 13222123 | PCR_POS_COUNT |
| SOB_ES_Ns | 13222124 | Indicate location of PCR to be referred to by the<br>number of PCRS before head of Packet Group |
| SOB_V_ES_Ns | 13222125 | PCR_POS_SHIFT |
| SOB_A_ES_Ns | 13222126 | Exponent part of 2 of LB indicating location of PCR packet |
| Profile Information (example 2) | 13222128 | CP_CTL_INFO: To be described later |

F I G. 10

SOB_ES_PID : ES OF PID
STREAM_TYPE : STREAM type indicated in PMT
STREAM_CONTENT
　　STREAM_CONTENT value indicated by component descriptor
COMPONENT_TYPE
　　COMPONENT_TYPE value indicated by component descriptor
COMPONENT_TAG
　　COMPONENT_TAG value indicated by component descriptor There are three types of SOB_ESI : V_ESI, A_ESI, and OTHER_ESI ADR_OFS
  Packet Group number (LB address) from head of file to head of SOB
VOBU_PB_TM_RNG
  SOBU playback time range
  1=0.4s~1.2s, 2=1s~2s, 3=2s~3s T_MAP_N : TMAP number : number from head in TMAP file (T_MAP_T)

Note) TMAPI_SRPs do not always indicate TMAPI in ascending order
     Garbage data may be inserted among TMAPI Garbage data may be inserted among SOBU/VOBU_ENTs
SOBU/VOBU_TY : 00=VOBU, 01=SOBU

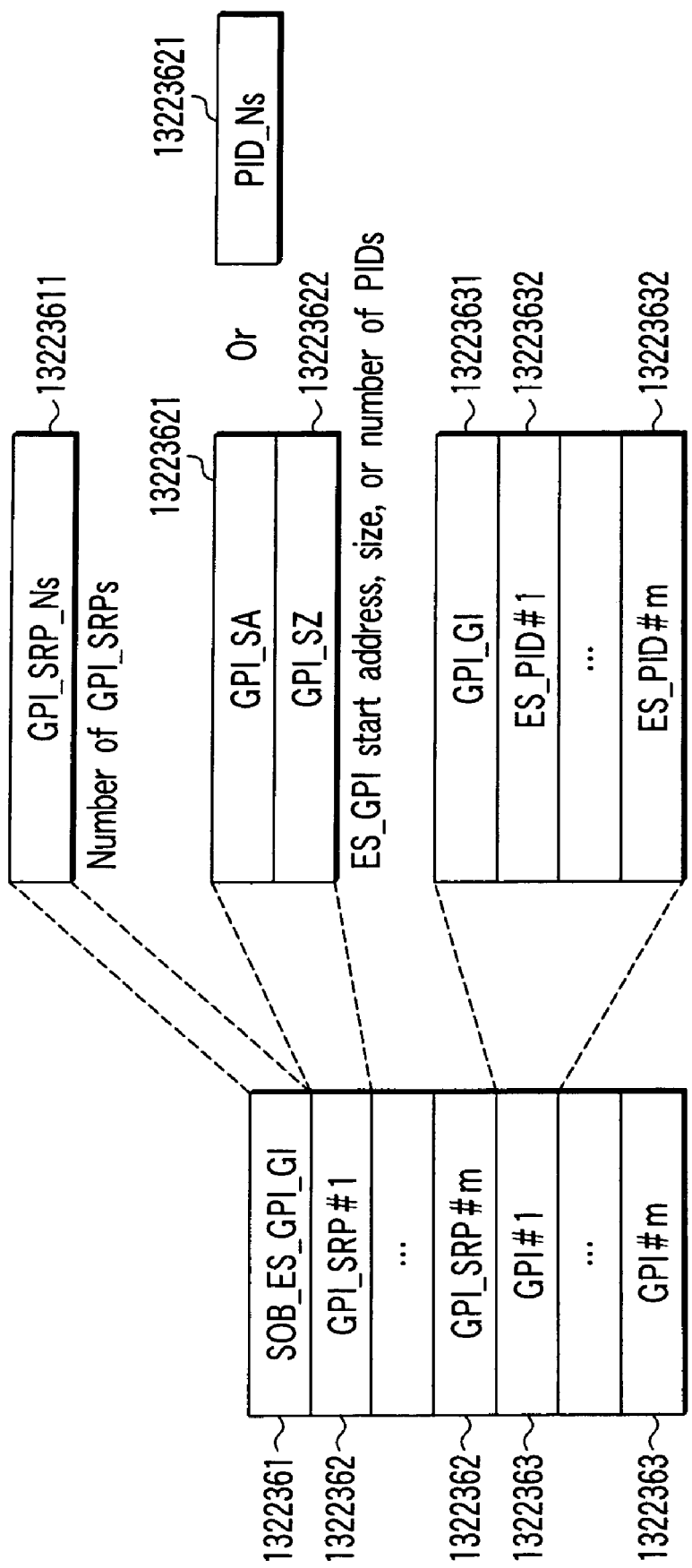
F I G. 26

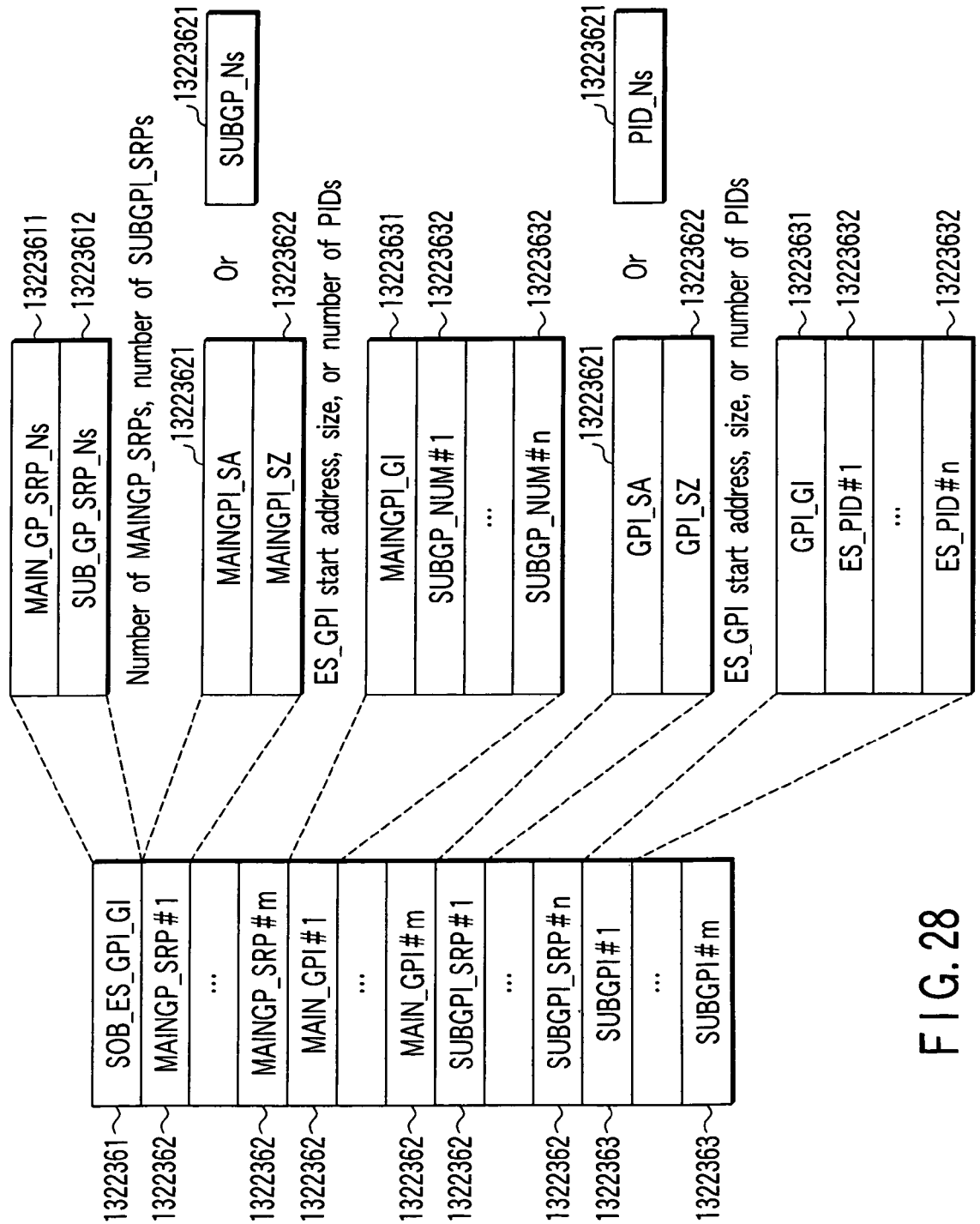
F I G. 28

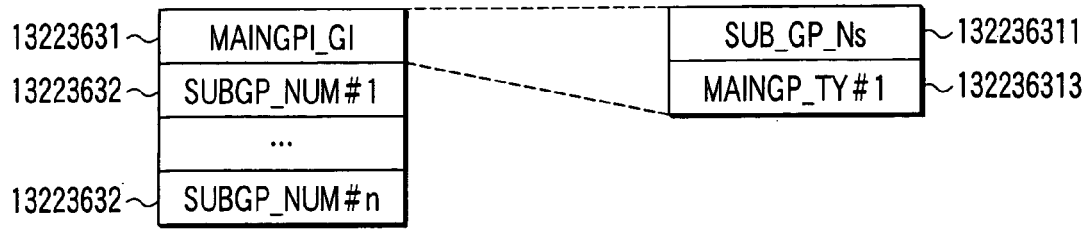
SUB_GP_Ns : Number of SUB_GPs which belong to this GP
GP_TY : 1=Multi-View  02=Rain Attenuation
          3=Multi-channel_video
SUBGP_NUM : Sub-group number
          Switching is allowed using angle button, etc. within MAINGP
          Describe MAIN angle in #1
F I G. 29
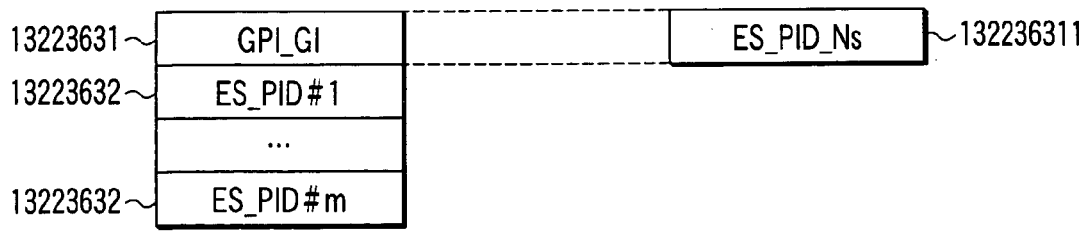
Number of PIDS of ESs which belong to this GP
F I G. 30

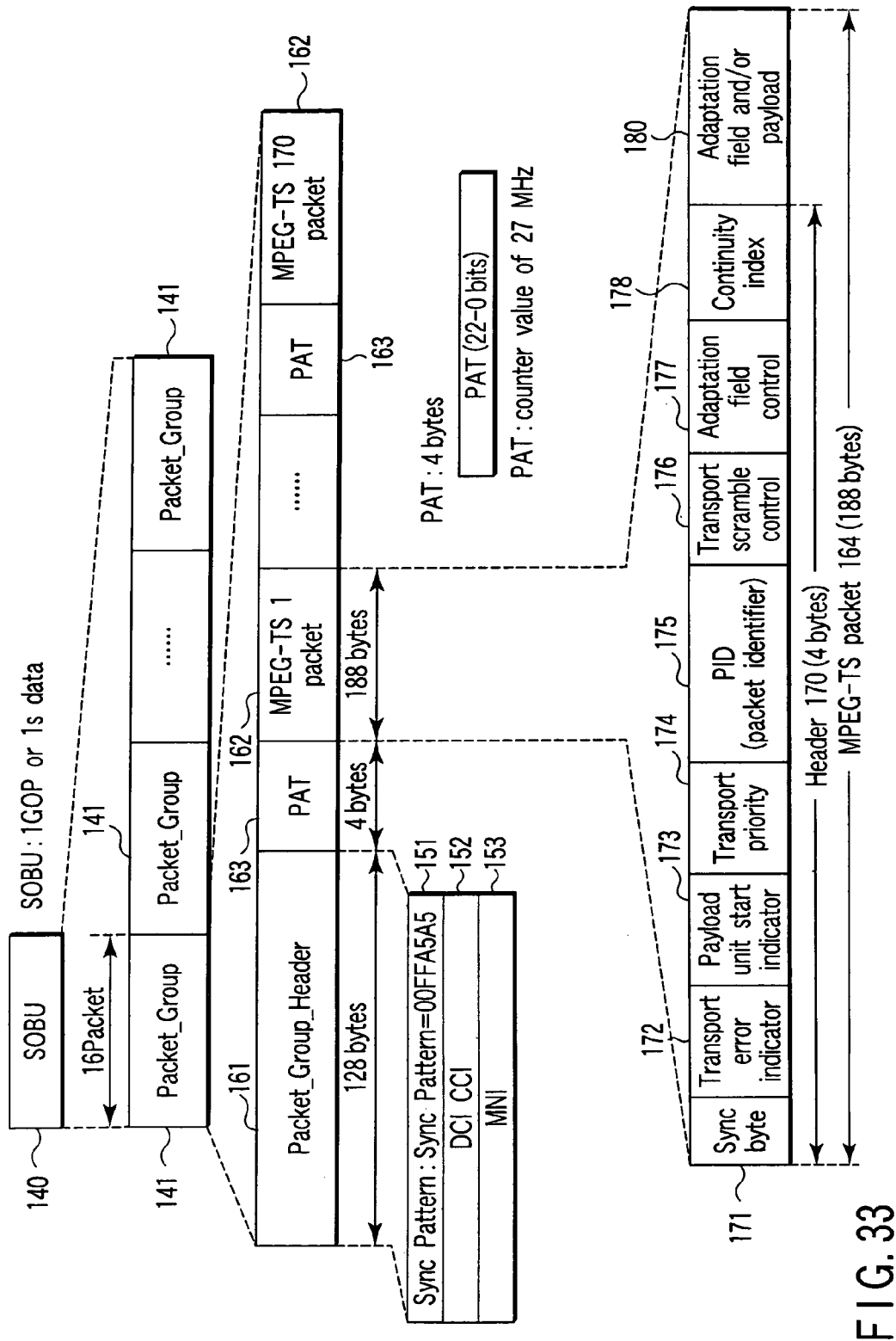
F I G. 33

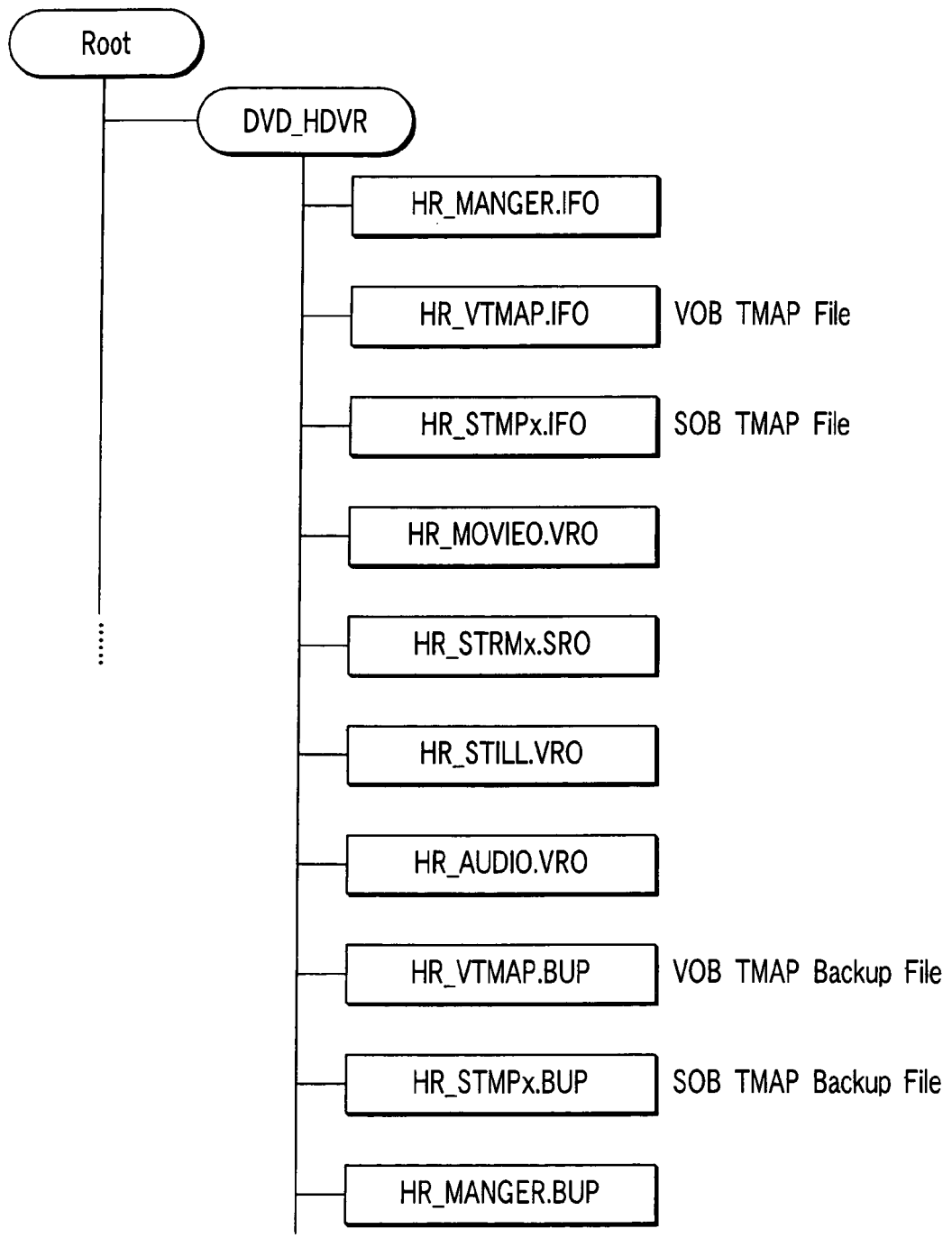
F I G. 36

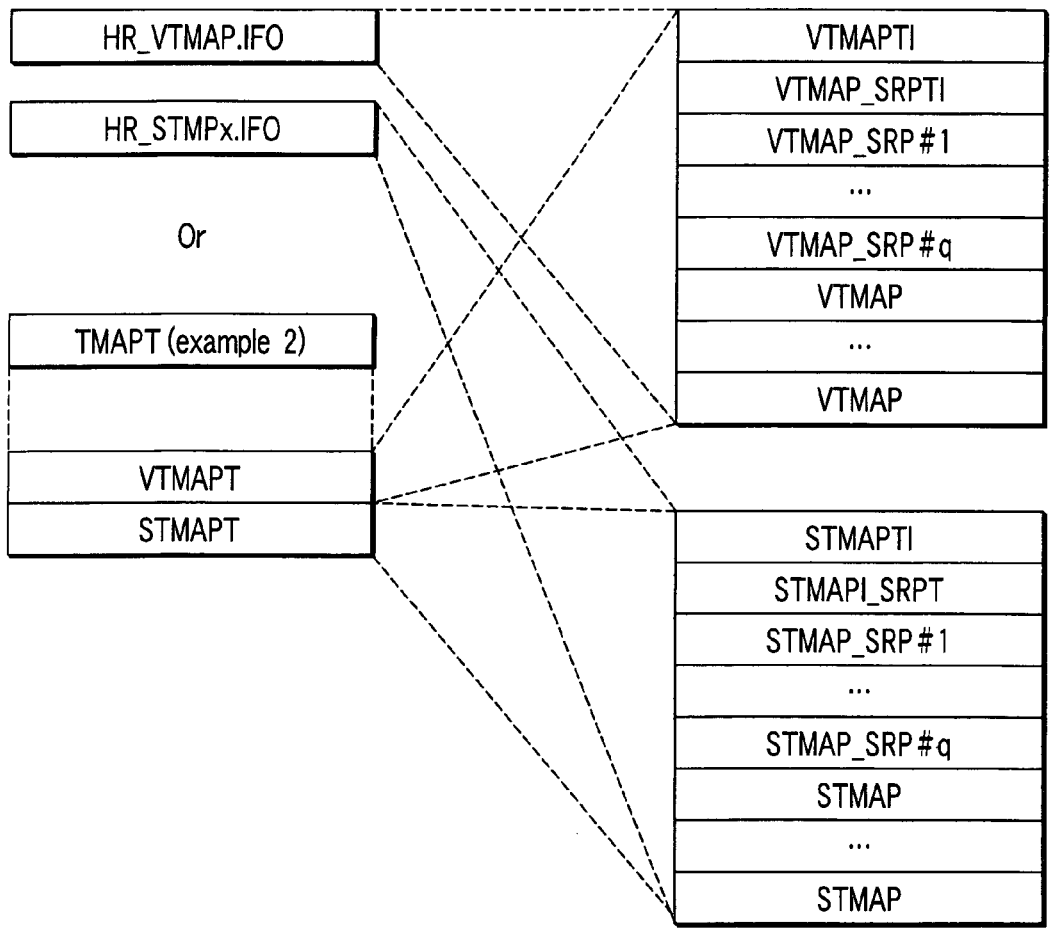
Note) TMAP_SRPS do not always indicate TMAPI in ascending order
Garbage data may be inserted among TMAPI
F I G. 37

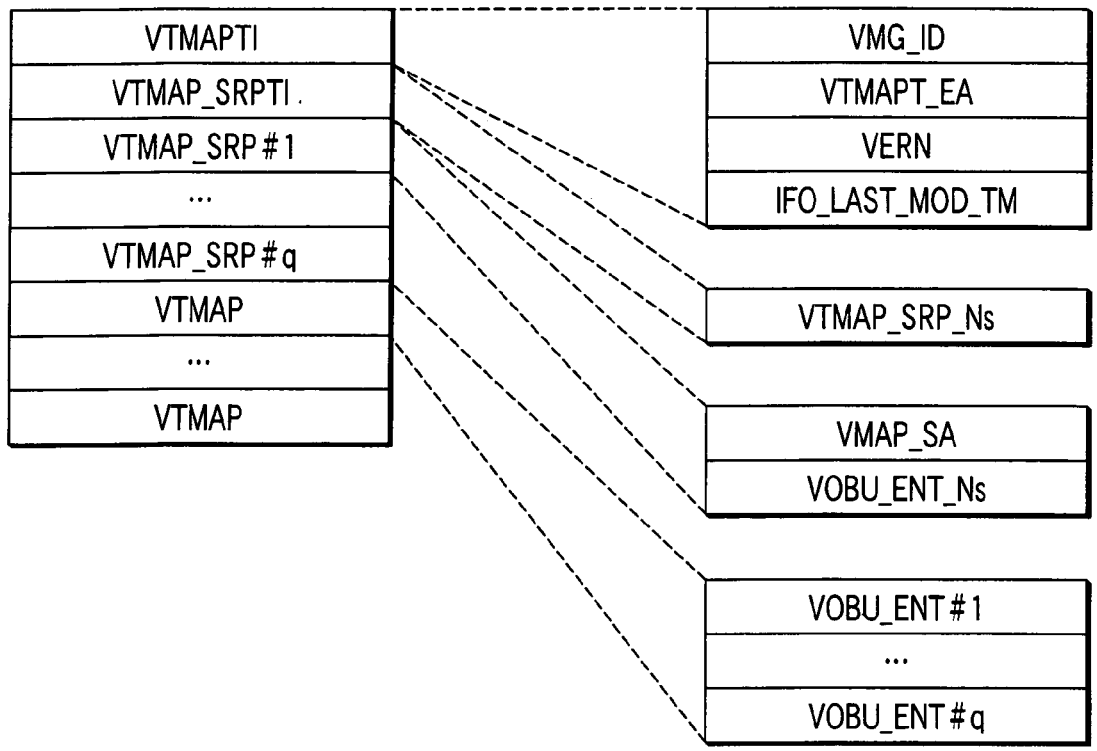
VMG_ID : VMG identification information
VTMAPT_EA : End address of this file
VERN : TMAP version information
IFO_LAST_MOD_TM : Describe TMAPT update date
(Same value as HR_MANGR.IFO)
VMAP_SA : Each VMAP start address
VOBU_ENT_Ns : Number of VOBU_ENTs
F I G. 38

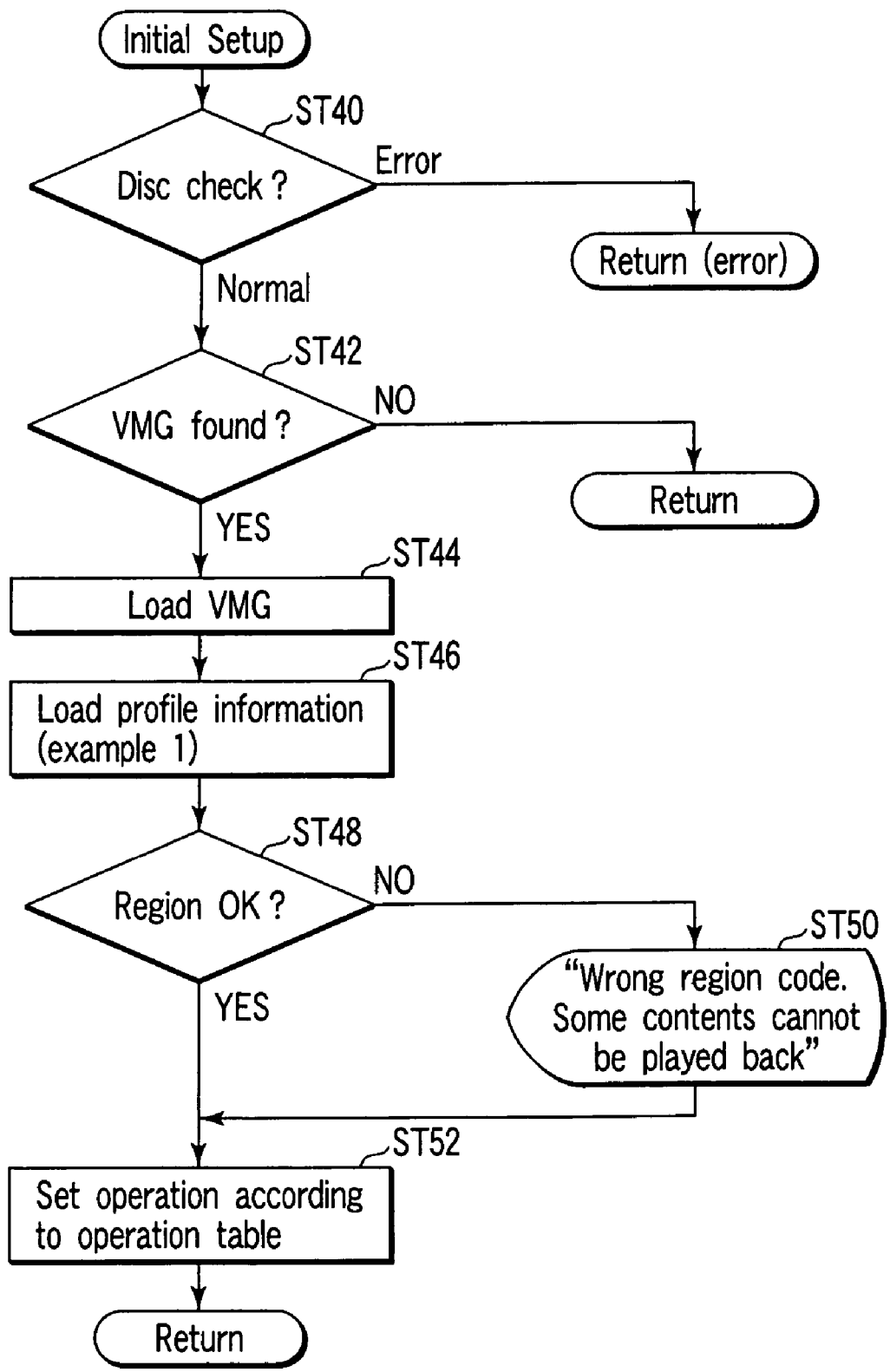
F I G. 44

(a)

| Rec operation \ Disc | Base only | Base+OP1 | Base+OP2 | Base+OP1+OP2 |
|---|---|---|---|---|
| Base only | ○ | ○ | ○ | ○ |
| Base+OP1 | △ (base only) | ○ | △ (base only) | ○ |
| Base+OP2 | △ (base only) | △ (base only) | ○ | ○ |
| Base+OP1+OP2 | △ (base only) | △ (base+OP1) | △ (base+OP2) | ○ |

(b)

| Rec operation \ Disc | Base only | Base+OP1 | Base+OP2 | Base+OP1+OP2 |
|---|---|---|---|---|
| Base only | ○ | △ (base only) | △ (base only) | △ (base only) |
| Base+OP1 | ○ | ○ | △ (base only) | △ (base+OP1) |
| Base+OP2 | ○ | △ (base only) | ○ | △ (base+OP2) |
| Base+OP1+OP2 | ○ | ○ | ○ | ○ |

F I G. 45

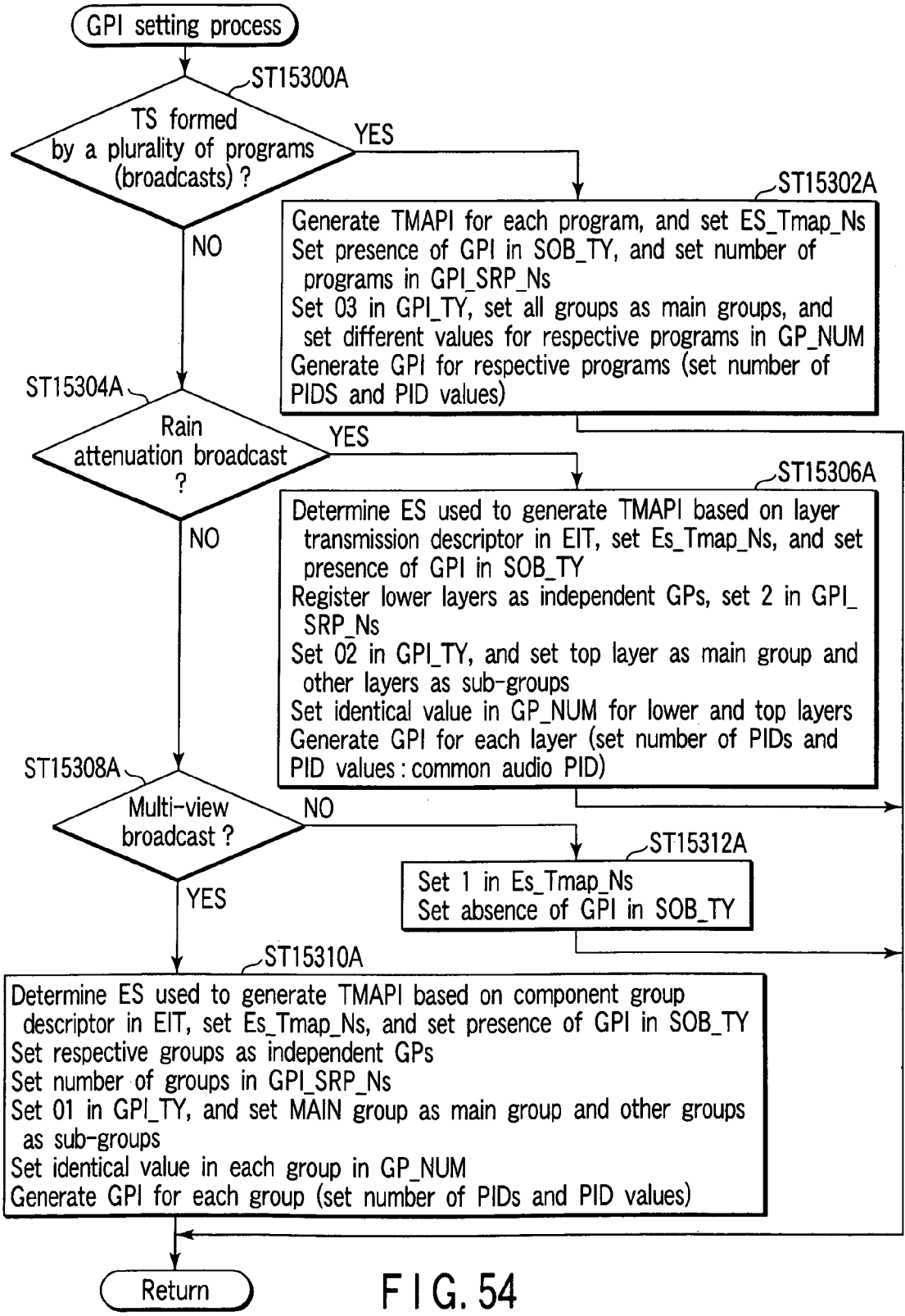
F I G. 54

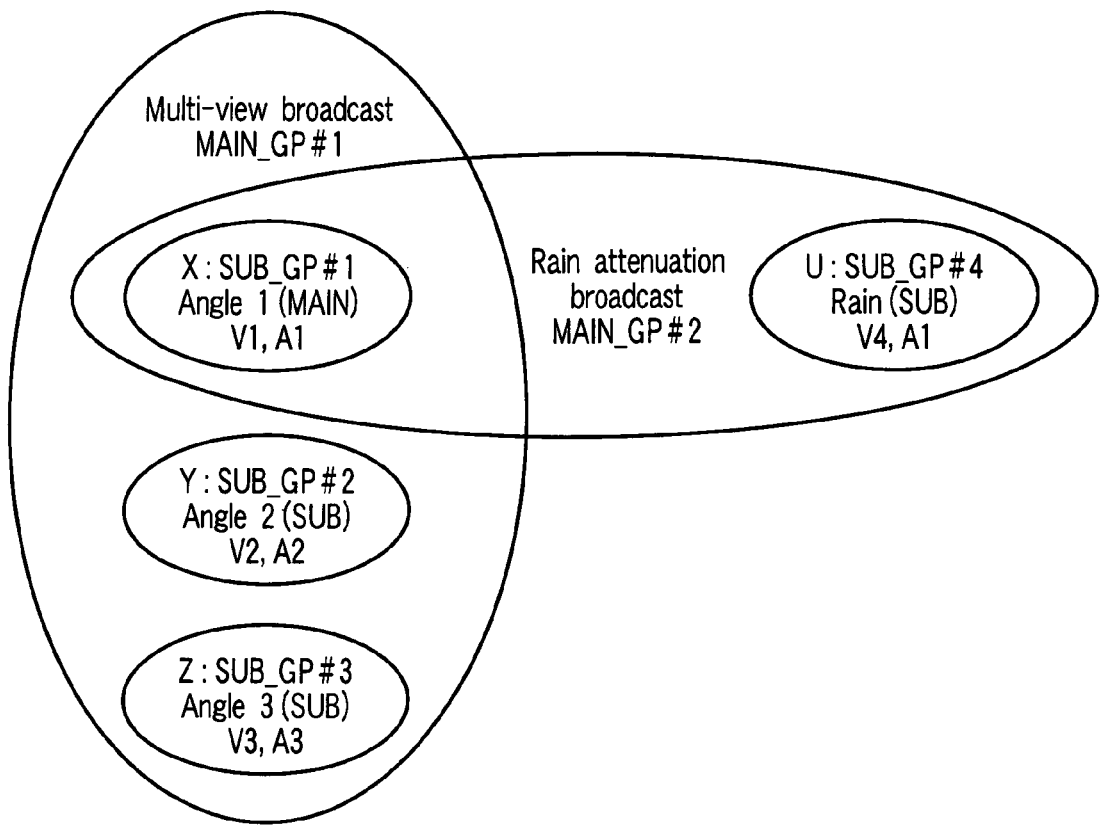
MAINGP_SRP_Ns=2, SUBGP_SRP_Ns=4
MAIN_GP#1 : MAINGP_TY=1
  X(SUB_GP#1), Y(SUB_GP#2), Z(SUB_GP#3)
MAIN_GP#2 : MAINGP_TY=1
  X(SUB_GP#1), U(SUB_GP#4)
F I G. 71

| |
|---|
| SOB_TY |
| AP_FORMAT_2 |
| SOB_PROFILE |
| PMT_PID |
| PCR_PID |
| NETWORK_ID |
| TS_ID |
| PROGRAM_NUMBER |
| Format_ID |
| SERVICE_TYPE |
| CP_CTRL_INFO |
| Reserved |
| SOB_REC_TM |
| SOB_REC_TM_SUB |
| LOCAL_TM_ZONE |
| SOB_DEF_PID |
| SOB_S_PTM |
| SOB_E_PTM |
| SOB_DURATION |
| PCR_POS_COUNT |
| PCR_POS_SHIFT |
| SOB_ES_Ns |
| SOB_V_ES_Ns |
| SOB_A_ES_Ns |

SOB_TY : b15,14=00 : TMAP on PTM base, b15,14=10 : TMAP on PATS base
 b13=0 : normal SOB, b13=1 : temporary erase SOB
 b12=0 : absence of GPI, b12=1 : presence of GPI
AP_FORMAT_2 : ISDB-S, ISDB-T, ATSC_1···Information of recorded PSI and SI
PROGRAM_NUMBER (SERVICE_ID), SERVICE_TYPE, PMT_ID, NETWORK_ID,
TS_ID, FORMAT_ID, SOB_DEF_PID, etc.
Default PID : PID with smaller component tag value in case of ARIB;
 component group descriptor value is preferentially used
SOB_DURATION
 SOB playback time (number of fields, total of SOBU_ENTs to which default PID belongs)
SOB PATS period : time from PATS of first Packet to PATS of last Packet
 (in case of PATS base)
SOB_ES_Ns : number of ESs
SOB_V_ES (number of pieces of SOB_V_ESI) : number of video ESs
SOB_A_ES : number of audio ESs (number of pieces of SOB_A_ESI)
SOB_ES_Ns≧SOB_V_ES_Ns+SOB_A_ES_Ns
SOB_V_ES_Ns+SOB_A_ES_Ns≧ES_TMAP_Ns
PCR_POS_COUNT : Indicate location of PCR to be referred to by number of PCRs before
 head of Packet_Group
PCR_POS_SHIFT : Exponential part of 2 of LB which indicates PCR packet position
CP_CTL_INFO : to be described later
SOB_S_PTM/PATS
 SOB playback start time
 PATS of Packet at head of SOB (PATS base)
SOB_E_PTM/PATS
 SOB playback end time
 PATS of last Packet of SOB (PATS base)

F I G. 81

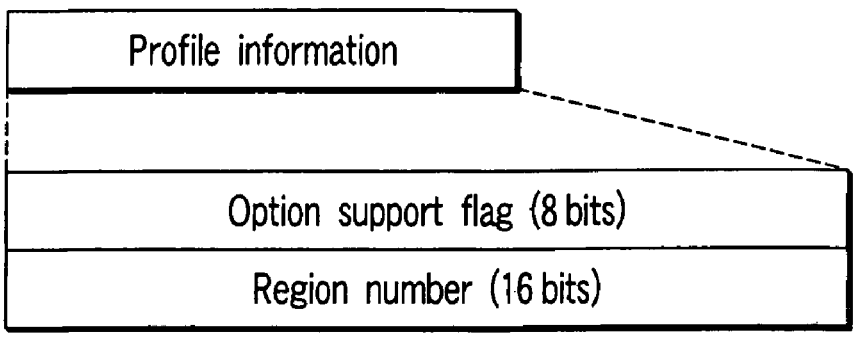
Option support flag : 00=Base only, 01=Base+Option1, 02=Base+Option2, 03=Base+Option1+Option2
Region number : 00=JPN (ARIB), 01=U.S.A. (ATSC), 02=Europe (DVB), ···, 0xffff=universal
F I G. 82
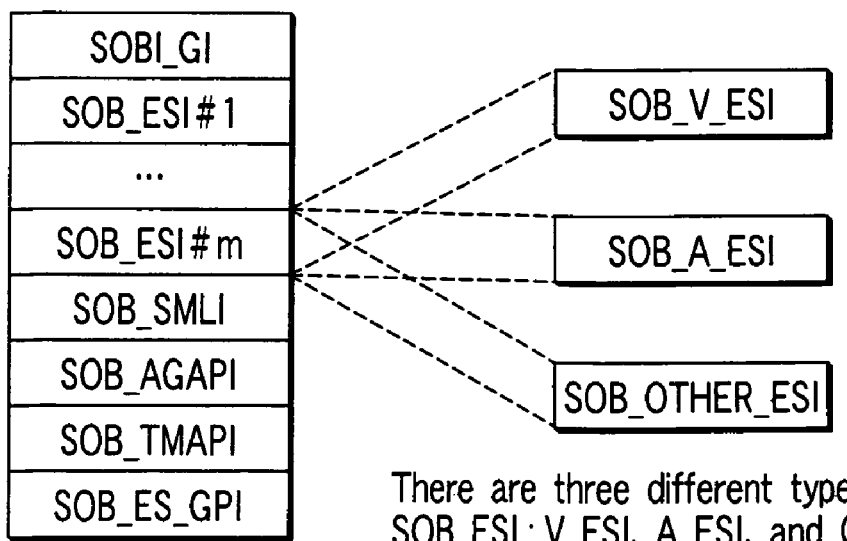
There are three different types of SOB_ESI : V_ESI, A_ESI, and OTHER_ESI
F I G. 83

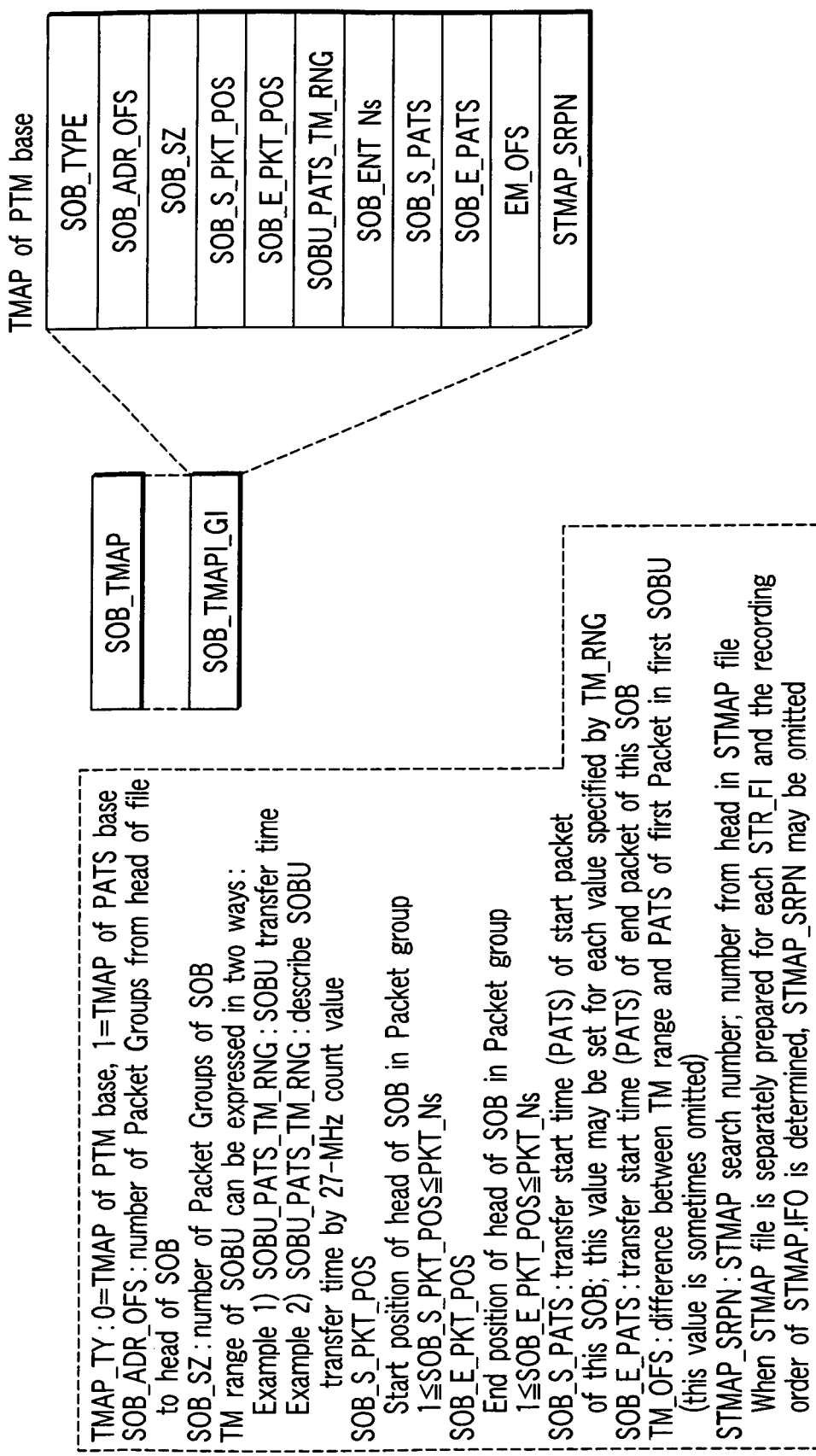
F I G. 89

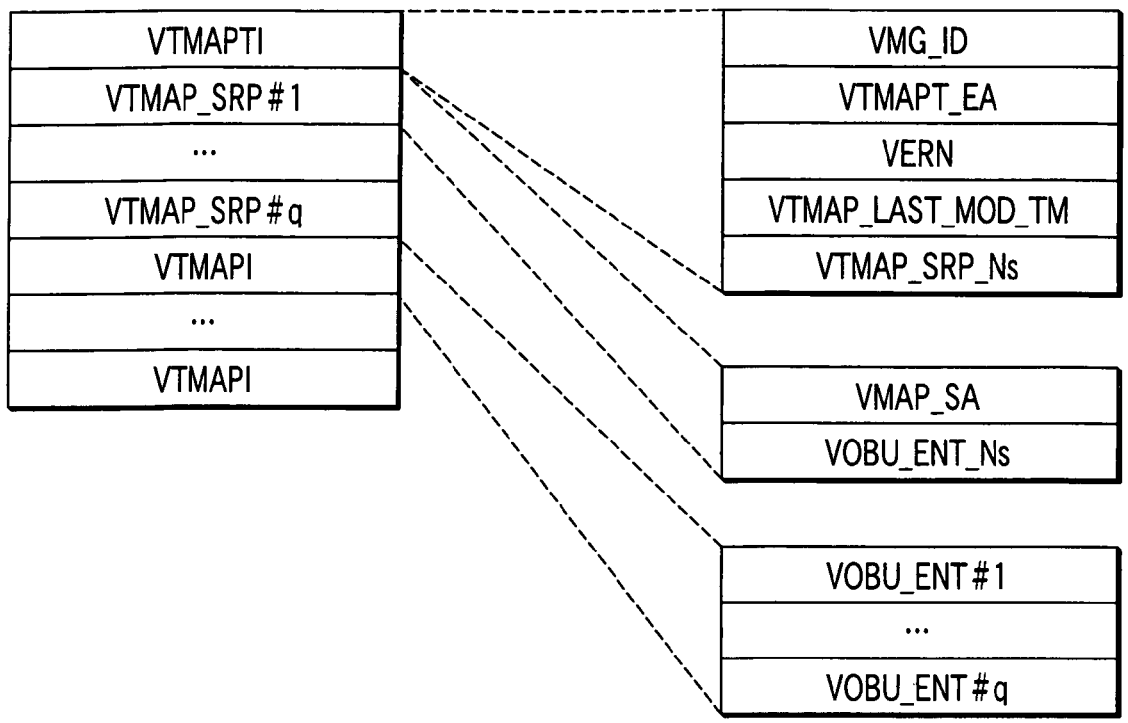
F I G. 92
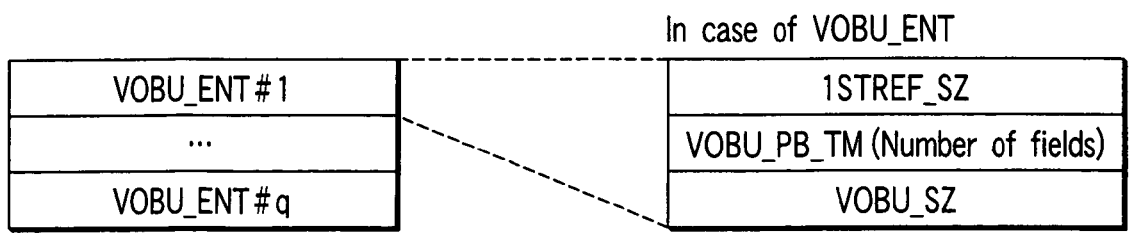
F I G. 93

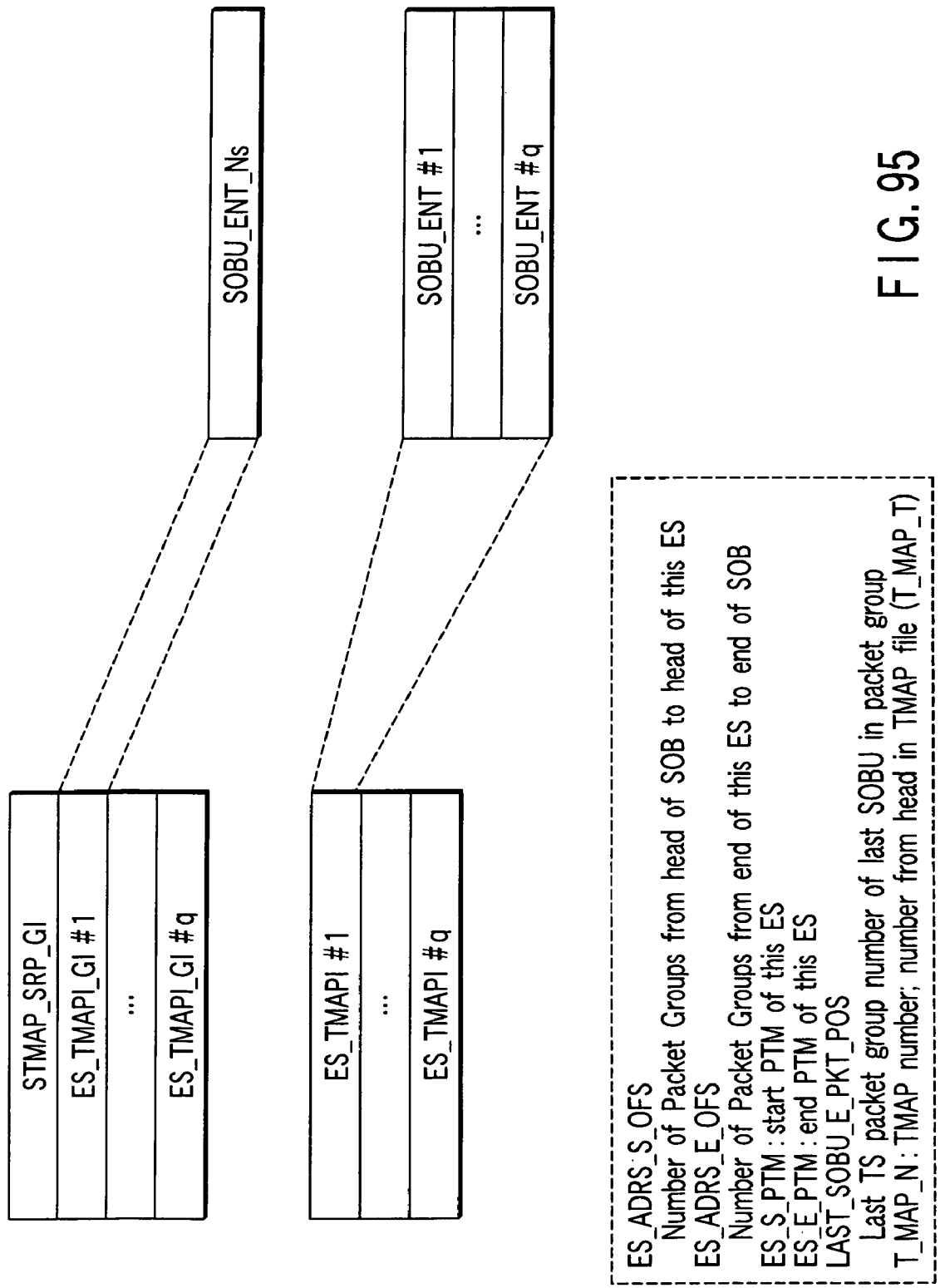
F I G. 95

Example 1) in case of Packet unit

| ASOBU_ENT #1 |
| ... |
| ASOBU_ENT #q |

| SOBU_SZ (Number of PacketGPs) |
| SOBU_S_PKT_POS (Number of Packets) |

ASOBU: delimited by constant time: minimum SOBU_ATS_TM_RNG=0:0.5s, =1:1s, =2:2s or more except for last SOBU; last SOBU may be equal to or smaller than constant time
SOBU_SZ: number of packet groups which belong to SOBU
SOBU_S_PKT_POS: number of Packets (1 to 170) from head of Packet_Group to start of SOBU in PACKET Group Example 2) in case of Packet Group unit

| ASOBU_ENT #1 |
| ... |
| ASOBU_ENT #q |

| SOBU_SZ (Number of PacketGPs) |

FIG. 97

ES_PID_Ns : number of PIDs of ESs which belong to this GP
BLOCK_TY : 1=Multi-View 2=Multi-channel_video
  3=Rain Attenuation
GP_TY : 01=Main Group 02=Sub Group 01=other
BLOCK_NUM : block number
  GPs with same block numbers can be switched using
  angle button, etc.

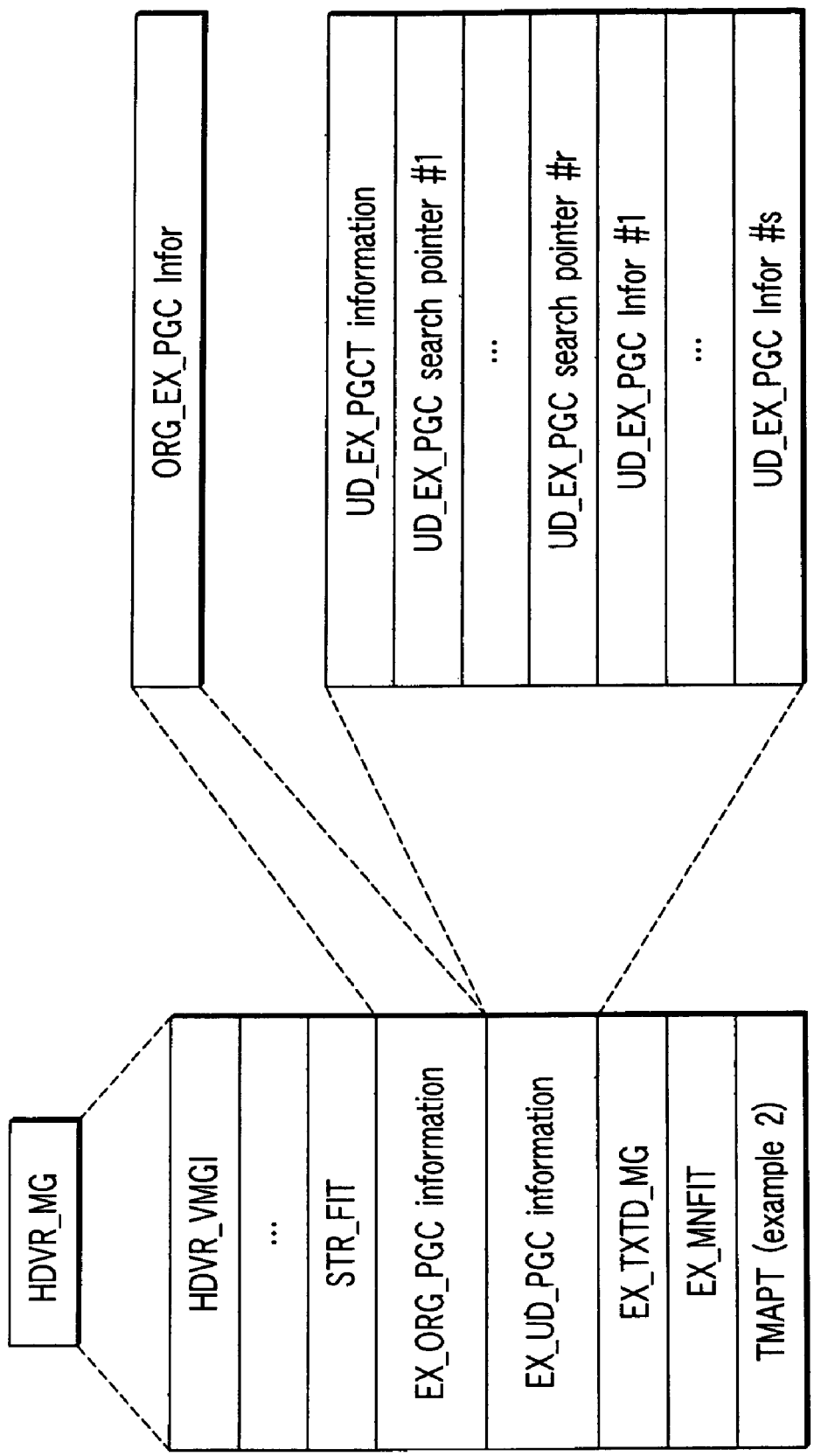
F I G. 101

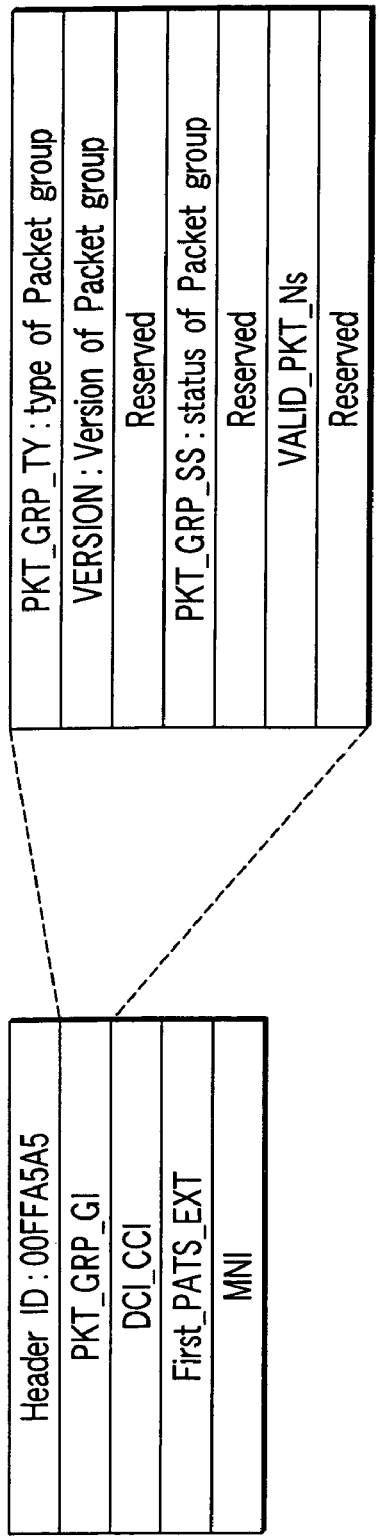

| Header ID : 00FFA5A5 |
| PKT_GRP_GI |
| DCI_CCI |
| First_PATS_EXT |
| MNI |

| PKT_GRP_TY : type of Packet group |
| VERSION : Version of Packet group |
| Reserved |
| PKT_GRP_SS : status of Packet group |
| Reserved |
| VALID_PKT_Ns |
| Reserved |

PKT_GRP_TY : 01=Packet Group for MPEG-TS Packet Other than 01=other
VERSION : version number 10=Ver.1 11=Ver.1.1
PKT_GRP_SS : status of this Packet Group

| ERR (1 bit) | STUF (1 bit) | WRAP (1 bit) | DISCON (1 bit) | Reserved (4 bits) |

ERR : indicate whether or not error has occurred in this Packet Group from reception until recording
  1 : error, 0 : no error
Note) in this example, ERR is set for each Packet Group; 32 bits are required if ERR is set for stream,
  or 170 bits are required if ERR is set for Packet.
STUF : this bit=1 when Group does not fully store Packets and ends in the middle, and remaining space
  undergoes stuffing
WRAP : this bit=1 when transfer time information (PATS) reaches end in this Packet Group and starts from zero
DISCON : playback time discontinuity has occurred (PCR discontinuity has occurred)
Valid_Packet_Ns : number of valid packets (which assumes value other than 0xAA when STUF=1)

F I G. 104

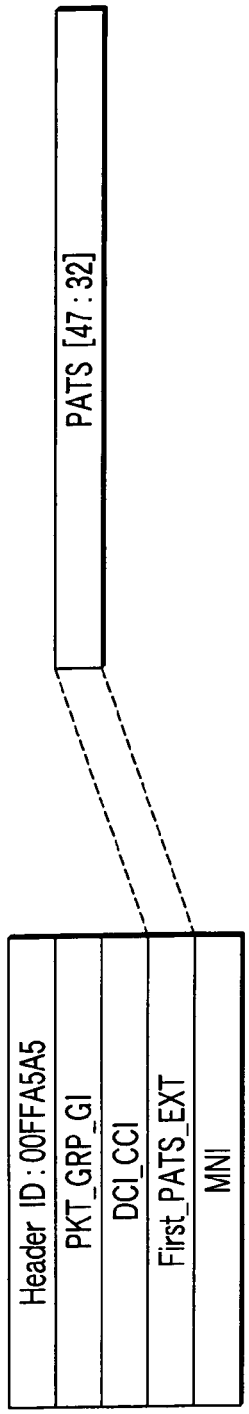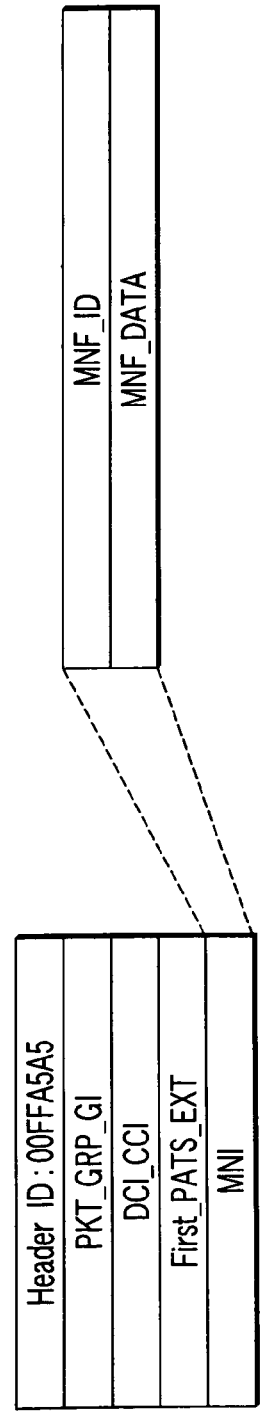

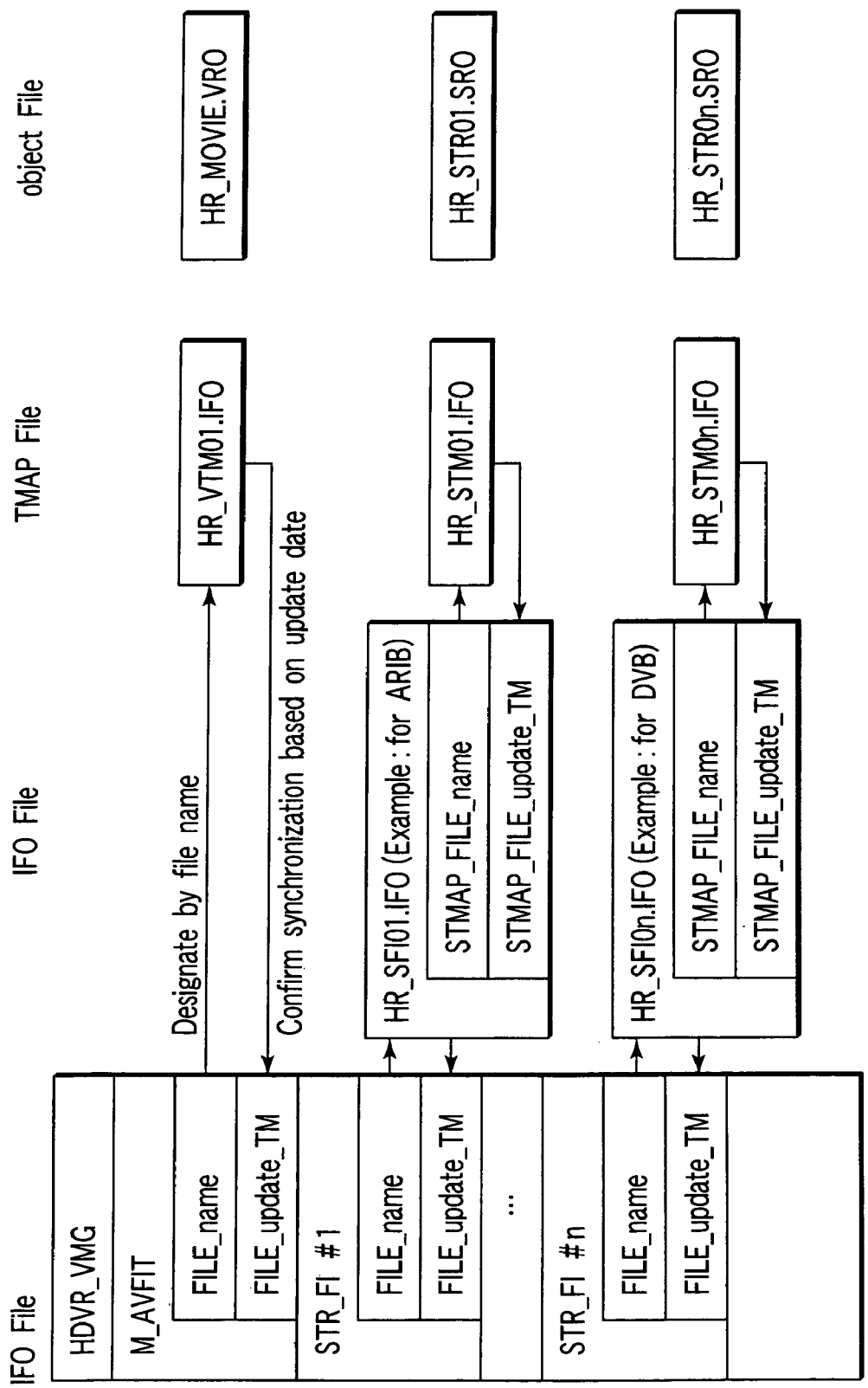
F I G. 108

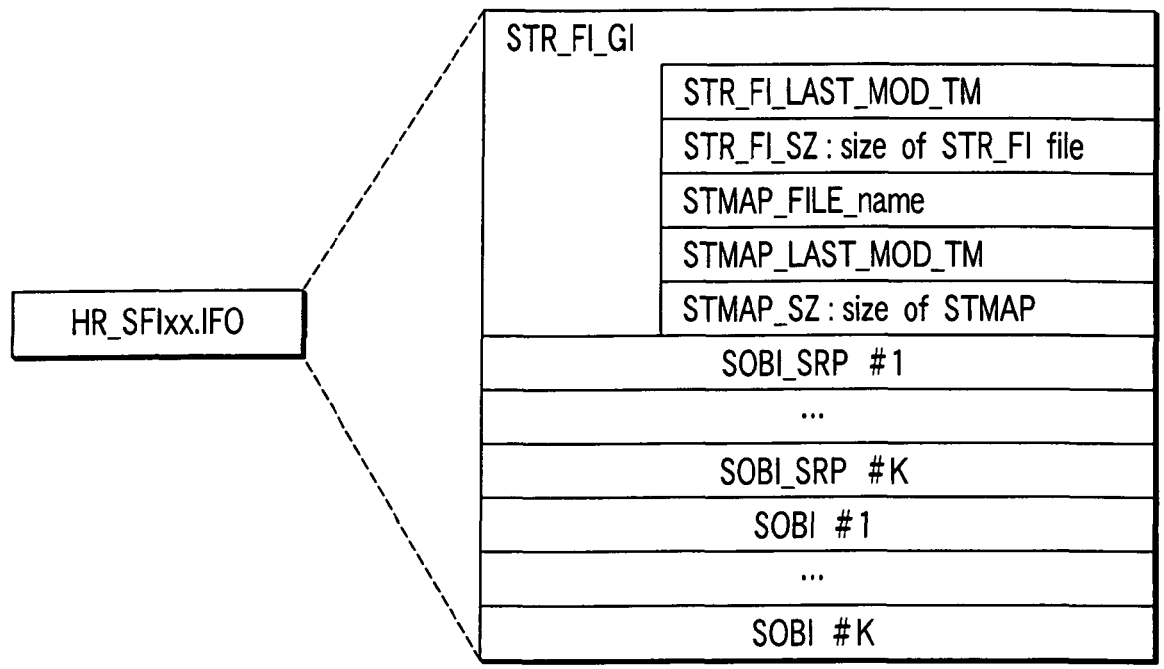

- STR_FI_LAST_MOD_TM: update date of STR_FI file (attain file synchronization by confirming if this value is same as update date information described in STR_FI_SRP)
- STR_FI_SZ: STR_FI file size
- STMAP_FILE_name: STMAP file name (this field can be omitted if file name is determined in advance)
- STMAP_LAST_MOD_TM: update date of STMAP file (attain file synchronization by confirming if this value is same as update date information described in STMAP file)
- STMAP_SZ: STMAP file size

FIG. 111

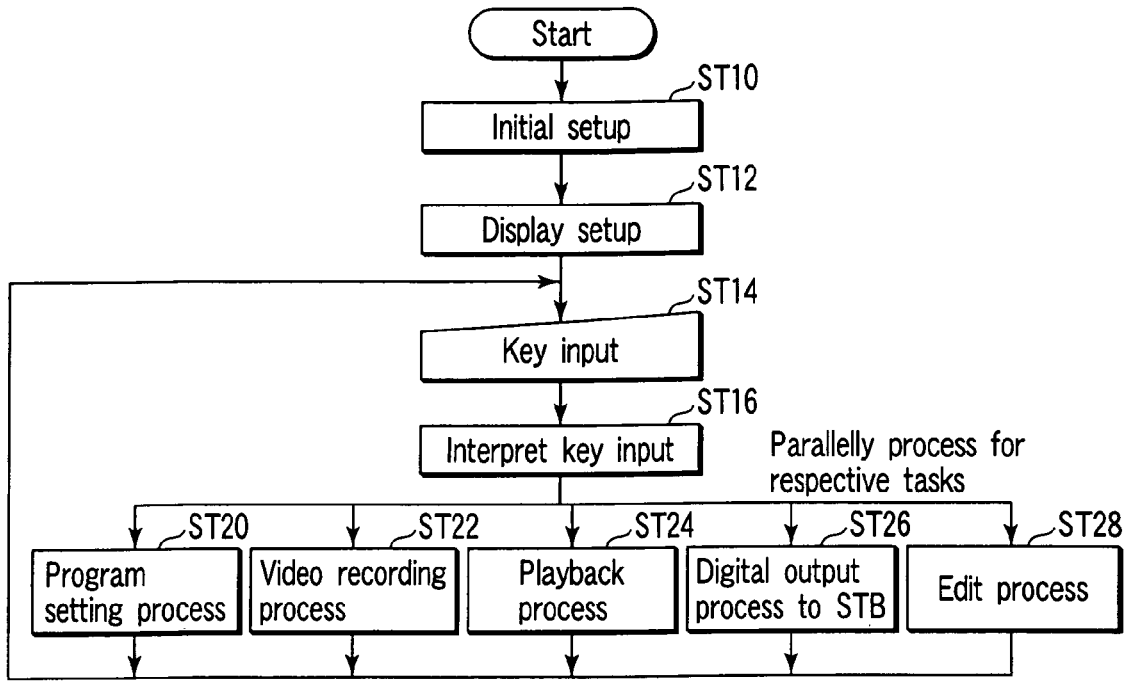
F I G. 113
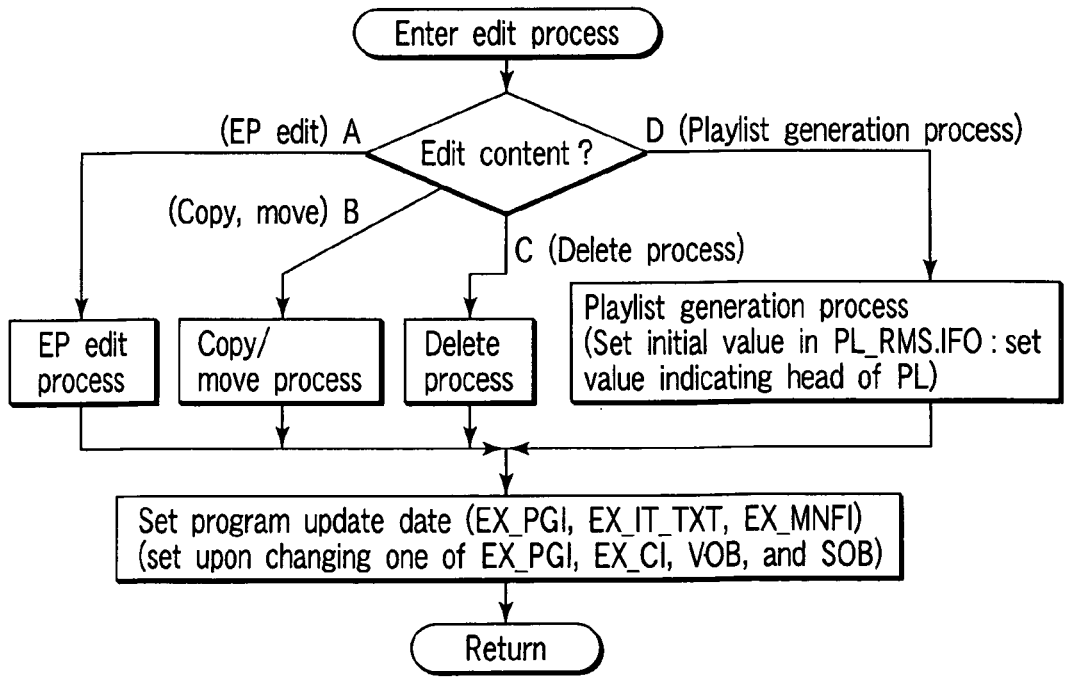
F I G. 114

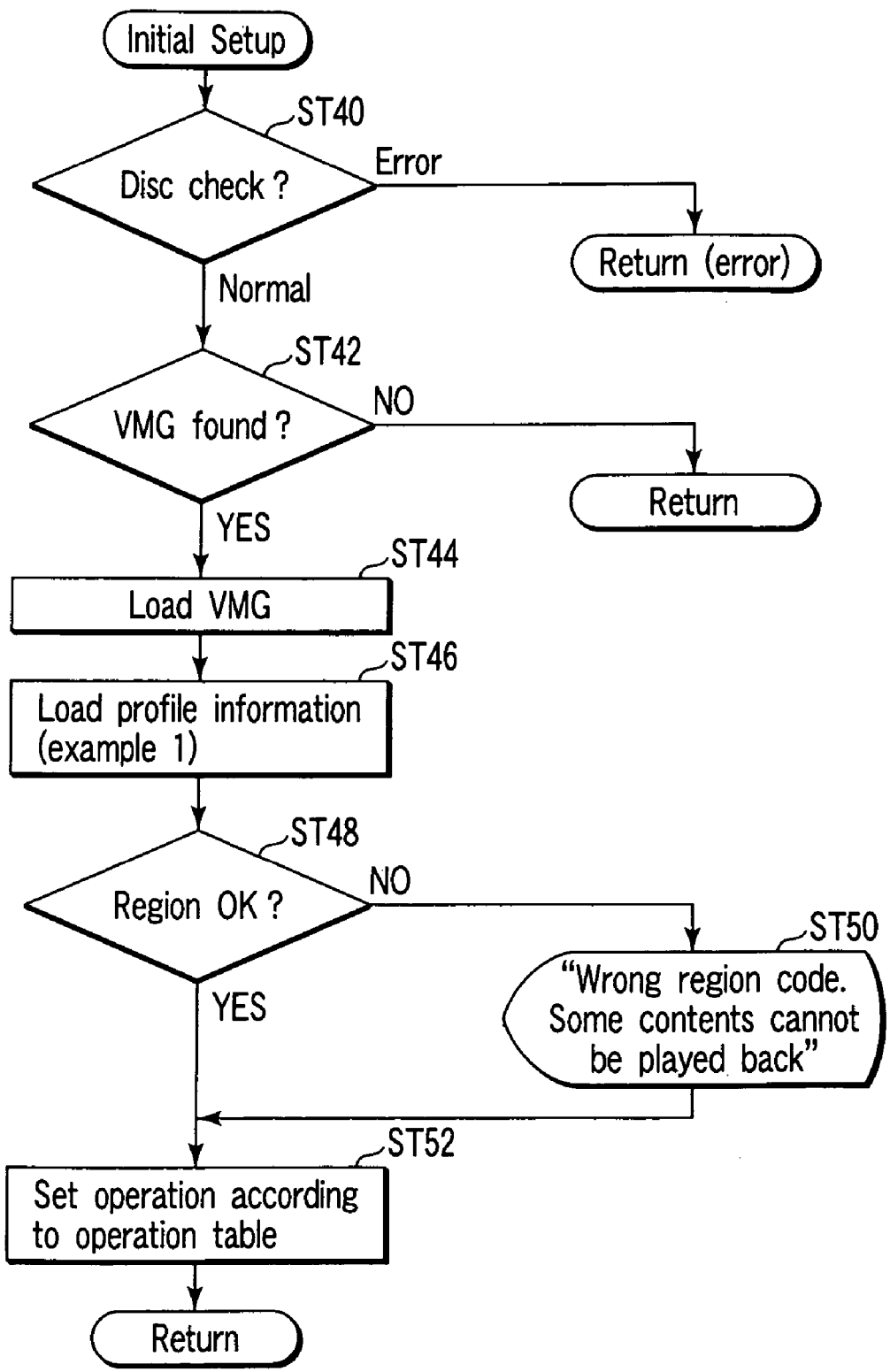
F I G. 115

Set 1 in PKT_GRP_GI : STUF, and set number of valid packets in VALID_PKT_Ns

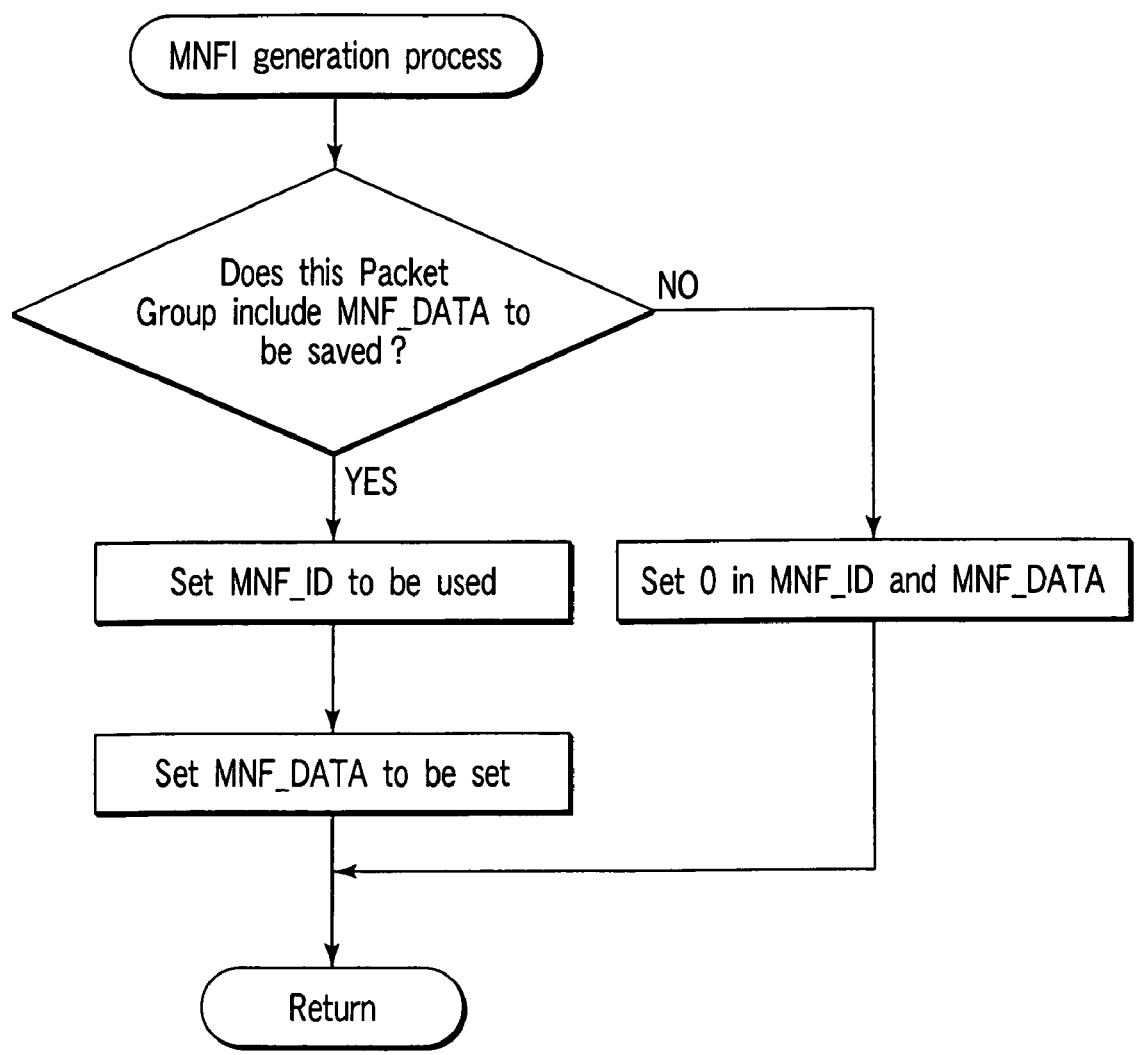
F I G. 121

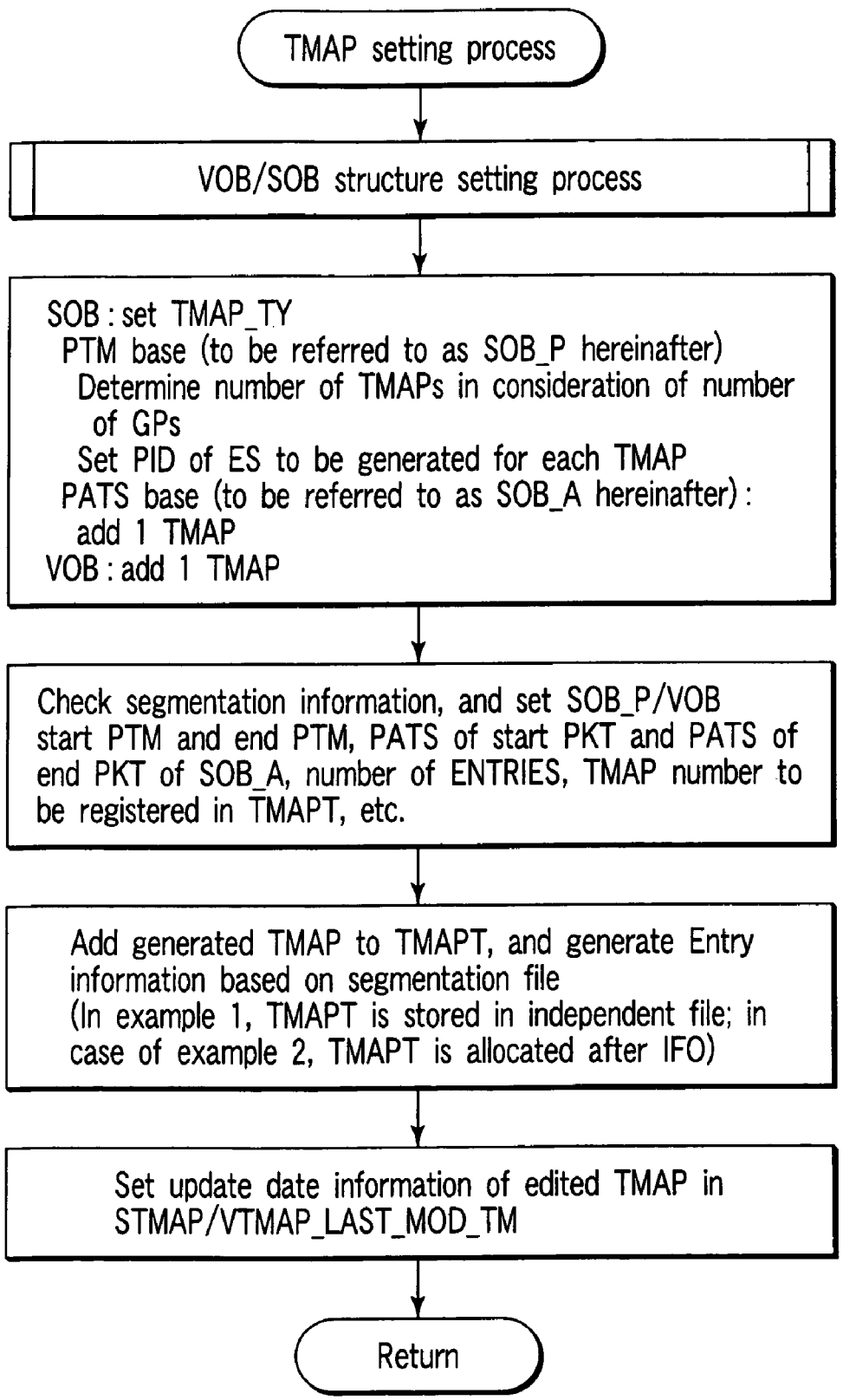
F I G. 126

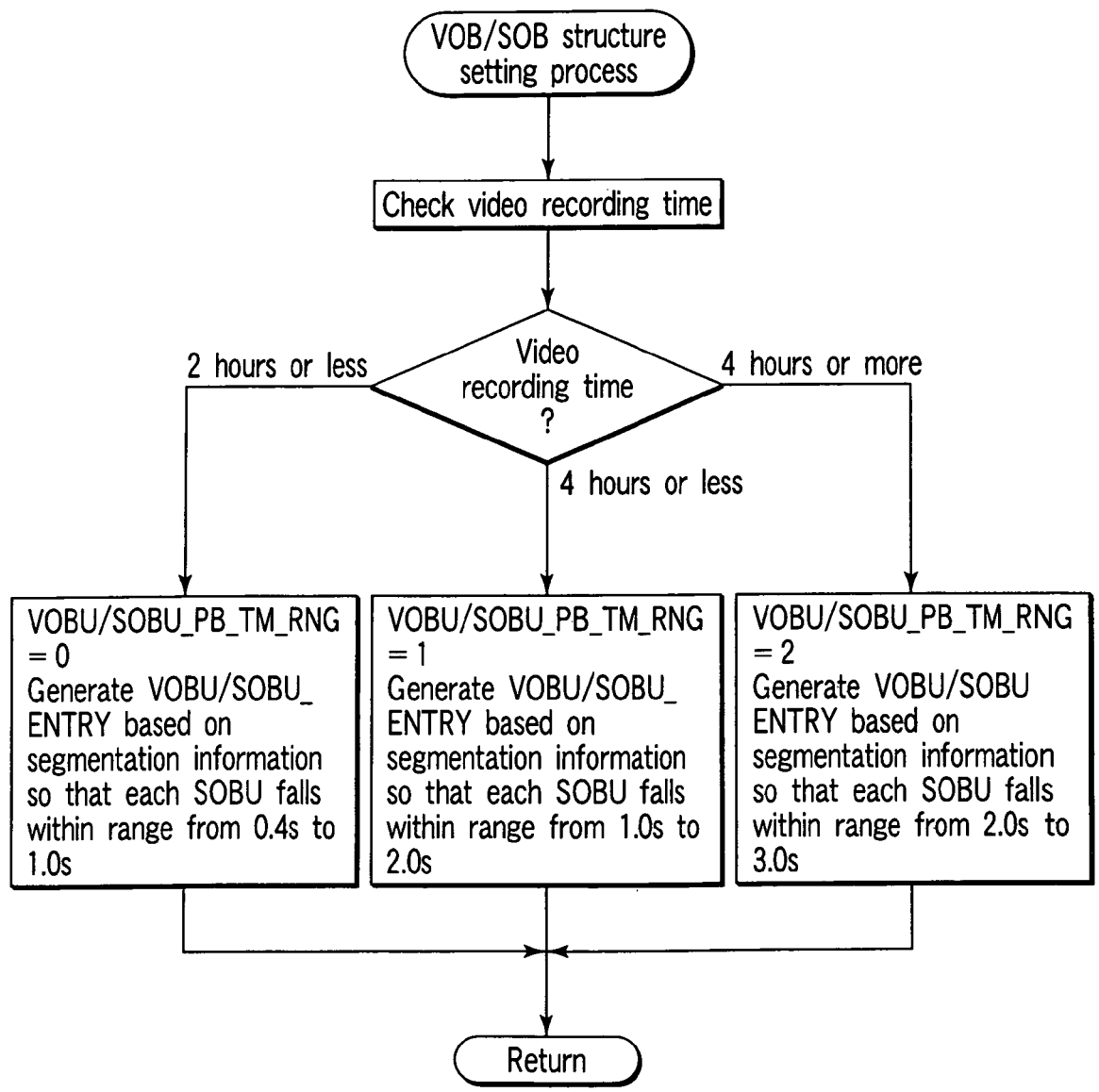
F I G. 127

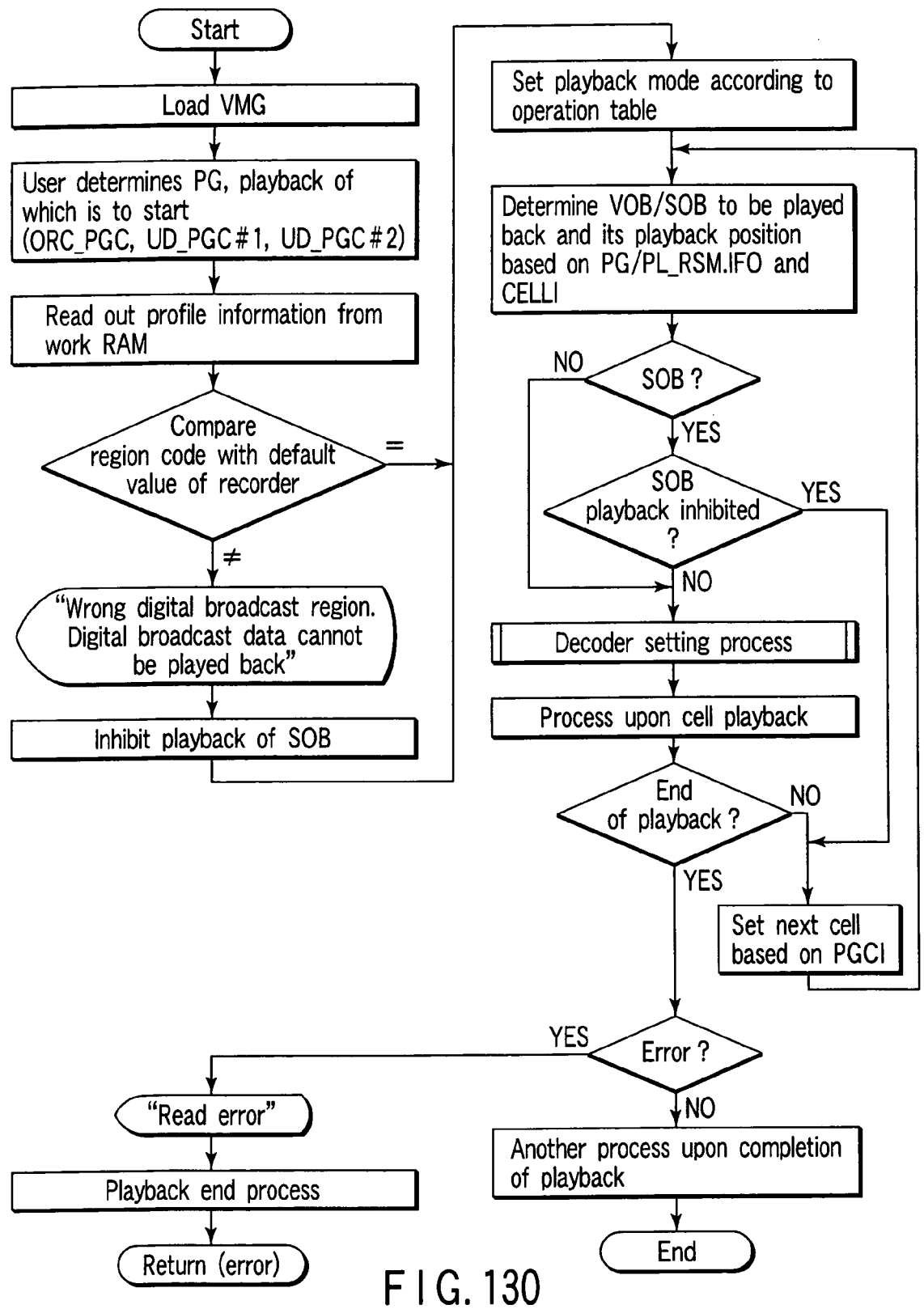
F I G. 130

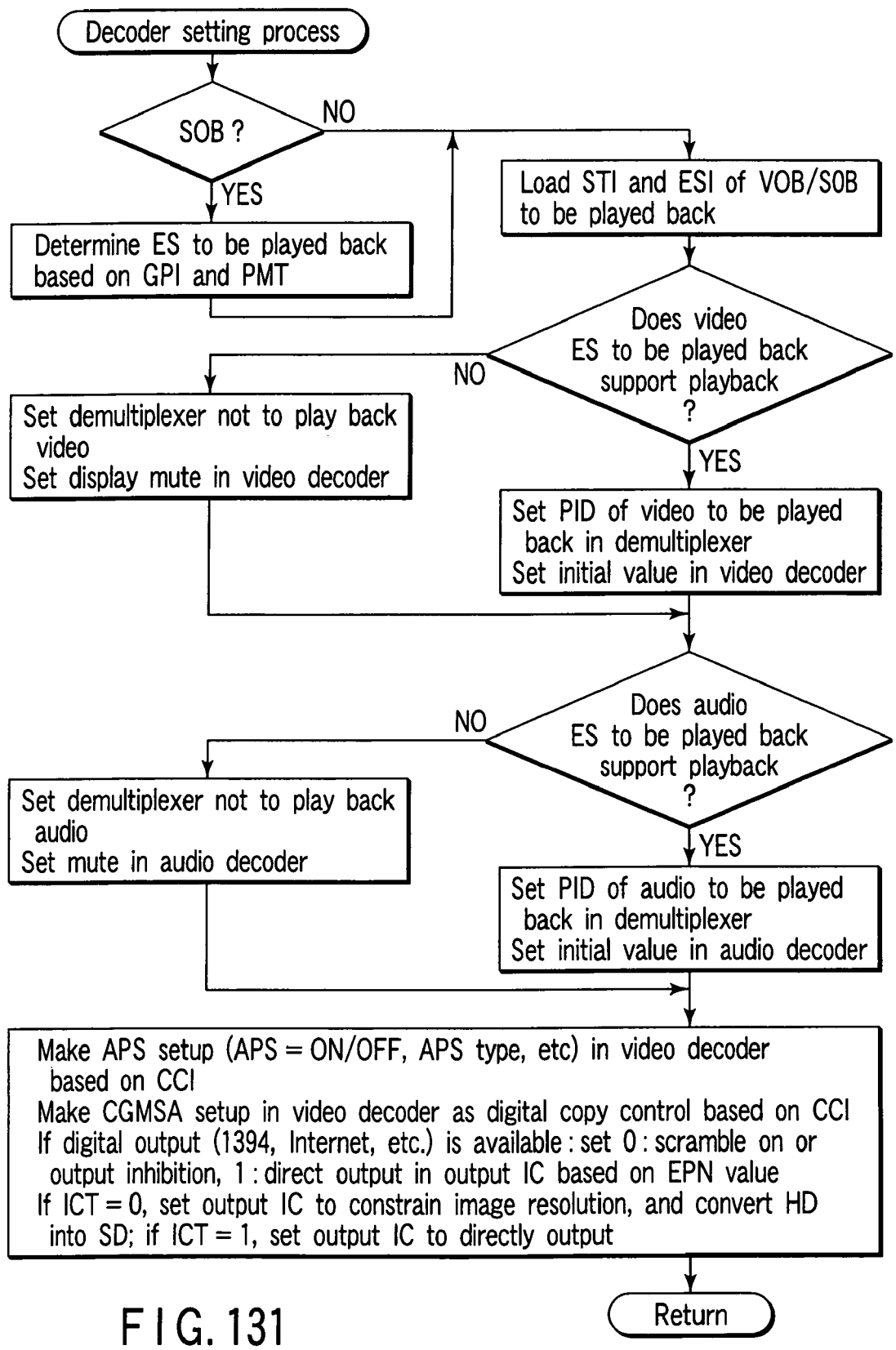
F I G. 131

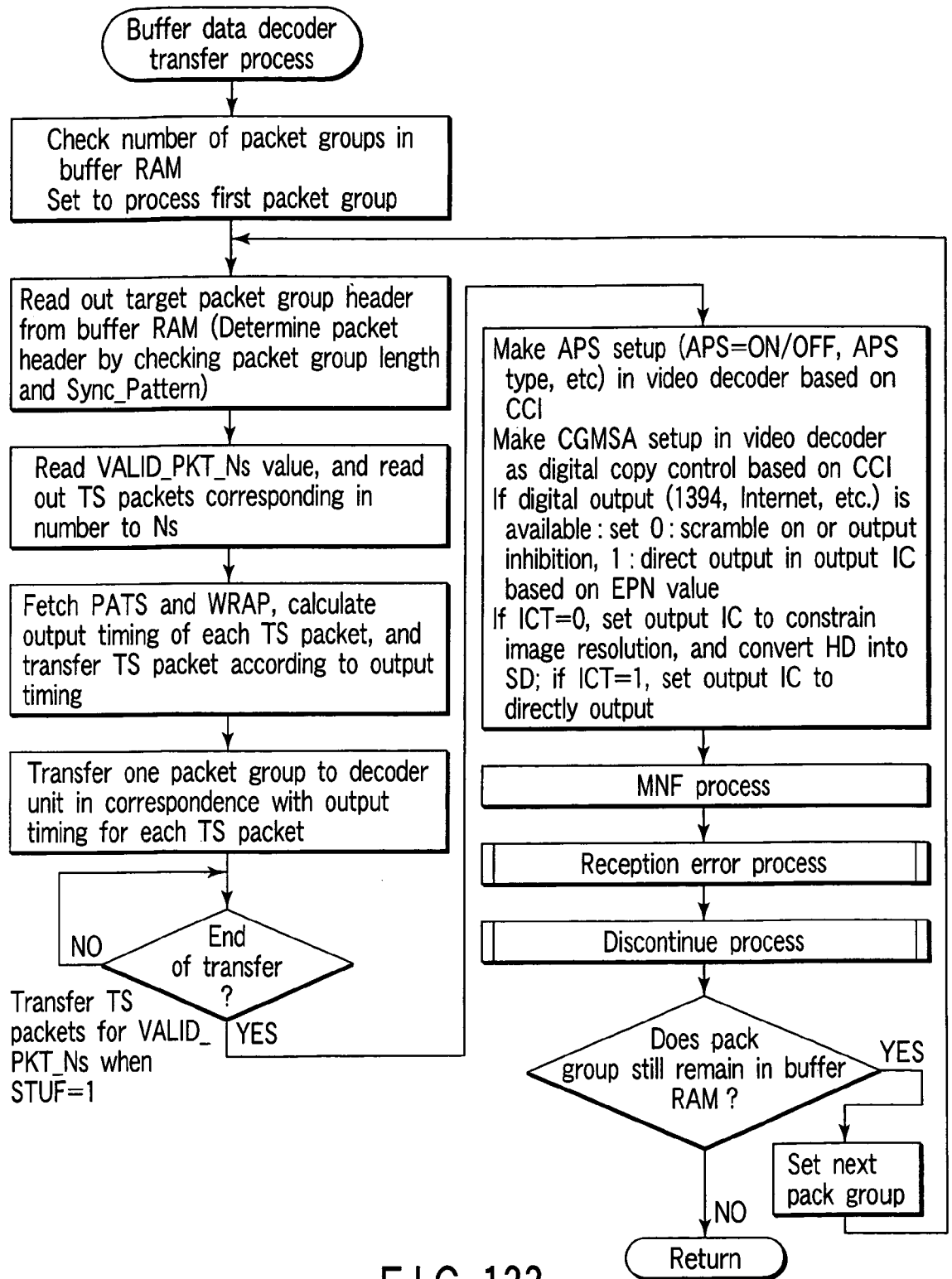
F I G. 133

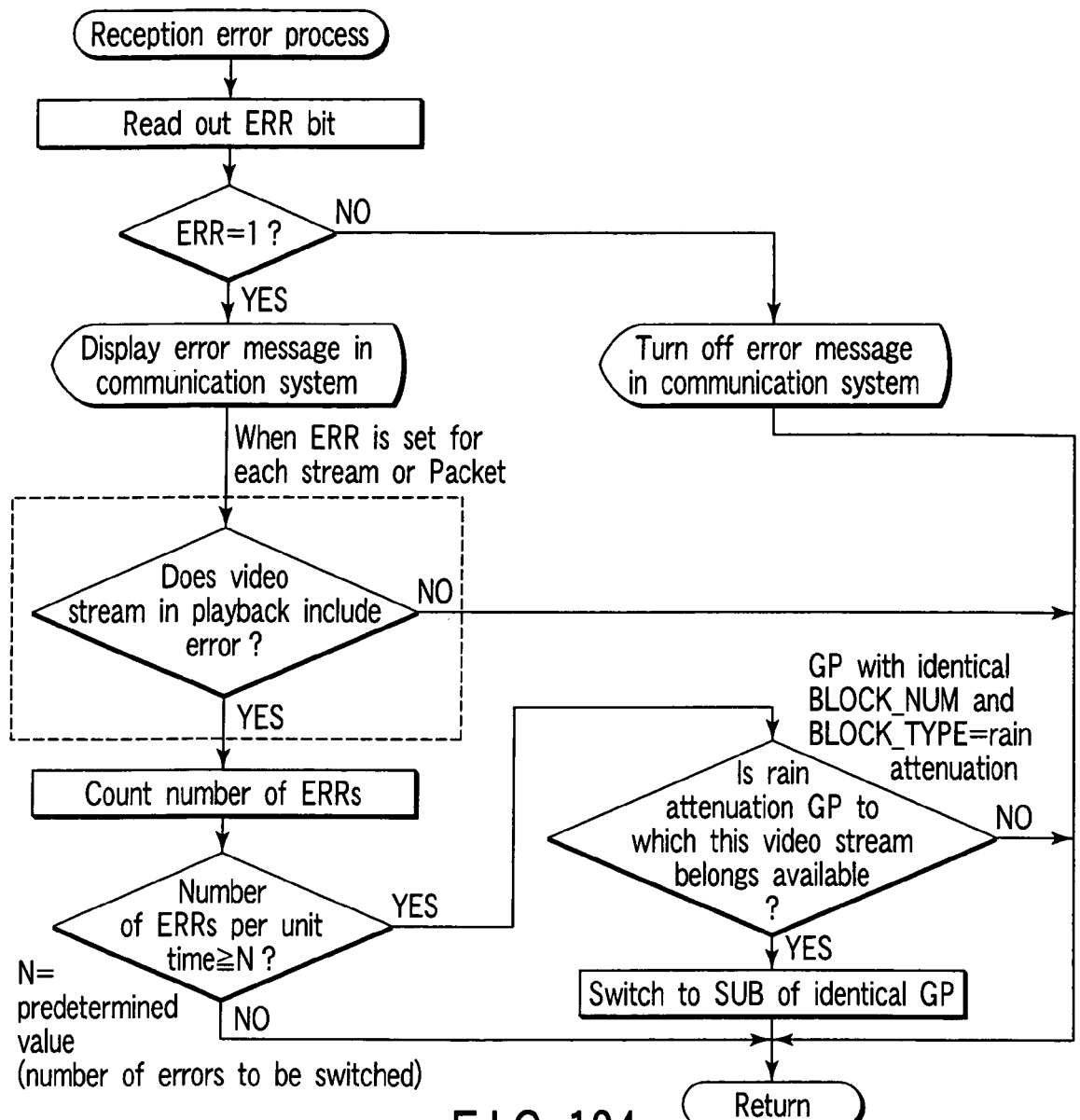
F I G. 134
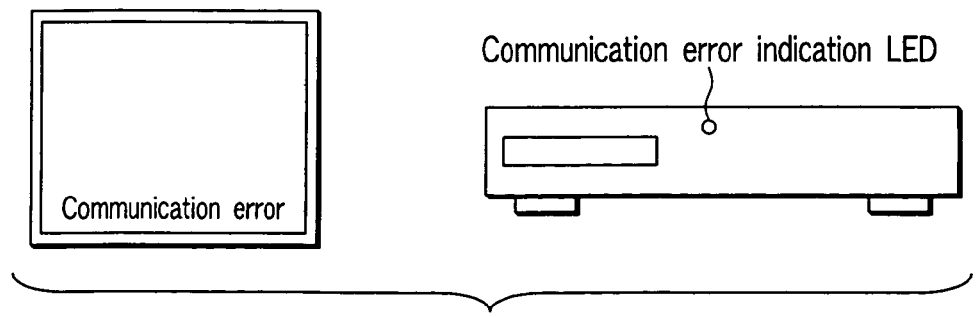
F I G. 135

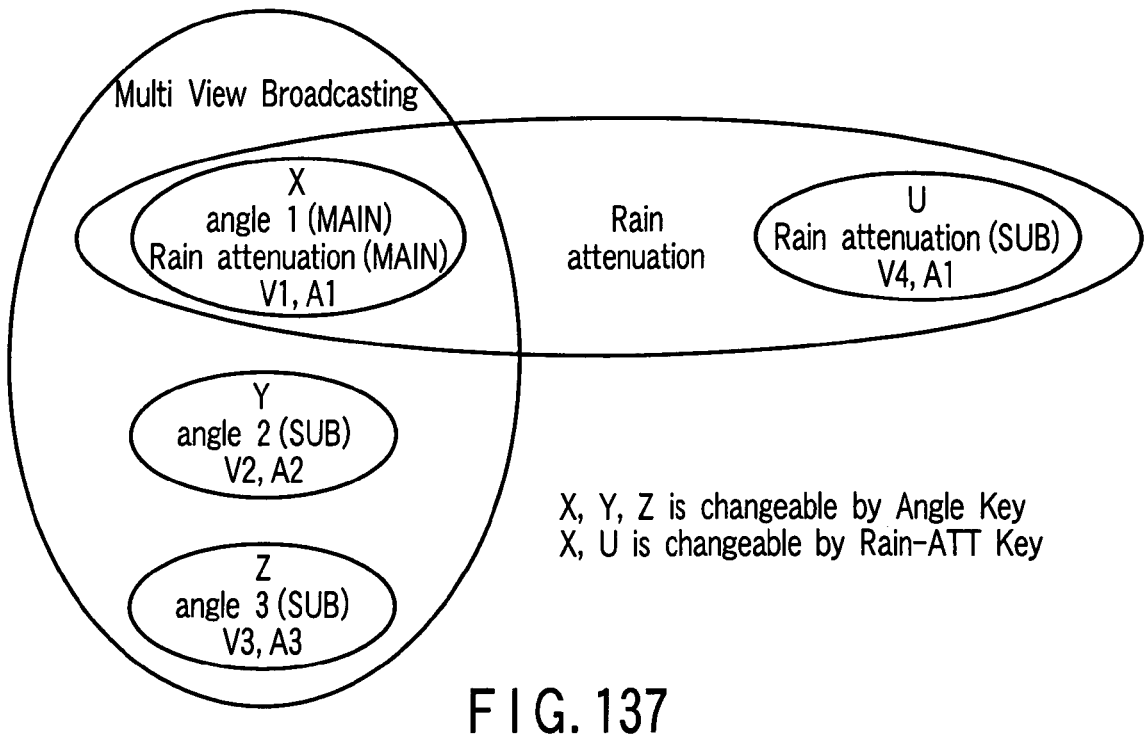
F I G. 137
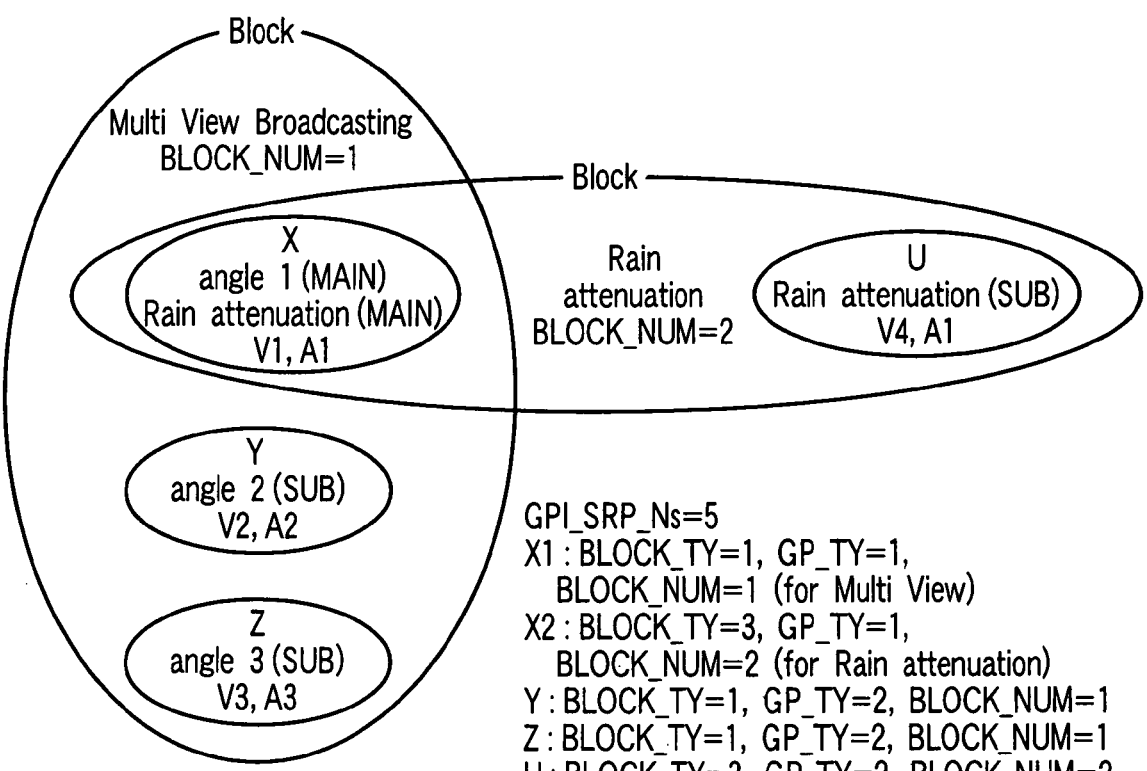
F I G. 138

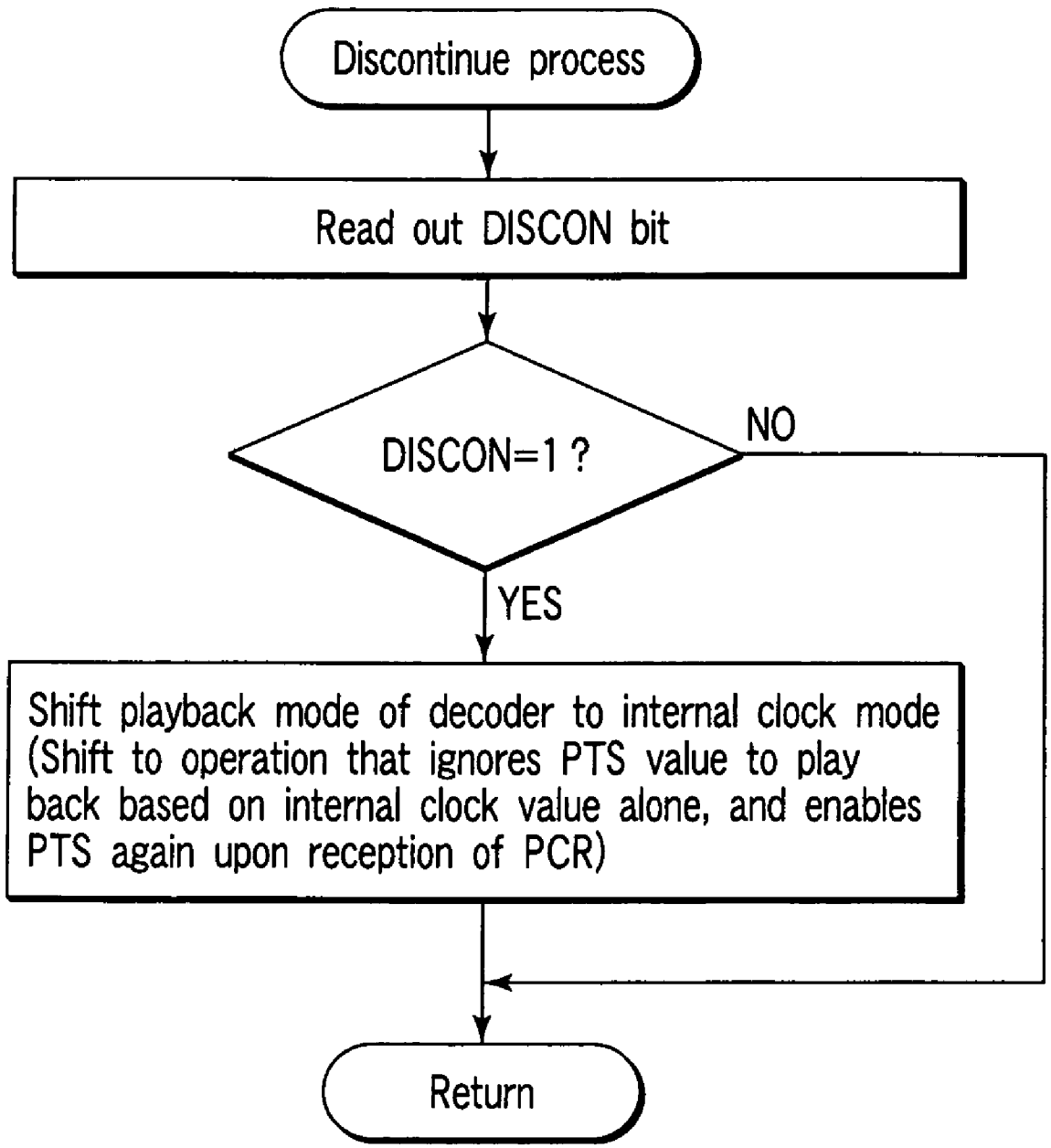
F I G. 141

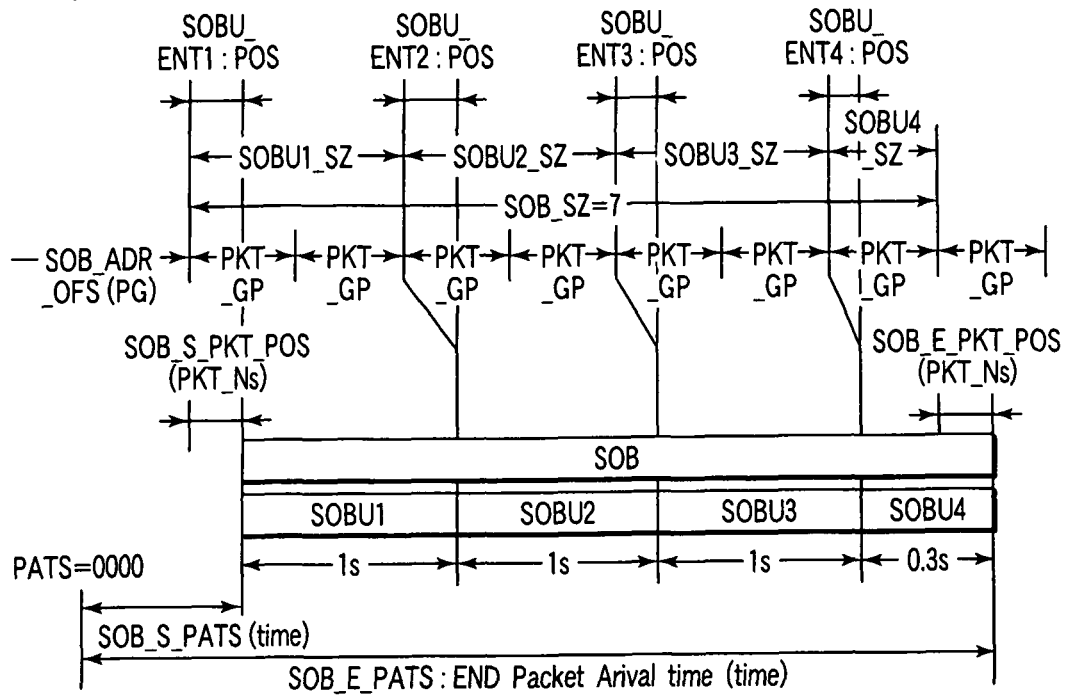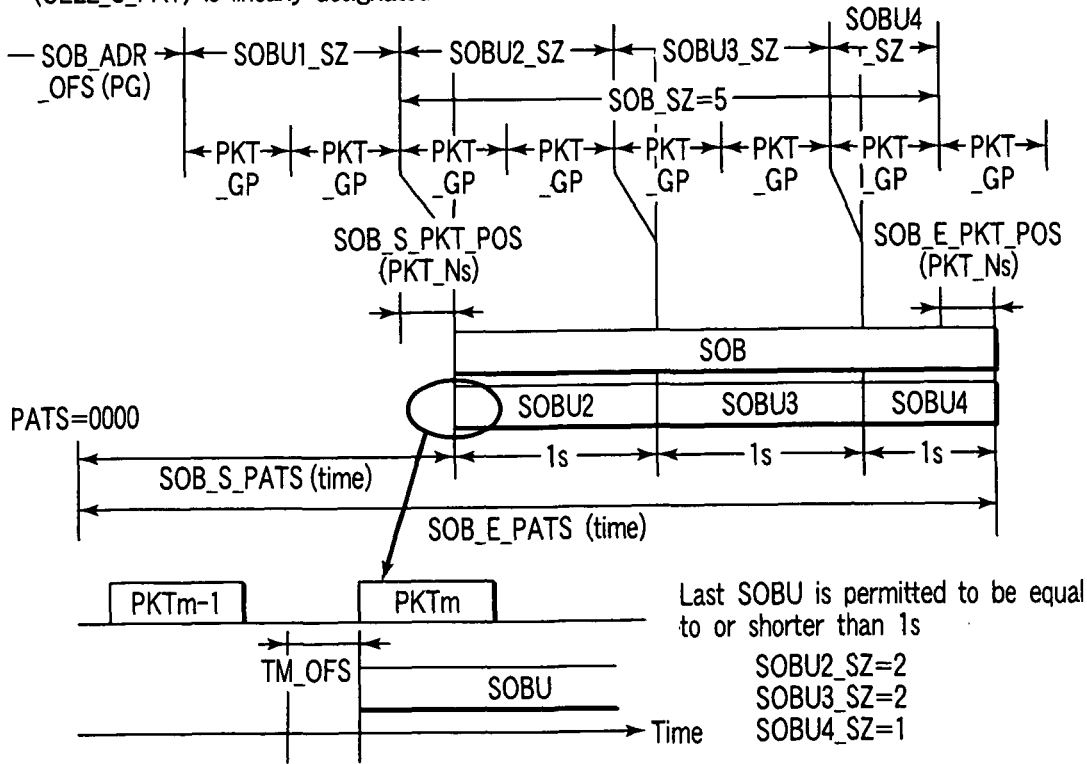
FIG. 142

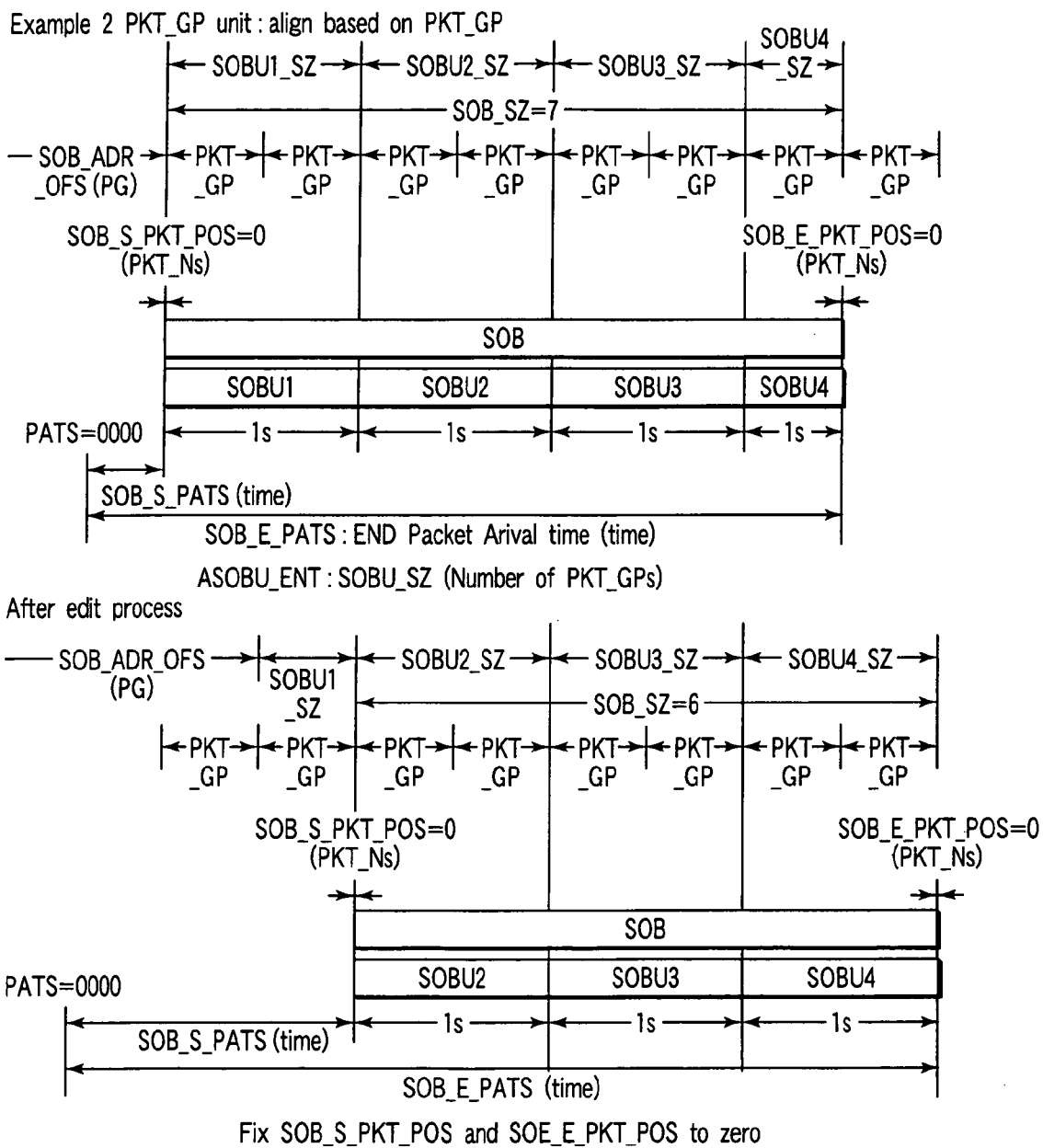
F I G. 143

INFORMATION RECORDING MEDIUM, INFORMATION RECORDING METHOD, INFORMATION PLAYBACK METHOD, INFORMATION RECORDING APPARATUS, AND INFORMATION PLAYBACK APPARATUS

CROSS-REFERENCE TO RELATED APPLICATIONS

This application is based upon and claims the benefit of priority from prior Japanese Patent Applications No. 2003-380265, filed Nov. 10, 2003; and No. 2004-073587, filed Mar. 15, 2004, the entire contents of both of which are incorporated herein by reference.

BACKGROUND OF THE INVENTION

1. Field of the Invention

The present invention relates to an information recording medium (or data structure), an information recording/playback method, and an information recording/playback apparatus, which are suited to record/play back a digital stream signal used in digital TV broadcast or the like.

2. Description of the Related Art

In recent years, TV broadcast has entered the era of digital broadcasts having Hi-Vision programs (programs of high-definition AV information) as principal broadcast contents. The current digital broadcast (and forthcoming terrestrial digital broadcast) adopts an MPEG transport stream (to be abbreviated as MPEG-TS as needed hereinafter). In the field of digital broadcast using moving pictures, MPEG-TS will be used as a standard format in the future. At the start of such digital TV broadcast, market needs for a streamer that can directly record digital TV broadcast contents are increasing.

As an example of a streamer that utilizes an optical disc such as a DVD-RAM or the like, "recording/playback apparatus" (Jpn. Pat. Appln. KOKAI Publication No. 2002-84479) is known.

Different digital broadcast schemes are adopted in respective countries: for example, DVB (Digital Video Broadcasting) in Europe; ATSC (Advanced Television Systems Committee) in U.S.A.; and ARIB (Association of Radio Industries and Businesses) in Japan.

In DVB, the video format is MPEG2, the resolutions are 1152*1440i, 1080*1920(i, p), 1035*1920, 720*1280, (576, 480)*(720, 544, 480, 352), and (288, 240)*352, the frame frequencies are 30 Hz and 25 Hz, the audio format includes MPEG-1 audio and MPEG-2 Audio, and the sampling frequencies are 32 kHz, 44.1 kHz, and 48 kHz.

In ATSC, the video format is MPEG2, the resolutions are 1080*1920(i, p), 720*1280p, 480*704(i, p), and 480*640(i, p), the frame frequencies are 23.976 Hz, 24 Hz, 29.97 Hz, 30 Hz, 59.94 Hz, and 60 Hz, the audio format includes MPEG1 Audio Layer 1 & 2 (DirecTV) and AC3 Layer 1 & 2 (Primstar), and the sampling frequencies are 48 kHz, 44.1 kHz, and 32 kHz.

In ARIB, the video format is MPEG2, the resolutions are 1080i, 720p, 480i, and 480p, the frame rates are 29.97 Hz and 59.94 Hz, the audio format includes AAC (MPEG-2 Advanced Audio Coding), and the sampling frequencies are 48 kHz, 44.1 kHz, 32 kHz, 24 kHz, 22.05 kHz, and 16 kHz.

In this manner, streams to be decoded by the apparatus side have many different variations for respective areas, and if all these variations are supported, the arrangement of a recording/playback apparatus (e.g., a DVD recorder) becomes considerably heavy (or completed). As a result, the apparatus cost increases.

BRIEF SUMMARY OF THE INVENTION

In an embodiment of the present invention, management information (e.g., HDVR_VMG/HDVR_VMGI/profile information in FIG. 4) of a recording medium can have option support information (e.g., option support flag in FIG. 5) that designates a combination of a base format (Base) and one or more options (Option1, Option2).

Note that the contents (e.g., option support flag=00, 01, 02, or 03) of the option support information are configured to specify decode formats of predetermined types (e.g., decode of streams corresponding to ○ in a combination shown in FIG. 45) (for example, the contents are configured to support, as options, 1080i MPEG2 video and 48-kHz/16-bit MPEG2 AAC5.1ch Audio when 480i MPEG2 video and 48-kHz/16-bit MPEG1 MP2 audio are included in the base format).

The number of formats of streams to be supported by the apparatus (recorder) is limited to a given value, and the option support information can specify which of a limited number of formats is to be used, thus suppressing an increase in apparatus cost.

BRIEF DESCRIPTION OF THE SEVERAL VIEWS OF THE DRAWING

FIG. 2 is a view for explaining the relationship among a playback management information layer, object management information layer, and object layer in the data structure according to the embodiment of the present invention;

FIG. 10 is a view for explaining various kinds of information included in SOBI_GI in FIG. 9;

FIG. 26 is a view for explaining an example of the configuration of SOB_ES_GPI_GI, GPI_SRP#, and GPI# included in SOB_ES_GPI in FIG. 25 (the GPI structure of example 1);

FIG. 28 is a view for explaining an example of the configuration of SOB_ES_GPI_GI, MAINGPI_SRP#, MAINGPI#, SUBGPI_SRP#, and SUBGPI# included in SOB_ES_GPI in FIG. 25 (GPI structure example 2);

FIG. 29 is a view for explaining an example of the configuration of MAINGPI_GI included in MAINGPI# in FIG. 28 (the GPI structure of example 2);

FIG. 30 is a view for explaining an example of the configuration of GPI_GI included in SUBGPI# in FIG. 28 (the GPI structure of example 2);

FIG. 33 is a view for explaining an example of the configuration of a data unit (SOBU) for a stream object shown in FIG. 1 or 2;

FIG. 36 is a view for explaining the file structure according to another embodiment of the present invention;

FIG. 37 is a view for explaining an example of the configuration of time map file HR_VTMAP.IFO/HR_STMPx.IFO included in a DVD_HDVR directory in FIG. 36 or time map table TMAPT (example 2) allocated at the end of HDVR_VMG in FIG. 6 (modification of FIG. 19);

FIG. 38 is a view for explaining an example of the configuration of various kinds of information included in VTMAPT in FIG. 37;

FIG. 44 is a flowchart-(initialize process flow example 1) for explaining an initialize process (ST10) shown in FIG. 42;

FIG. 45 shows examples of operation tables Used to designate a combination of the base format (Base) and one or more options (Option1, Option2) in association with a disc used and recording/playback operation (association tables between options and recording/playback operations);

FIG. 54 is a flowchart for explaining an example (example 1) of a GPI setting process (ST1530) in FIG. 53;

FIG. 71 is a view for explaining another example (example 2) of the group configuration of streams upon broadcasting a plurality of kinds of broadcasts;

FIG. 81 is a view for explaining various kinds of information included in SOBI_GI in FIG. 80;

FIG. 82 is a view for explaining an SOBU profile;

FIG. 83 is a view for explaining an example of the configuration of SOB_ESI included in SOBI;

FIG. 89 is a view for explaining an example of the configuration of SOB_TMAP of PATS base included in SOBI in FIG. 78;

FIG. 92 is a view for explaining an example of the configuration of various kinds of information included in VTMAPT in FIG. 91;

FIG. 93 is a view for explaining an example of the configuration of the contents of each SOBU/VOBU_ENT# (in case of a VOBU_ENT);

FIG. 95 is a view for explaining an example of information stored in ES_TMAPIGI and ES_TMAP# included in STMAP_SRP# and STMAP in FIG. 94;

FIG. 97 is a view for explaining an example of the configuration for PATS base of the contents of each SOBU/VOBU_ENT# (in case of SOBU_ENTRY) in FIG. 95;

FIG. 101 is an explanatory view showing an example of the configuration of EX_ORG_PGC information and EX_UD_PGC information in one field (HDVR_MG) of management information recorded on AV data management information recording area 130;

FIG. 104 is an explanatory view showing an example of the configuration of packet group general information included in the packet group header in FIG. 103;

FIG. 106 is an explanatory view showing an example of the configuration of First_PATS_EXT included in the packet group header in FIG. 103;

FIG. 107 is an explanatory view showing an example of the configuration of MNFI included in the packet group header in FIG. 103;

FIG. 108 is an explanatory view showing the relationship among management information in HDVR_VMG, STR_FI files, TMAP files, and Object files, and a state wherein the corresponding files and management information are managed so that their update date information matches;

FIG. 111 is an explanatory view showing an example of the format of HR_SFI#n when STR_FI is prepared as an independent file;

FIG. 113 is a flowchart (overall operation process flow) for explaining an example of the overall operation of the apparatus shown in FIG. 112;

FIG. 114 is a flowchart (edit operation process flow) for explaining an example of an edit process (ST28) shown in FIG. 113;

FIG. 115 is a flowchart (initialize process flow example 1) for explaining an initialize process (ST10) shown in FIG. 113;

FIG. 120 is an explanatory view showing a packet group align process;

FIG. 121 is a flowchart for explaining an example of an MNFI setting process;

FIG. 122 is a flowchart for explaining an example of a process executed before video recording starts on a disc-like information storage medium (e.g., an optical disc using blue laser) shown in FIG. 72;

FIG. 123 is a flowchart for explaining a stream information (ESI) generation process in FIG. 116;

FIG. 124 is a flowchart for explaining an example of a stream file information (STR_FI) generation process in a video recording end process in FIG. 116;

FIG. 125 is a flowchart for explaining an example (example 1) of a GPI setting process in FIG. 114;

FIG. 126 is a flowchart for explaining a TMAP setting process in FIG. 125;

FIG. 127 is an example of a process for setting a VOB/SOB structure;

FIG. 128 is a flowchart for explaining a CP_CTL_INFO generation process;

FIG. 129 is a flowchart for explaining an example of a program chain (PGC) generation process (including a program setting process) in the video recording end process;

FIG. 130 is a flowchart for explaining an example of a playback operation of the apparatus in FIG. 112;

FIG. 131 is a flowchart for explaining a decoder setting process in FIG. 130;

Figure 132:
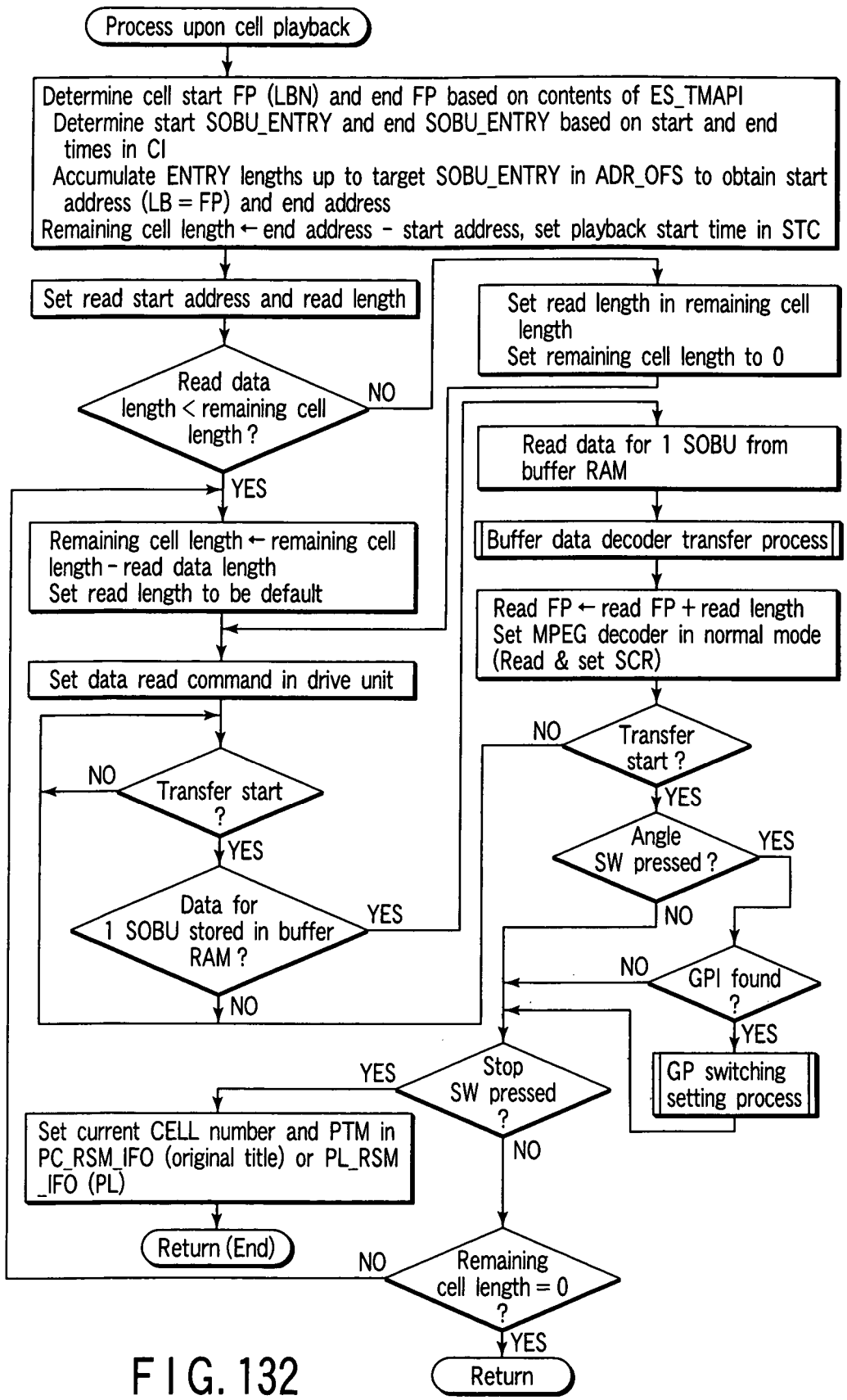
Figure 136:
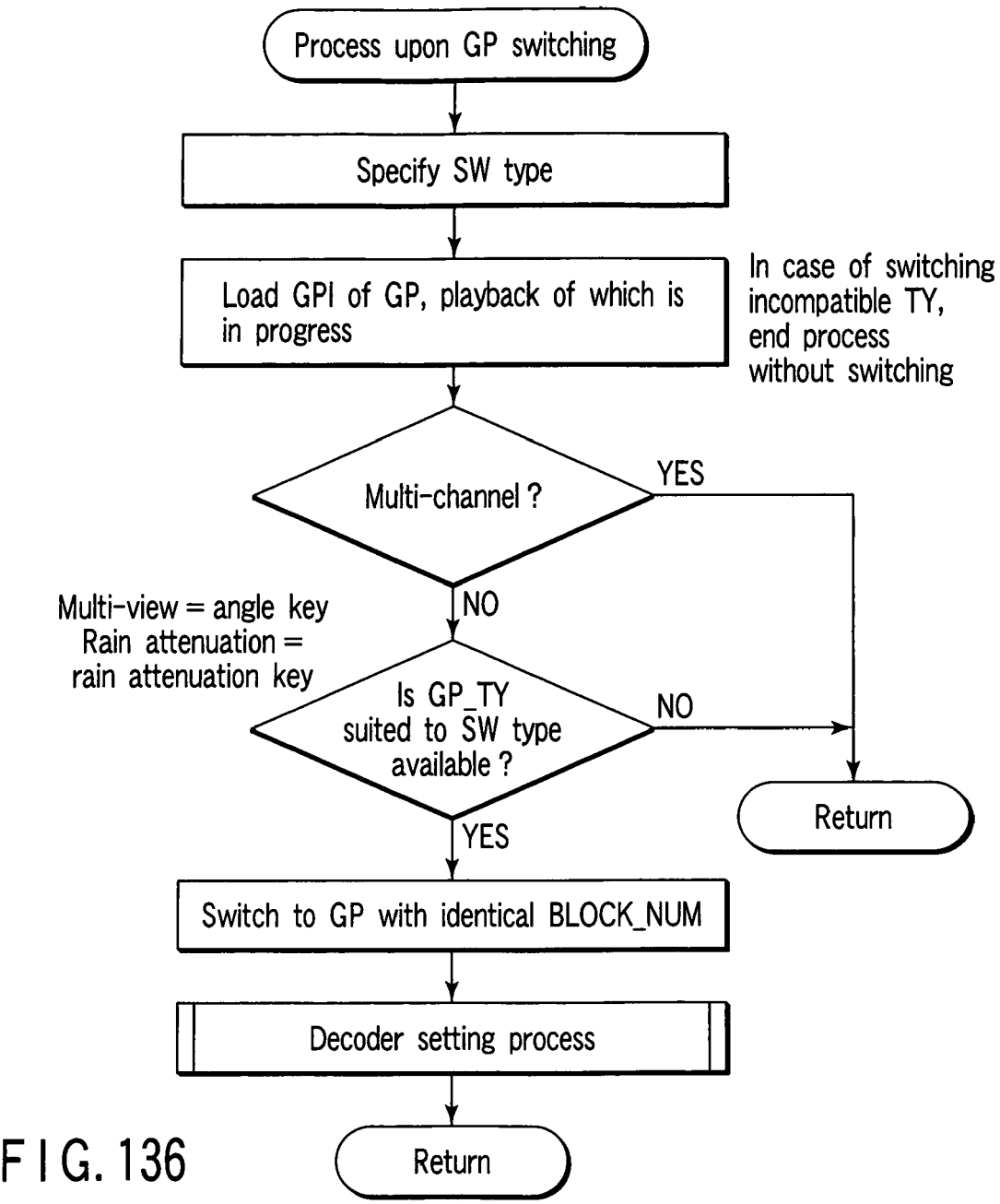
Figure 139:
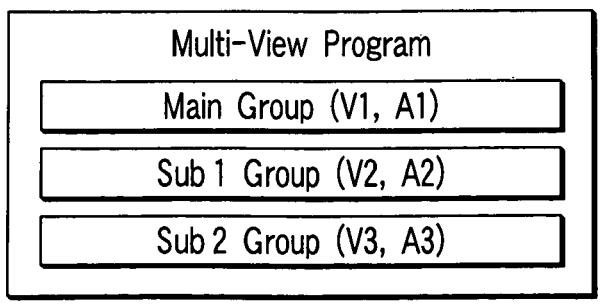
Figure 140:
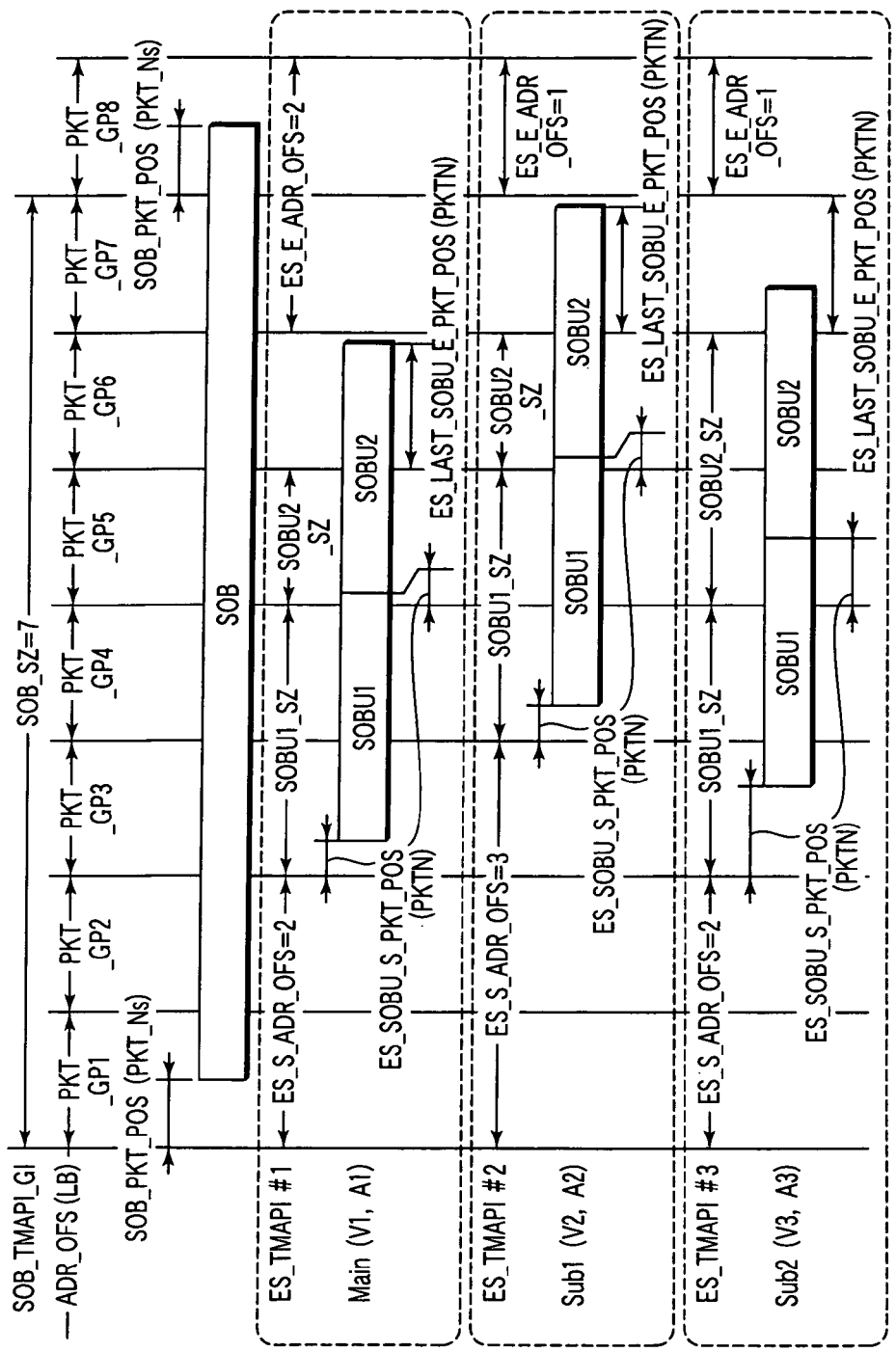

FIG. 132 is a flowchart for explaining an example of a process upon cell playback in FIG. 130;

FIG. 133 is a flowchart for explaining a transfer process from a buffer RAM to a decoder upon playback;

FIG. 134 is a flowchart for explaining an example of a process executed upon detection of any reception error;

FIG. 135 is an explanatory view showing an example of the correspondence between a display and a recording/playback apparatus upon detection of any reception error;

FIG. 136 is a flowchart for explaining an example (example 1) of a GP switching setting process;

FIG. 137 is a view for explaining an overview of the configuration of streams upon broadcasting a plurality of types of broadcast data;

FIG. 138 is a view for explaining an example (example 2) of the group configuration of streams upon broadcasting a plurality of types of broadcast data;

FIG. 139 shows an SOB image upon recording multi-view broadcast;

FIG. 140 is an explanatory view showing the relationship between an SOB and the data structure upon recording multi-view broadcast;

FIG. 141 is a flowchart for explaining an example of the operation upon detection of any discontinuity;

FIG. 142 is an explanatory view for explaining an example upon editing in an SOB recorded state; and FIG. 143 is an explanatory view for explaining another example upon editing in an SOB recorded state.

DETAILED DESCRIPTION OF THE INVENTION

Figure 1:
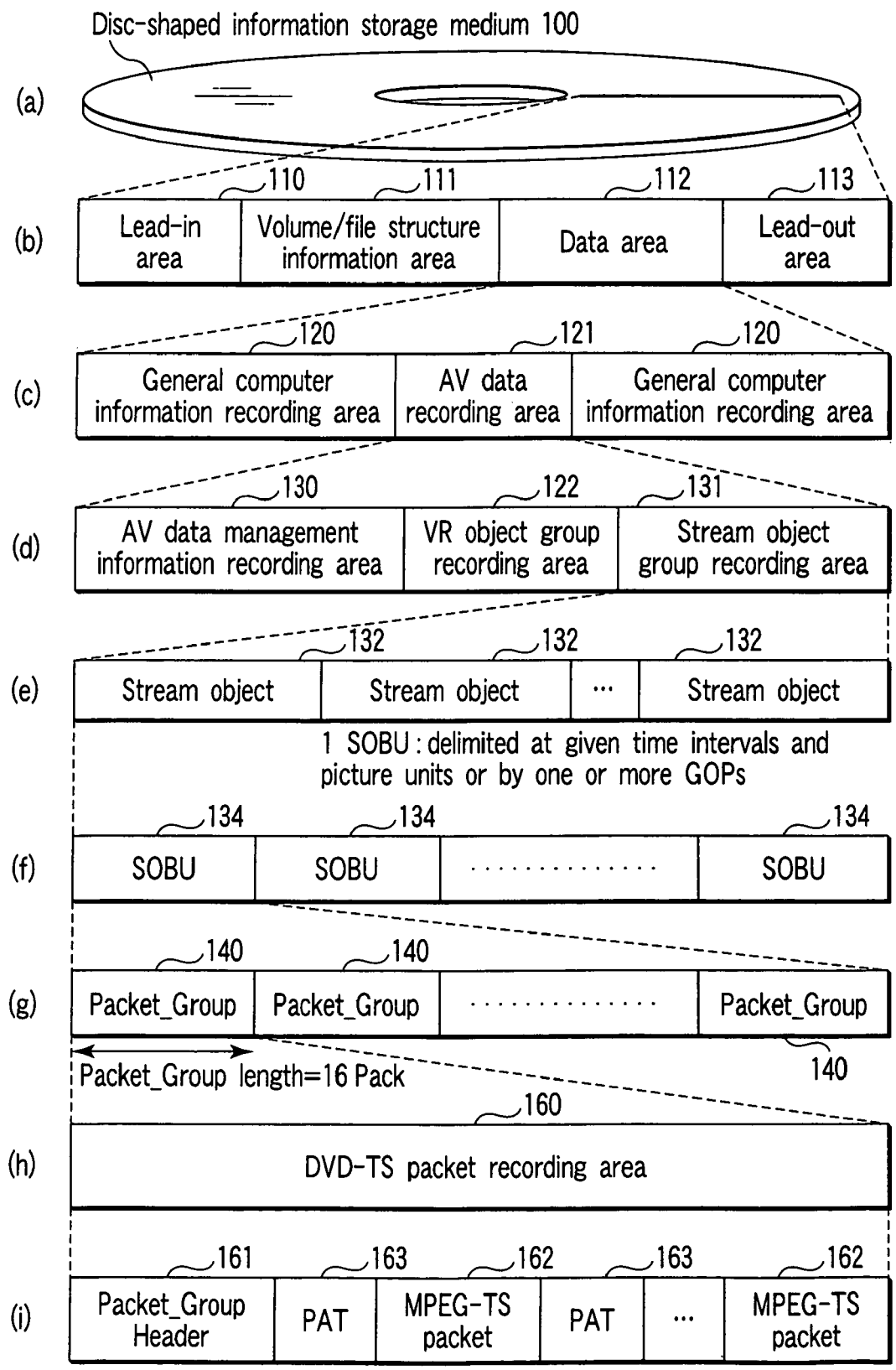
FIG. 1 is a view for explaining the data structure according to an embodiment of the present invention.

Various embodiments of the present invention will be described hereinafter with reference to the accompanying drawings. FIG. 1 is a view for explaining the data structure according to an embodiment of the present invention. As disc-shaped information recording medium 100 (FIG. 1(a)), recordable optical discs such as a DVD-RAM, DVD-RW, DVD-R, and the like, and recordable magnetic discs such as a hard disc and the like are available. The following explanation will be given taking an optical disc such as a DVD-RAM or the like using a laser of 405 nm to 650 nm as an example.

Disc 100 has lead-in area 110, volume/file structure information area 111, data area 112, and lead-out area 113 from its inner periphery side toward the outer periphery side (FIG. 1(b)). Volume/file structure information area 111 stores a file system. The file system includes information indicating the recording locations of files. Recorded contents are stored in data area 112 (FIG. 1(c)).

Data area 112 is divided into areas 120 that record general computer data, and area 121 that records AV data. AV data recording area 121 includes AV data management information area 130 that stores a file (VMG file) used to manage AV data, VR object group recording area 122 that records object data (VOBS) files (VRO files) complying with the video recording standard, and Stream object group recording area 131 that records stream objects (SOBS: Stream object Set) compatible to digital broadcast (FIG. 1(*d*)). That is, in this embodiment, stream objects of digital broadcast are recorded as stream objects 132 (SOBS) as files independent from VR objects (FIG. 1(*e*)).

Each stream object 132 is formed of one or more data units (SOBU: Stream object Unit) 134 each of which serves as an access unit to disc 100 (FIG. 1(*f*)). Note that one SOBU is a data unit delimited by pictures at given time intervals which are designated by a value in object management information. Alternatively, one SOBU may be a data unit delimited by one or more GOPs. Each data unit (SOBU) 134 includes one or more pack groups (Packet Group), each of which includes a group of a plurality of TS packets (FIG. 1(*g*)).

In this embodiment, each packet group 140 includes, e.g., a group of 16 packs (or 16 LBs (Logical Blocks)). If one pack size (or one LB size) is 2 kbytes, the size of each packet group 140 is 32 kbytes. This size is equal to the ECC block size in the video recording standard.

Each packet group 140 forms packet recording area (DVD-TS packet recording area) 160 in stream recording (SR) (FIG. 1(*h*)). DVD-TS packet recording area 160 can be formed of packet group header 161, and a plurality of pairs (e.g., 170 pairs) of packet arrival time information (PAT) 163 and MPEG-TS packets 162 (FIG. 1(*i*)). The contents of packet group 140 will be described in detail later with reference to FIG. 33.

FIG. 2 is a view for explaining the relationship among a playback management information layer, object management information layer, and object layer in the data structure according to the embodiment of the present invention. Management information (VMG file) recorded on AV data management information recording area 130 in FIG. 1 has playback management information layer 10 used to manage the playback sequences of both the recorded contents based on the video recording standard and the stream recording recorded contents based on the present invention. That is, a group of one or more cells 13 each of which serves as a playback unit of stream-recorded objects form program 12, and a group of one or more cells 13 each of which serves as a playback unit of video-recorded objects form another program 12. A sequence (playback sequence) of these programs 12 is managed by management information (PGCI) of program chain (PGC) 11.

Even when the user wants to start playback from the middle of either cell 13 on the stream recording side or cell 13 on the video recording side, he or she can designate the playback location using a playback time (PTS). That is, when playback is to start from the middle of cell 13 on the stream recording side using the playback time (PTS), stream object SOB 132 in stream object layer 30 is designated via stream object information SOBI 21 in stream object management information layer 20, and stream object unit SOBU 134 in stream object layer 30 is designated via stream object unit information SOBUI 22 in stream object management information layer 20. When SOB 132 and its SOBU 134 are designated, the playback start location is specified. (SOBUI in this case may be restated as global information 22.)

This SOBU 134 is formed of one or more packet groups 140. SOBU 134 is a data unit corresponding to, e.g., 1 or 2 GOPs. Alternatively, SOBU 134 may be delimited by units each corresponding to a data size for a given playback time designated by a value in object management information. In this way, overflow of each information field is prevented.

Each packet group 140 includes 16 packs (or 16 LBs) (32768 bytes), and has packet group header 161 at its head position. After packet group header 161, a plurality of pairs (170 pairs in this example) of PAT 163 and TS packets 162 are allocated. These TS packets 162 store stream recording recorded contents.

On the other hand, when playback is to start from the middle of cell 13 on the video recording side using the playback time (PTS), video object VOB 36 in video object layer 35 is designated via video object information VOBI 24 in video object (VOB) management information layer 23, and video object unit VOBU 37 in video object layer 35 is designated via video object unit information VOBUI 25 in video object management information layer 23. When VOB 36 and its VOBU 37 are designated, the playback start location is specified. VOBU 37 includes a plurality of packs 38, which store video recording recorded contents.

Figure 22:
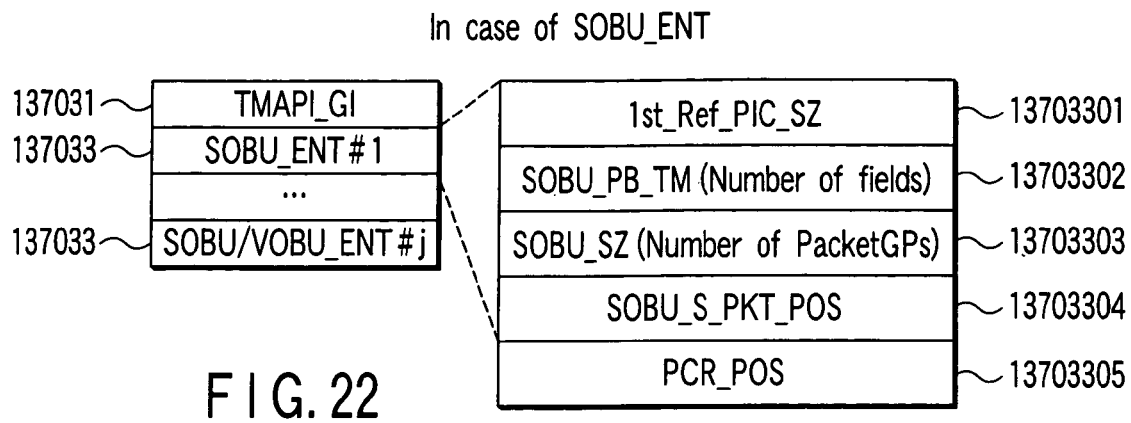
FIG. 22 is a view for explaining an example of the configuration of the contents of each SOBU/VOBU_ENT# (in case of SOBU_ENT) in FIG. 20.

When playback is to start from the middle of cell 13 on the stream recording side, the playback start location can be designated using a time in units of the number of fields by SOBU_PB_TM (FIG. 22). On the other hand, when the playback is to start from the middle of cell 13 on the video recording side, the playback start location can be designated by VOBU_PB_TM (FIG. 24) in time map information (TMAPI) specified by the video recording standard.

The contents of FIG. 2 can be summarized as follows. That is, the structure of each SOBU (Stream Object Set) includes one or more SOB (Stream object) data. Each SOB corresponds to, e.g., one program. The SOB includes one or more SOBUs (Stream object Units), each of which corresponds to object data for a given time interval (which changes depending on the value of VOBU/SOBU_PBT_RNG; VOBU/SOBU PlayBack Time Range in FIG. 18/FIG. 17) or one or more GOPs.

When the transfer rate is low, one GOP data cannot often be sent within 1 sec (is) (DVD-VR that MPEG-encodes an analog video input inside the apparatus can freely set the data unit configuration since it adopts internal encoding, but digital broadcast cannot specify the next incoming data since encoding is done by a broadcast station). On the other hand, the transfer rate may be high, and I-picture data may be sent frequently. In such case, SOBU is delimited frequently, and SOBU management information increases accordingly, thus ballooning the whole management information. For this reason, it is appropriate to delimit SOBUs according to the embodiment of the present invention by a given time interval (a minimum limitation is to delimit SOBUs by picture data except for the last SOBU of the SOB) or by one or more GOPs.

One SOBU includes one or more packet groups, each of which is basically formed of 16 packs (one Pack=one sector: 2048-byte size). Each packet group includes a packet group header and (170) TS packets. The arrival time of each TS packet can be detected from PAT 163 which forms a pair with each TS packet 162.

Figure 3:
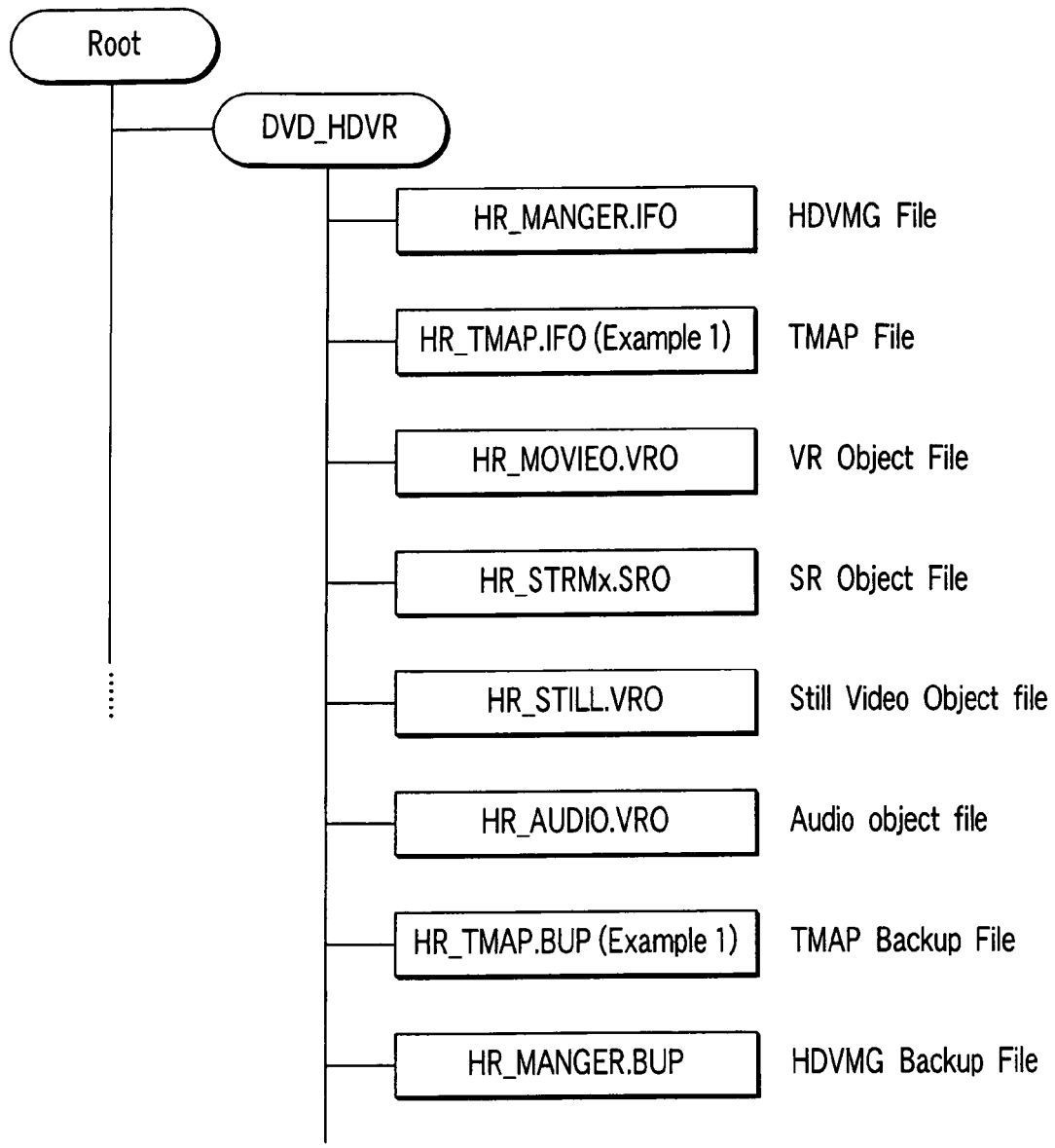
FIG. 3 is a view for explaining the file structure according to the embodiment of the present invention.

The management information will be described below with reference to FIGS. 3 to 32. FIG. 3 is a view for explaining the file structure according to the embodiment of the present invention. Data in disc 100 in FIG. 1 includes volume/file structure information area 111 which stores a file system, and data area 112 which actually records data files. The file system stored in volume/file structure information area 111 includes information indicating the recording locations of files, as shown in FIG. 3. Data area 112 is divided into areas 120 that record general computer data, and area 121 that records AV data. AV data recording area 121 includes AV data management information area 130 that stores an HDVMG file (and its backup file) used to manage recorded AV data, VR object group recording area 122 that records object data (VOBS) files (VRO files) complying with the video recording standard, and Stream object group recording area 131 that records stream objects (SOBS) compatible to digital broadcast.

Note that different directories are prepared in correspondence with formats (e.g., VIDEO-TS for DVD-Video (ROM Video) and DVD-RTAV for DVD-RTR (recordable/reproducible DVD), and the digital broadcast compatible DVD standard to be described below is recorded in, e.g., a DVD_H-DVR directory.

That is, as shown in FIG. 3, the DVD_HDVR directory records a VMG file (HR_MANGER.IFO and its backup HR_MANGER.BUP) used to manage data, a VRO file (HR_MOVIEO.VRO) as an object file used to record analog AV information such as analog broadcast, analog line input data, and the like, an SRO file (HR_STRMx.SOR; x=0, 1, 2, ... ) as a digital broadcast object, a still object file (HR_STILL.VRO), and an audio object file (HR_AUDIO.VRO). Note that the SRO file records SOBS.

In FIG. 3, a time map file (HR_TMAP.IFO) and its backup file (HR_TMAP.BUP) as example 1 are also assured as independent files. These files (HR_TMAP.IFO and HR_TMAP.BUP) can store information of time map table TMAPT (that is, TMAPT can undergo file management independently of other kinds of management information).

As shown in FIG. 3, SR management data is recorded in the HDVMG file common to VR, and undergoes control common to VR. As shown in FIG. 2, SR and VR management data are linked for respective CELLs, and their playback locations can be designated by playback times.

Note that the DVD_HDVR directory can store HR_THNL.DAT (not shown) as a thumbnail (reduced-scale picture) file which can be used in a chapter menu and the like. Furthermore, the DVD_HDVR directory can store an additional text file: HR_TEXT.DAT independent from item text (IT_TXT) and HR_EXEP.DAT used to save information added to entry points (EP), as needed (neither of them are shown).

Figure 4:
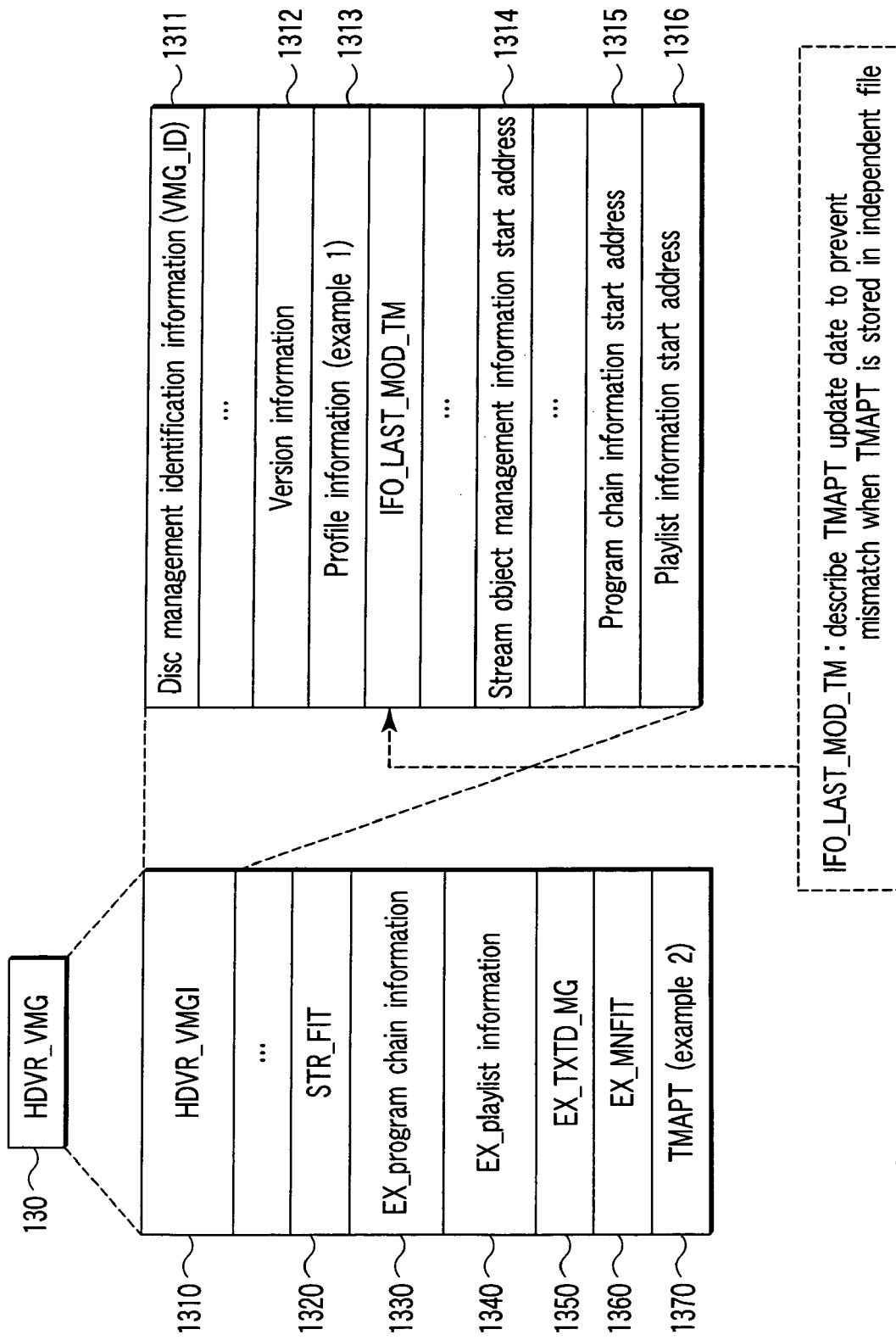
FIG. 4 is a view for explaining an example of the configuration of a field (HDVR_VMGI) of one management information (HDVR_VMG) recorded on AV data management information recording area 130 (this HDVR_VMGI includes profile information (example 1))

Note that TMAPT may be added to the end of HDVR_VMG (example 2), as shown in FIG. 4, in place of storing TMAPT as an independent file, as shown in FIG. 3.

FIG. 4 is a view for explaining an example of the configuration of a field (HDVR_VMGI) of one management information (HDVR_VMG) recorded on AV data management information recording area 130. Note that stream recording in this embodiment will be abbreviated as SR, and video recording will be abbreviated as VR. Then, management information (STR_FIT; Stream File Information Table) of SR data is saved in HDVR_VMG 130 (in HR_MANGER.IFO in FIG. 3), and is managed in the same way as VR data.

HDVR_VMG 130 includes video manager information (HDVR_VMGI) 1310, stream file information table (STR_FIT) 1320, program chain information 1330, playlist information 1340, text data manager 1350, manufacturer information table 1360, and time map table TMAPT (example 2) 1370.

Note that it is important to locate TMAPT 1370 at the end of VMG 130. That is, since TMAPT 1370 is located at the end of VMG 130, even when TMAP is frequently rewritten and its data size increases/decreases, VMGI 1310 to MNFIT 1360 need not be rewritten in each case.

In other words, a DVD recorder normally has time map information (TMAPI) as VOB management information. This information is used to divide object data (VOB/SOB) for each data unit (VOBU/SOBU) and to implement playback, special playback, and the like for that unit, and one information is required per a maximum of 0.5 s. For this reason, if the disc size increases in the future or a compression method with high compression efficiency is adopted, the number of pieces of time map information TMAPI increases, and complicated management is required when an edit process or the like is made. If this TMAPI is stored in the management information file (HR_MANGER.IFO in FIG. 3), management data in other non-related fields must be moved or rewritten every time TMAPI is changed, resulting in poor efficiency.

Hence, in the embodiment of the present invention, in order to improve such situation, TMAPI is recorded in an independent field (HR_TMAP.IFO in FIG. 3, TMAPT allocated at the end of HDVR_VMG in FIG. 4, or the like).

Referring to FIG. 4, HDVR_VMGI 1310 includes disc management identification information (VMG_ID) 1311, version information (VERN) 1312, profile information 1313 as example 1, IFO_LAST_MOD_TM that describes the update date and time of TMAPT, stream object management information start addresses 1314, program chain information start address 1315, and playlist information start address 1316. SR stream management information is saved in STR_FIT 1320.

In the example of FIG. 4, VMGI describes the update date information of TMAPT (or that of VMGI as including TMAPT) (IFO_LAST_MOD_TM). This value is compared with update date information (not shown or IFO_LAST_MOD_TM in FIG. 38 or 39) described in a TMAPT file, and when the two values match, a process can be done since it is determined that stored data are consistent.

Profile information (example 1) 1313 included in VMGI 1310 in FIG. 4 can be used to indicate support states of various decode functions, as will be described below with reference to FIGS. 5 and 45.

Figure 5:
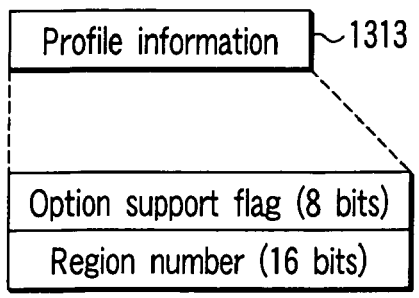
FIG. 5 is a view for explaining a practical example of profile information (example 1) in FIG. 4.

FIG. 5 is a view for explaining a practical example of profile information (example 1) in FIG. 4. The profile information of example 1 includes an 8-bit option support flag and 16-bit region number. This region number indicates Japan (ARIB) when it is 00; U.S.A. (ATSC) when it is 01; Europe (DVB) when it is 02; and universal when it is 0xffff. Of the recorded contents, data of a region corresponding to the region number can be played back.

Normally, DVD has a playback must principle of all registered compression formats, thus assuring compatibility among DVD recorders of respective manufacturers. However, in next-generation DVD, a plurality of different video formats are registered, and if the all-format playback must in principle be stuck, all DVD recorders become very expensive.

In order to solve such price appreciation problem, format support functions are classified into BASE and a plurality of options, and options to be supported are selectively used depending on their purposes and price range. In this case, in order to allow the apparatus to compare the self support state and that of a stream upon reception of data of an unsupported option, contents store that information. In the embodiment of the present invention, since VMGI stores that option state (option support flag in FIG. 5), a DVD recorder that can support variations of a plurality of options can be provided (details will be described later with reference to FIG. 45).

Different digital broadcast schemes are adopted in respective countries: for example, DVB (Digital Video Broadcasting) in Europe; ATSC (Advanced Television Systems Committee) in U.S.A.; and ARIB (Association of Radio Industries and Businesses) in Japan. [1] In DVB, the video format is MPEG2, the resolutions are 1152*1440i, 1080*1920(i, p), 1035*1920, 720*1280, (576, 480)*(720, 544, 480, 352), and (288, 240)*352, the frame frequencies are 30 Hz and 25 Hz, the audio format includes MPEG-1 audio and MPEG-2 Audio, and the sampling frequencies are 32 kHz, 44.1 kHz, and 48 kHz. [2] In ATSC, the video format is MPEG2, the resolutions are 1080*1920(i, p), 720*1280p, 480*704(i, p), and 480*640(i, p), the frame frequencies are 23.976 Hz, 24 Hz, 29.97 Hz, 30 Hz, 59.94 Hz, and 60 Hz, the audio format includes MPEG1 Audio Layer 1 & 2 (DirecTV) and AC3 Layer 1 & 2 (Primstar), and the sampling frequencies are 48 kHz, 44.1 kHz, and 32 kHz. [3] In ARIB, the video format is MPEG2, the resolutions are 1080i, 720p, 480i, and 480p, the frame rates are 29.97 Hz and 59.94 Hz, the audio format includes AAC (MPEG-2 Advanced Audio Coding), and the sampling frequencies are 48 kHz, 44.1 kHz, 32 kHz, 24 kHz, 22.05 kHz, and 16 kHz.

In this manner, since different decoders must be equipped in recorders depending on regions where the recorders are used, information indicating a recorder used to record a disc and its supported functions is saved in VMGI, thus identifying the recorder used to write data on a disc and its supported functions.

Figure 6:
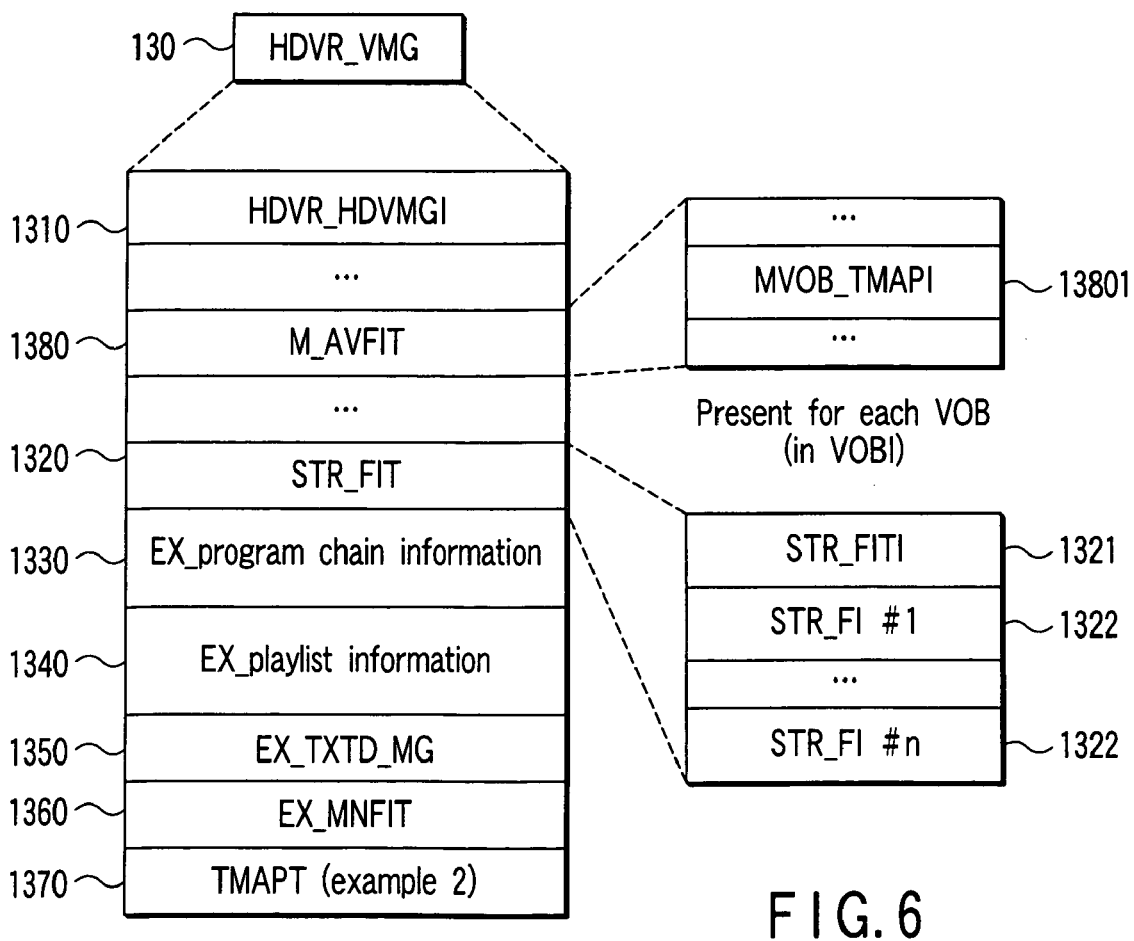
FIG. 6 is a view for explaining an example of the configuration of other fields (M_AVFIT and STR_FIT) of one management information (HDVR_VMG) in the data structure according to the embodiment of the present invention.

FIG. 6 is a view for explaining an example of the configuration of other fields (M_AVFIT and STR_FIT) of one management information (HDVR_VMG) in the data structure according to the embodiment of the present invention. VR data management information and SR stream management information are saved in HDVR_VMG, thus managing stream data in the same way as VR data. That is, the VR data management information is saved in M_AVFIT (Movie AV File Information Table), which includes MVOB_TMAPI (Movie Video Object Timemap Information) in VOBI (Video Object Information) for each VOB. The stream management information is saved in STR_FIT (Stream File Information Table), which includes STR_FITI (STR_FIT Information) and one or more pieces of STR_FI (Stream File Information). Each STR_FI includes SOB_TMAPI having functions corresponding to MVOB_TMAPI in its data layer (to be described later with reference to FIG. 8).

Figure 7:
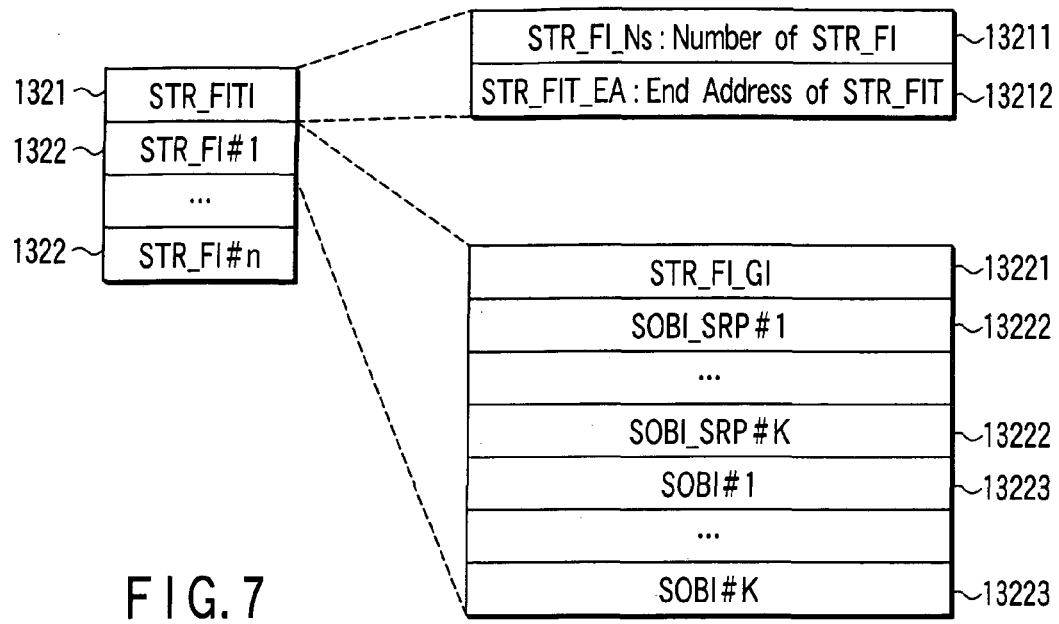
FIG. 7 is a view for explaining an example of the configuration of STR_FITI and STR_FI in FIG. 6.

FIG. 7 is a view for explaining an example of the configuration of STR_FITI and STR_FI in FIG. 6. That is, STR_FITI includes the total number of pieces of STR_FI (STR_FI_Ns), and the end address (STR_FIT_EA) of this table (STR_FIT). STR_FI includes STR_FI_GI (STR_FI General Information), one or more SOBI_SRP (Stream Object Information Search Pointer) data, and one or more pieces of SOBI (SOB Information) assigned the same numbers (#1 to #K) as those of SOBI_SRP# data.

Figure 8:
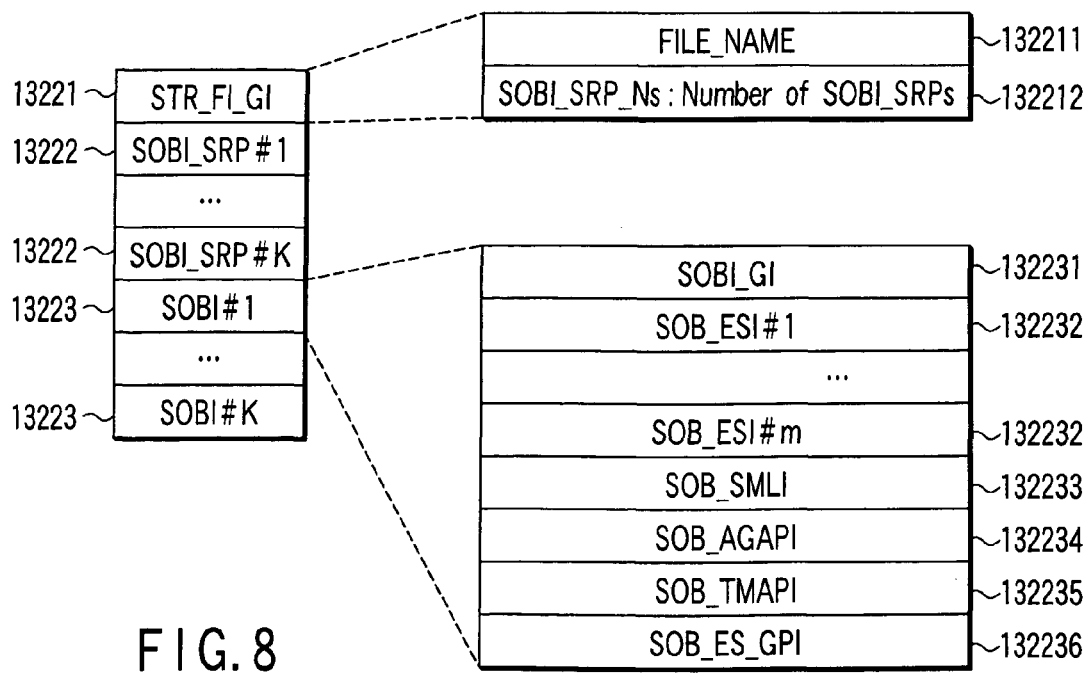
FIG. 8 is a view for explaining an example of the configuration of STR_FI_GI and SOBI in FIG. 7.

FIG. 8 is a view for explaining an example of the configuration of STR_FI_GI and SOBI in FIG. 7. STR_FI_GI includes a file name and the number of SOBI search pointers (SOBI_SRP_Ns). SOBI# indicated by the SOBI_SRP# with the corresponding number (#) includes SOBI_GI (SOBI General Information), one or more pieces of SOB_ESI (SOB Elementary Stream Information) #, SOB_SMLI (SOB Seamless Information), SOB_AGAPI (SOB Audio GAP Information), SOB_TMAPI (SOB Time Map Information), and SOB_ES_GPI (SOB Elementary Stream Group Information). Note that SOB_ESI further includes SOB_V_ESI (SOB Video ESI) and SOB_A_ESI (SOB Audio ESI) (see FIG. 9).

Figure 9:
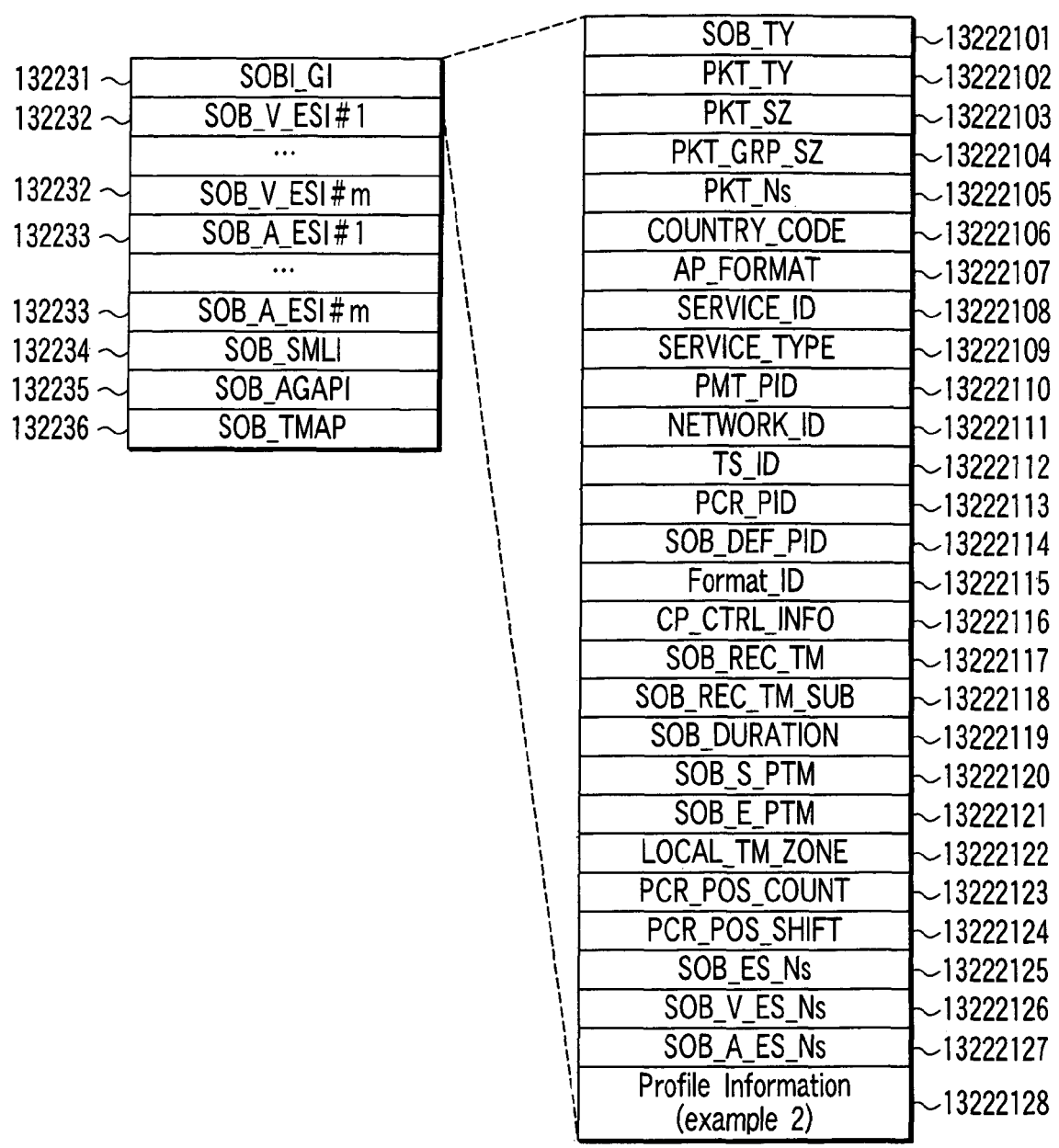
FIG. 9 is a view for explaining another example of the configuration of SOBI in FIG. 8 and an example of the configuration of SOBI_GI included in this SOBI (this SOBI_GI includes profile information (example 2) at its end)

FIG. 9 is a view for explaining an example of the configuration of SOBI_GI included in SOBI in FIG. 8. As shown in FIG. 9, SOBI_GI includes SOB_TY (SOB type), PKT_TY (packet type), PKT_SZ (packet size), PKT_GRP_SZ (packet group size), PKT_Ns (the number of packets), COUNTRY_CODE (country code), and AP_FORMAT (application format).

Also, SOBI_GI includes SERVICE_ID (service ID), SERVICE_TYPE (service type), PMT_PID (packet ID of PMT), NETWORK_ID (network ID), TS_ID (transport stream ID), PCR_PID (packet ID of PCR), and SOB_DEF_PID (default PID of SOB).

Furthermore, SOBI_GI includes Format_ID (format ID), CP_CTRL_INFO (copy control information), SOB_REC_TM (SOB recording time), SOB_REC_TM_SUB (SOB sub-recording time), SOB_DURATION (SOB period), SOB_S_PTM (SOB start time), and SOB_E_PTM (SOB end time).

Moreover, SOBI_GI includes LOCAL_TM_ZONE (local time zone), PCR_POS_COUNT (PCR position count), PCR_POS_SHIFT (PCR position shift), SOB_ES_Ns (the number of ESs of SOB), SOB_A_ES_Ns (the number of video ESs of SOB), SOB_A_ES_Ns (the number of audio ESs of SOB), and profile information (example 2) at the end.

In the example of FIG. 9, each SOB in a disc has profile information (example 2) in place of profile information (example 1) in FIG. 5 for each disc.

FIG. 10 is a view for explaining various kinds of information included in SOBI_GI in FIG. 9. SOB_TY indicates a normal SOB if its bit b15=0; a temporary erase SOB if bit b15=1; the absence of GPI if bit 14=0; and the presence of GPI if bit b14=1. PKT_TY indicates (that a stream included in a packet is) MPEG-TS if its contents are 01; and (that a stream included in a packet is) non-cognizant if the contents are 0xff. PKT_SZ indicates the packet size=188 bytes if it is 00Bch.

PKT_GRP_SZ indicates a packet group size (e.g., an 8-logical block size, 16-logical block size, or the like). According to the example of FIG. 1(g), PKT_GRP_SZ=16 Logical Blocks is fixed. PKT_Ns indicates the number of packets (e.g., 0xAA: 170 TS packets (fixed)) in one packet group. COUNTRY_CODE indicates a code (e.g., JPN=Japan) of a country where an apparatus (DVD recorder or the like) used in video recording is marketed or distributed. AP_FORMAT indicates ISDB-S (BS/CS broadcast) if its contents are 1; and ISDB-T (terrestrial digital broadcast) if its contents are 2.

Furthermore, the contents of SERVICE_ID, PMT_PID, NETWORK_ID, TS_ID, and FORMAT_ID are configured based on PSI and SI values; and the contents of SOB_ES_Ns (the number of ESs selected for video recording), SOB_V_ES_Ns (the number of recorded video ESs), and SOB_A_ES_Ns (the number of recorded audio ESs) are configured based on data to be recorded.

Note that SOB_ES_Ns, SOB_V_ES_Ns, SOB_A_ES_Ns, and ES_TMAP_Ns (see FIG. 17) have the following relations:

SOB_ES_Ns≧SOB_V_ES_Ns+SOB_A_ESNs

SOB_V_ES_Ns+SOB_A_ES_Ns≧ES_TMAP_Ns

In addition, PCR_POSCOUNT indicates the location of PCR to be referred to by the number of PCRs before the head of a packet group, PCR_POS_SHIFT indicates an exponential part of 2 of an LB which indicates the PCR packet position, and CP_CTRL_INFO allows copy control for the copyright protection and the like.

Note that the default PID (SOB_DEF_PID) indicates a PID with a smaller component tag value (the value of a component group descriptor is preferentially used). SOB_DURATION indicates a playback time of SOB, and corresponds to a total of SOBU_ENTs.

Figure 11:
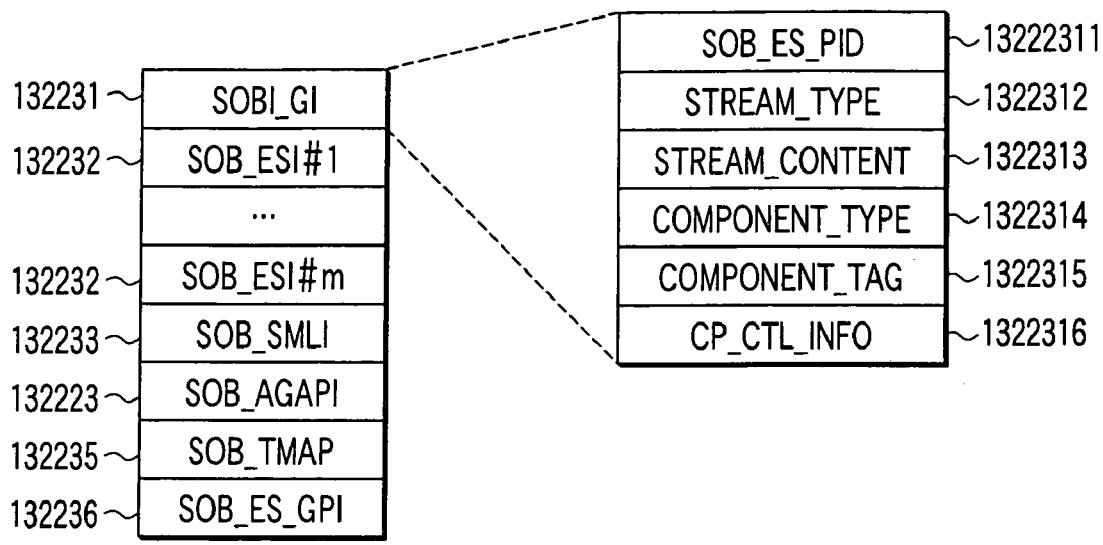
FIG. 11 is a view for explaining another example of the configuration of SOBI_GI included in SOBI in FIG. 8.

FIG. 11 is a view for explaining another example of the configuration of SOBI_GI included in SOBI in FIG. 8. In this configuration, SOBI_GI includes SOB_ES_PID (PID of ES), STREAM_TYPE (STREAM type indicated in PMT), STREAM_CONTENT (the value of STREAM_CONTENT indicated by the component descriptor), COMPONENT_

TYPE (the value of COMPONENT_TYPE indicated by the component descriptor), COMPONENT_TAG (the value of COMPONENT_TAG indicated by the component descriptor), and CP_CTL_INFO (copy control information/copyright management information).

Figure 12:
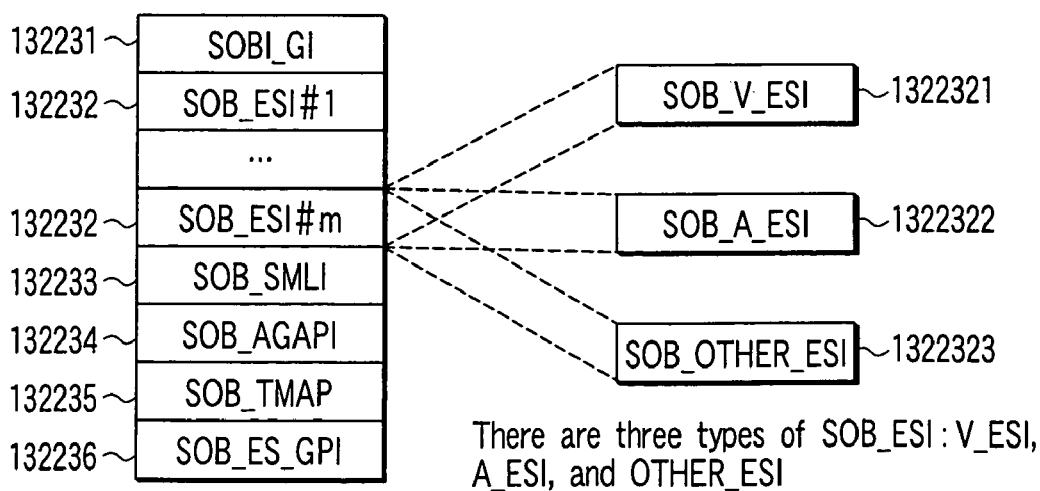
FIG. 12 is a view for explaining an example of the configuration of SOB_ESI included in SOBI in FIG. 8.

FIG. 12 is a view for explaining an example of the configuration of SOB_ESI included in SOBI in FIG. 8. In this example, SOB_ESI is classified into three types (SOB_V_ESI, SOB_A_ESI, and SOB_OTHER_ESI).

Figure 13:
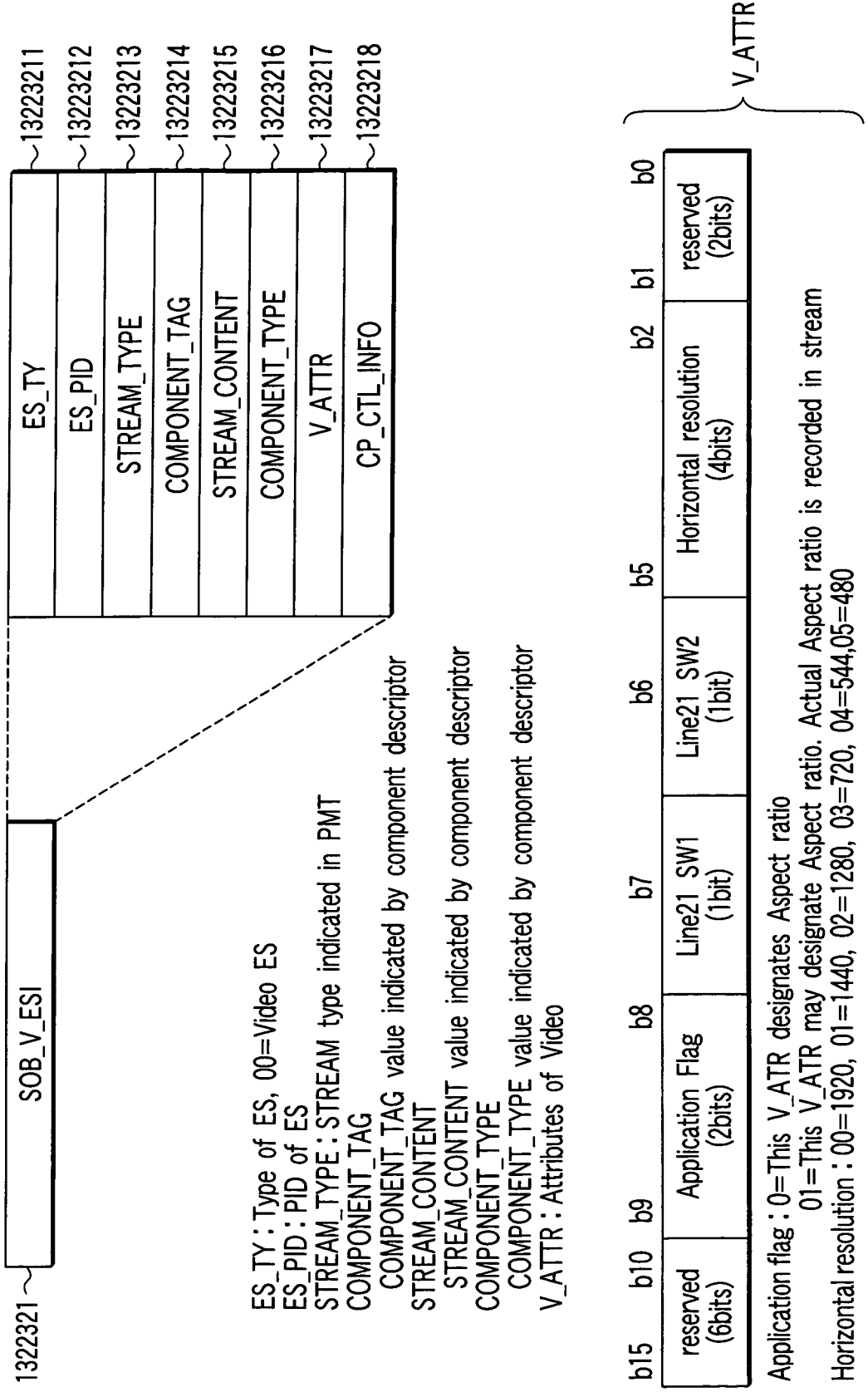
FIG. 13 is a view for explaining an example of the configuration of SOB_V_ESI included in each SOB_ESI (SOB_ESI#m in this case) in FIG. 12, and an example of the configuration of video attribute V_ATTR included in this SOB_V_ESI.

FIG. 13 is a view for explaining an example of the configuration of SOB_V_ESI included in each SOB_ESI (SOB_ESI#m in this case) in FIG. 12, and an example of the configuration of video attribute V_ATTR included in this SOB_V_ESI.

SOB_V_ESI includes ES_TY indicating an ES type, ES_PID indicating the PID of an ES, STREAM_TYPE (STREAM type indicated in PMT), COMPONENT_TAG (the value of COMPONENT_TAG indicated by the component descriptor), COMPONENT_TYPE (the value of COMPONENT_TYPE indicated by the component descriptor), V_ATTR indicating video attributes, and CP_CTL_INFO ((copy control information/copyright management information).

V_ATTR (16 bits) includes an application flag that designates a video aspect ratio, data indicating a horizontal resolution, and the like.

Normally, playback is made according to such attributes. However, if a change has been made in the middle of an SOB, DCI values in a packet header are preferentially used.

Figure 14:
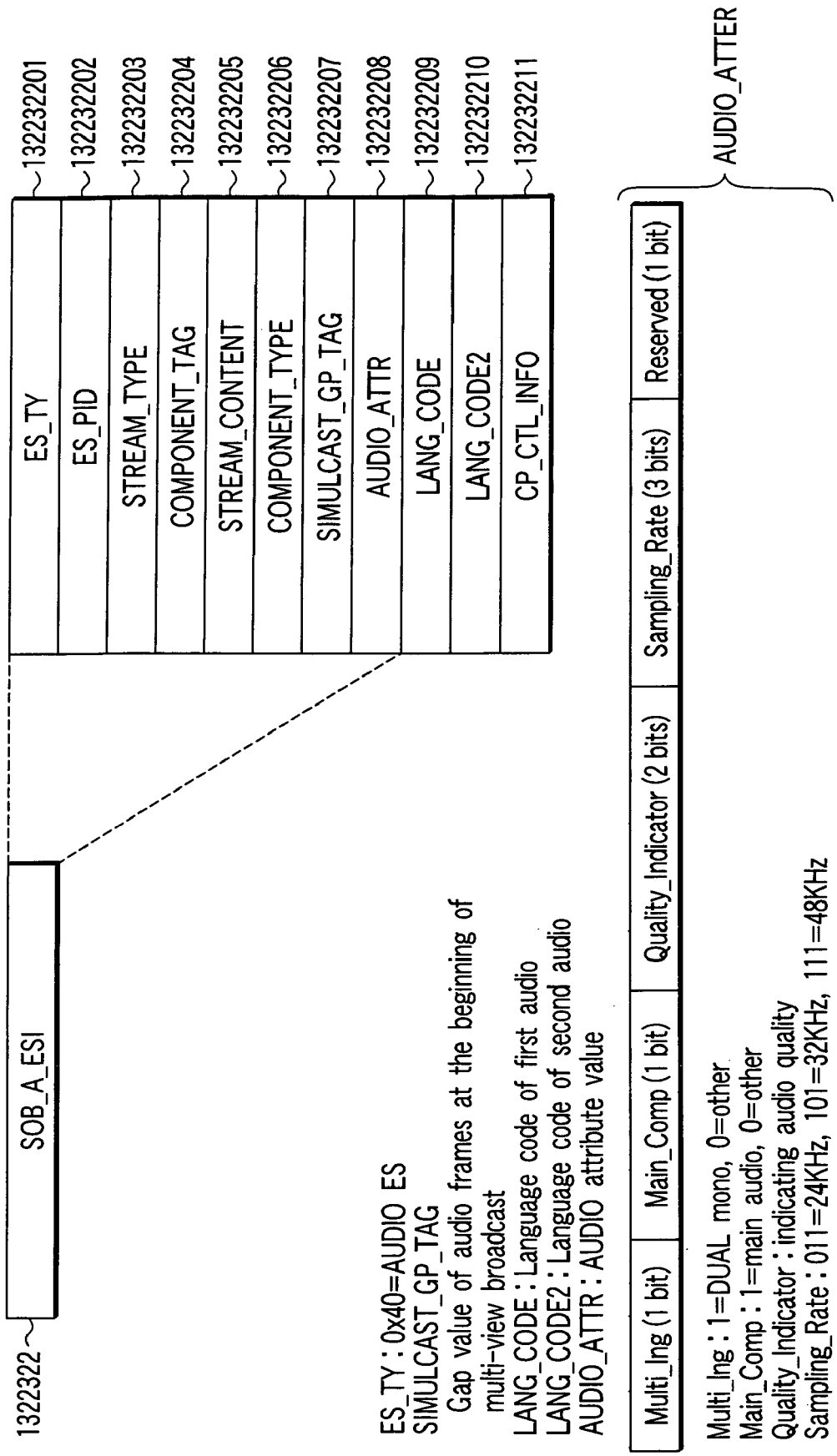
FIG. 14 is a view for explaining an example of the configuration of SOB_A_ESI included in each SOB_ESI (SOB_ESI#m in this case) in FIG. 12, and an example of the configuration of audio attribute A_ATTR included in this SOB_A_ESI.

FIG. 14 is a view for explaining an example of the configuration of SOB_A_ESI included in each SOB_ESI (SOB_ESI#m in this case) in FIG. 12, and an example of the configuration of audio attribute AUDIO_ATTR included in this SOB_A_ESI.

SOB_A_ESI includes ES_TY indicating an ES type, ES_PID indicating the PID of an ES, STREAM_TYPE (STREAM type indicated in PMT), COMPONENT_TAG (the value of COMPONENT_TAG indicated by the component descriptor), STREAM_CONTENT (the value of STREAM_CONTENT indicated by the component descriptor), COMPONENT_TYPE (the value of COMPONENT_TYPE indicated by the component descriptor), SIMULCAST_GP_ATTR (a gap value of audio frames at the beginning of multi-view broadcast), AUDIO_ATTR (audio attribute values), LANG_CODE (a language code of first audio), LAND_CODE2 (a language code of second audio), and CP_CTL_INFO ((copy control information/copyright management information).

AUDIO_ATTR includes Multi_1 ng (1=DUAL mono, 0=other), Main_Comp (1=main audio, 0=other), Quality_Indicator (indicating audio quality), and Sampling_Rate (011=24 kHz, 101=32 kHz, 111=48 kHz). These values are set based on the values of an audio component descriptor.

Figure 15:
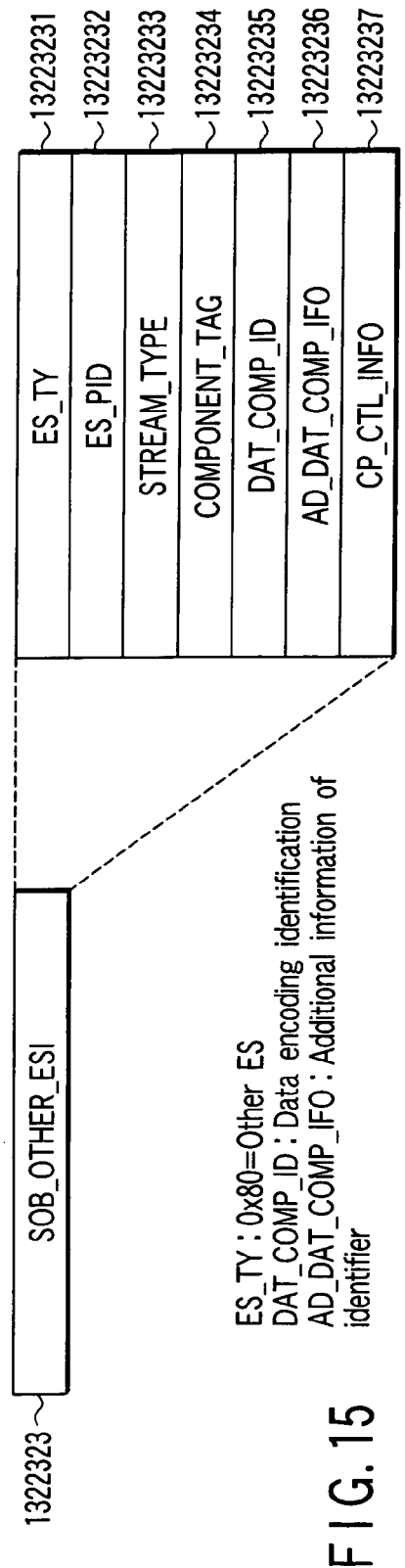
FIG. 15 is a view for explaining an example of the configuration of SOB_OTHER_ESI included in each SOB_ESI (SOB_ESI#m in this case) in FIG. 12.

FIG. 15 is an example of the configuration of SOB_OTHER_ESI included in each SOB_ESI (SOB_ESI#m in this case) in FIG. 12.

SOB_OTHER_ESI includes DAT_COMP_ID (data contents encoding identifier) and AD_DAT_COMP_IFO (Additional data Component Information) in addition to ES_TY, ES_PID, STREAM_TYPE, COMPONENT_TAG, and CP_CTL_INFO.

Figure 16:
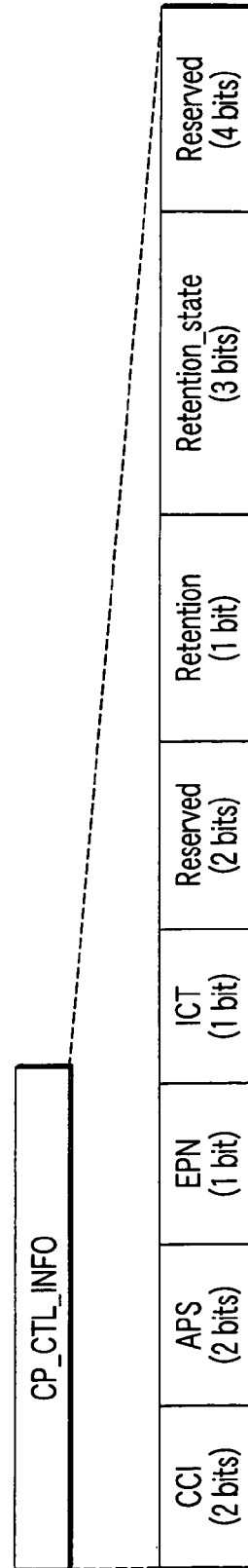
FIG. 16 is a view for explaining another example of the configuration of copy control information (copyright protection information) CP_CTL_INFO included in SOB_OTHER_ESI in FIG. 15.

FIG. 16 is a view for explaining another example of the configuration of copy control information (copyright protection information) CP_CTL_INFO included in SOB_OTHER_ESI in FIG. 15. CP_CTL_INFO is stored in CPI of SOBI_GI, SOB_V_ESI, SOB_A_ESI, and a Packet Group Header. CPI of SOBI_GI makes the overall copy control, CPI of ESI makes copy control of each ES, and copy control of each Packet Group is made based on CPI of the Packet Group Header. The CPI values of ESI are used in preference to those of SOBI_GI, and CPI of the Packet Header Group is assigned top priority. These CPI values are set based on a digital copy control descriptor, content use descriptor, and the like.

The contents of CP_CTL_INFO are: CCI or CGMS (0=copy never; 1=copy free); APS (0=no APS, 1=append APS type 1, 2=append APS type 2, 3=append APS type 3); EPN (0=contents protection (Internet output protection), 1=no contents protection); ICT (0=resolution constraint, 1=no constraint); Retention (1=none, 0=valid within a temporary storage time); and Retention_State (0=no limitation, 1=1 week, 2=2 days, 3=1 day, 4=12 hours, 5=6 hours, 6=3 hours, 7=1.5 hours). Of these contents, Retention allows temporary storage only for a time indicated by Retention_State when Retention=0 and a copy inhibition mode is set, and the stored contents must be erased after an elapse of that time.

Figure 17:
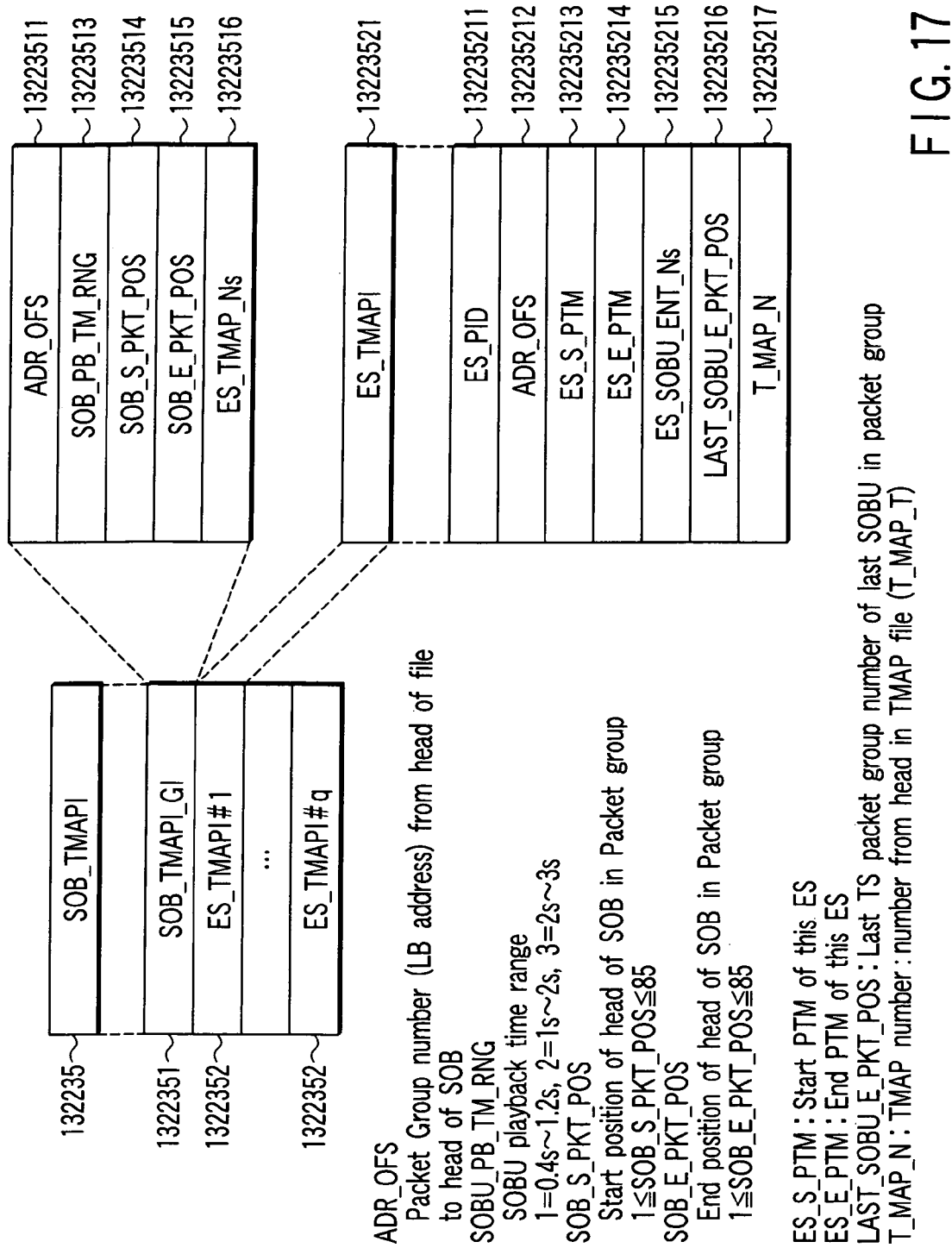
FIG. 17 is a view for explaining an example of the configuration of SOB_TMAP included in SOBI in FIG. 8.

FIG. 17 is a view for explaining an example of the configuration of SOB_TMAPI included in SOBI in FIG. 8. SOB_TMAPI includes SOB_TMAPI_GI and one or more pieces of ES_TMAPI#. SOB_TMAPI_GI includes ADR_OFS (a Packet Group number (LB address) from the head of a file to the head of an SOB), SOBU_PB_TM_RNG (SOBU playback time range: 1=1=0.4 s to 1.2 s, 2=1 s to 2 s, 3=2 s to 3 s), SOB_S_PKT_POS (the start position of the head of an SOB in a Packet group: 1≦SOB_S_PKT_POS≦170), SOB_E_PKT_POS (the end position of the head of an SOB in a Packet group: 1≦SOB_E_PKT_POS≦170), and ES_TMAP_Ns (the number of ES_TMAPs).

Each ES_TMAPI includes ES_PID (the PID of a target ES of this TMAP), ADR_OFS (logical address from the head of an SOB file to the head of this ES), ES_S_PTM (start PTM), ES_E_PTM (end PTM), ES_SOBU_ENT_Ns (the number of SOBU_ENTs), LAST_SOBU_E_PKT_POS (position of the last SOBU in a Packet Group), and TMAP_N (the number of a TMAP in the TMAPT, which belongs to this ES: this number may be omitted when the TMAPTs are recorded in independent areas for VR and SR or TMAPs are recorded in turn in each TMAPT).

Note that TMAPI information can be prevented from becoming extremely large by appropriately setting SOBU_PB_TM_RNG even when a video recording time increases. However, in such case, since the time interval between neighboring ENTRIES is broadened, it is more likely to disturb smooth double-speed playback and the like.

Figure 18:
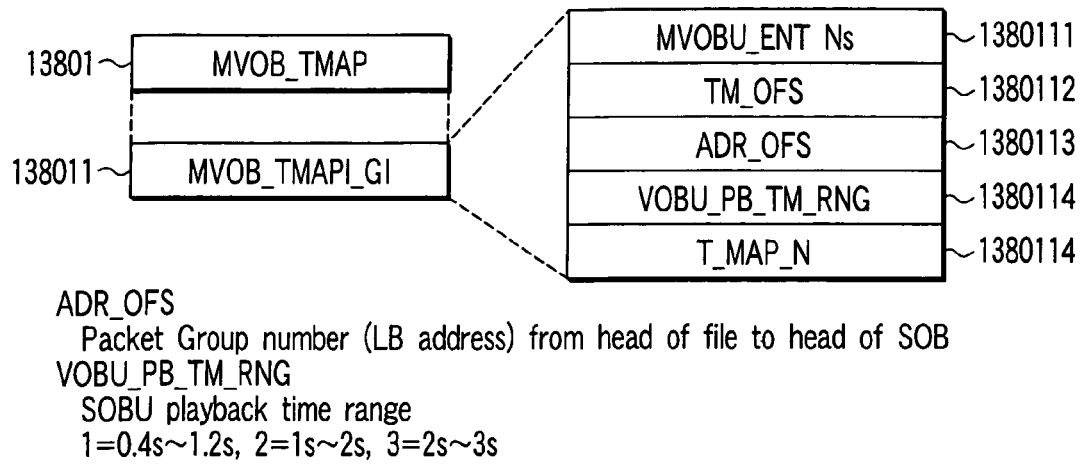
FIG. 18 is a view for explaining an example of the configuration of MVOB_TMAP_GI included in MVOB_TMAP in FIG. 6.

FIG. 18 is a view for explaining an example of the configuration of MVOB_TMAP_GI included in MVOB_TMAP in FIG. 6. MVOB_TMAP_GI includes the number of VR movie VOBU entries MVOBU_ENT_Ns, time offset TM_OFS, address offset ADR_OFS, VOBU playback time range VOBU_PB_TM_RNG (1=0.4 s to 1.2 s, 2=1 s to 2 s, 3=2 s to 3 s), and TMAP number T_MAP_N.

Figure 19:
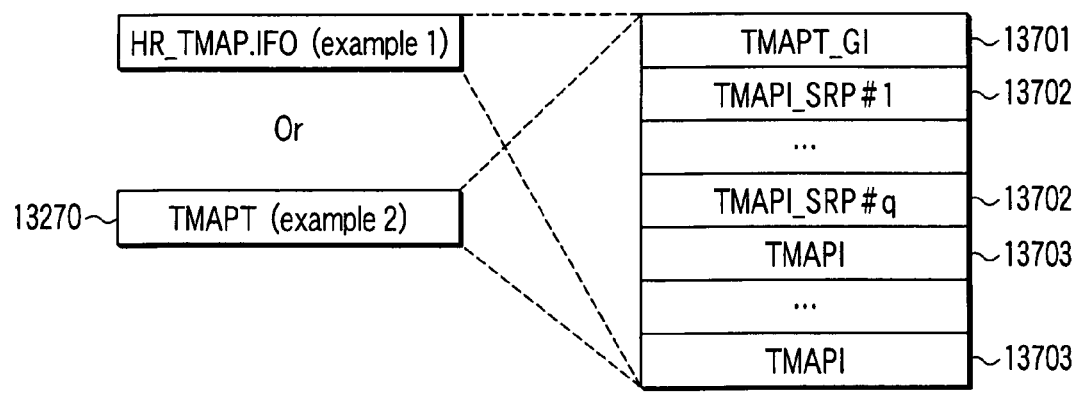
FIG. 19 is a view for explaining an example of the configuration of time map file HR_TMAP.IFO (example 1) included in a DVD_HDVR directory in FIG. 3 or time map table TMAPT (example 2) allocated at the end of HDVR_VMG in FIG. 6.

FIG. 19 is a view for explaining an example of the configuration of time map file HR_TMAP.IFO (example 1) included in the DVD_HDVR directory in FIG. 3 or time map table TMAPT (example 2) allocated at the end of HDVR_VMG in FIG. 6.

The TMAPT is recorded in an independent area (independent file (FIG. 3 and the like) or at the end of IFO (FIG. 4 and the like)), and when the TMAPT is used common to a SOB and VOB, the TMAPT includes TMAPT_GI, one or more TMAPI_SRP# data, and one or more pieces of TMAPI designated by these SRP# data. Note that TMAPI_SRP# data do not always designate TMAPI in ascending order, and irrelevant data may be included among a sequence of a plurality of pieces of TMAPI (a specific TMAPI_SPR# can designate specific TMAPI irrespective of a TMAPI sequence).

Figure 20:
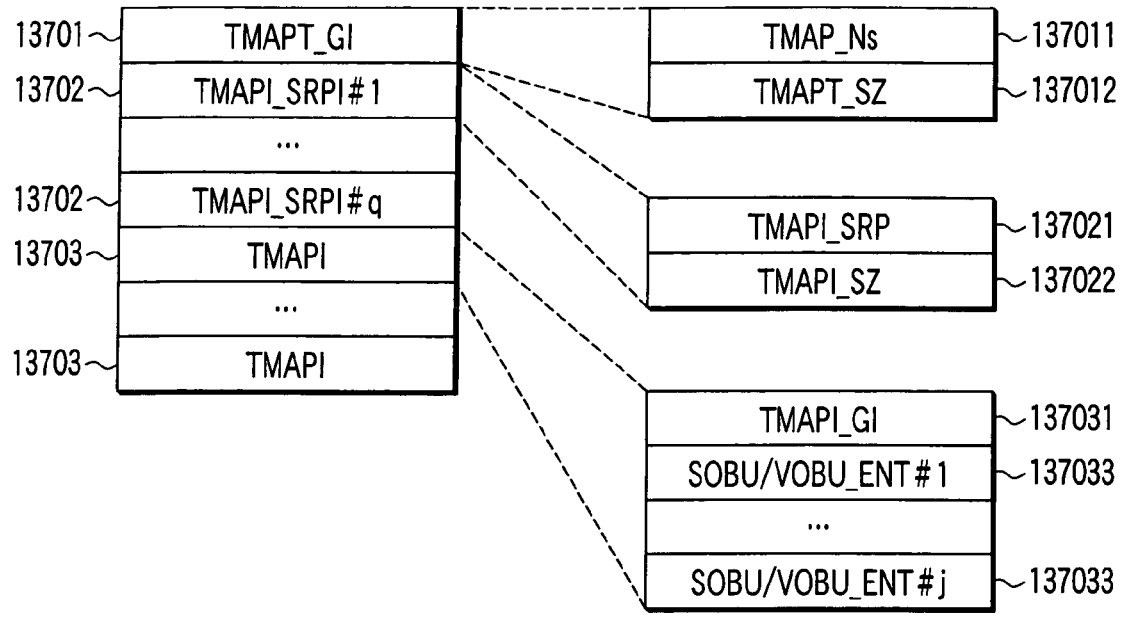
FIG. 20 is a view for explaining an example of the configuration of TMAPT_GI, each TMAPI_SRP#, and each TMAPI in FIG. 19.

FIG. 20 is a view for explaining an example of the configuration of TMAPT_GI, each TMAPI_SPR#, and each TMAPI in FIG. 19. TMAPT_GI in FIG. 20 includes TMAP_Ns (the number of TMAPI_SRP# data=the number of pieces of TMAPI) and TMAPT_SZ (TMAPT size). Each TMAPI_SRP# is address information to TMAPI as an element of each TMAPT, and includes TMAPI_SRP (address to TMAPI) and TMAPI_SZ (TMAPI size). Each TMAPI includes TMAPI_GI and the required number of SOBU/VOBU_ENTs.

Figure 21:
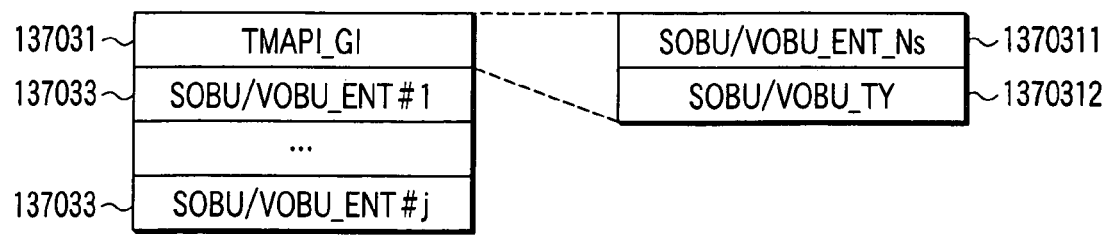
FIG. 21 is a view for explaining an example of the configuration of TMAPI_GI in FIG. 20.

FIG. 21 is a view for explaining an example of the configuration of TMAPI_GI in FIG. 20. TMAPI_GI includes SOBU/VOBU_ENT_Ns (the number of ENTRIES) and SOBU/VOBU_ENT_TY (this TMAPI type; 0=VOBU, 1=SOBU). Note that garbage data may be included among a sequence of a plurality of SOBU/VOBU_ENT# data.

Figure 23:
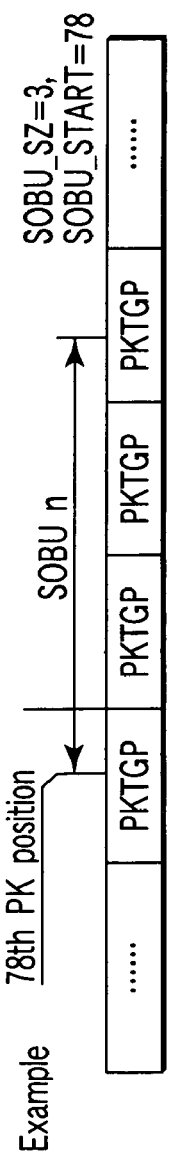
FIG. 23 is a view for explaining an example of the contents of SOBU shown in FIG. 2 depending on the availability of video and audio data.

FIG. 22 is a view for explaining an example of the configuration of the contents of each SOBU/VOBU_ENT# (in case of SOBU_ENTRY) in FIG. 20. FIG. 23 is a view for explaining an example of the contents of an SOBU depending on the availability of video and audio data. Respective ENTRIES are classified to those for an SOBU, and those for a VOBU. In case of SOBU_ENT, there are three cases, i.e., a case wherein video data is available, a case wherein no video data is available but audio data is available, and a case of only other kinds of information. These types are respectively expressed by <1>, <2>, and <3>. That is, there are three types of SOBU entry information (SOBU_ENT) in accordance with the aforementioned types.

<1> When video data is available, SOBU entry information includes end address information (unit: LB) 1st_Ref_PIC_SZ of the first reference picture (I picture or the like) in an entry from the head of SOBU, SOBU playback time (the number of fields) SOBU_PB_TM, SOBU_SZ (the size expressed by the number of packet groups, i.e., the number of packet groups which belong to that SOBU), SOBU_S_PKT_POS (the number of packets from the head of a packet group that stores the head of SOBU), and PCR_POS.

Note that PCR_POS indicates the position of PCR at a position indicated by PCR_POS_COUNT using the number of addresses from the head of SOBU. If no PCR is available, PCR_POS=0xffff. The number of LBs of PCR_POS can also be expressed by PCR_POSx2^PCR_POS_SHIFT. Note that the PCR is a position of the PCR which is located several minutes indicated by the PCR interval before the reference picture position.

In this manner, in case of a time search, the SOBU at a target timing is obtained by accumulating SOBU_PB_TM, and the playback start PTM can be calculated using the number of fields from the head of that SOBU. Let K be the target SOBU that is to undergo a time search, and A be the target address. Then, target address A is expressed by a "value obtained by multiplying the accumulated value of SOBU_SZ (N) from N=1 to N=K−1 by 8, and adding 1 to the product". That is, $$A = \Sigma^{k-1}_{N=1} \{SOBU\_SZ(N)\} \times 8 + 1 \quad (1)$$

Furthermore, the first packet is indicated by the value of SOBU_S_PKT_POS to access this address.

<2> When video data is not available and audio data is available, SOBU entry information includes the end address information (the same as that described above) of the first audio frame in an entry from the head of SOBU, SOBU playback time (the number of fields), SOBU size (the same as that described above), and PCR_POS.

<3> When only other kinds of information are available, since entry information cannot be formed, all data are padded with "FF"s.

Figure 24:
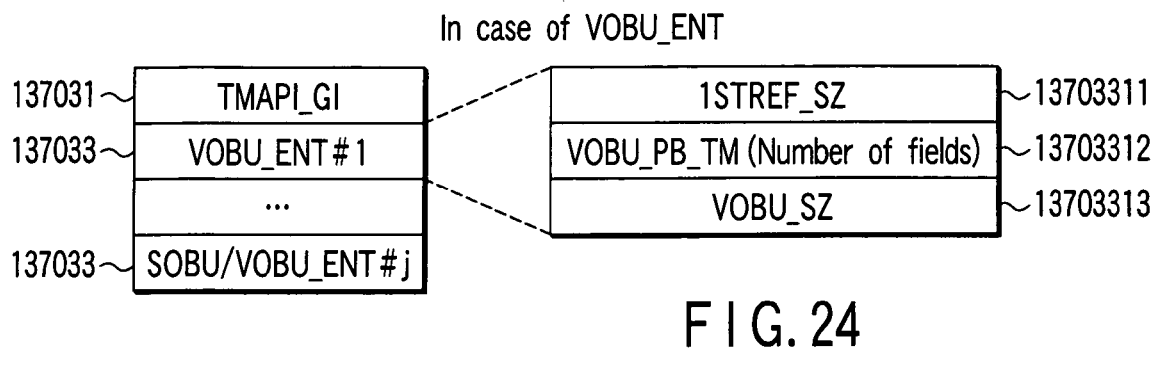
FIG. 24 is a view for explaining an example of the configuration of the contents of each SOBU/VOBU_ENT# (in case of VOBU_ENT) in FIG. 20.

FIG. 24 is a view for explaining an example of the configuration of the contents of each SOBU/VOBU_ENT# (in case of VOBU_ENT) in FIG. 20. In case of VOBU_ENT, the same structure (1STREF_SZ; VOBU_PB_TM; VOBU_SZ) as in normal VR is adopted. However, in a next-generation optical disc, the numbers of bits of respective fields increase due to an increase in recording capacity.

Figure 25:
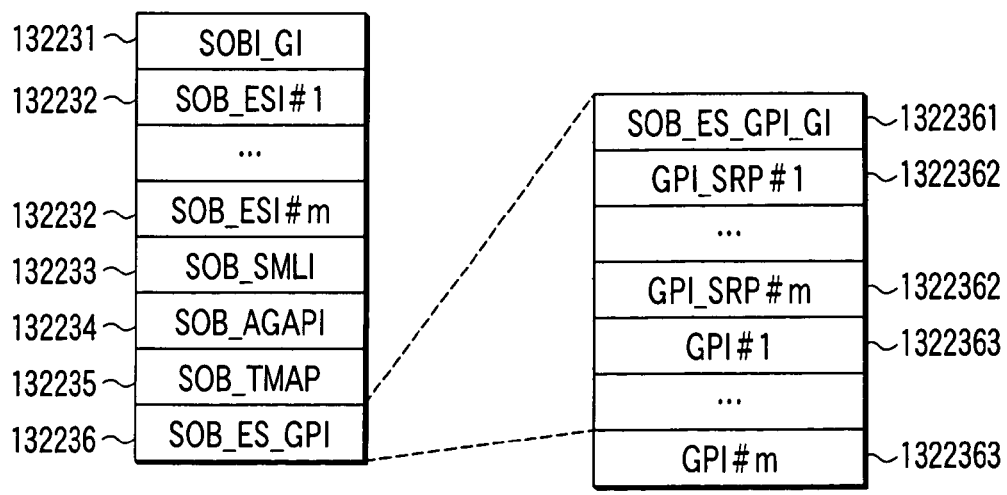
FIG. 25 is a view for explaining an example of the configuration of SOB_ES_GPI included in SOBI# in FIG. 8 (GPI structure example 1)
Figure 27:
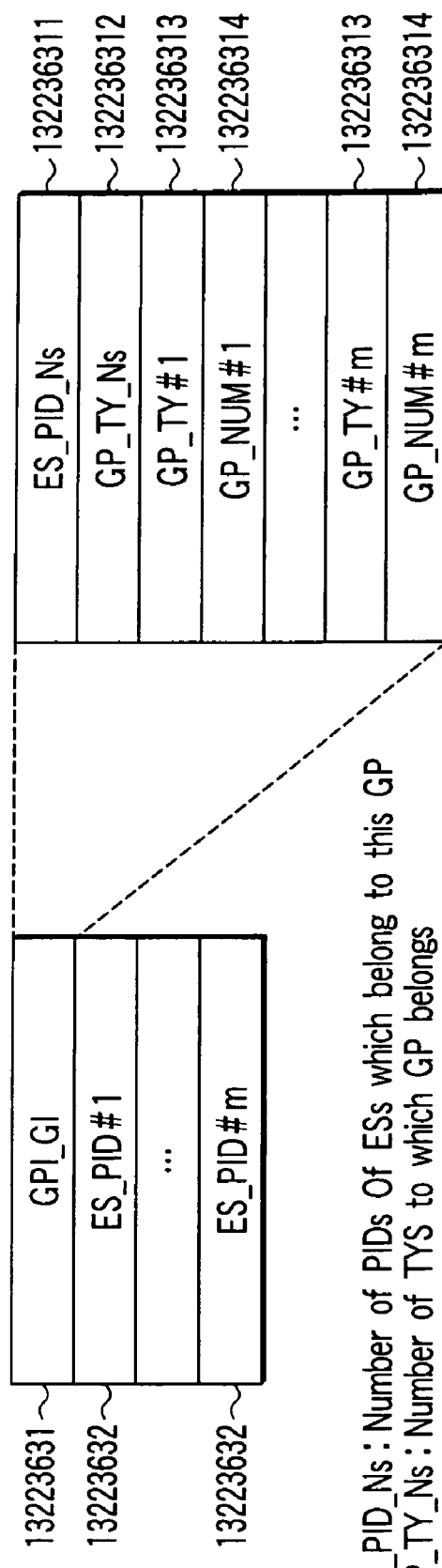
FIG. 27 is a view for explaining an example of the configuration of GPI_GI included in GPI# in FIG. 26 (the GPI structure of example 1)

FIG. 25 is a view for explaining an example of the configuration of SOB_ES_GPI included in SOBI# in FIG. 8 (GPI structure example 1). FIG. 26 is a view for explaining an example of the configuration of SOB_ES_GPI_GI, GPI_SRP#, and GPI# included in SOB_ES_GPI in FIG. 25 (the GPI structure of example 1). FIG. 27 is a view for explaining an example of the configuration of GPI_GI included in GPI# in FIG. 26 (the GPI structure of example 1).

SOB includes SOB_ES_GPI (SOB_ES Group Information) to support multi-view broadcast, rain attenuation broadcast, and multi-program simultaneous video recording, and two different structures are available. The first structure is shown in FIGS. 25 to 27, and GPI includes a plurality of pieces of type information, which are used to make control.

GPI includes SOB_ES_GPI_GI, GPI_SRP#, and GPI# (FIG. 25). SOB_ES_GPI stores GPI_SRP_Ns (number of ES_GPI_SRPs) (FIG. 26). Each GPI_SRP# includes GPI_SA (the start address of GPI), and GPI_SZ (GPI size) (or PID_Ns indicating the number of PIDs may be used instead) (FIG. 26). Each GPI# includes GPI_GI and one or more ES_PIDs (FIG. 26). GPI_GI includes ES_PID_Ns (the number of ESs of this group), GP_TY_Ns (the number of GP_TYs), GP_TY# (upper 4 bits: 1=multi-view broadcast, 2=rain attenuation, 3=multi-channel recording, lower 4 bits: 0=MainGP, 1=SUB), and GP_NUM# (GP number: an identical GP number allows switching) (FIG. 27).

Note that GP_TY specifies the type of this group, and it is determined whether groups are to be switched using an angle button or rain button (if available), or if switching is not allowed (groups cannot be freely switched if different programs are recorded at the same time). Also, the GP number (GP_NUM) specifies a GP to which the current group can be switched. Such information is effective if two different multi-view broadcast programs are recorded. Furthermore, a plurality of different types allow selective use, i.e., an angle is switched by pressing a multi-angle button, and the current group is switched to a rain GP by a rain button when a picture is disturbed by rain.

FIG. 28 is a view for explaining an example of the configuration of SOB_ES_GPI_GI, MAINGPI_SRP#, MAINGPI#, SUBGIP_SRP#, and SUBGPI# included in SOB_ES_GPI in FIG. 25 (GPI structure example 2). FIG. 29 is a view for explaining an example of the configuration of MAINGPI_GI included in MAINGPI# in FIG. 28 (the GPI structure of example 2). FIG. 30 is a view for explaining an example of the configuration of GPI_GI included in SUBGPI# in FIG. 28 (the GPI structure of example 2).

The second structure is shown in FIGS. 28 to 30, and supports the above broadcast modes by adopting a two-layered structure of method attribute and stream layers. GPI is divided into MAIN_GP and SUB_GP. Each MAIN_GP is registered with SUB_GPs, which are registered with PIDs (FIG. 28). In this manner, SUB_GPs which have an identical type and can be switched form one MAIN_GP, and each SUB_GP is registered with PIDs to be played back. With this structure, a plurality of types of GPs can exist at the same time.

MAINGPI_GI included in MAINGPI includes SUB_GP_Ns indicating the number of SUB_GPs which belong to this GP, and MAINGP_TY# indicating the type of this GP (01=multi-view; 02=rain attenuation; 03=multi-channel video) (FIG. 29).

SUB_GP_NUM included in MAINGPI is a number indicating a sub-group, i.e., a sub-group which can be switched in a main group using an angle button or the like of a remote controller. A main angle is described in, e.g., SUBGP_NUM#1.

GPI_GI included in SUB_GPI describes the number of PIDs of ESs which belong to this GP (FIG. 30).

Figure 31:
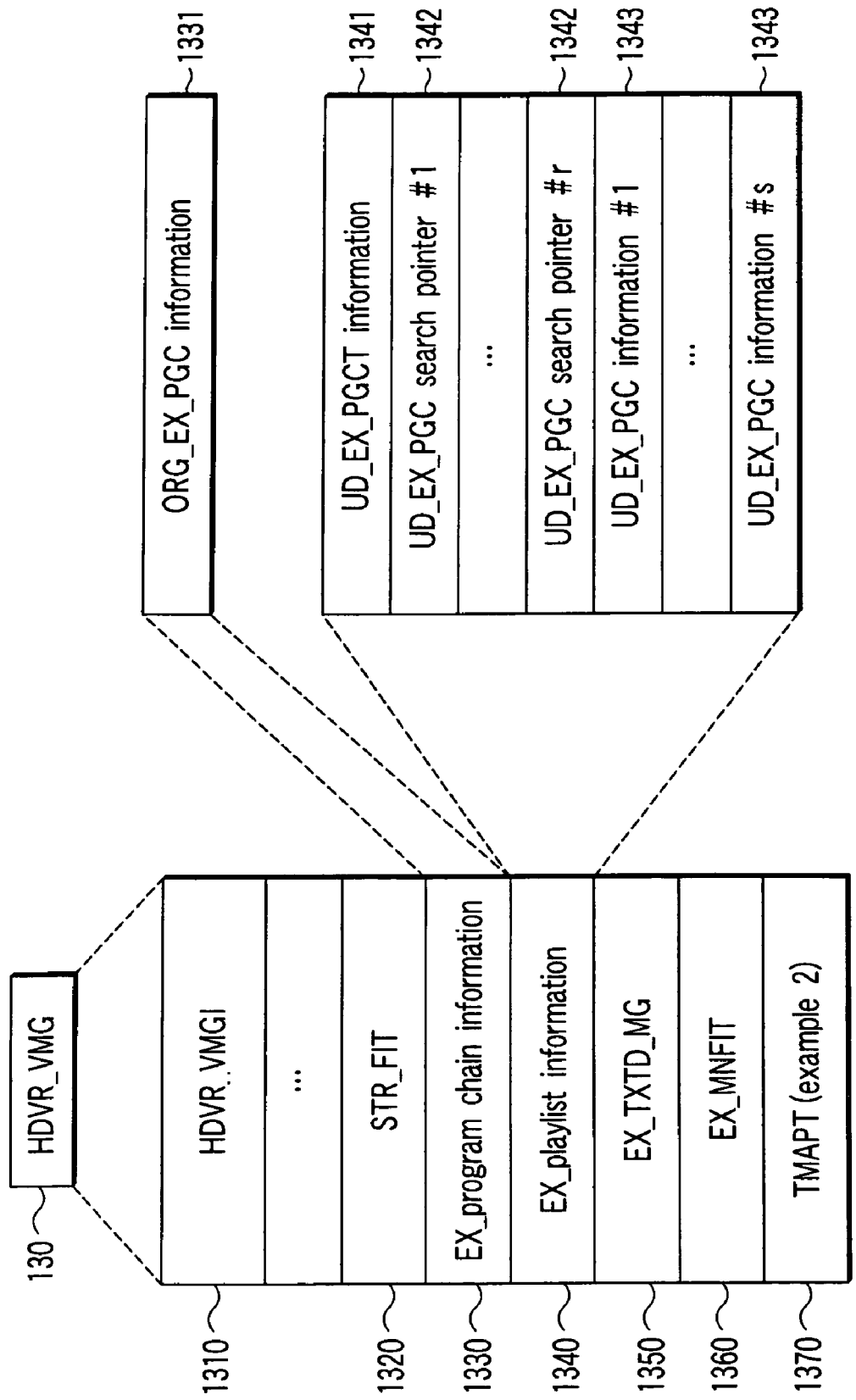
FIG. 31 is a view for explaining an example of the configuration of PGC information (ORG_EX_PGC information and EX_playlist information/UD_EX_PGCT information) included in HDVR_VMG in FIG. 6.

FIG. 31 is a view for explaining an example of the configuration of PGC information (ORG_EX_PGC information and EX_playlist information/UD_EX_PGCT information) included in HDVR_VMG in FIG. 6. Original PGC information ORG_EX_PGCI is stored in EX program chain information 1330. EX playlist information (or user-defined information table information) 1340 includes user-defined PGC table information UD_EX_PGCTI and one or more UD_EX_PGC_SRP#1 to UD_EX_PGC_SRP#r, and one or more pieces of user-defined PGC information UD_EX_PGCI#1 to UD_EX_PGCI#s.

PGC information as playback information has the same format as a normal VR format, and ORG_PGC information 1331 is automatically generated by an apparatus (recorder) upon video recording and is set in the order of video recording. UD_PGC information 1341 is generated according to a playback order which is freely added by the user, and is called a playlist. These two formats (original PGC information and playlist) have a common format in PGC level, and FIG. 32 shows that PGC format.

Figure 32:
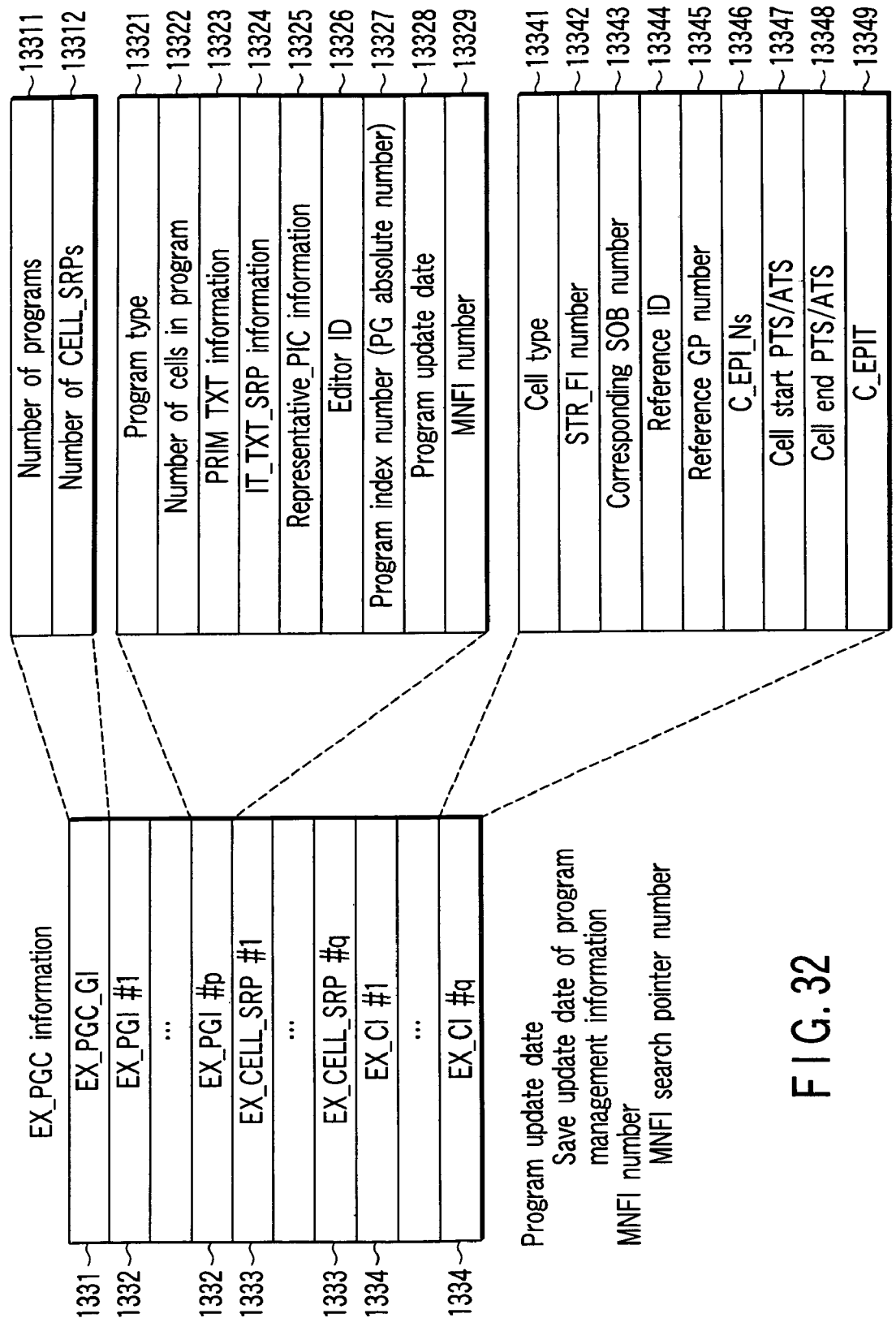
FIG. 32 is a view for explaining an example of the configuration of EX_PGC information in FIG. 31.

FIG. 32 is a view for explaining an example of the configuration of EX_PGC information shown in FIG. 31. EX_PGC information (original PGCI) includes its general information EX_PGC_GI, one or more pieces of program information EX_PGI#, one or more cell search pointers EX_CELL_SRP#, and one or more pieces of cell information EX_CI#.

Note that PG information (EX_PGI#) saves update date information 13328 of this PG. This information can identify when this PG was edited. A program name as text information uses PRM_TXT 13323, and an IT_TXT field saves other kinds of information (director name, leading actor name, . . . ) to save other kinds of text information. This PGI is set with SRP number 13324 of the IT_TXT field which saves these kinds of information to establish a link. Furthermore, a PG number is set in IT_TXT data. Note that the PG number is an absolute number from the beginning of recording on this disc, and is an index number which remains unchanged even after other PGs are deleted.

In order to use MNFI 13329 which is assured to implement functions unique to each manufacturer, the SRP number of such MNFI is set in PGI. Also, the PG number is set in the MNFI information to link with data in MNFI information.

Furthermore, PG update date information is set in both MNF$_1$ and IT_TXT. By checking if two times match upon displaying a menu, whether or not the contents have been edited by another manufacturer can be verified. Furthermore, in CELL information (EX_CI#), an SOB type is added to CELL type 13341 to designate an SOB number, start time, end time, and GP number to be played back (or SUB-number to be played back). Note that the start and end times can be expressed by either of two methods, i.e., PTS units (playback time) and ATS units (transfer time).

When a time is designated by a playback time (real time upon playback), the same access method as in the conventional VR is allowed, and the user can designate a desired access position using a playback time. Hence, a user's desire can be perfectly reflected. However, this method can be designated only when the stream contents can be sufficiently cognizable. If the contents cannot be sufficiently cognizable, a time must be designated using a transfer time. (That is, if a time is designated using a playback time in such case, playback cannot always be started from the head of I-picture data.) If a frame at the playback start position is not I, decoding starts from immediately preceding I, and display starts when the target frame is decoded, thus presenting a picture to the user as if playback were started from the designated frame.

As for reference ID 13344, a method of setting the PID (or component tag value) of a representative one of streams to be played back, and a method of setting the ID of a component group in case of multi-view TV or the like are available. Also, in still another method, reference GPI number (or SUB-GP number) 13345 may be set to switch groups (during playback). Unique ID numbers are assigned to PG and CELL data, so that PG and CELL data can be designated using numbers which remain unchanged even when middle PG and CELL data are deleted.

FIG. 33 is a view for explaining an example of the configuration of the stream object data unit (SOBU) shown in FIG. 1 or 2. One SOBU 134 includes one or more packet groups 140, each of which includes, e.g., 16 packs (1 pack=1 sector: 2048 bytes).

Each packet group 140 includes packet group header (404 bytes) 161, one or more (170 in this case) packet arrival time PAT (4 bytes) data, and one or more (170 in this case) MPEG-TS packets (188 bytes) 162 as many as the PAT data. Each MPEG-TS packet 162 has PAT 163 to be paired at its head position, and this PAT allows to detect the arrival time of each MPEG-TS (at the apparatus).

Packet group header 161 includes sync pattern 151, display control information (DCI) and copy generation management information (or copy control information CCI) 152, and manufacturer's information (MNI) (or manufacturer's information MNFI) 153.

Each MPEG-TS packet 162 includes 4-byte header 170 and adaptation field and/or payload 180. Note that header 170 includes sync byte 171, transport error indicator 172, payload unit start indicator 173, transport priority 174, packet identifier (PID) 175, transport scramble control 176, adaptation field control 177, and continuity index 178.

Figure 34:
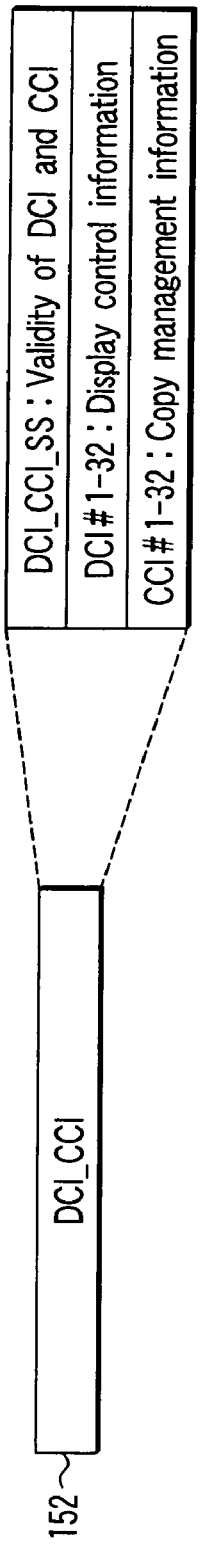
FIG. 34 is a view for explaining an example of the configuration of DCI_CCI included in a packet group header shown in FIG. 33.

FIG. 34 is a view for explaining an example of the configuration of DCI_CCI included in the packet group header shown in FIG. 33. Validity information (DCI_CCI_SS) has 1 byte: 1-bit DCI_SS data indicates invalid if it is "01; and valid if it is 11". The 0th bit of 4-bit CCI_SS data indicates the invalidity/validity of APS; the 1st bit indicates the invalidity/validity of EPN and ICT; the 2nd bit indicates the invalidity/validity of CGMS; and the 3rd bit indicates the invalidity/validity of Retention.

Four bytes are assigned to the display control information (DCI), and DCI for 32 streams is set for each ES. If no stream is available, this DCI field is padded with "0"s. In the contents of this DCI, aspect flags ("0" indicates an aspect ratio=4:3, "1" indicates an aspect ratio=16:9) of ES1 to ES32 are allocated in turn from the head.

Figure 35:
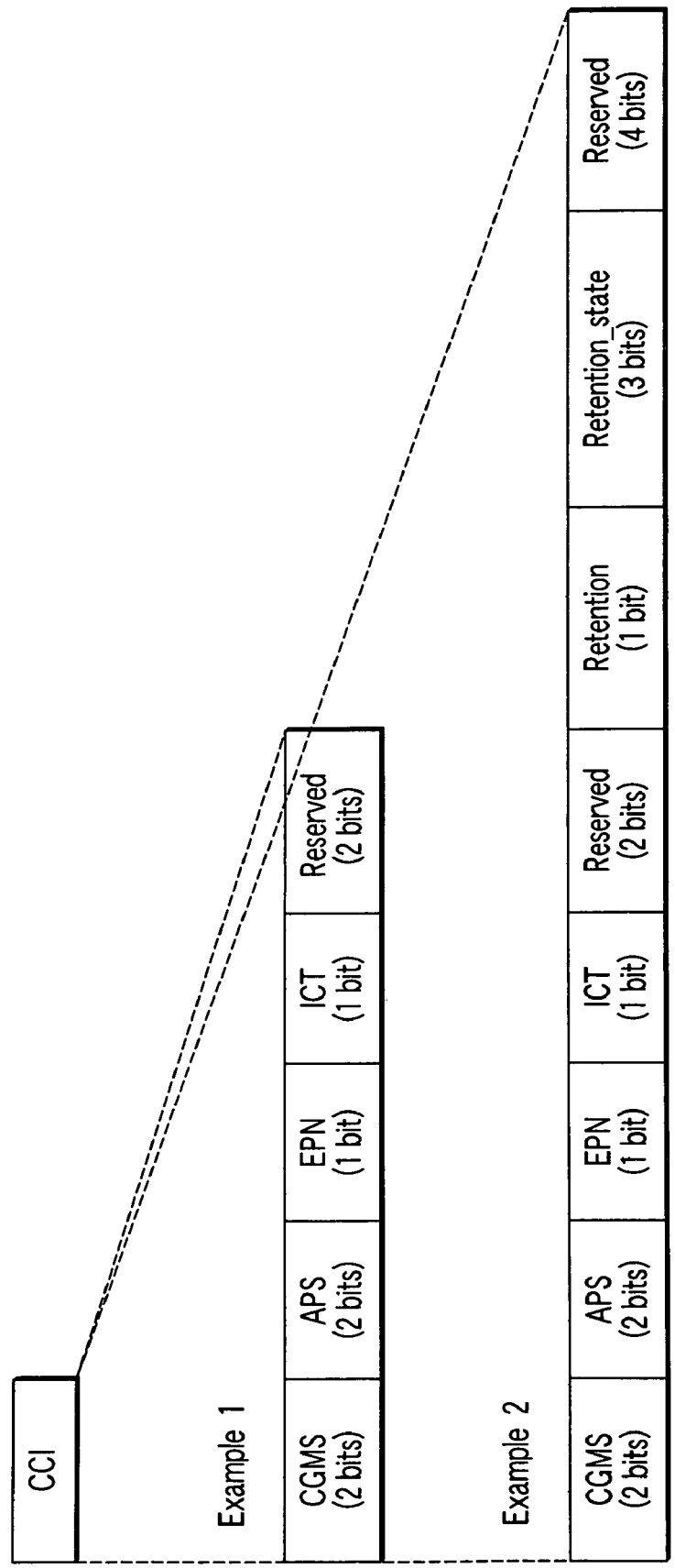
FIG. 35 is a view for explaining examples (examples 1 and 2) of the configuration of each copy control information CCI# included in DCI_CCI in FIG. 34.

FIG. 35 is a view for explaining examples (examples 1 and 2) of the configuration of each copy control information CCI included in DCI_CCI in FIG. 34. The copy control information (CCI) may include, with the same contents as those in ESI, digital copy control (00=copy never, 01=copy once, 11=copy free), analog copy control (00=no APS, 01=APS type 1, 10=APS type 2, 11=APS type 3), EPN (0=contents protection, 1=no contents protection), and ICT (Image_Constraint_Token: 0=analog video output resolution constraint, 1=no constraint), or may also store retention information (that allows temporarily storage for a time indicated by state when the "copy never" mode and Retention=0 are set). Note that APS is an abbreviation for "Analog Protection System", and this embodiment assumes Macrovision®.

When a change in CCI/DCI may take place in a single packet group of a single ES, that packet group is temporarily delimited, and the remaining data of the packet group are padded with dummy data (PAT=0x01, TS packet=ALL0x00) to set the next packet group. In other words, an align process (FIG. 50) is executed to prevent CCI/DCI from changing in a packet group.

FIG. 36 is a view for explaining the file structure according to another embodiment of the present invention. FIG. 36 shows a modification of FIG. 3. In FIG. 36, VOB time map files HR_VTMAP.IFO/HR_VTMAP.BUP for VR, and SOB time map files HR_STMAPx.IFO/HR_STMAPx.BUP for SR are assured in place of HR_TMAP.IFO/HR_TMAP.BUP in FIG. 3.

FIG. 37 is a view for explaining an example of the configuration of time map file HR_VTMAP.IFO/HR_VTMAP.BUP included in the DVD_HDVR directory in FIG. 36 or time map table TMAPT (example 2) which is allocated at the end of HDVR_VMG in FIG. 6 (modification of FIG. 19). When TMAPTs are separately recorded for SOB and VOB, as shown in FIG. 36, VTMAPT and STMAPT adopt independent structures, as shown in FIG. 37. Referring to FIG. 37, VTMAPT includes VTMAPTI, VTMAP_SRPT (VTMAP search table information: VTMAP_SRP#1 to VTMAP_SRP#q), and VTMAP#. Also, STMAPT includes STMAPTI, STMAP_SRPT (STMAP search table information: STMAP_SRP#1 to STMAP_SRP#q), and STMAP#.

FIG. 38 is a view for explaining an example of the configuration of various kinds of information included in VTMAPT in FIG. 37. Referring to FIG. 38, VTMAPT includes VMG_ID (the same value as VMG_ID located at the head of VMGI), VTMAPT_EA (the end address of VTMAP), VERN (version information of TMAP), and IFO_LAST_MOD_TM (update date information of TMAPT (or IFO update date information) the same value as in HR_MANGR.IFO). VTMAP_SRP includes VTMAP_SA (the start address of VTMAP) and VOBU_ENT_Ns (the total number of VOBU_ENTs). VTMAP includes one or more VOBU_ENTs.

Figure 39:
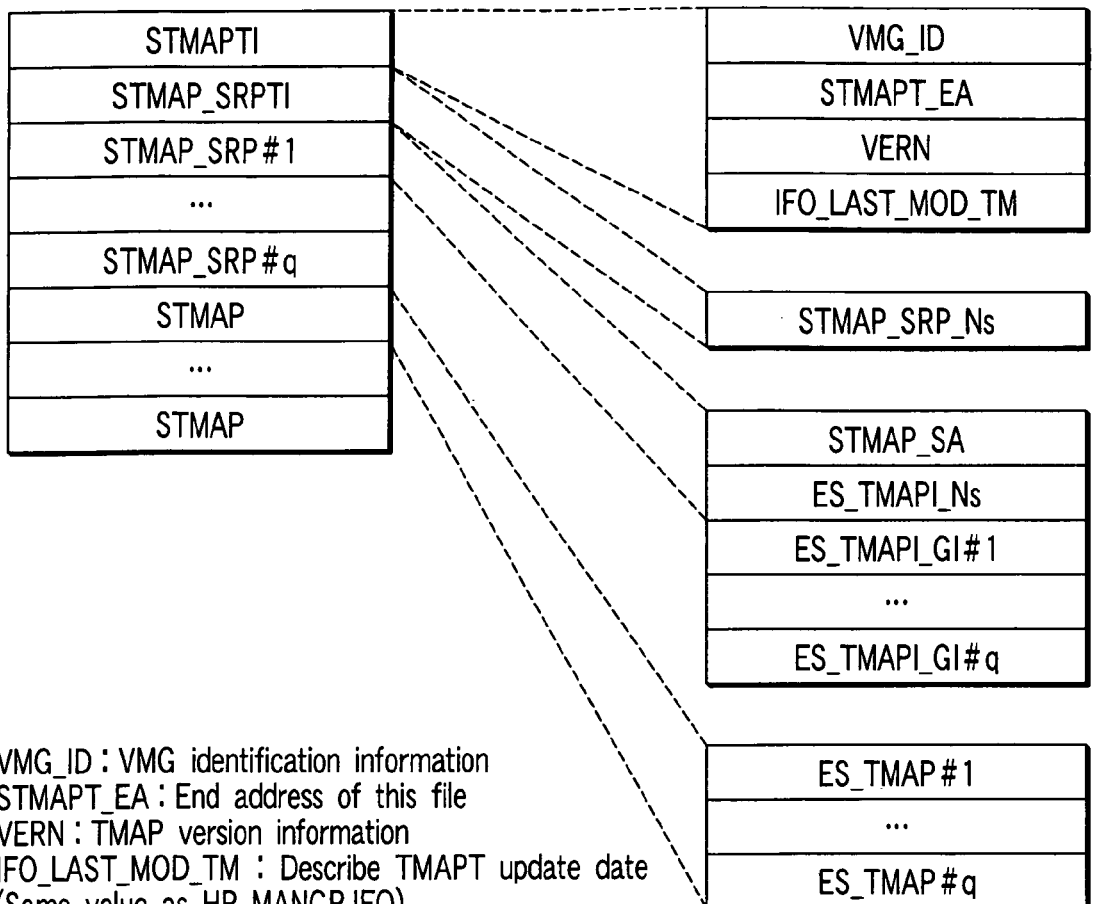
FIG. 39 is a view for explaining an example of the configuration of various kinds of information included in STMAPT in FIG. 37.

FIG. 39 is a view for explaining an example of the configuration of various kinds of information included in STMAPT in FIG. 37. Referring to FIG. 39, STMAPTI includes VMG_ID, STMAPT_EA (the end address of STMAP), VERN, and IFO_LAST_MOD_TM. STMAP_SRPTI includes STMAP_SRP_Ns. STMAP_SRP includes STMAP_SA (the start address of STMAP), ES_TMAPI_Ns (the total number of ES_TMAPs), and ES_TMAPI_GI. STMAP includes one or more ES_TMAPs.

Figure 40:
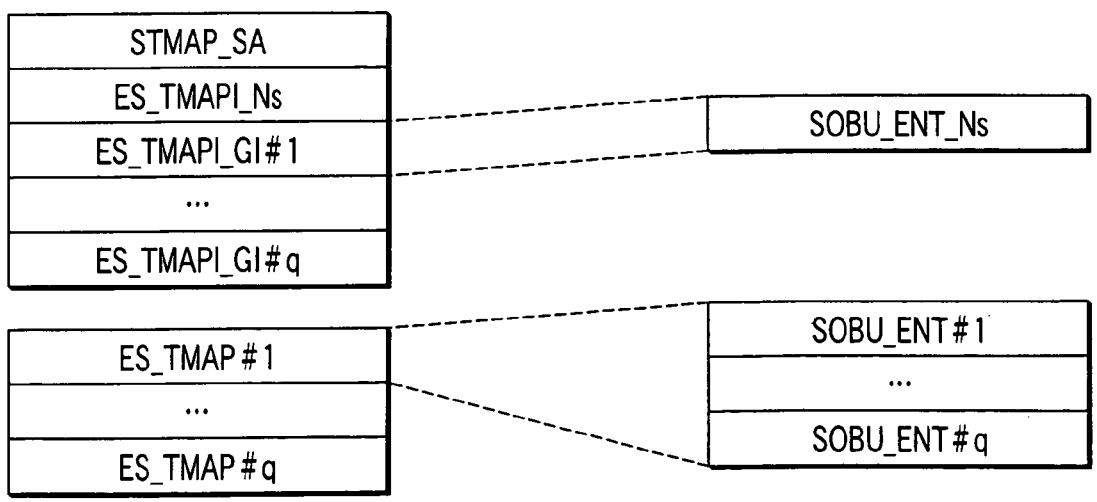
FIG. 40 is a view for explaining an example of information stored in ES_TMAPI_GI and ES_TMAP# included in STMAP_SRP# and STMAP in FIG. 39.

FIG. 40 is a view for explaining an example of information stored in ES_TMAPI_GI and ES_TMAP# included in STMAP_SRP# and STMAP in FIG. 39. ES_TMAP_GI includes SOBU_ENT_Ns (the total number of SOBU_ENTs). Each ES_TMAP includes one or more VOBU_ENTs. Note that TMAP_SRPs do not always designate TMAPs in ascending order, but SRP points to each individual TMAP. Hence, garbage data may be included among TMAPs (e.g., insignificant data may be stored between TMAP#1 and TMAP#3).

Figure 41:
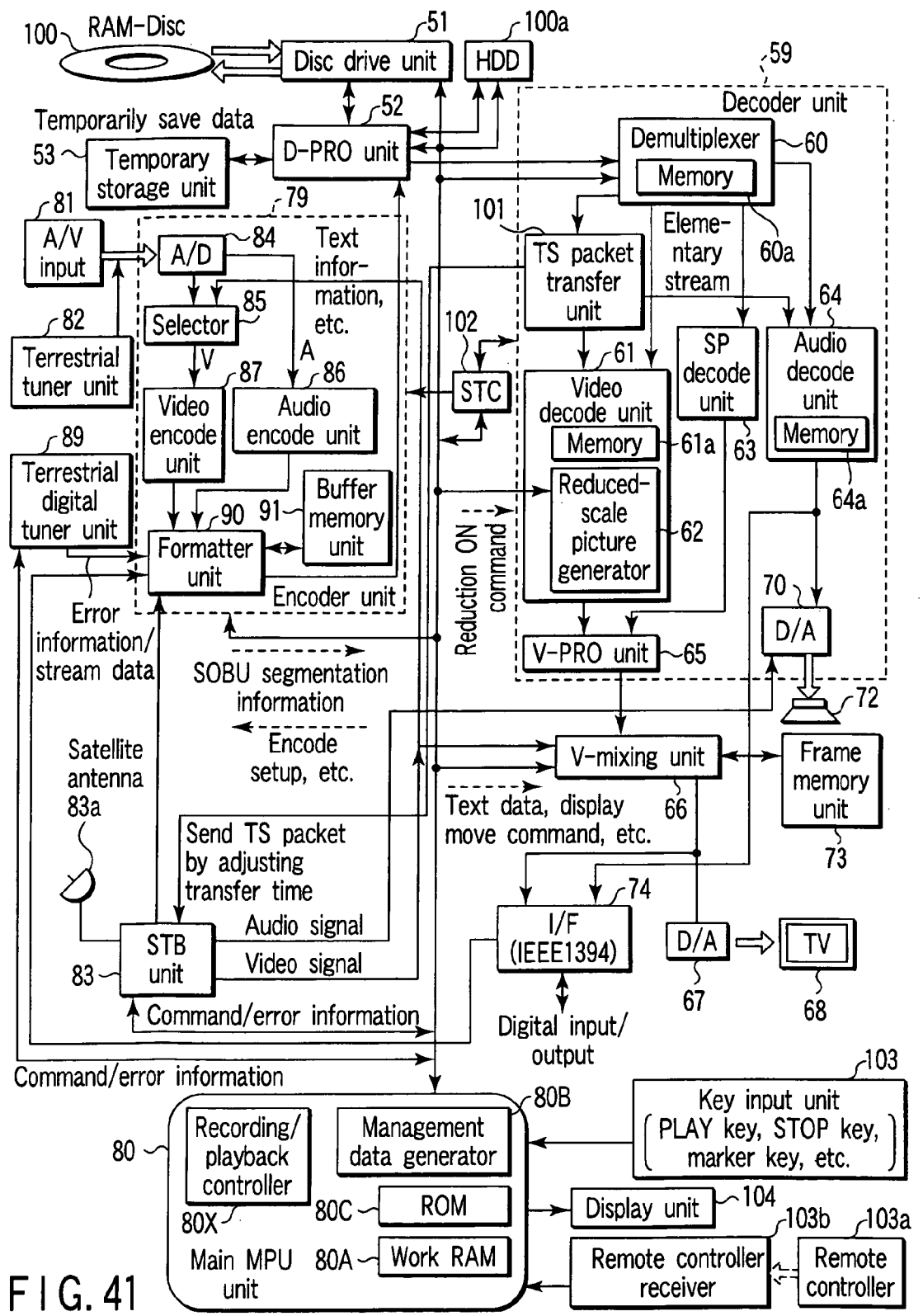
FIG. 41 is a block diagram for explaining an example of an apparatus for recording and playing back AV information (digital TV broadcast program and the like) on and from an information recording medium (optical disc, hard disc, or the like) using the data structure according to the embodiment of the present invention.

FIG. 41 is a block diagram for explaining an example of the apparatus which records and plays back AV information (digital TV broadcast program or the like) on an information recording medium (optical disc, hard disc, or the like) using the data structure according to the embodiment of the present invention. As shown in FIG. 41, this apparatus (digital video recorder/streamer) comprises MPU unit 80, key input unit 103, remote controller receiver 103b for receiving user operation information from remote controller 103a, display unit 104, decoder unit 59, encoder unit 79, system time counter (STC) unit 102, data processor (D-PRO) unit 52, temporary storage unit 53, disc drive unit 51 for recording/playing back information on/from recordable optical disc 100 (e.g., a DVD-RAM or the like), hard disc drive (HDD) 100a, video mixing (V-mixing) unit 66, frame memory unit 73, analog TV D/A converter 67, analog TV tuner unit 82, terrestrial digital tuner unit 89, and STB (Set Top Box) unit 83 connected to satellite antenna 83a. Furthermore this apparatus comprises digital I/F 74 (e.g., IEEE1394) to support digital inputs/outputs as a streamer. Note that STC unit 102 counts clocks on a 27-MHz basis in correspondence with PAT_Base shown in FIG. 33.

STB unit 83 decodes received digital broadcast data to generate an AV signal (digital). STB unit 83 sends the AV signal to TV 68 via encoder unit 79, decoder unit 59, and D/A converter 67 in the streamer, thus displaying the contents of the received digital broadcast. Alternatively, STB unit 83 directly sends the decoded AV signal (digital) to V-mixing unit 66, and can send an analog AV signal from it to TV 68 via D/A converter 67.

The apparatus shown in FIG. 41 forms a recorder comprising both the video and stream recording functions. Hence, the apparatus comprises components (IEEE1394 I/F and the like) which are not required in video recording, and those (AV input A/D converter 84, audio encode unit 86, video encode unit 87, and the like) which are not required in stream recording.

Encoder unit 79 includes A/D converter 84, video encode unit 87, input selector 85 to video encode unit 87, audio encode unit 86, a sub-picture encode unit (as needed although not shown), format unit 90, and buffer memory unit 91.

Decode unit 59 comprises demultiplexer 60 which incorporates memory 60a, video decode unit 61 which incorporates memory 61a and reduced-scale picture (thumbnail or the like) generator 62, sub-picture (SP) decode unit 63, audio decode unit 64 which incorporates memory 64a, TS packet transfer unit 101, video processor (V-PRO) unit 65, and audio D/A converter 70. An analog output (monaural, stereo, or AAC 5.1CH surround) from this D/A converter 70 is input to an AV amplifier or the like (not shown) to drive a required number of loudspeakers 72.

In order to display contents, whose video recording is in progress, on TV 68, stream data to be recorded is sent to decoder unit 59 simultaneously with D-PRO unit 52, and can be played back. In this case, MPU unit 80 makes setups upon playback in decoder unit 59, which then automatically executes a playback process.

D-PRO unit 52 forms ECC groups by combining, e.g., every 16 packs (or 32 packs or 64 kbytes), appends ECC data to each group, and sends them to disc drive unit 51. When disc drive unit 51 is not ready to record on disc 100, D-PRO unit 52 transfers the ECC groups to temporary storage unit 53 and waits until disc drive unit 51 is ready to record. When disc drive unit 51 is ready, D-PRO unit 52 starts recording. As temporary storage unit 53, a large-capacity memory is assumed since it must hold recording data for several minutes or longer by high-speed access. Temporary storage unit 53 may be assured by using a given area of HDD 100a. Note that MPU unit 80 can make read/write access to D-PRO unit 52 via a dedicated microcomputer bus, so as to read/write the file management area and the like.

The apparatus shown in FIG. 41 assumes optical disc 100 such as DVD-RAM/-RW/-R/Blue media (recordable media using blue laser) and the like as primary recording media, and hard disc drive (HDD) 100a (and/or a large-capacity memory card (not shown) or the like) as its auxiliary storage device.

These plurality of types of media can be used as follows. That is, stream recording is done on HDD 100a using the data structure (format) shown in FIGS. 1 to 40. Of stream recording contents which are recorded on HDD 100a, programs that the user wants to preserve directly undergo stream recording (direct copy or digital dubbing) on disc 100 (if copying is not inhibited by copy control information CCI). In this manner, only desired programs having quality equivalent to original digital broadcast data can be recorded together on disc 100. Furthermore, since the stream recording contents copied onto disc 100 exploit the data structure of the present invention, they allow easy special playback processes such as time search and the like, although these contents are recorded by stream recording.

A practical example of a digital recorder having the aforementioned features (a streamer/video recorder using a combination of DVD-RAM/-RW/-R/Blue media and HDD) is the apparatus shown in FIG. 41. The digital recorder shown in FIG. 41 is.configured to roughly include a tuner unit (82, 83, 89), disc unit (100, 100a), encoder unit 79, decoder unit 59, and a controller (80).

Satellite digital TV broadcast data is delivered from a broadcast station via a communication satellite. The delivered digital data is received and played back by STB unit 83. This STB 83 expands and plays back scrambled data on the basis of a key code distributed from the broadcast station. At this time, scramble from the broadcast station is descrambled. Data is scrambled to prevent users who are not subscribers of the broadcast station from illicitly receiving broadcast programs.

In STB unit 83, the broadcast digital data is received by a tuner system (not shown). When the received data is directly played back, it is descrambled by a digital expansion unit and is decoded by an MPEG decoder unit. Then, the decoded received data is converted into a TV signal by a video encoder unit, and that TV signal is externally output via D/A converter 67. In this manner, the digital broadcast program received by STB unit 83 can be displayed on analog TV 68.

Terrestrial digital broadcast data is received and processed in substantially the same manner as satellite broadcast data except that it does not go through any communication satellite (and is not scrambled if it is a free broadcast program). That is, terrestrial digital broadcast data is received by terrestrial digital tuner unit 89, and the decoded TV signal is externally output via D/A converter 67 when it is directly played back. In this way, a digital broadcast program received by terrestrial digital tuner unit 89 can be displayed on analog TV 68. Terrestrial analog broadcast data is received by terrestrial tuner unit 82, and the received analog TV signal is externally output when it is directly played back. In this way, an analog broadcast program received by terrestrial tuner unit 82 can be displayed on analog TV 68.

An analog video signal input from external AV input 81 can be directly output to TV 68. Also, after the analog video signal is temporarily A/D-converted into a digital signal by A/D converter 84, and that digital signal is then re-converted into an analog video signal by D/A converter 67, that analog video signal may be output to the external TV 68 side. In this way, even when an analog VCR playback signal that includes many jitter components is input from external AV input 81, an analog video signal free from any jitter components (that has undergone digital time-base correction) can be output to the TV 68 side.

A digital video signal input from digital I/F (IEEE1394 interface) 74 is output to the external TV 68 side via D/A converter 67. In this way, a digital video signal input to digital I/F 74 can be displayed on TV 68.

A bitstream (MPEG-TS) input from satellite digital broadcast, terrestrial digital broadcast, or digital I/F 74 can undergo stream recording in stream object group recording area 131 (FIG. 1(d)) of disc 100 (and/or HDD 100a) as stream object 132 in FIG. 1(e). An analog video signal from terrestrial analog broadcast or AV input 81 can undergo video recording on VR object group recording area 122 (FIG. 1(d)) of disc 100 (and/or HDD 100a).

Note that the apparatus may be configured to temporarily A/D-convert an analog video signal from terrestrial analog broadcast or AV input 81 into a digital signal, and to make stream recording of the digital signal in place of video recording. Conversely, the apparatus may be configured to make video recording of a bitstream (MPEG-TS) input from satellite digital broadcast, terrestrial digital broadcast, or digital I/F 74 (after it undergoes required format conversion) in place of stream recording.

Recording/playback control of stream recording or video recording is done by firmware (control programs and the like corresponding to operations shown in FIGS. 42 to 68 to be described later) written in ROM 80C of main MPU unit 80 (recording/playback controller 80X). MPU unit 80 has management data generation unit 80B for stream recording and video recording, generates various kinds of management information using work RAM 80A as a work area, and records the generated management information on AV data management information recording area 130 in FIG. 1(d) as needed. MPU unit 80 plays back management information recorded on AV data management information recording area 130, and executes various kinds of control (FIGS. 42 to 68) on the basis of the played back management information. Note that manufacturer ID information and the like of the apparatus shown in FIG. 41 can be written on ROM 80C of MPU unit 80.

The features of medium 100 (100a) used in the apparatus of FIG. 41 will be briefly summarized below. That is, this medium has management area 130 and data area 131. Data is separately recorded on the data area as a plurality of object data (SOB), and each object data includes a group of data units (SOBU). One data unit (SOBU) includes packet groups each of which is formed by converting a MPEG-TS compatible digital broadcast signal into TS packets and packing a plurality of packets (see FIGS. 1 and 33). On the other hand, management area 130 has PGC information (PGCI) as information used to manage the playback sequence. This PGC information includes cell information (CI). Furthermore, management area 130 has information used to manage object data (SOB).

The apparatus shown in FIG. 41 can make stream recording on medium 100 (100a) with the above data structure in addition to video recording. In this case, in order to extract program map table PMT and service information SI from a TS packet stream, MPU unit 80 has a service information extraction unit (not shown; firmware that forms management data generation unit 80B). Also, MPU unit 80 has an attribute information generation unit (not shown; firmware that forms management data generation unit 80B) that generates attribute information (PCR_pack number, PCR_LB count number, and the like) on the basis of information extracted by the service information extraction unit.

In the apparatus shown in FIG. 41, the flow of signals upon recording are, for example, as follows. That is, TS packet data received by the STB unit (or terrestrial digital tuner) are packed into packet groups by the formatter unit and the packet groups are saved on a work area (buffer memory unit 91). When the saved packet groups reach a predetermined size (for one or an integer multiple of CDA size), they are recorded on the disc. As the operations to be executed at that time, upon reception of TS packets, a group is formed every 170 packets, and a packet group header is generated.

On the other hand, an analog signal input from the terrestrial tuner or line input is converted into a digital signal by the A/D converter. That digital signal is input to respective encoder units. That is, a video signal is input to the video encode unit, an audio signal is input to the audio encode unit, and text data of, e.g., teletext broadcasting is input to an SP encode unit (not shown). The video signal is compressed by MPEG, the audio signal is compressed by AC3 or MPEG audio, and the text data is compressed by runlength coding.

Each encoder unit packs compressed data (or segments into blocks) to form 2084-byte packets (or blocks) and inputs them to the formatter unit. The formatter unit multiplexes the packets (or blocks), and sends them to the D-PRO unit. The D-PRO unit forms ECC blocks for every 16 or 32 packets (16 or 32 blocks), appends error correction data to them, and records the ECC packets (or blocks) on the disc via the disc drive unit.

When the disc drive unit is busy due to seek, track jump, and the like, data are stored in an HDD buffer unit, and wait until the disc drive unit is ready. Furthermore, the formatter unit generates segmentation information during video recording, and periodically sends it to the MPU unit (GOP head interrupt or the like). The segmentation information includes the number of packs (or the number of LBs) of VOBU (SOBU), the end address of I-picture data from the head of VOBU (SOBU), the playback time of VOBU (SOBU), and the like.

In the flow of signals upon recording, TS packet data received by the STB unit (or terrestrial digital tuner) are converted into packet groups by the formatter unit, and are saved in the work RAM. When data saved in the work RAM reach a predetermined size (for one or an integer multiple of CDA size), they are recorded on the disc.

In the flow of signals upon playback, data are read out from the disc by the disc drive unit, undergo error correction by the D-PRO unit, and are then input to the decode unit. The MPU unit determines the type of input data (i.e., VR or SR data) (based on cell type), and sets that type in the decoder unit before playback. In case of SR data, the MPU unit determines PMT_ID to be played back based on cell information CI to be played back, determines the PIDs of items (video, audio, and the like) to be played back based on that PMT, and sets them in the decoder unit. In the decoder unit, the demultiplexer sends TS packets to the respective decode units based on the PIDs. Furthermore, the TS packets are sent to the TS packet transfer unit, and are transmitted to the STB unit (1394 I/F) in the form of TS packets. The respective decode units execute decoding, and decoded data are converted into an analog signal by the D/A converter, thus displaying data on the TV. In case of VR data, the demultiplexer sends data to the respective decode unit according to the fixed IDs. The respective decode units execute decoding, and decoded data are converted into an analog signal by the D/A converter, thus displaying data on the TV.

Upon playback, pack data read out from the disc are interpreted by the demultiplexer. Packs that store TS packets are sent to the TS packet transfer unit, and are then sent to the decoders, thus playing back data. When pack data are transferred to the STB (or are transmitted to an external apparatus such as a digital TV or the like), the TS packet transfer unit transfers only TS packets at the same time intervals as they arrived. The STB unit makes decoding to generate an AV signal, which is displayed on the TV via the video encoder unit in the streamer.

An MPEG-TS scheme as a basic format common to broadcast schemes which broadcast (distribute) compressed moving picture data such as digital TV broadcast, broadcast uses a wired network such as the Internet or the like, and so on is divided into a packet management data field and payload. The payload includes data to be played back in a scrambled state. According to ARIB, a PAT (Program Association Table), PMT (Program Map Table), and SI (Service Information) are not scrambled. Also, various kinds of management information can be generated using the PMT and SI (SDT: Service Description Table, EIT: Event Information Table, BAT: Bouquet Association Table).

The contents to be played back include MPEG video data, Dolby AC3® audio data, MPEG audio data, data broadcast data, and the like. Also, the contents include information required upon playback (e.g., PAT, PMT, SI, and the like) although they are not directly related to the contents to be played back. The PAT includes the PID (Packet Identification) of the PMT for each program, and the PMT records the PIDs of video data and audio data.

A normal playback sequence of the STB (Set Top Box) is as follows. That is, when the user determines a program based on EPG (Electronic Program Guide) information, the PAT is loaded at the start time of the target program, and the PID of a PMT, which belongs to the desired program, is determined on the basis of that data. The target PMT is read out in accordance with that PIT, and the PIDs of video and audio packets to be played back, which are included in the PMT, are determined. Video and audio attributes are read out based on the PMT and SI and are set in respective decoders. The video and audio data are extracted and played back in accordance with their PIDs. Note that the PAT, PMT, SI, and the like are transmitted at intervals of several 100 ms since they are used during playback.

In the flow of signals upon recording, TS packet data received by the STB unit (or terrestrial digital tuner) are converted into packet groups by the formatter unit, and are saved in the work RAM. When data saved in the work RAM reach a predetermined size, they are recorded on the disc. As the operations at that time, upon reception of TS packets, a group is formed every 170 packets, and a packet group header is generated.

An analog signal input from the terrestrial tuner or line input is converted into a digital signal by the A/D converter. That digital signal is input to respective encoder units. That is, a video signal is input to the video encode unit, an audio signal is input to the audio encode unit, and text data of, e.g., teletext broadcasting is input to an SP encode unit. The video signal is compressed by MPEG, the audio signal is compressed by AC3 or MPEG audio, and the text data is compressed by runlength coding.

Each encoder unit packs compressed data to form 2084-byte packets and inputs them to the formatter unit. The formatter unit packs and multiplexes the packets, and sends them to the D-PRO unit.

The D-PRO unit forms ECC blocks for every 16 or 32 packs, appends error correction data to them, and records the ECC packets on the disc via the disc drive unit. When the disc drive unit is busy due to seek, track jump, and the like, data are stored in an HDD buffer unit, and wait until the disc drive unit is ready.

Furthermore, the formatter unit generates segmentation information during video recording, and periodically sends it to the MPU unit (GOP head interrupt or the like). The segmentation information includes the number of packs of VOBU (SOBU), the end address of I-picture data from the head of VOBU (SOBU), the playback time of VOBU (SOBU), and the like.

In the flow of signals upon playback, data are read out from the disc by the disc drive unit, undergo error correction by the D-PRO unit, and are then input to the decode unit. The MPU unit determines the type of input data (i.e., VR or SR data) (based on CELL TYPE), and sets that type in the decoder unit before playback. In case of SR data, the MPU unit determines PMT_ID to be played back based on CELLI to be played back, determines the PIDs of items (video, audio, and the like) to be played back based on that PMT, and sets them in the decoder unit. In the decoder unit, the demultiplexer sends TS packets to the respective decode units based on the PIDs. Furthermore, the TS packets are sent to the TS packet transfer unit, and are transmitted to the STB unit (1394 I/F) in the form of TS packets. The respective decode units execute decoding, and decoded data are converted into an analog signal by the D/A converter, thus displaying data on the TV. In case of VR data, the demultiplexer sends data to the respective decode unit according to the fixed IDs. The respective decode units execute decoding, and decoded data are converted into an analog signal by the D/A converter, thus displaying data on the TV.

In order to display contents on the TV, data is sent to the decoder unit simultaneously with the D-PRO unit, and is played back. In this case, the MPU unit makes setups upon playback in the decoder unit, which then automatically executes a playback process. The D-PRO unit forms ECC groups by combining, e.g., every 16 packs, appends ECC data to each group, and sends them to the disc drive unit. When the disc drive unit is not ready to record on the disc, the D-PRO unit transfers the ECC groups to the temporary storage unit and waits until the disc drive unit is ready to record data. When the disc drive unit is ready, the D-PRO unit starts recording. As the temporary storage unit, a large-capacity memory is assumed since it must hold recording data for several minutes or longer by high-speed access. Also, the MPU unit can make high-speed read/write access to the D-PRO unit via a dedicated microcomputer bus, so as to read/write the file management area and the like.

Upon playback, pack data read out from the disc are interpreted by the demultiplexer. Packs that store TS packets are sent to the TS packet transfer unit, and are then sent to the decoders, thus playing back data. When pack data are transferred to the STB (or are transmitted to an external apparatus: a digital TV or the like), the TS packet transfer unit transfers only TS packets at the same time intervals as they arrived.

The STB unit makes decoding to generate an AV signal, which is displayed on the TV via the video encoder unit in the streamer.

Figure 42:
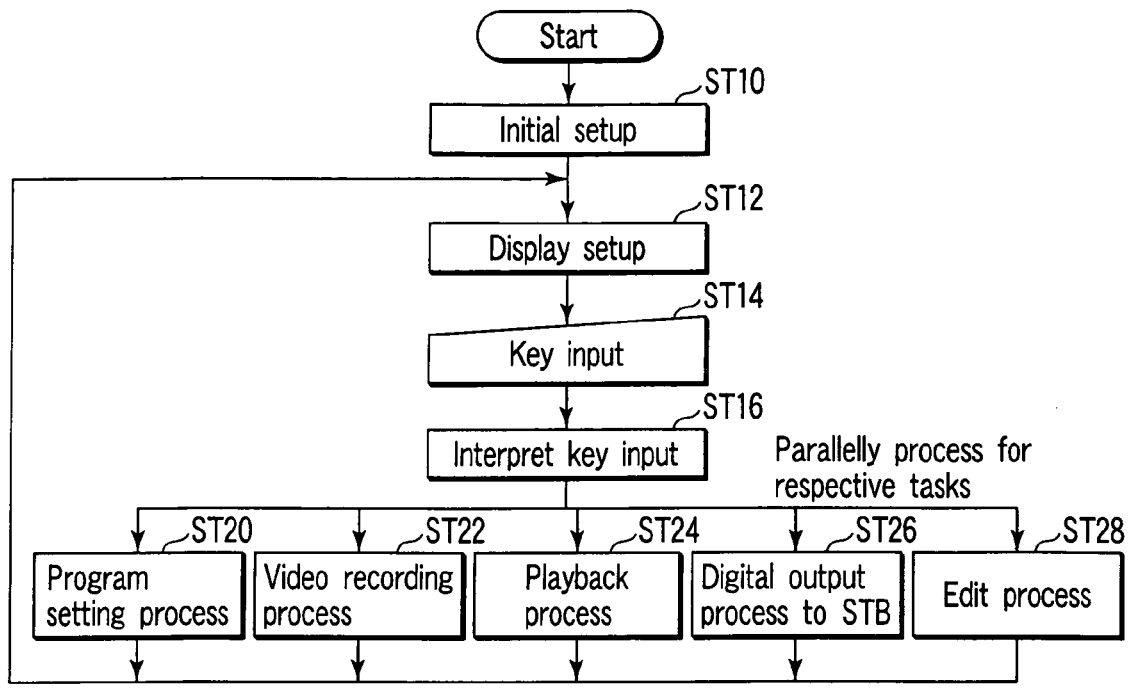
FIG. 42 is a flowchart (overall operation process flow) for explaining an example of the overall operation of the apparatus shown in FIG. 41.

FIG. 42 is a flowchart (overall operation process flow) for explaining an example of the overall operation of the apparatus shown in FIG. 41. In this case, data processes include five different processes, i.e., a video recording process, playback process, data transfer process (a digital output process to the STB or the like), program setting process, and edit process.

For example, when the power switch of the apparatus in FIG. 41 is turned on, MPU unit 80 makes initial setups (upon factory shipment or after user's setups) (step ST10). MPU unit 80 also makes display setups (step ST12) and waits for a user's operation. If the user has made a key input from key input unit 103 or remote controller 103a (step ST14), MPU unit 80 interprets the contents of that key input (step ST16). The following five data processes are executed as needed in accordance with this input key interpretation result.

That is, if the key input is, for example, a key operation made to set timer program recording, a program setting process starts (step ST20). If the key input is a key operation made to start video recording, a video recording process starts (step ST22). If the key input is a key operation made to start playback, a playback process starts (step ST24). If the key input is a key input made to output digital data to the STB, a digital output process starts (step ST26). If the key input is a key operation of an edit process, the edit process starts (step ST28).

The processes in steps ST20 to ST28 are parallelly executed as needed for respective tasks. For example, the process for outputting digital data to the STB (ST26) is parallelly executed during the playback process (ST24). Or a new program setting process (ST20) can be parallelly executed during the video recording process (ST22) which is not timer program recording. Or by utilizing the feature of disc recording that allows high-speed access, the playback process (ST24) and digital output process (ST26) can be parallelly executed during the video recording process (ST22). Also, the disc edit process (step ST28) can be executed during video recording on the HDD.

Figure 43:
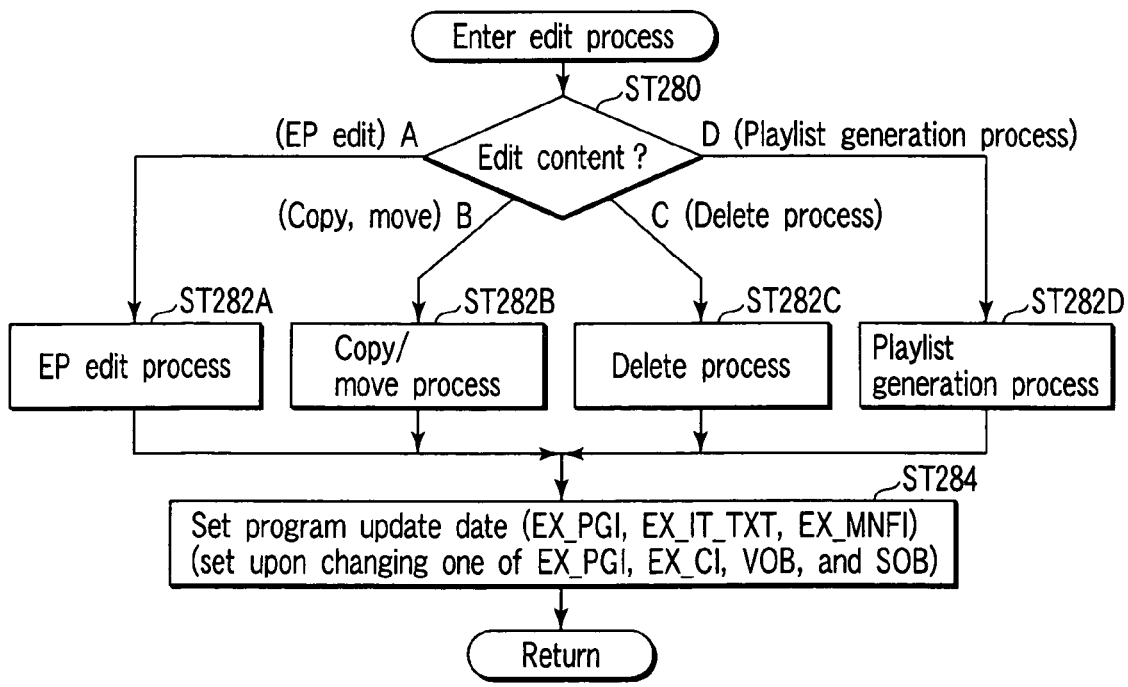
FIG. 43 is a flowchart (edit operation process flow) for explaining an example of an edit process (ST28) shown in FIG. 42.

FIG. 43 is a flowchart (edit operation process flow) for explaining an example of the contents of the edit process (ST28) shown in FIG. 42. When the control enters the edit process, the flow branches to one of four processes (one of A to D) (step ST280) in accordance with the edit contents. Upon completion of one of an entry point edit process (step ST282A), copy/move process (step ST282B), delete process (step ST282C), and playlist generation process (step ST282D), the program update date by this edit process is set in respective pieces of management information (EX_PGI, EX_IT_TXT, EX_MNFI) (step ST284).

When one of program information PGI, cell information CI, or VOB/SOB has been changed, this program update date (FIG. 32) may be set. When VOBI and/or SOBI have/has been changed, the edit times/time (EDIT_TIME) of the VOBI and/or SOBI can be set in SOB_EDIT_TIME (not shown) or the like.

In this connection, in the process in step ST284, the manufacturer ID of the apparatus that has made the operation in one of steps ST282A to ST282D may be set in editor ID (LAST_MNF_ID) 13326 in FIG. 32. Every time one of PGI, CI, and SOB (or VOB) has been changed, this editor ID can be set (or updated) to the ID information of the apparatus used at that time.

FIG. 44 is a flowchart (initial setup process flow example 1) for explaining an example of the initial setup (ST10) shown in FIG. 42. This initial setup process is executed as follows:

c1) A disc check process is made, and if an error is found, this process ends (step ST40);

c2) If a disc is set (YES in step ST42), and if VMG is recorded, VMG is read (step ST44);

c3) If profile information is stored for each disc, the values of the profile information are extracted (step ST46), and to check if a region code of the information matches that of the apparatus (step ST48). If they do not match (NO in step ST48), a setup is made not to play back SOB (step ST50); and c4) If the two region codes match (YES in step ST48), option information is read, and a setup is made to operate the apparatus according to the operation table shown in FIG. 45 (step ST52).

FIG. 45 shows examples of operation tables that designate combinations of the base format (Base) and one or more options (Option1, Option2) in association with the relationship between a disc to be used and recording operation (a)/playback operation (b) (association tables between options and recording/playback operations).

For example, if Base is SD_MPEG-PS+SD_new AVC-PC, a DVD-RAM disc can record signals for a longer period of time than the conventional DVD-VR (DVD video recording). If Option1 is HD_new AVC-PS+HD_MPEG2-PS, recording can be made on an AOD (Advanced Optical Disc) with high image quality which cannot be attained by the conventional DVD-VR. Furthermore, if Option2 supports digital broadcast and MPEG-TS, stream recording of digital broadcast data can be made. Hence, options to be introduced can be selected depending on the purposes of individual apparatuses.

In FIG. 45, Δ indicates that only some functions are available, and ○ indicates that functions of the corresponding option are available. Since practical correspondence with a plurality of ○ marks in FIG. 45 can be freely determined (unless otherwise specified in the standard or the like), it is not particularly limited here, and its example is as described above.

Figure 46:
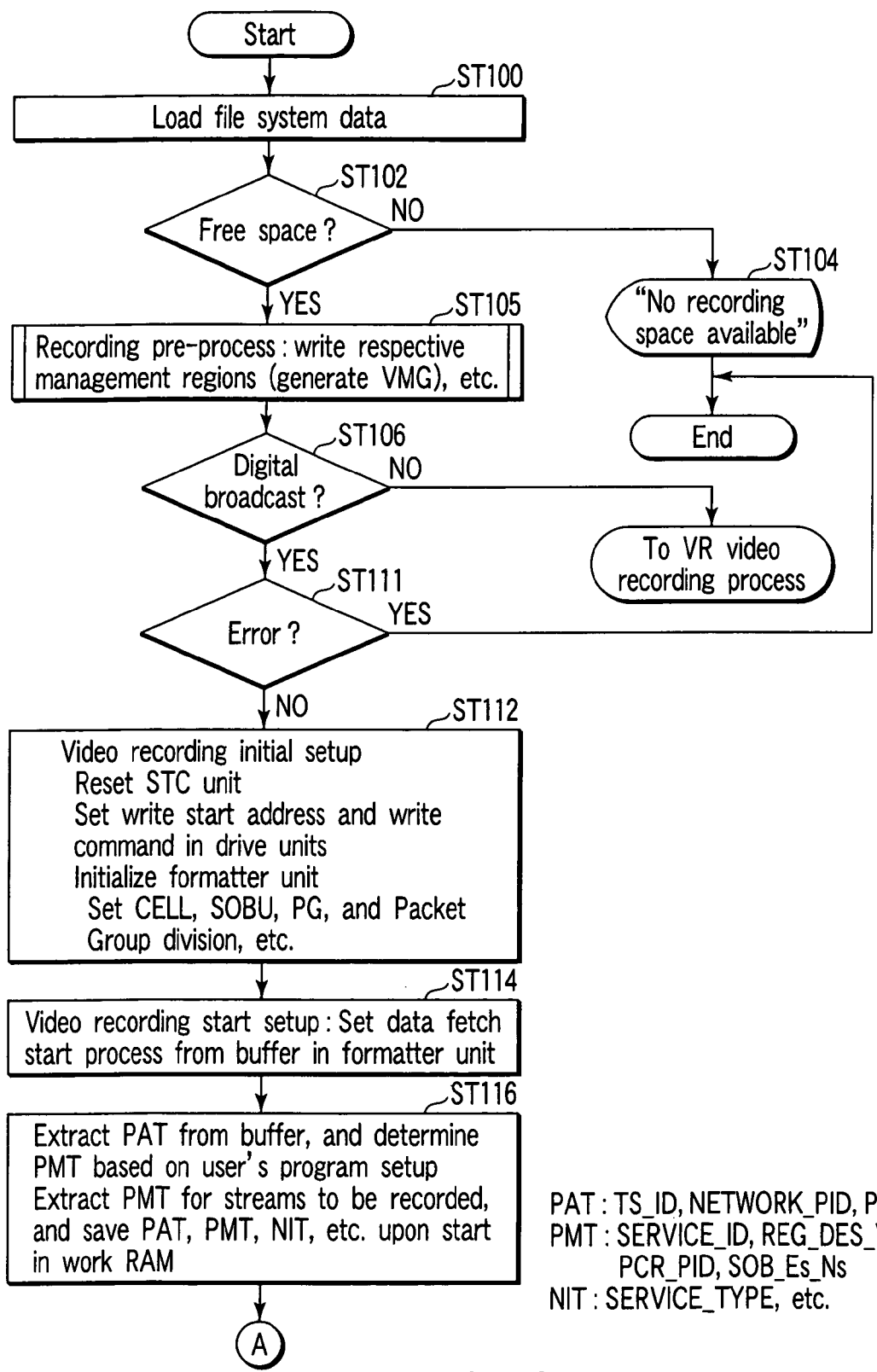
FIG. 46 is a flowchart for explaining an example of a video recording operation (part 1) of the apparatus in FIG. 41.
Figure 47:
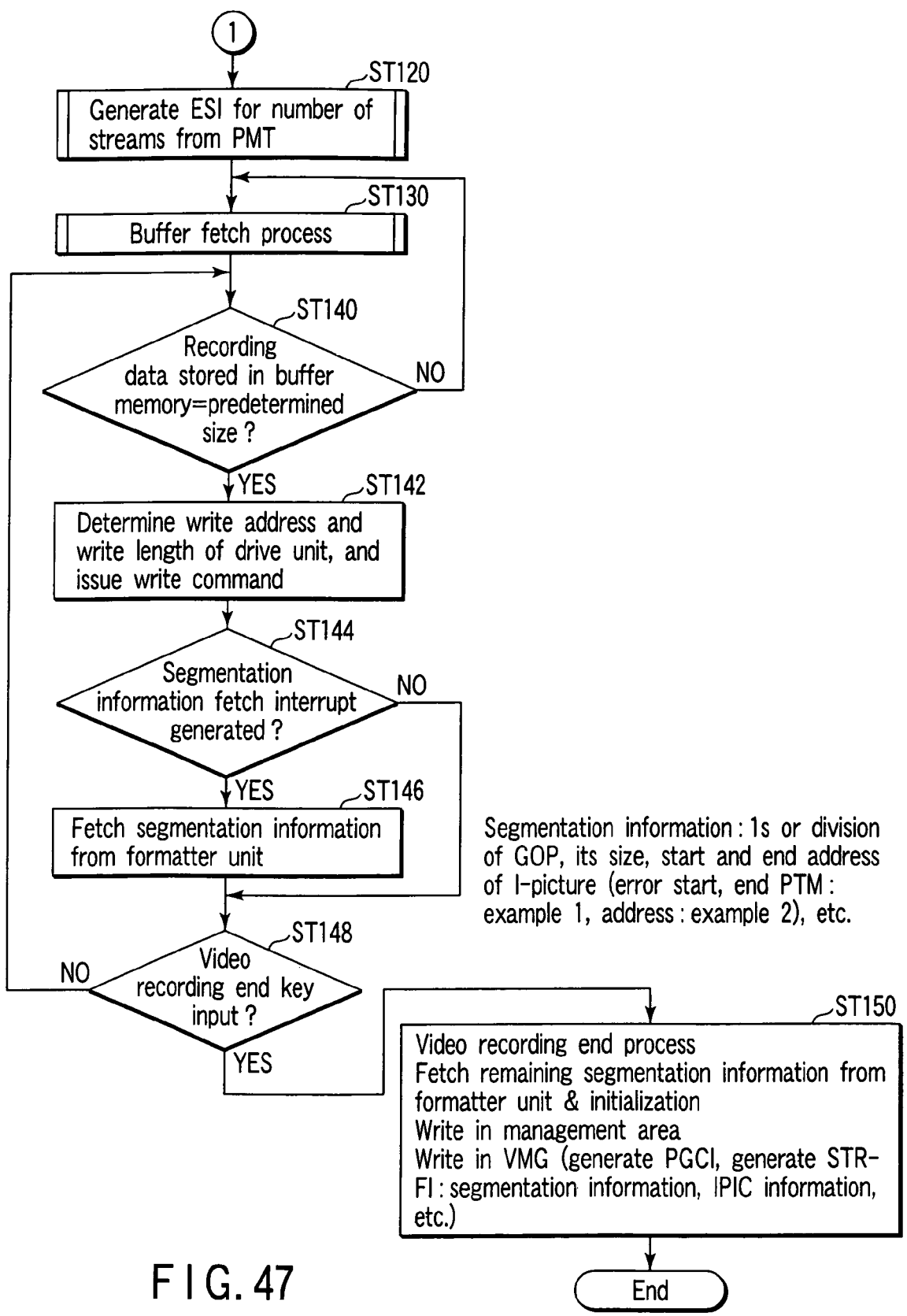
FIG. 47 is a flowchart for explaining an example of a video recording operation (part 2) of the apparatus in FIG. 41.
Figure 48:
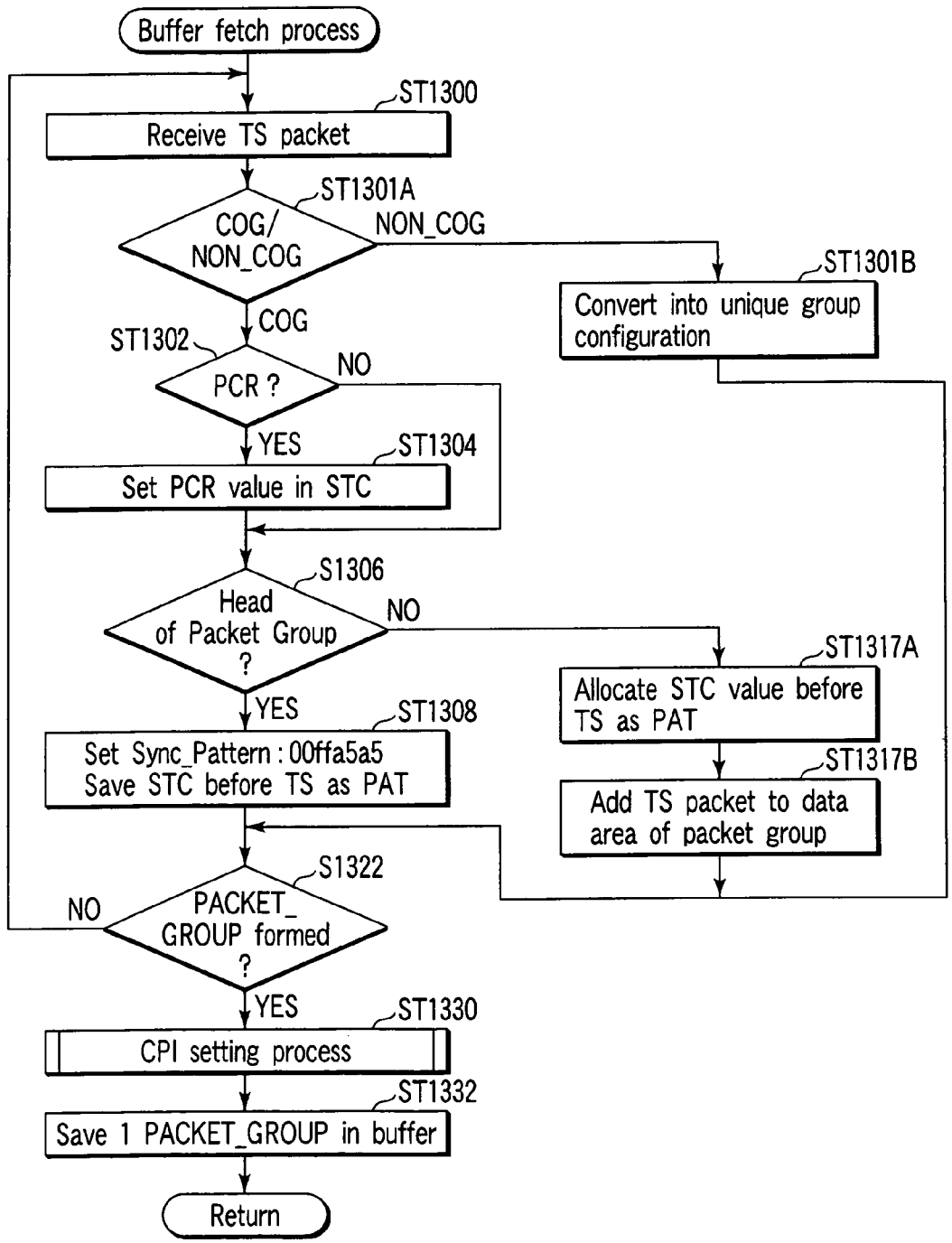
FIG. 48 is a flowchart (buffer fetch process flow) for explaining an example of a buffer fetch process (ST130) shown in FIG. 47.
Figure 52:
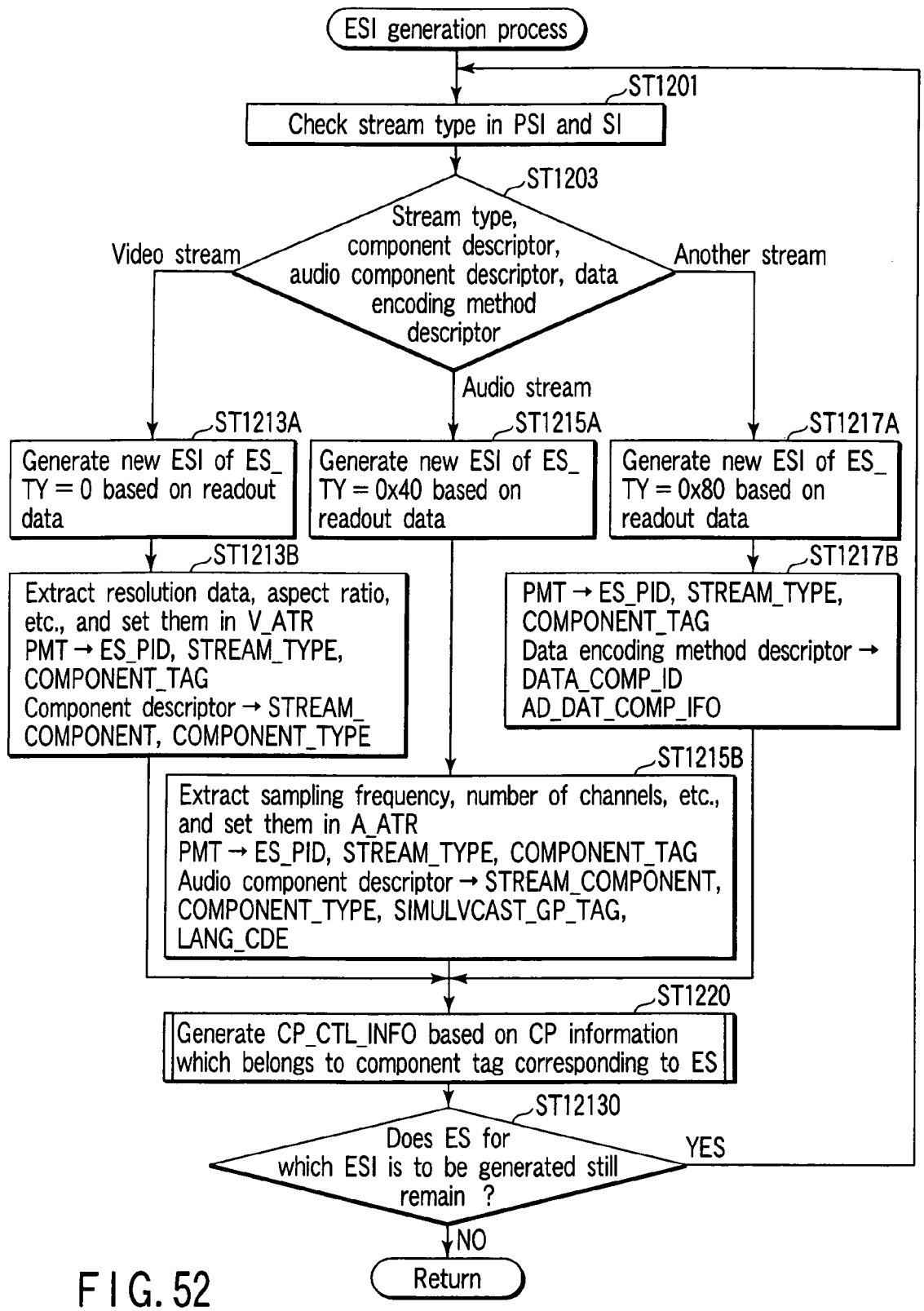
FIG. 52 is a flowchart (ESI setting process flow) for explaining an example of a stream information (ESI) generation process (ST120) shown in FIG. 47.

FIGS. 46 and 47 are flowcharts for explaining an example of the video recording operation of the apparatus in FIG. 41. Data processes upon stream recording are as follows (see FIGS. 46 to 58).

d1) A program to be recorded is determined using EPG (Electronic Program Guide) in the program setting process, reception of that program starts, and the determined program is recorded;

d2) Upon reception of a recording command from the key input unit, the MPU unit loads management data from disc drive unit and determines a write area. At this time, MPU unit checks the file system (step ST100) to determine whether or not recording can be proceeded (step ST102). If recording can be proceeded, the MPU unit determines a recording position (step ST105; see FIG. 51); otherwise, a message that advises accordingly is displayed for the user (step ST104), thus aborting the recording process.

d3) If data to be recorded is digital broadcast data (step ST106) and if no error is found (step ST111), contents of the management area are set to write data in the determined area, and the write start address of video data is set in the disc drive unit, thus preparing for data recording (step ST112);

d4) The time of the STC unit is reset. Note that the STC unit is a system timer, and recording/playback is done with reference to the count value of this timer;

d5) The PAT of a program to be recorded is loaded to determine the PID required to fetch the PMT of the target program. Then, the target PMT is loaded to determine the PIDs of data (video, audio) to be decoded (to be recorded). At this time, the PAT and PMT are saved in the work RAM of the MPU unit, and are written in the management information. VMG file data is written in the file system, and required information is written in VMGI.

d6) Video recording setups are made in respective units (step ST114). At this time, a segmentation setup of data and a reception setup of TS packets are made in the formatter unit. Also, the PID of data to be recorded is set to record only a target video stream. Furthermore, the buffer is set to start holding of TS packets (step ST116). Then, the formatter unit starts operation, as shown in FIG. 48.

d7) SOB_ESI is generated based on the PMT (step ST120; see FIG. 52);

d8) If data stored in the buffer reaches a predetermined size, a ECC process is done via the D-PRO unit, thus recording the data on the disc (step ST130);

d9) During video recording, segmentation information is saved in the work RAM of the MPU unit periodically (before the buffer RAM of the formatter unit becomes full of data). The segmentation information to be saved is that of SOBUs, i.e., the SOBU start address, SOBU pack length, I-picture end address, the SOBU arrival time (ATS), or the like may be saved;

d10) It is checked if video recording is to end (if the user has pressed a video recording end key or if no recordable space remains). If video recording is to end, remaining segmentation information is fetched from the formatter unit, and is added to the work RAM. These data are recorded in management data (VMGI), and the remaining information is recorded in the file system;

d11) If video recording is not to end, the control returns to d7) to continue the data fetch and write processes.

FIG. 48 is a flowchart (buffer fetch process flow) for explaining an example of the contents of the buffer fetch process (ST130) shown in FIG. 47. In the flow of signals upon recording, TS packet data received by the STB unit (or terrestrial digital tuner) are converted into packet groups by the formatter unit, and are saved in the work RAM. When data saved in the work RAM reach a predetermined size (for one or an integer multiple of CDA size), they are recorded on the disc. As the operations at that time (FIG. 48), upon reception of TS packets, a group is formed every 170 packets, and a packet group header is generated.

a1) A TS packet is received (step ST1300);

a2) If the fetched TS packet includes a PCR, the STC unit is corrected;

a3) If the packet of interest corresponds to the head of a packet group, Sync_Pattern: 00ffa5a5a is set (step ST1308)

a4) The arrival time of the TS packet is allocated before that TS packet as PAT data (step ST1308);

a5) The fetched TS packet is set in the TS packet data area;

a6) It is checked if a packet group is formed (if 170 TS packets are grouped) (step ST1322). If NO in step S1322, the control returns to a1); otherwise, a CPI process is executed (step ST1330), and the group data is temporarily saved in the buffer RAM (step ST1332).

Figure 49:
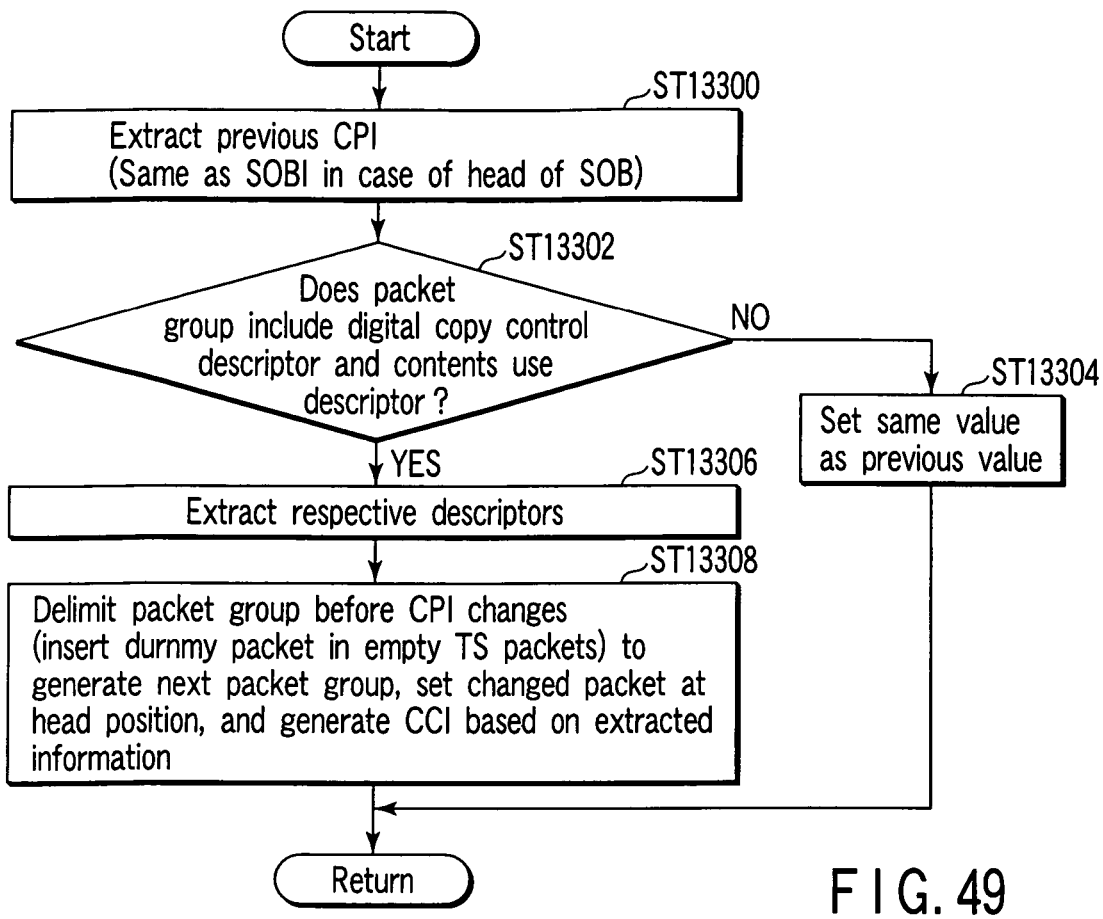
FIG. 49 is a flowchart (CPI generation process flow) for explaining an example of a CPI setting process (ST1330) shown in FIG. 48.

FIG. 49 is a flowchart (CPI generation process flow) for explaining an example of the CPI setting process (ST1330) shown in FIG. 48. The CPI setting process will be described below.

b1) It is checked if the latest PMT and EIT include copy information (step T13302). If the copy information is found, copy information is formed based on that information (step ST13306), and is set. After that, the control advances to b3);

b2) If the received TS packet does not include any copy information, the same information as that in the previous pack is formed as copy information (step ST13304);

b3) It is checked if the latest PMT and EIT include contents use descriptors (step ST13302). If contents use descriptors are found, the following process is made. That is, if the values of the contents use descriptors have changed in the middle of a packet group, dummy data (see FIG. 50) is inserted in the previous packet group to form a new packet group after the changed position, and CCI is set based on that information (step ST13308);

b4) If the received TS packet does not include any copy information, CCI is formed as "copy free".

Figure 50:
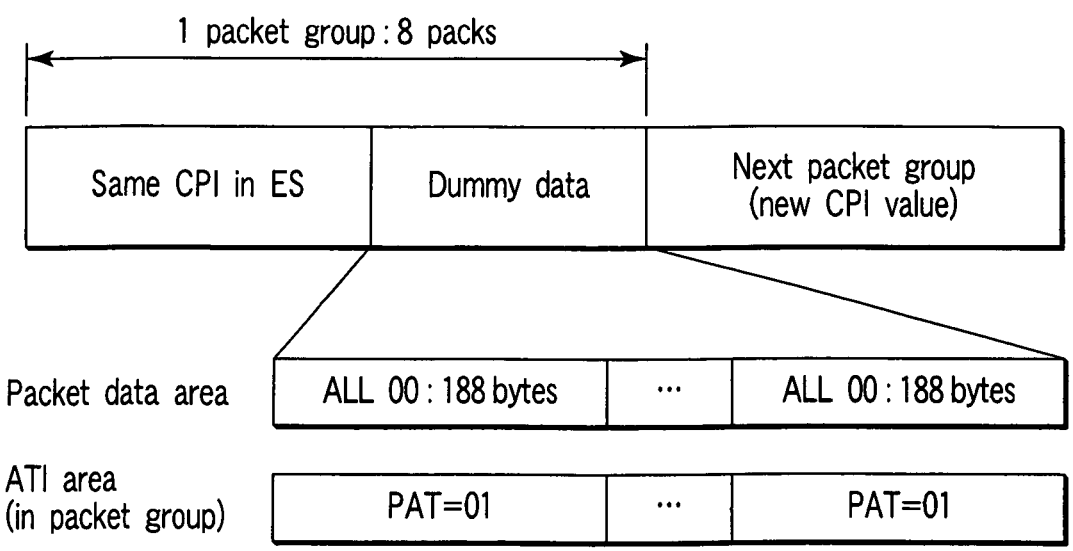
FIG. 50 is a view for explaining an example of the data structure of packet groups in a process (packet group align process) in step ST13308 in FIG. 49.

FIG. 50 is a view for explaining an example of the data structure of packet groups in the process (packet group align process) in step ST13308 in FIG. 49. When a change in CCI/DCI may take place in a single packet group of a single ES, that packet group is temporarily delimited, and the remaining data of the packet group are padded with dummy data to set the next packet group, as shown in FIG. 50. In other words, an align process is executed to prevent CCI/DCI from changing in a packet group.

Figure 51:
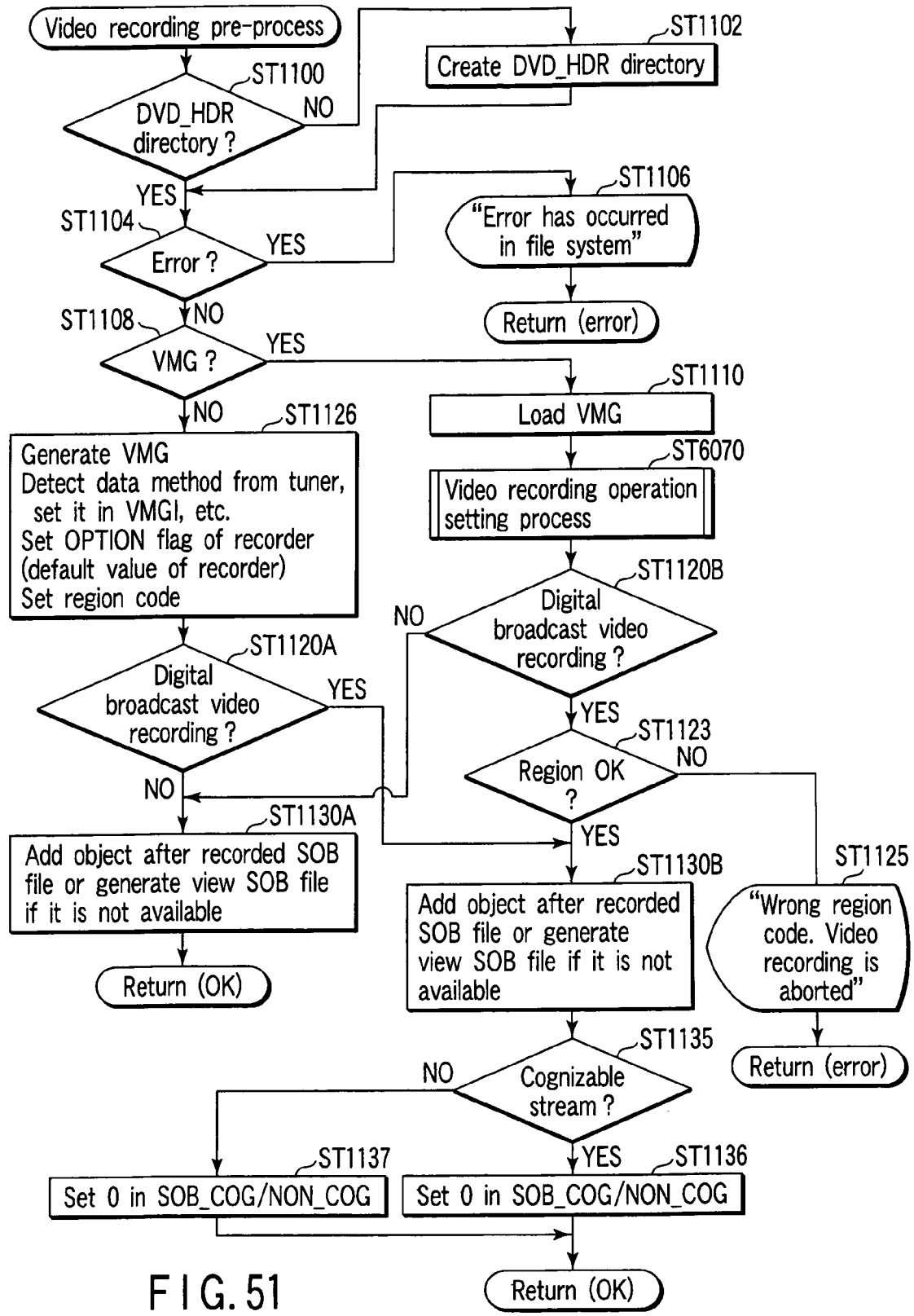
FIG. 51 is a flowchart (video recording pre-process flow) for explaining an example of a process before the beginning of video recording on a disc-shaped information storage medium (e.g., an optical disc using blue laser) shown in FIG. 1.

FIG. 51 is a flowchart (video recording pre-process flow) for explaining an example of a process before the beginning of video recording on the disc-shaped information storage medium (e.g., an optical disc using blue laser) shown in FIG. 1. The pre-process for video recording is executed as follows.

e1) A DVD_HDR directory is searched for (a directory that stores new VR) (step ST1100). If no such directory is found, that directory is created (step ST1102); otherwise, the control advances to the next step;

e2) It is checked if data has already been recorded in the directory (step ST1108). If the data has already been recorded, VMGI as its management information is loaded onto the work RAM (step ST1110), and profile information (FIGS. 5, 9, and the like) is loaded. Then, a video recording operation setting process is executed (step ST6070). If no data is recorded (NO in step ST1108), the control advances to e5).

e3) It is checked if contents to be recorded are digital broadcast contents (step ST1120B). If NO in step ST1120B, the control advances to e9);

e4) If the contents to be recorded are digital broadcast contents (YES in step ST1120B), a region code is checked (step ST1123). If the region code of the contents does not match a region value which is set as a default in this apparatus (that shown in FIG. 41), video recording ends (step ST1125); otherwise, the control advances to e7).

e5) VMG is generated, and default values of this apparatus are recorded in profile information (FIGS. 5, 9, and the like) (step ST1126);

e6) It is checked if contents to be recorded are digital broadcast contents (step ST1120A). If NO in step ST1120A, the control advances to e9);

e7) If an SOB file is available, a setup is made to record an object after that file; if no SOB file is available, a new SOB file is generated, and a setup is made to record an object after that file (step ST1130B);

e8) It is checked if a stream is cognizable (step ST1135). If the stream is cognizable, "cognizant" is set (step ST1136); otherwise, "Non-cognizant" is set (step ST1137), thus ending this process.

e9) If a VOB file is available, a setup is made to record an object after that file; if no VOB file is available, a new VOB file is generated, and a setup is made to record an object after that file (step ST1130A), thus ending this process.

FIG. 52 is a flowchart (ESI setting process flow) for explaining an example of the contents of the stream information (ESI) generation process (ST120) shown in FIG. 47.

f1) PSI and SI are examined to check the number of set streams (step ST1201);

f2) f4) and f5) are repeated in correspondence with the number of set streams;

f3) A stream type is checked based on PSI and SI (step ST1203) to determine if the stream of interest is a video/audio stream or another type of stream to branch the control to the next stream check processes;

f4) The stream type is categorized to MPEG1 video, MPEG2 video, MPEG1 audio, MPEG2 audio, . . . , and internal data are checked depending on the determined type to read out respective kinds of attribute information.

f5) In case of a video stream, ES_TY=0 (step ST1213A), and respective kinds of attribute information are set (especially, resolution data, aspect information, and the like are extracted) to generate V_ATR (step ST1213B). The control then advances to f8);

f6) In case of an audio stream, ES_TY=0x40 (step ST1215A), and respective kinds of attribute information are set (especially, the sampling frequency, the number of channels, and the like are extracted) to generate A_ATR (step ST1215B). The control then advances to f8);

f7) In case of another kind of stream, ES_TY=0x80 (step ST1217A), and respective kinds of attribute information are set (step ST1217B). The control then advances to f8);

f8) Copy information is extracted to generate CP_CTL_INFO (step ST1220);

f9) New ESI is set based on the attribute information, and the control returns to check the next stream (step ST1230).

Figure 53:
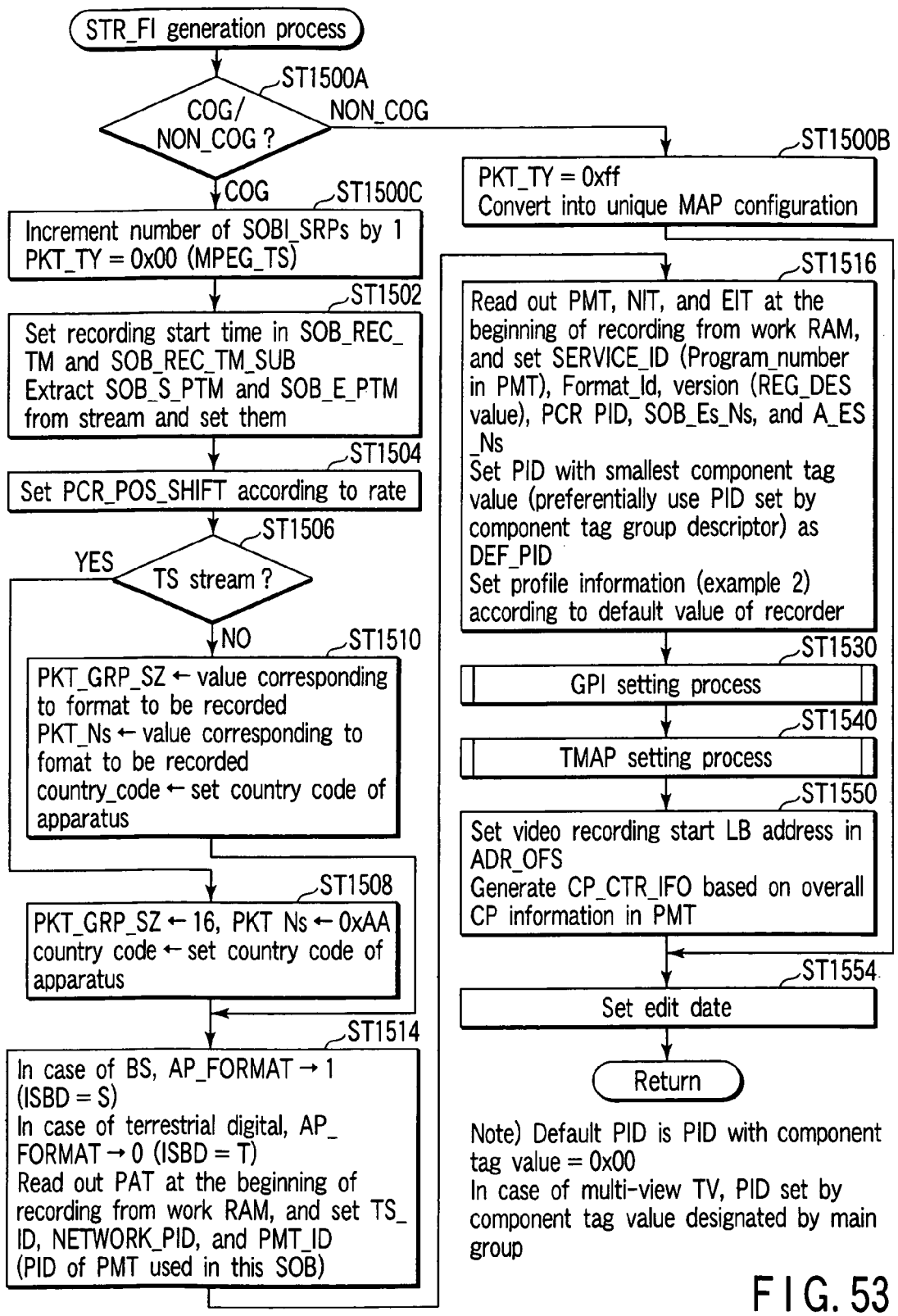
FIG. 53 is a flowchart (stream file information generation process flow with a GPI setting process and TMAP setting process) for explaining an example of a stream file information (STR_FI) generation process in a video recording end process (ST150) shown in FIG. 47.

FIG. 53 is a flowchart (stream file information generation process flow with a GPI setting process and TMAP setting process) for explaining an example of a stream file information (STR_FI) generation process in the video recording end process (ST150) shown in FIG. 47. The STR_FI generation process will be described below with reference to FIGS. 53 to 57.

g1) The number of SOBI_SRP# data (FIG. 8) is increased by one to add another SOBI, an area for that SOBI is assured, and 0: MPEG_TS is set in PKT_TY (step ST1500C);

g2) The video recording time is set in SOB_REC_TM (step ST1502). Note that the internal clock of the apparatus (FIG. 41) is set and corrected based on TDT (Time Data Table; not shown), so that an accurate time can always be obtained;

g3) Start and end PTMs are set (step ST1502);

g4) PCR_POS_SHIFT is set according to the recording rate (step ST1504);

g5) If the stream type is a TS stream (ARIB, DVB), "188" is set in AP_PKT_SZ and "16" is set in PKT_GRP_SZ (step ST1508); otherwise, values according to the broadcast scheme are set (step ST1510).

g6) MPEG_TS is set in PKT_TY;

g7) TS_ID, NETWORK_PID, and PMT_ID (the PID of PMT used by this SOB) are set based on PAT (step ST1514);

g8) SERVICE_ID (Program Number in PMT) and PCR_PID are set based on PMT (step ST1516). Furthermore, as for FORMAT_ID and VERSION, default values in the apparatus (in case of the built-in tuner) or Registration_Descriptor values sent via a digital input (in case of an external digital input) are set;

g9) Moreover, the number of recorded ESs is set. (The PMT is set with information and number of all broadcasted ESs, but since not all ESs are always recorded upon video recording, the number of recorded ESs is set.)

g10) The video recording start LB address is set in ADR_OFS (FIG. 17) (step ST1550), and a default PID is set. Note that the default video PID corresponds to that with a component tag value=00 or that of a stream corresponding to a component tag described in a main component group.

g11) If profile information (FIG. 9) is stored for each SOBI, default values of this apparatus are set in this process;

g12) A GPI setting process (to be described later) is executed (step ST1530), and TMAPI is generated for each stream on the basis of segmentation information (step ST1540);

g13) An edit date is set (step ST1554).

FIG. 54 is a flowchart for explaining an example (example 1) of the GPI setting process (ST1530) in FIG. 53. As the GPI setting process, two different data methods are available, and the first method is as shown in FIG. 54. The first method of the GPI setting process will be described below.

h1) A stream type is checked;

h2) If a plurality of programs form one stream (YES in step ST15300A), information indicating the presence of GPI is set in SOB_TY, GP_TY (FIG. 27)=3, all GPs are set as main groups, different numbers are set in GP_NUM in correspondence with programs, and one GPI is generated per program, thus ending this process (store the PID to be played back) (step ST15302A);

h3) In case of rain attenuation broadcast (YES In step ST15304A), information indicating the presence of GPI is set in SOB_TY, GP_TY=2, and the top layer is set as a main group and other layers are set as sub-groups. An identical number is set in GP_NUM, and one GPI is generated per layer, thus ending this process (store the PID to be played back) (step ST15306A);

h4) In case of multi-view broadcast (YES in step ST15308A), information indicating the presence of GPI is set in SOB_TY, GP_TY=1, and a MAIN group is set as a main group and other groups are set as sub-groups. An identical number is set in GP_NUM, and one GPI is generated per view, thus ending this process (store the PID to be played back) (step ST15310A);

h5) Otherwise (NO in step ST15308A), information indicating the absence of GPI is set in SOB_TY, and this process ends (step ST15312A).

Figure 55:
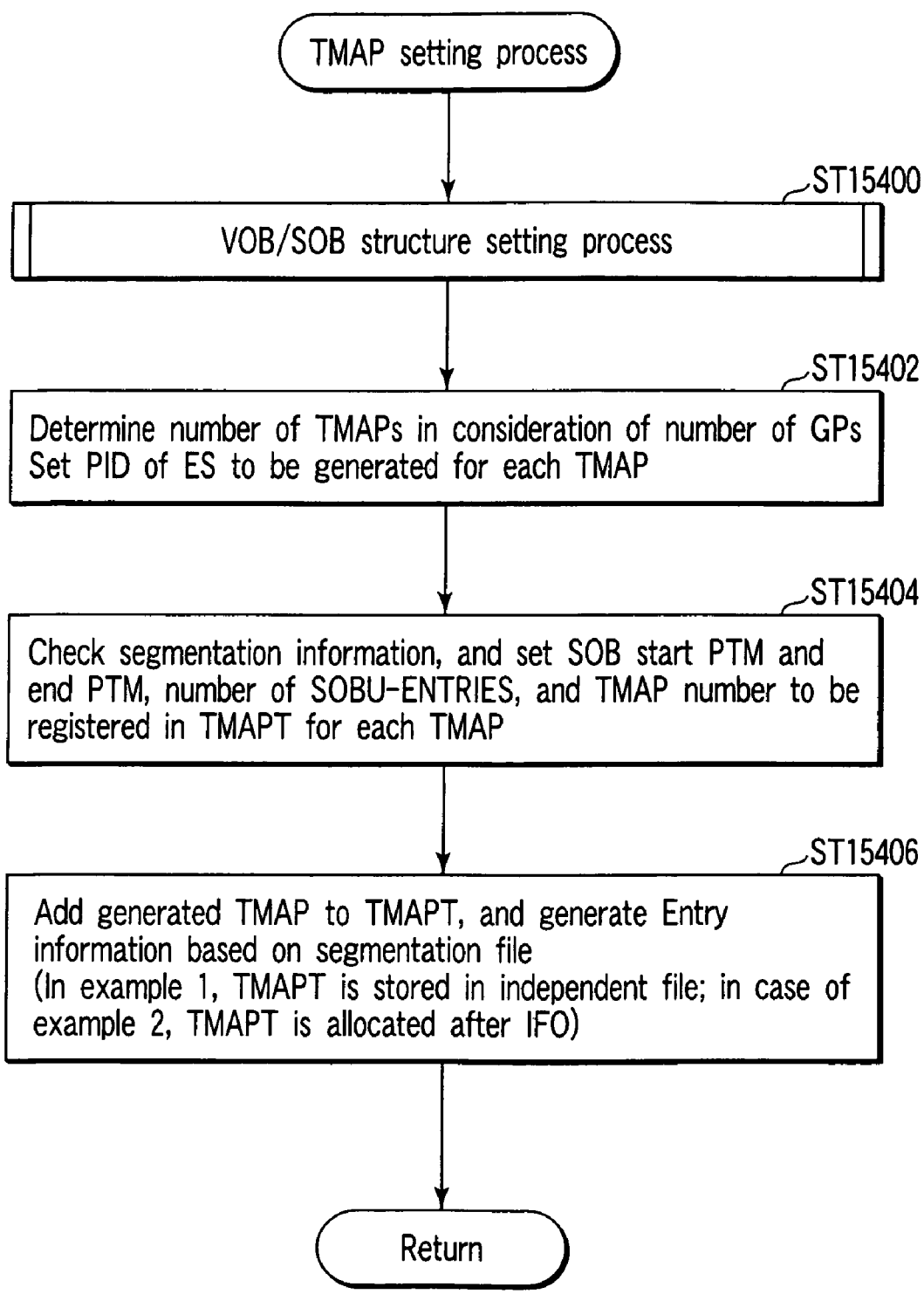
FIG. 55 is a flowchart for explaining a TMAP setting process (ST1540) in FIG. 53.

FIG. 55 is a flowchart for explaining the TMAP setting process (ST1540) in FIG. 53. The TMAP setting process is executed as follows;

i1) The SOB structure is determined (step ST15400);

i2) ESs for this TMAP data are to be generated are determined in consideration of the number of GPs, the number of ESs is set as the number of TMAPs, and ES_PID is set for each TMAP (step ST15402). (However, one TMAP need not always be assigned to one GP. If no TMAP is available, the TMAP of MAIN_GP or GP with identical GP_NUM is used to implement playback, search, special playback, and the like.)

i3) The SOB start and end times, the start and end times for each TMAP, the number of ENTRIES, and the like are set based on segmentation information (step ST15404);

i4) TMAPT data is added, and ENTRY information is generated based on segmentation information (step ST15406). Note that the TMAPT information is stored as an independent file (FIG. 3 and the like) or is added to the end of the IFO file (FIG. 4 and the like).

Figure 56:
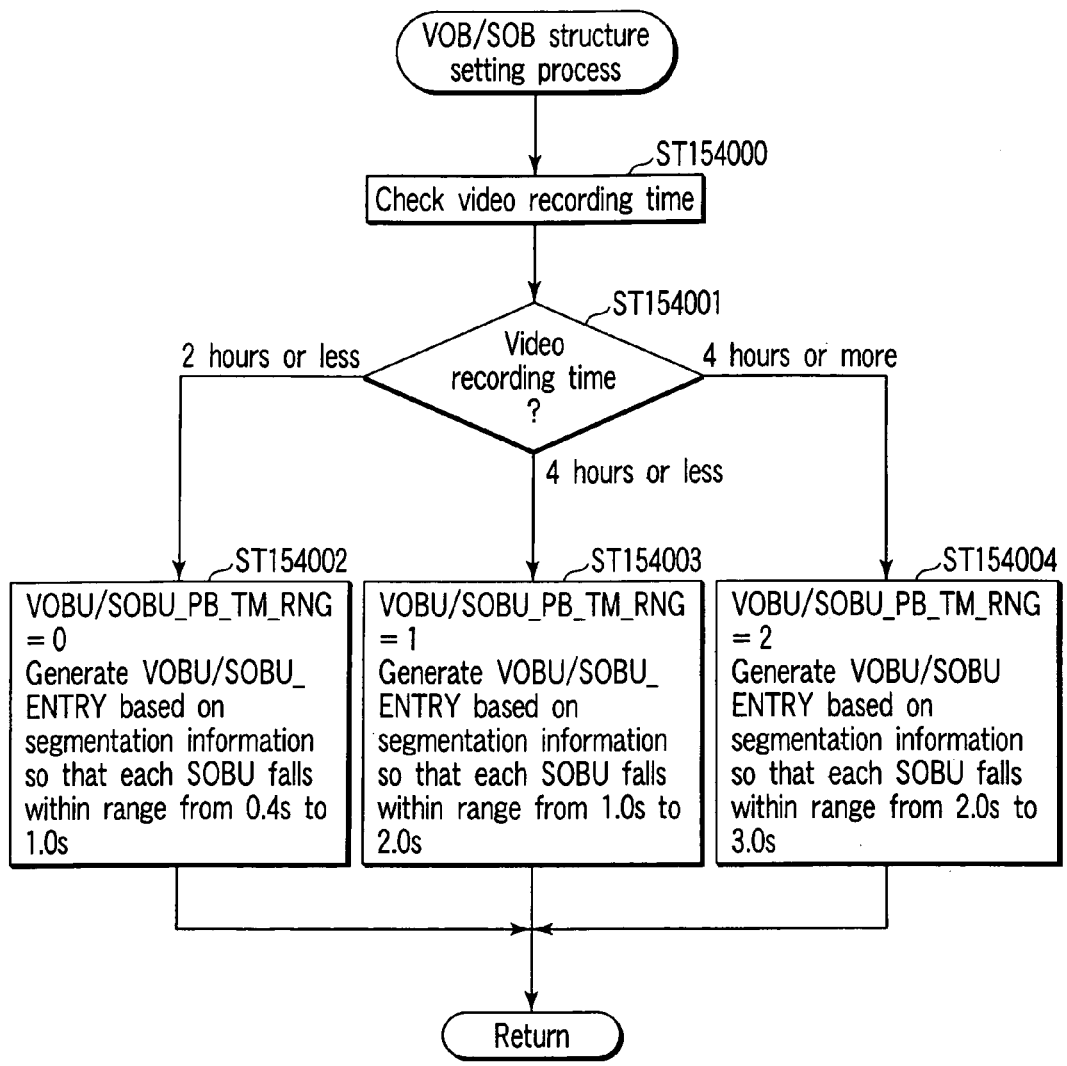
FIG. 56 is a flowchart for explaining a VOB/SOB structure setting process (ST15400) in FIG. 55.

FIG. 56 is a flowchart for explaining the VOB/SOB structure setting process (ST15400) in FIG. 55. The VOB/SOB structure setting process will be described below.

j1) The recorded time is checked (step S154001). If the recorded time is equal to or shorter than two hours, the control advances to j2); if it falls within the range from two to four hours, the control advances to j3); or if it is equal to or longer than four hours, the control advances to j4);

j2) "0" is set in VOB/SOB_PB_TM_RNG, and VOBU/SOBU_ENT data are generated based on segmentation information (information of 0.4 s to 1 s) so that each SOBU has a time range of 0.4 s to 1 s (step ST154002). The control then advances to j5);

j3) "1" is set in VOB/SOB_PB_TM_RNG, and VOBU/SOBU_ENT data are generated based on segmentation information (information of 0.4 s to is) so that each SOBU has a time range of 1.0 s to 2.0 s (step ST154003). The control then advances to j5);

j4) "2" is set in VOB/SOB_PB_TM_RNG, and VOBU/SOBU_ENT data are generated based on segmentation information (information of 0.4 s to is) so that each SOBU has a time range of 2 s to 3 s (step ST154004). The control then advances to j5);

j5) This process ends.

Figure 57:
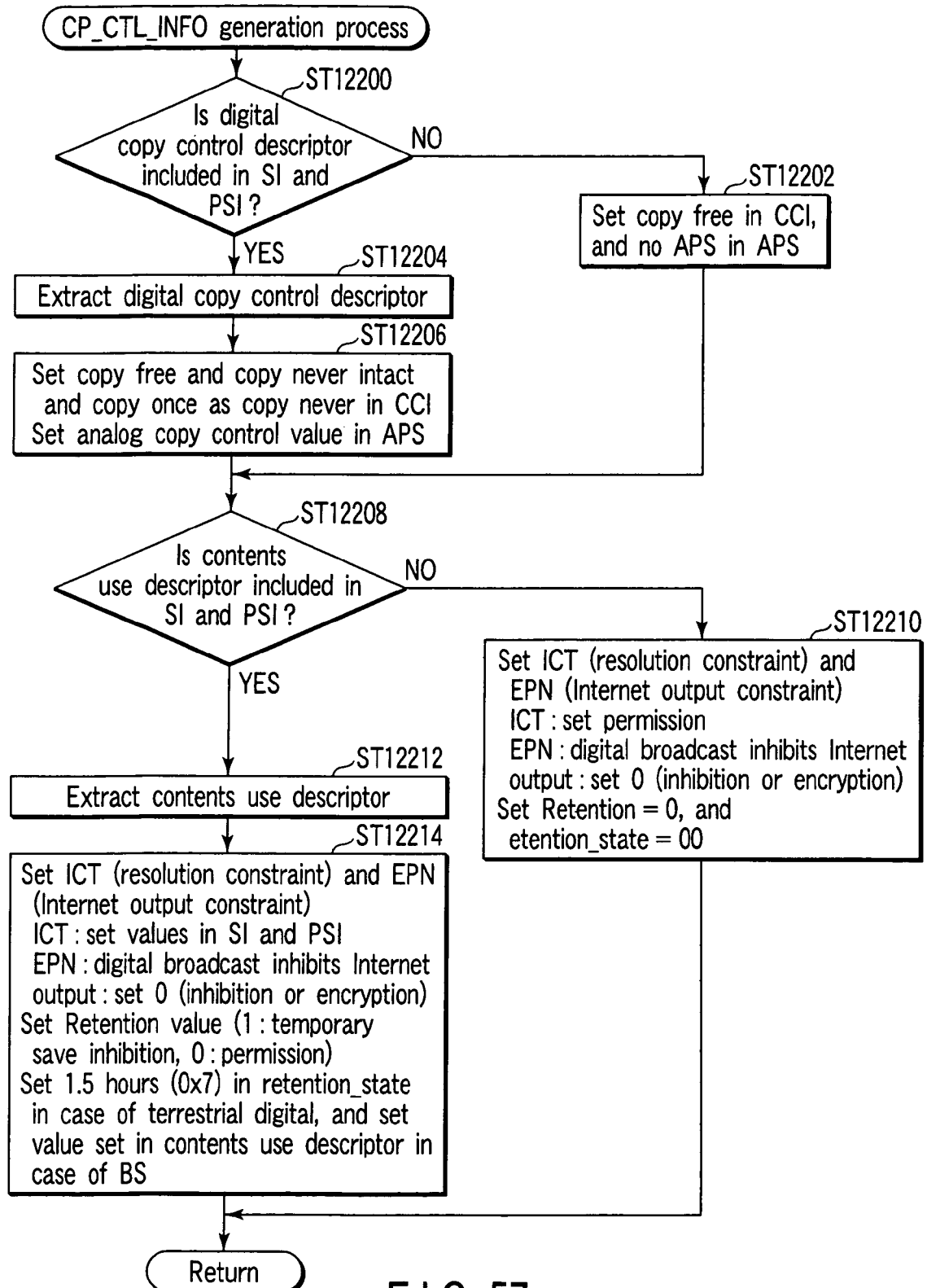
FIG. 57 is a flowchart for explaining a CP_CTL_INFO generation process (ST1220) in FIG. 52.

FIG. 57 is a flowchart for explaining the CP_CTL_INFO generation process (ST1220) in FIG. 52. The CP_CTL_INFO setting process will be described below;

k1) It is checked if the latest PMT and EIT include copy information (step ST12200). If copy information is found, copy information is generated based on that information (step ST12204, ST12206), and is set. The control then advances to k3);

k2) If no copy information is found, "copy free" is set (step ST12202);

k3) It is checked if the latest PMT and EIT include contents use descriptors (step ST12208). If the contents use descriptors are found, ICT and EPN are set based on their values (step ST12212, ST12214);

k4) If the received TS packet does not include any copy information, ICT and EPN are formed as "copy free".

Figure 58:
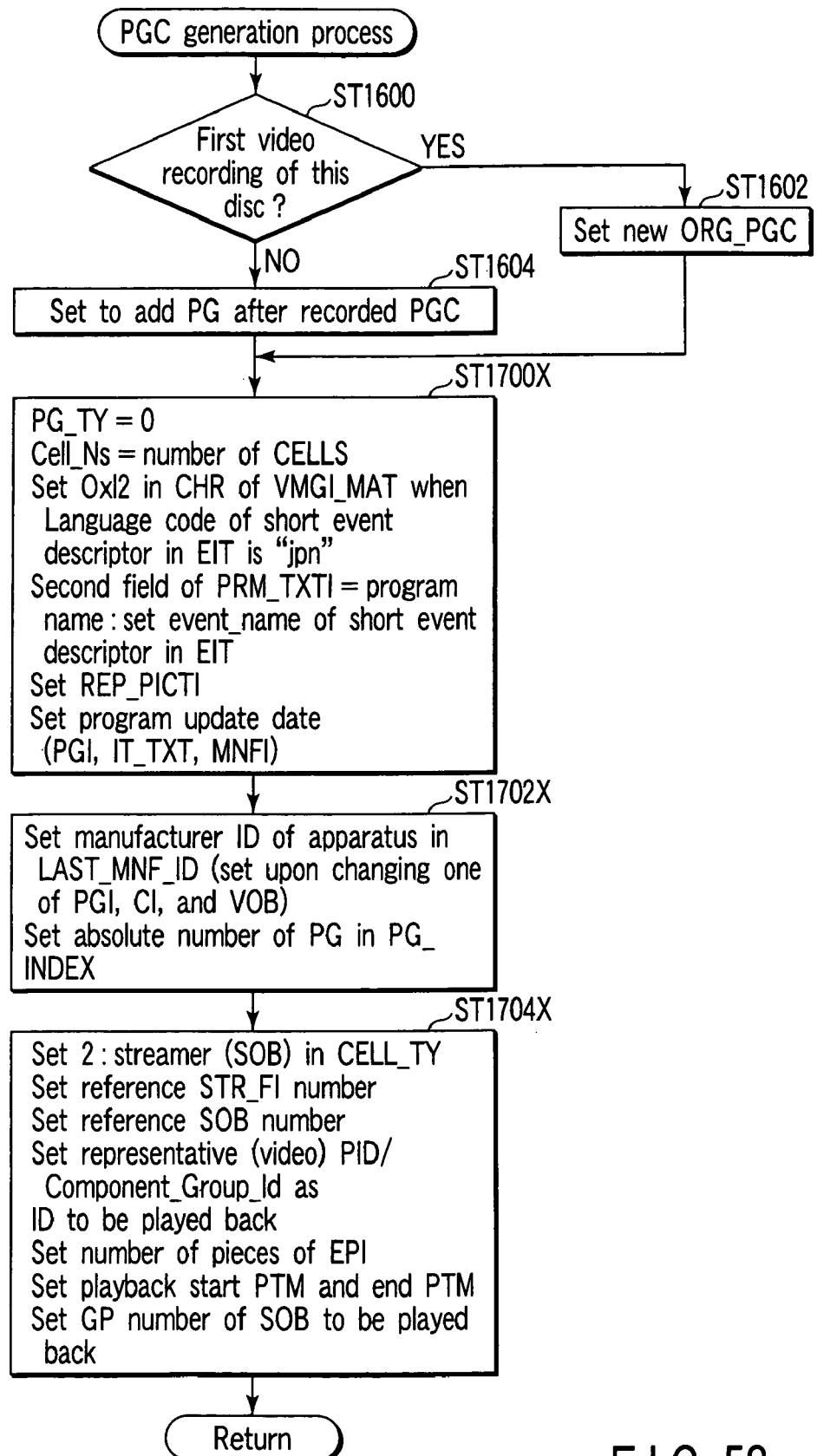
FIG. 58 is a flowchart for explaining an example of a program chain (PGC) generation process (including a program setting process) in the video recording end process (ST150) shown in FIG. 47.

FIG. 58 is a flowchart for explaining an example of the program chain (PGC) generation process (including a program setting process) in the video recording end process (ST150) shown in FIG. 47. The PG generation process in this process will be described below;

m1) It is checked if a disc of interest undergoes the first video recording (step ST1600). If the disc of interest undergoes the first video recording, ORG_PGC is generated (step ST1602); otherwise, a setup is made to add PG information after the ORG_PGC (step ST1604);

m2) Erase permission: 0 is set in PG_TY, and the number of cells is set in Cell_Ns (step ST1700X);

m3) In case of ARIB, if language_code in a short event descriptor in EIT is "jpn", "00x12" is set in text information in management information VMG_MAT, EVENT_NAME is set in the second field of primary text information PRM_TXTI, and representative picture information is set in REP_PICTI;

m4) The manufacturer ID of this apparatus (FIG. 41) is set in LAST_MNF_ID (step ST1702X). As for this value, when PGI, CI, or VOB has been changed, the manufacturer ID of the apparatus used to change such information is set to identify the manufacturer of the last apparatus used to execute edit and record processes. In this way, when the apparatus of another manufacturer is used to change the recorded contents of a disc, a reaction can be easily taken.

m5) The absolute number of PG is set in PG_INDEX (step ST1702X) to allow another application software or the like to refer to each PG. Furthermore, this PG update date information is recorded. At this time, if MNF$_1$ and IT_TXT (with the same manufacturer code) supported by this apparatus are found, the update date information of corresponding data is also set;

m6) Information unique to each manufacturer is set in MNFI;

m7) Information (CELLI) indicating a streamer is set in CELL_TY (step ST1704X);

m8) The reference SOB number is set, the representative (video) PID or Component_Group_Id is set as the ID to be played back, and the number of pieces of EPI, playback start and end PTMs, and EPs are set (step ST1704X).

Figure 59:
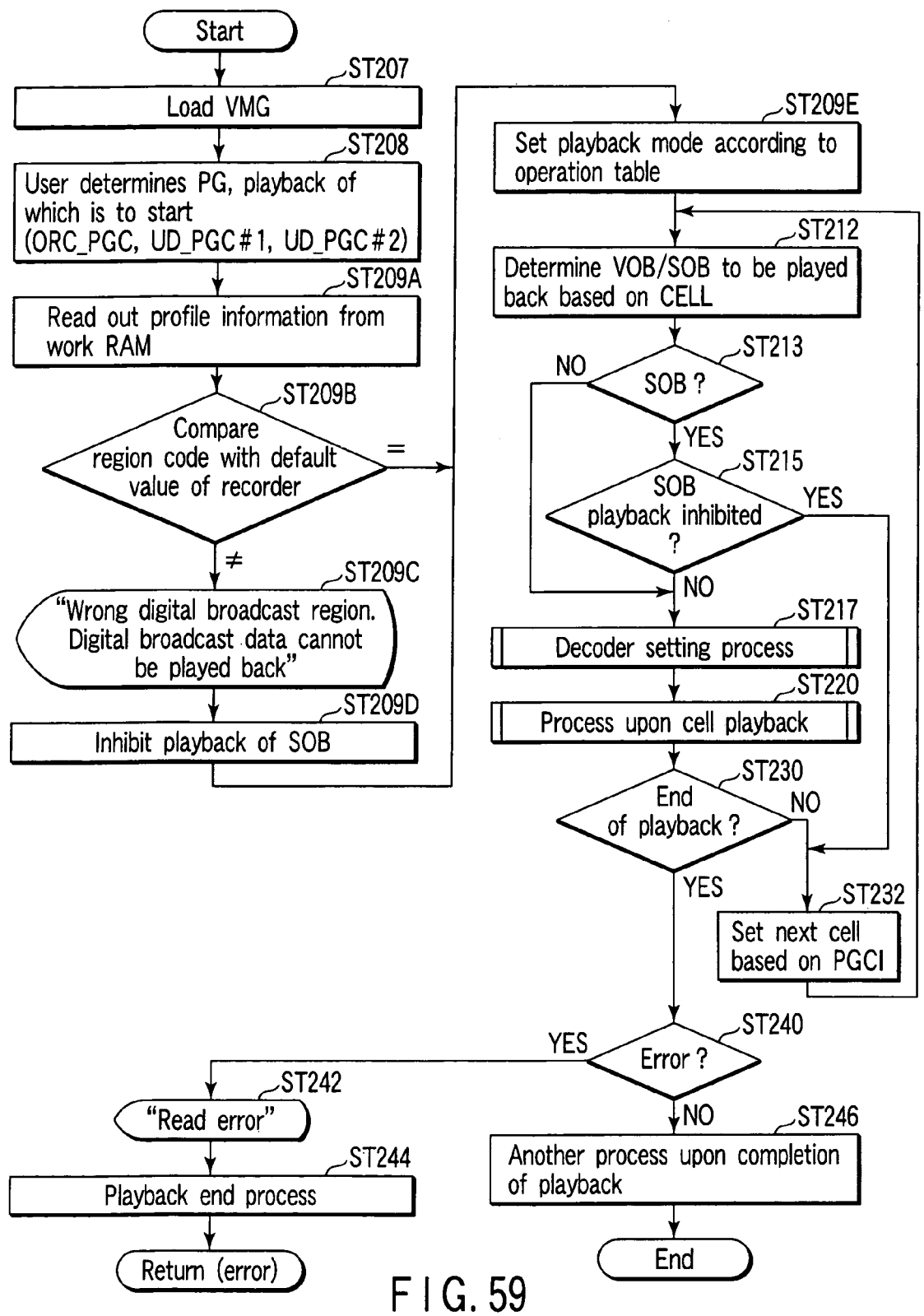
FIG. 59 is a flowchart (overall playback operation flow) for explaining an example of a playback operation of the apparatus in FIG. 41.

FIG. 59 is a flowchart (overall playback operation flow) for explaining an example of the playback operation of the apparatus in FIG. 41. The data processes upon playback are executed as follows (see FIGS. 59 to 62);

n1) Prior to the playback process, a disc check process is made to check if the disc of interest is a write-once or rewritable disc (R, RW, RAM; to be simply referred to as a "rewritable Disc" hereinafter). If the disc of interest is not a rewritable Disc, a message that advises accordingly is returned, and the process ends;

n2) The file system of the disc is read out to check if data has already been recorded. If no data is recorded, a message "no data is recorded" is displayed, thus ending the process.

n3) The VMG file is loaded to determine programs to be played back (step ST207, ST208). The VMG information is stored in work RAM 80A in FIG. 41. Profile information (FIGS. 5, 9, and the like) is read out from this work RAM (step ST209A) to compare a region code in the readout profile information with the default region value of the recorder (apparatus of FIG. 41) (step ST209B). If the region codes do not match, a message that advises accordingly is displayed (step ST209C), and playback of the SOB whose region code does not match is inhibited (step ST209D). On the other hand, if the region codes match and playback is permitted, the playback mode is set according to the operation table (step ST209E) (FIG. 45). After that, cells to be played back are determined (by prompting the user to select them). If a playback process in the recorded order is selected, playback is made according to ORG_PGCI; if a playback process for respective programs is to be made, playback is made according to UD_PGC with a number corresponding to the program to be played back.

n4) The value of PKT_TY is read out to check if the broadcast scheme is supported. If the broadcast scheme is unsupported, a message that advises accordingly is displayed, and the process ends (or the control advances to process the next CELL);

n5) The SOB/VOB to be played back is determined based on CELLI to be played back (step ST212), and playback start file pointer (logical address) FP is determined based on the playback start PTM. Furthermore, respective decoder units are set based on STI values to prepare for playback. Also, APS setups (e.g., APS=ON/OFF, APS type, and the like) are set in the video decoder based on CCI in the packet group header at the head position, and CGMSA setups are made in the video recorder based on digital copy control. Furthermore, if a digital output (IEEE1394, Internet, or the like) is available, 0: scramble ON or output inhibition or 1: direct output is set in the output IC based on the EPN value. If ICT=0, the image resolution is constrained, i.e., HD (high-resolution) is converted into SD (standard resolution); if ICT=1, "direct output" is set in the output IC. At this time, if the playback start frame is not I-picture data, decoding starts from immediately preceding I, and display starts when the target frame is decoded, thus starting normal playback.

n6) A process upon playback start is executed (step ST212);

n7) Setups of respective decoders (to be described later) are made (step ST217);

n8) A cell playback process (to be described later) is executed (step ST220), and it is then checked if playback is to end (step ST230). If playback is to end, an error check process is executed (step ST240). If any error is found, a message that advises accordingly is displayed (step ST242); otherwise, a playback end process is executed (step ST244), thus ending this operation;

n9) The next cell is determined based on PGCI (step ST232), and it is checked if setups of decoders are changed. If the setups are changed, change attributes are set in the decoders so as to change decoder setups in response to the next sequence end code;

n10) It is checked if playback is to end. If playback is not to end, the control returns to n6).

Figure 60:
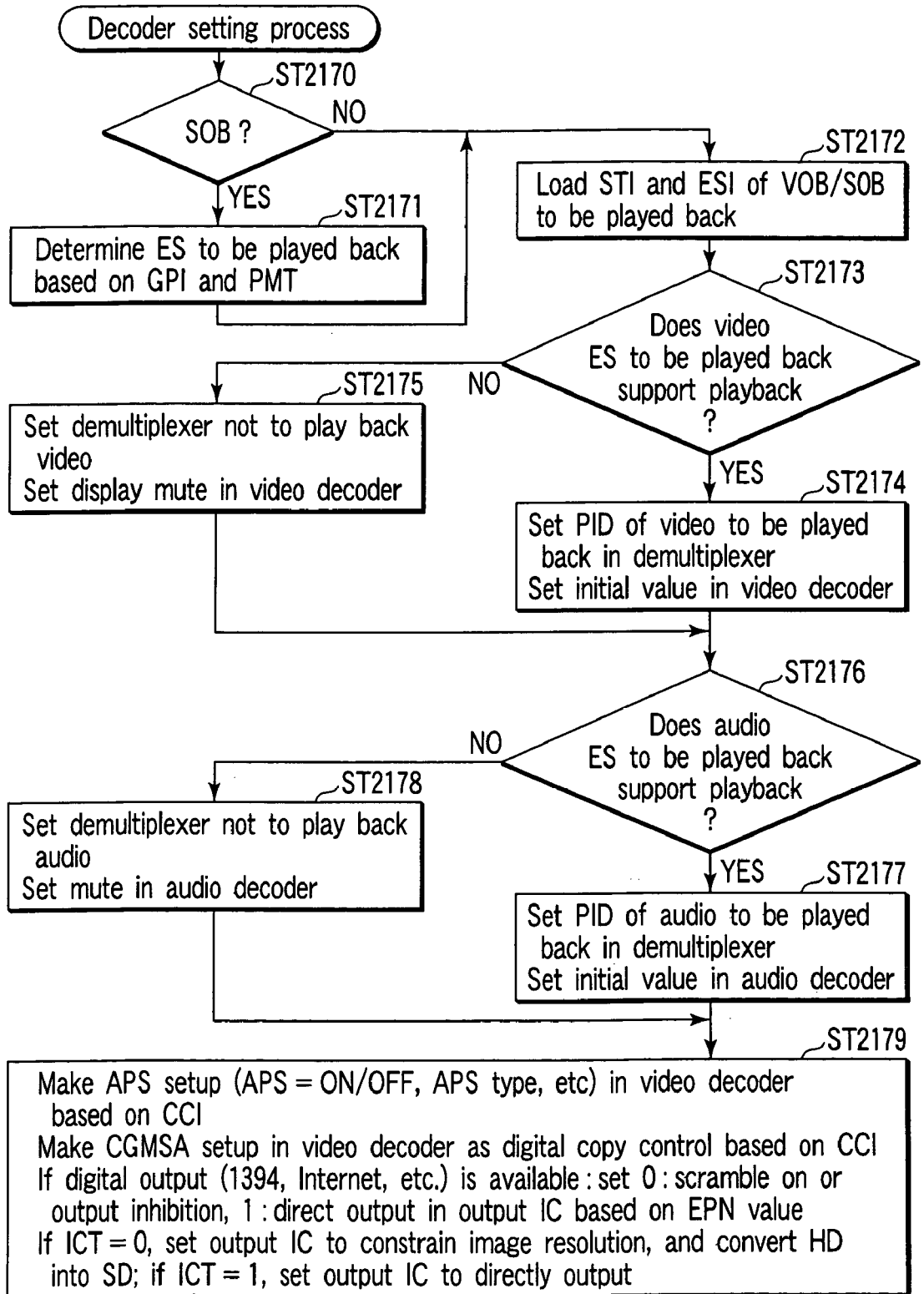
FIG. 60 is a flowchart for explaining a decoder setting process (ST217) in FIG. 59.

FIG. 60 is a flowchart for explaining the decoder setting process (ST217) in FIG. 59.

p1) A group to be played back is determined first, and ESs to be played back are determined in accordance with GPI (step ST2171);

p2) Attribute information (STI or ESI) is loaded (step ST2172);

p3) It is checked if the recorder supports the formats of the ESs to be played back (step ST2173, ST2176). If the recorder supports the formats, corresponding setups are made (step ST2174, ST2177); otherwise, mute setups are made (step ST2175, ST2178);

p4) CCI is set (step S2179).

Figure 61:
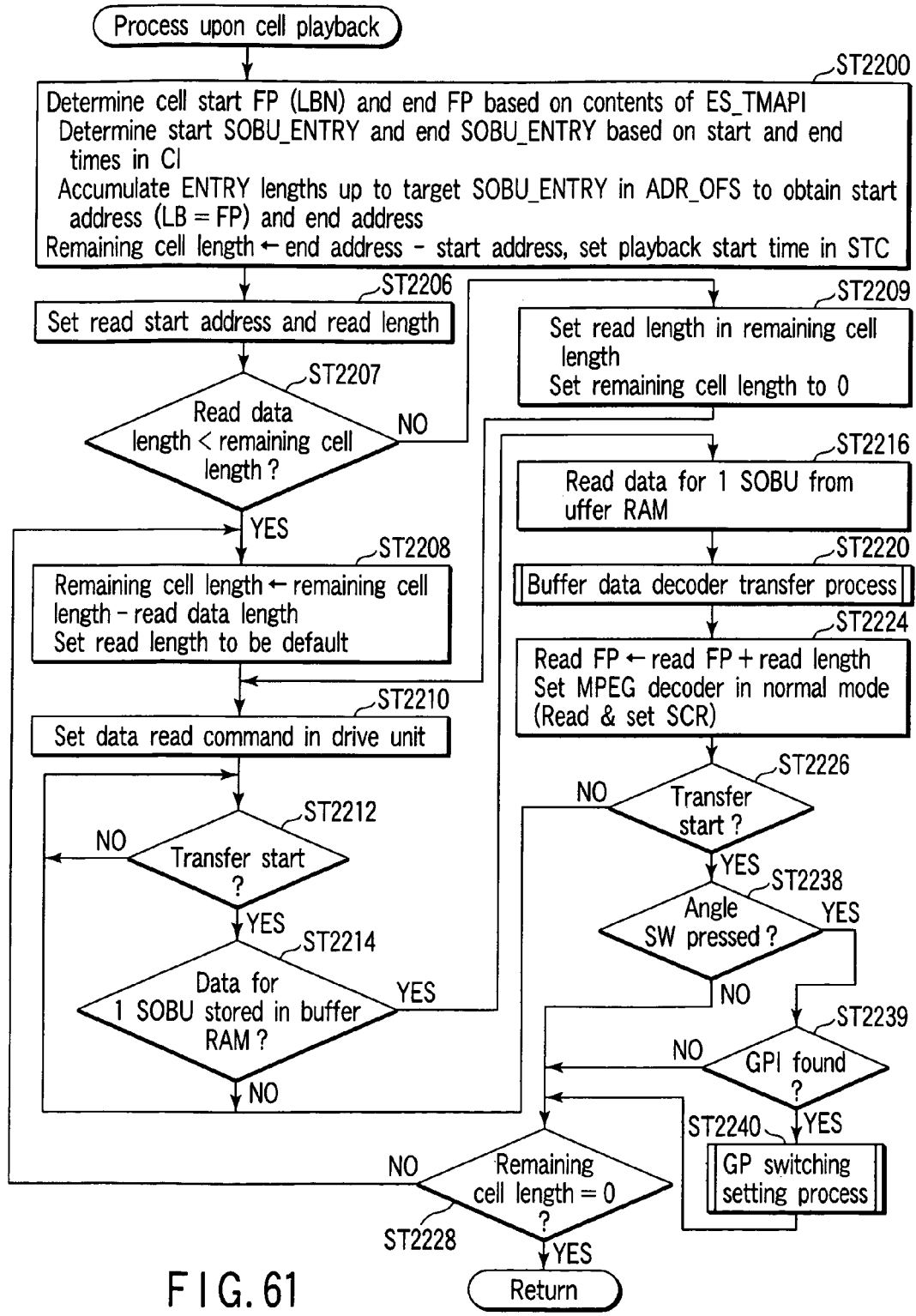
FIG. 61 is a flowchart for explaining an example of a process (ST220) upon cell playback in FIG. 59.

FIG. 61 is a flowchart for explaining an example of the process (ST220) upon cell playback in FIG. 59. The cell playback process is executed as follows;

q1) Start file pointer FP (logical block number LBN) and end address FP of a cell are determined on the basis of the contents of TMAPI. Furthermore, start SOBU_ENTRY and end SOBU_ENTRY are determined based on the start and end times in CELLI, and the data lengths of ENTRIES until target SOBU_ENTRY are accumulated in ADR_OFS, thus obtaining a start address (LB=FP) and end address. The remaining cell length is calculated by subtracting the start address from the end address, and the playback start time is set in the STC (step ST2200). The PID to be played back is determined and is set in the decoder (STB, digital tuner).

q2) A read process during playback is executed to determine the read address and read size based on the start file pointer (step ST2206);

q3) The read unit size to be read out is compared with the remaining cell length (step ST2207). If the remaining cell length is larger than the read unit size, a value obtained by subtracting the read unit size to be read out from the remaining cell length is set as the remaining cell length (step ST2208). If the remaining cell length is smaller than the read unit size, the read unit size is set to be the remaining cell length, and the remaining cell length is set to be zero (step ST2209);

q4) The read length is set to be a read unit length, and the read address, read length, and read command are set in the disc drive unit (step ST2210).

q5) The control waits until data for one SOBU are stored. If data for one SOBU are stored, a buffer decoder transfer process is executed (step ST2220), and the control advances to the next step.

q6) It is checked if transfer is complete (step ST2226). If transfer is complete, the control advances to the next step;

q7) It is checked if an angle key or the like has been pressed (step ST2238). If the angle key has been pressed, it is checked if GPI is available (step ST2239). If GPI is available, a GP switching process is executed (step ST2240); otherwise, the control advances to the next process without any process;

q8) The remaining cell length is checked (step ST2228). If the remaining cell length is not "00", the control returns to q2); if it is "00", this process ends.

Figure 62:
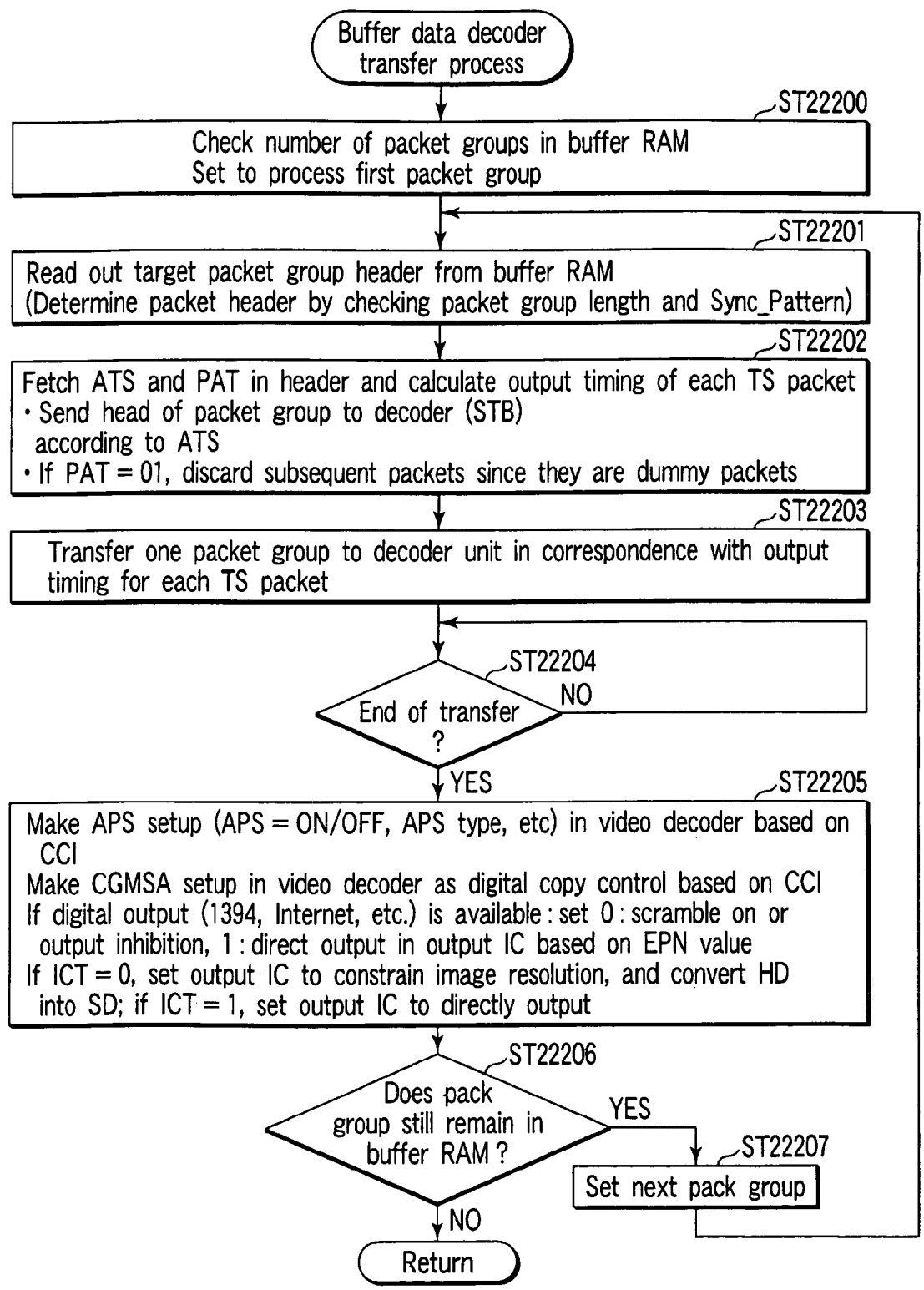
FIG. 62 is a flowchart for explaining a buffer data decoder transfer process (ST2220) in FIG. 61.

FIG. 62 is a flowchart for explaining the buffer data decoder transfer process (ST2220) in FIG. 61. The buffer data decoder transfer process will be described below;

r1) The number of packet groups in the buffer RAM is checked. If no packet group is found, this process ends. If one or more packet groups are stored, a setup is made to process the first packet group (step ST22200);

r2) A target packet group is read out from the buffer RAM (step ST22201). The head of the packet group is detected based on the packet group length and Sync_Pattern;

r3) ATS data in the packet group header is read out to check if ATS data is available (step ST22202). If no ATS is found, one packet group is sent to the decoder unit (STB, digital tuner) immediately (irrespective of time) (step ST22203).

r4) PAT data (6 bytes) is set as the transfer time of each TS packet intact, and each TS packet is sent to the decoder unit (STB unit) at that time (step ST22203).

r5) The control waits for the end of transfer (YES in step ST22204). If transfer of TS packets is complete, APS setups (see FIGS. 16 and 34; APS=ON/OFF; APS type; and the like) are made in the video decoder on the basis of CCI, and digital copy control is also made based on CCI (e.g., CGMSA is set in the video decoder). Furthermore, if a digital output (IEEE1394, Internet, or the like) is available, "scramble ON", "output inhibition", or the like is set based on the EPN value. Moreover, the output IC of the apparatus is set to constrain the image resolution, i.e., to convert HD (high-resolution) into SD (standard resolution) if ICT=0; or to output original data if ICT=1 (step ST22205). After this output IC setup, it is checked if the packet groups remain stored in the buffer RAM (step ST22206). If no packet group remains (NO in step ST22206), this process ends;

r6) A setup is made to process the next packet group (step ST22207), and the control returns to r2).

Figure 63:
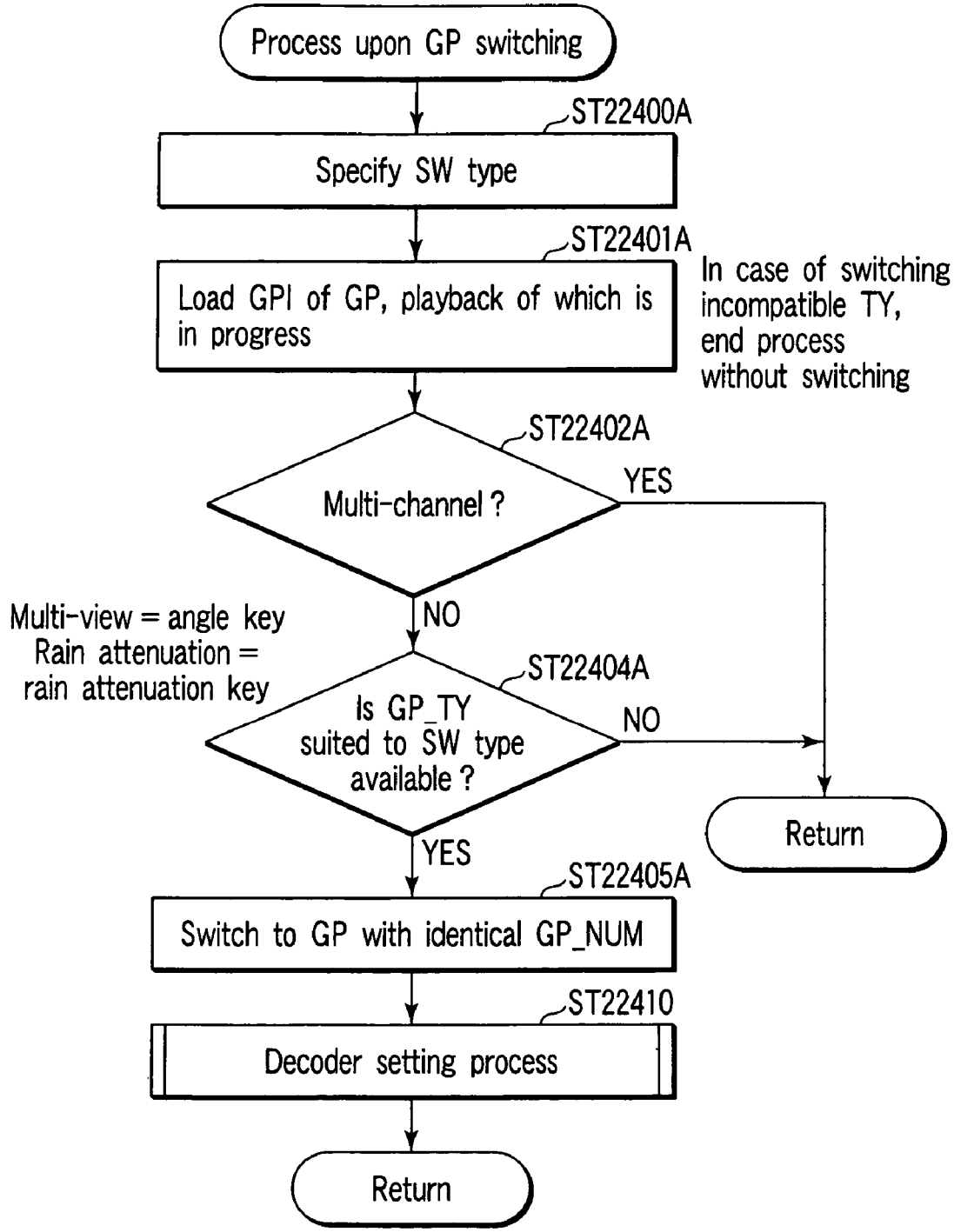
FIG. 63 is a flowchart for explaining an example (example 1) of a GP switching setting process (ST2240) in FIG. 61.

FIG. 63 is a flowchart for explaining an example (example 1) of the GP switching setting process (ST2240) in FIG. 61. As the GP switching process, two different methods are available for GPI. In addition to these two methods, a further simple method is available. The first method is as shown in FIG. 63;

u1) The type of selector SW is checked (step ST22400A);

u2) GPI of the GP whose playback is currently in progress is loaded (step ST22401A);

u3) If the SW type is multi-channel broadcast (YES in step ST22402A), video attributes are likely to change, and the process ends without switching (in case of TY which does not support switching, the process ends without any process);

u4) If the SW type is not multi-channel broadcast (NO in step ST22402), it is checked if GP_TY in the GP whose playback is currently in progress includes the SW type. If no SW type is available (NO in step ST22404A), the process ends without any process;

u5) If the SW type is included in GP_TY (YES in step ST22404A), GP_NUM is obtained based on GP_TY to check if a GP with the same GP_NUM is present. If a GP with the same GP_NUM is found, GPI information is loaded to switch the current GP to that GP (step ST22405A), and a decoder setting process is executed (step ST22410).

Figure 64:
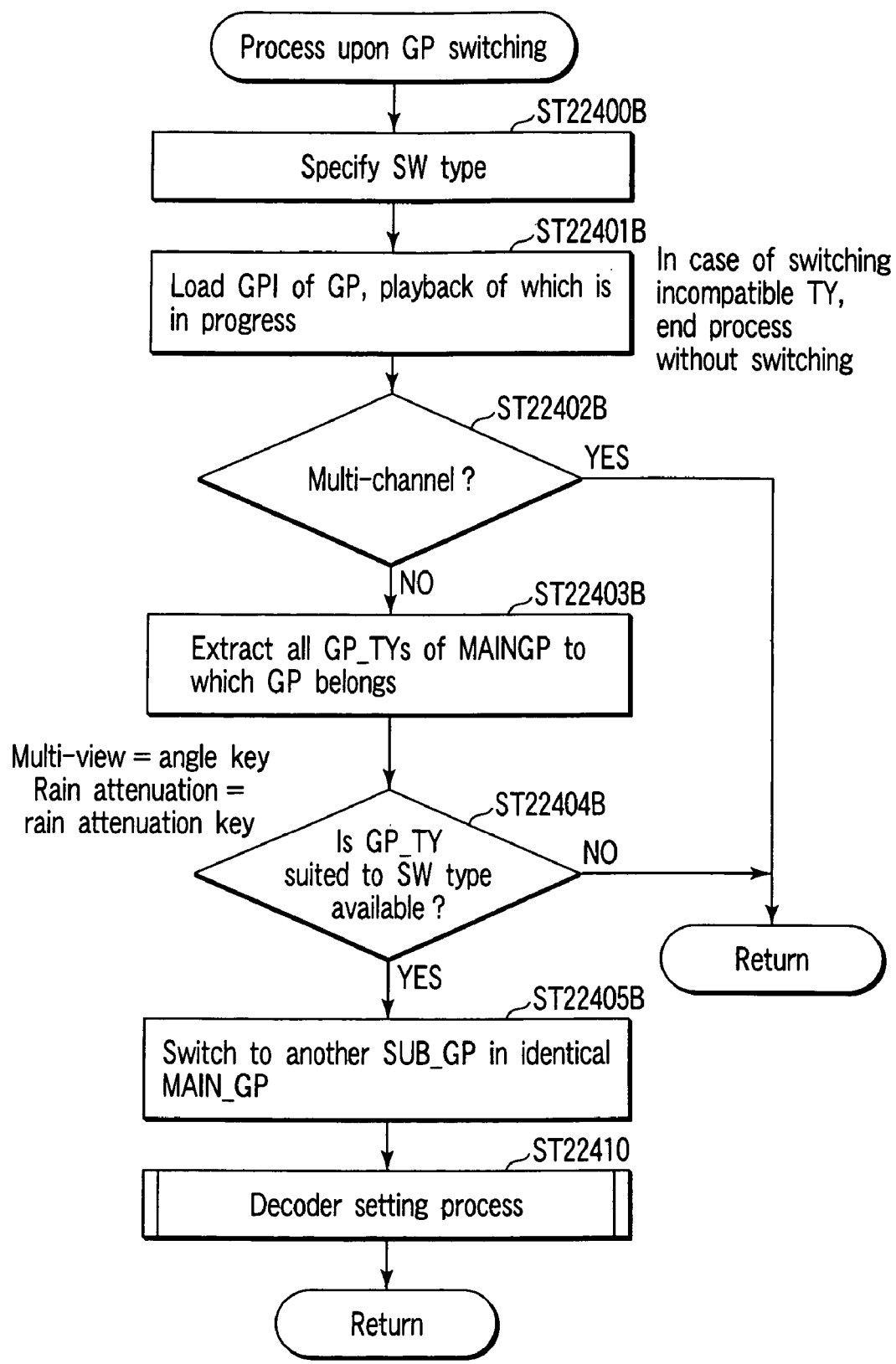
FIG. 64 is a flowchart for explaining another example (example 2) of a GP switching setting process (ST2240) in FIG. 61.

FIG. 64 is a flowchart for explaining another example (example 2) of the GP switching setting process (ST2240) in FIG. 61. The second method is as shown in FIG. 64.

v1) The type of selector SW is checked (step ST22400B);

v2) GPI of the SUBGP whose playback is currently in progress is loaded (step ST22401B);

v3) If the SW type is multi-channel broadcast (YES in step ST22402B), video attributes are likely to change, and the process ends without switching (in case of TY which does not support switching, the process ends without any process);

v4) All pieces of MAIN_GP information to which the SUB_GP of interest belongs are read out (step ST22403B), and it is checked if MAIN_GP_TY includes the SW type. If no SW type is found (NO in step ST22404B), the process ends without any process;

v5) If the SW type is included in MAIN_GP_TY (YES in step ST22404B), SUB_GP which belongs to that MAIN_GP is checked. If SUB_GP is found, GPI information is loaded to switch the current SUB_GP to that SUB_GP (step ST22405B), and a decoder setting process is executed (step ST22410).

Figure 65:
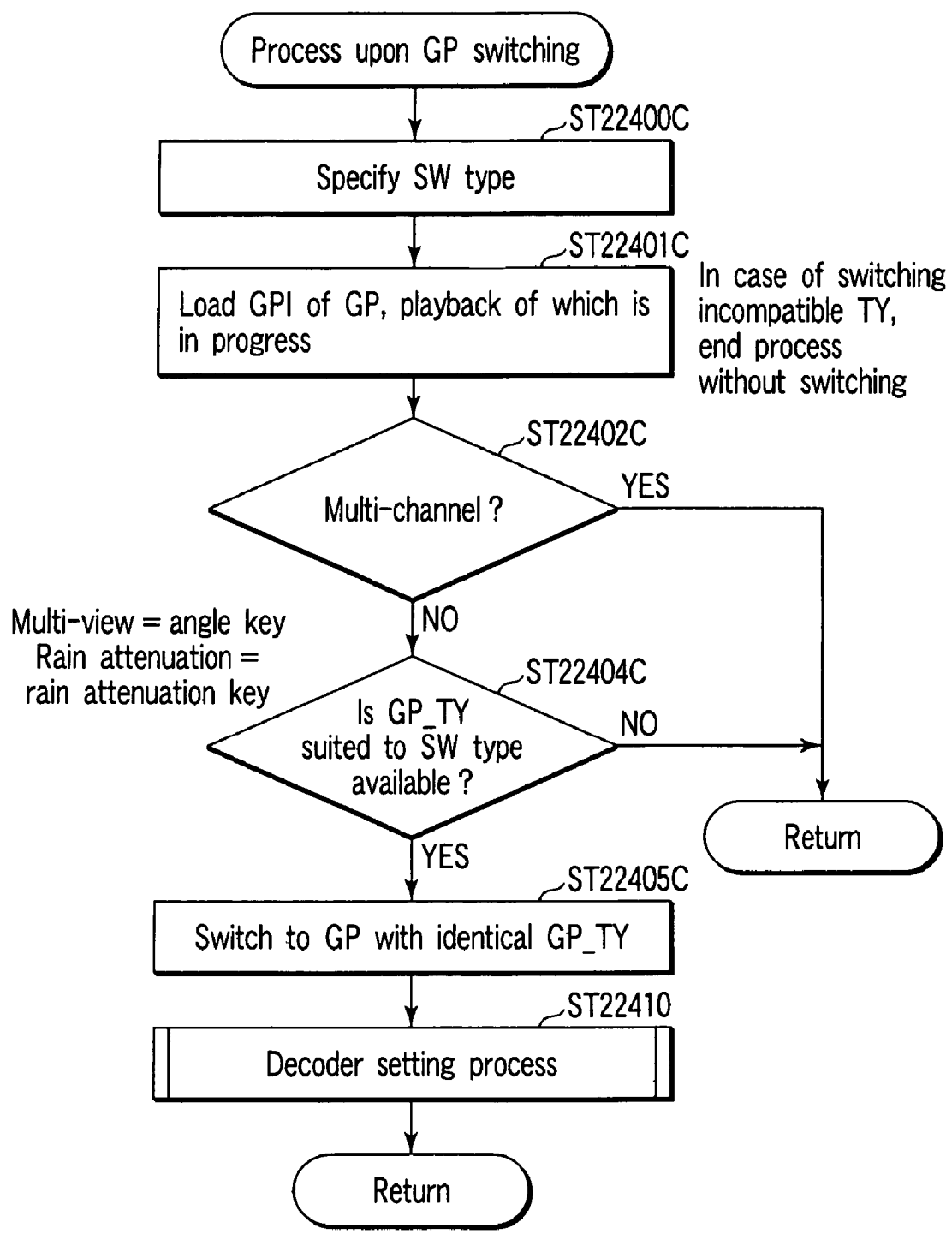
FIG. 65 is a flowchart for explaining still another example (example 3) of a GP switching setting process (ST2240) in FIG. 61.

FIG. 65 is a flowchart for explaining still another example (example 3 as a simple version of the first method) of the GP switching setting process (ST2240) in FIG. 61. This simple version is executed, as shown in FIG. 65.

w1) The type of selector SW is checked (step ST22400C);

w2) GPI of the GP whose playback is currently in progress is loaded (step ST22401C);

w3) If the SW type is multi-channel broadcast (YES in step ST22402C), video attributes are likely to change, and the process ends without switching (in case of TY which does not support switching, the process ends without any process);

w4) It is checked if GP_TY in the GP whose playback is currently in progress includes the SW type. If no SW type is available (NO in step ST22404C), the process ends without any process;

w5) It is checked if a GP with the same GP_TY is available. If such GP is found, GPI information is loaded to switch the current GP to that GP (step ST22405C), and a decoder setting process is executed (step ST22410).

Figure 66:
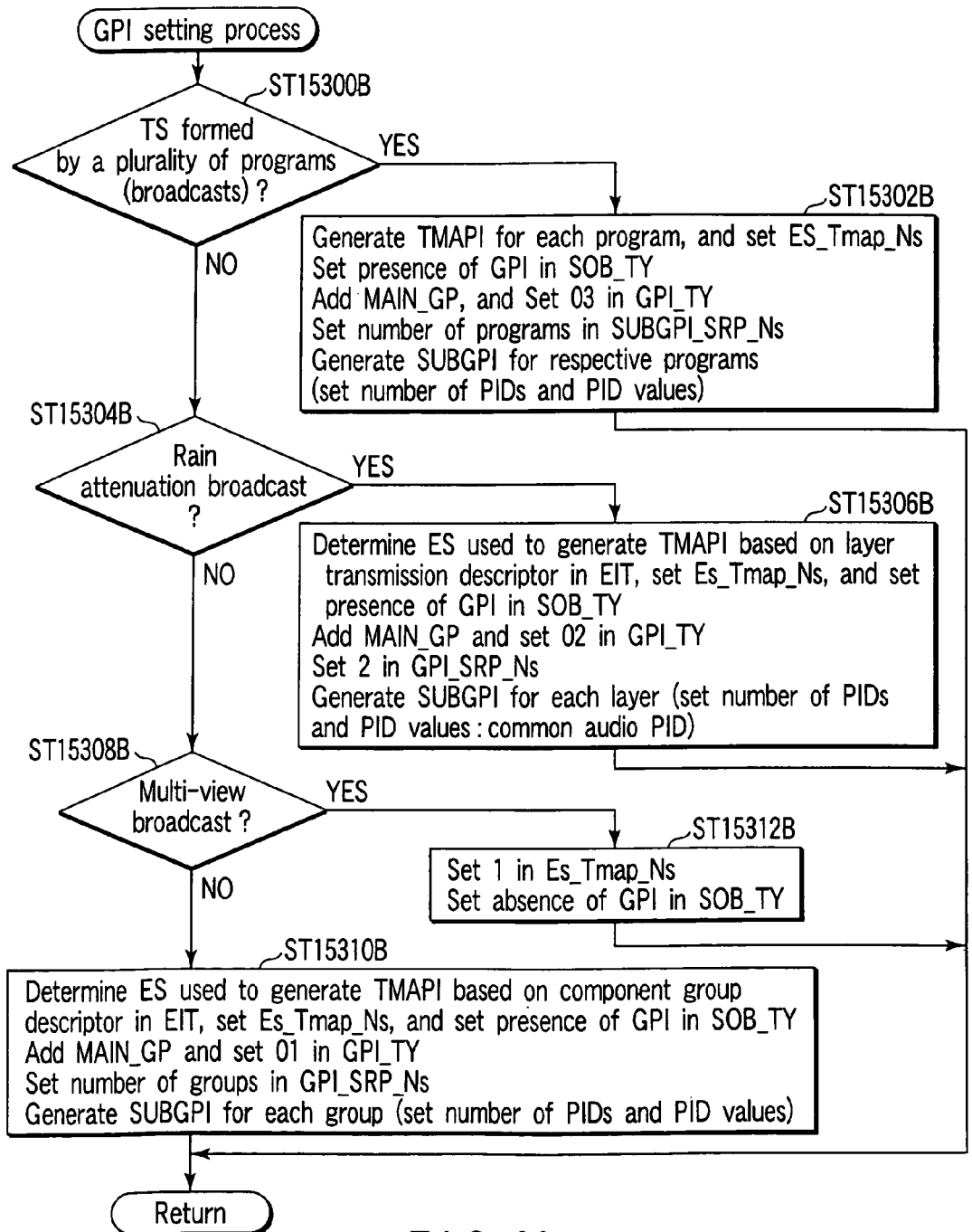
FIG. 66 is a flowchart for explaining another example (example 2) of a GPI setting process (ST1530) in FIG. 53.

FIG. 66 is a flowchart for explaining another example (example 2) of the GPI setting process (ST1530) in FIG. 53. The second method of the GPI setting process will be described below (the first method is shown in FIG. 54).

t1) A stream type is checked;

t2) If a plurality of programs form one stream (YES in step ST15300B), information indicating the presence of GPI is set in SOB_TY, MAIN_GP is added for each program, and MAIN_GP_TY=03. Since one SUB_GP is formed using MAIN_GPI per program, each SUB_GP is set, thus ending this process (store the PID to be played back in SUB_GP) (step ST15302B);

t3) In case of rain attenuation broadcast (YES In step ST15304B), information indicating the presence of GPI is set in SOB_TY, MAIN_GP is added, and MAIN_GP_TY=02. Furthermore, in MAIN_GPI, the top layer group is registered in SUB_GP#1, a lower-layer group is registered in SUB_GP#2, and respective SUB_GPs are reset, thus ending this process (store the PID to be played back in SUB_GP) (step ST15306B);

t4) In case of multi-view broadcast (YES in step ST15308B), information indicating the presence of GPI is set in SOB_TY, MAIN_GP is added, and MAIN_GP_TY=01. Furthermore, in MAIN_GPI, a main group is registered in SUB_GP#1, other groups are registered in SUB_GP#2 to SUB_GP#n, and respective SUB_GPs are reset, thus ending this process (store the PID to be played back in SUB_GP) (step ST15310B);

t5) Otherwise (NO in step ST15308B), information indicating the absence of GPI is set in SOB_TY (step ST15312B).

Figure 67:
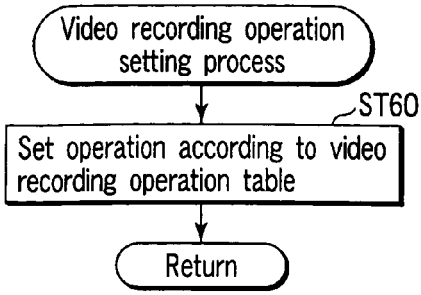
FIG. 67 is a flowchart for explaining an example of a video recording operation setting process (ST6070) in FIG. 51.
Figure 68:
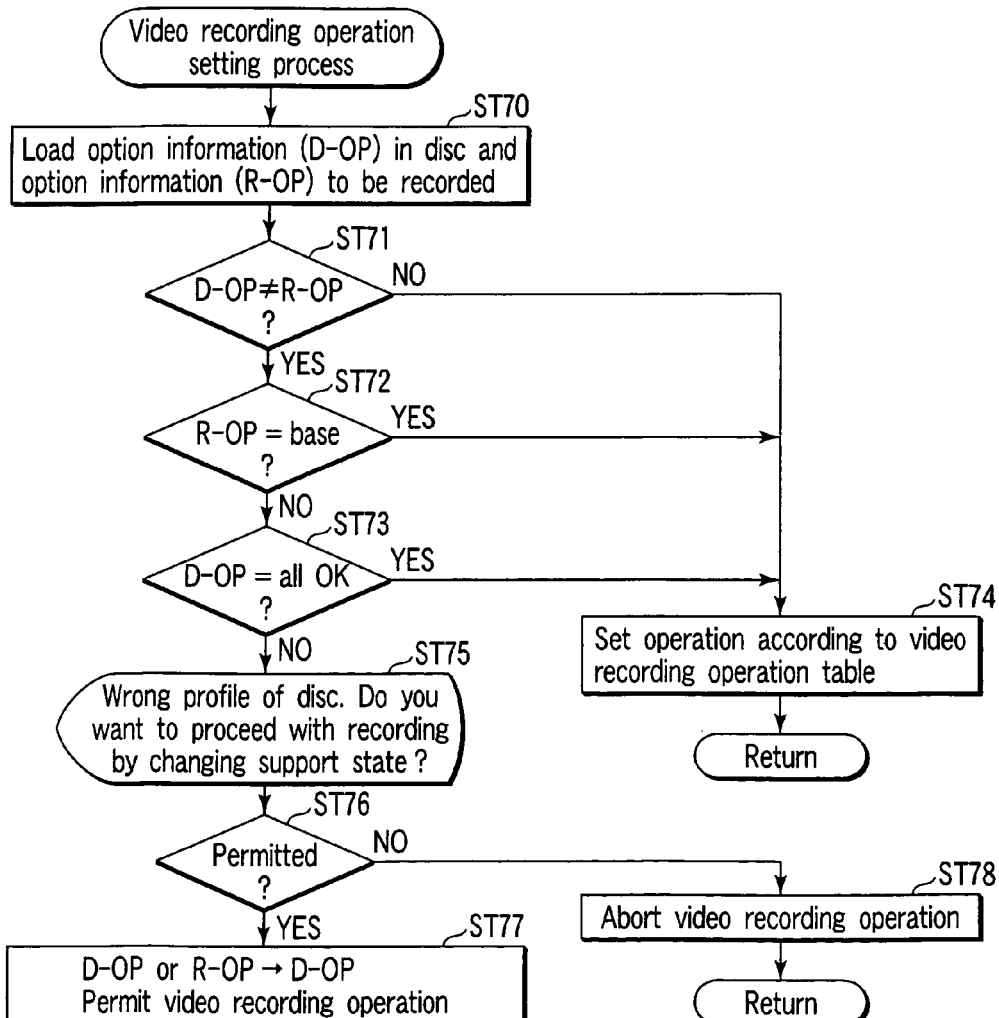
FIG. 68 is a flowchart for explaining another example of a video recording operation setting process (ST6070) in FIG. 51.

As the video recording operation setting process, two different methods are available, as shown in FIGS. 67 and 68. FIG. 67 is a flowchart for explaining an example of the video recording operation setting process (ST6070) in FIG. 51. The first method similarly limits the video recording and playback operations, and setups are made according to the operation table in FIG. 45, as shown in FIG. 67 (step ST60).

FIG. 68 is a flowchart for explaining another example of the video recording operation setting process (ST6070) in FIG. 51. The second method changes profile information in a disc without limiting the video recording operation to proceed with video recording, and an actual operation is made as follows;

s1) Profile information in a disc is loaded, and option information is extracted as D-OP from the profile information.

s2) Option information is generated as R-OP based on attribute information used in video recording to be executed.

s3) If the option information (D-OP) of the disc is equal to the option information (R-OP) upon video recording, or if video recording status is BASE and all kinds of Option information of the disc are OK (○ marks in the table of FIG. 45), since recording can be made without any program, a setup is made to proceed with video recording intact, thus ending this process.

s4) A message "wrong disc profile. Do you want to proceed with recording by changing support state" is displayed to ask for user's permission. If the user denies, video recording is aborted, and this process ends.

s5) If the user permits, the option information (D-OP) of the disc and the option information (R-OP) upon video recording are logically ORed to generate new option information of the disc, and a setup is made to proceed with a video recording process based on that information.

Figure 69:
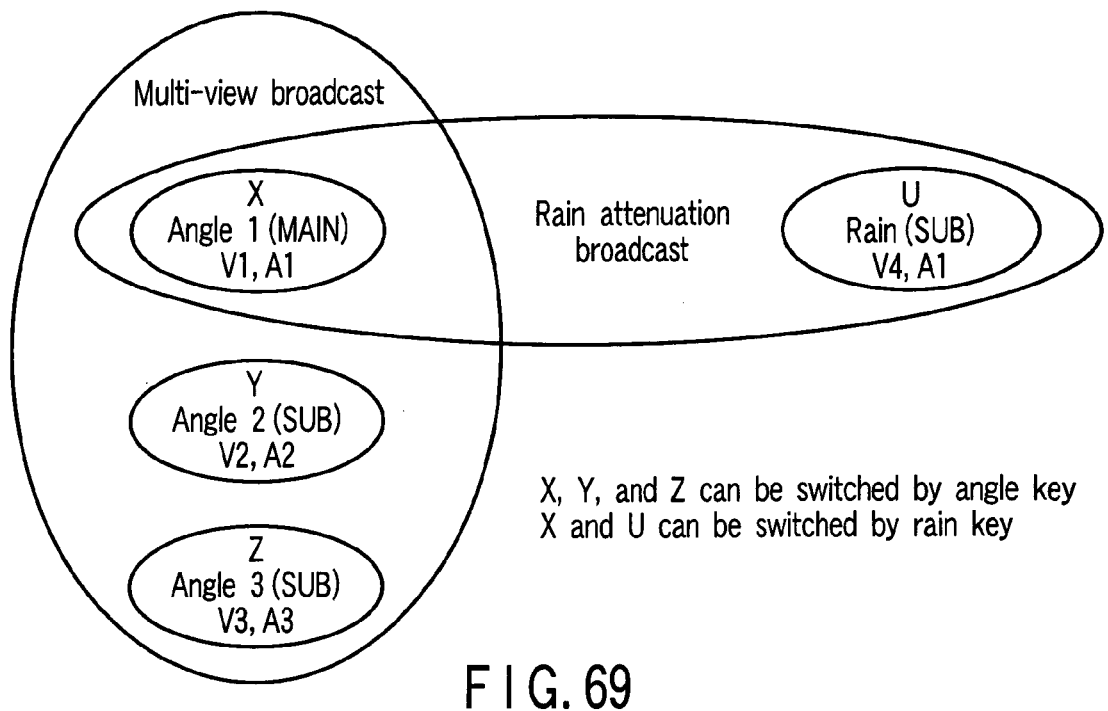
FIG. 69 is a view for explaining an outline of the configuration of streams upon broadcasting a plurality of kinds of broadcast data.

FIG. 69 is a view for explaining an outline of the configuration of streams upon broadcasting a plurality of kinds of broadcast data. As one of features of digital broadcast, for example, multi-view broadcast is known. In multi-view broadcast, a plurality of videos are broadcasted at the same time (by time sharing), and the user can play back one of these videos of his or her choice. In this manner, the user can select one of a plurality of contents according to his or her favor or the like. For example, when the recorder (the apparatus of FIG. 41 or the like) receives, as one TS, streams X, Y, and Z as multi-view broadcast and stream U as rain attenuation broadcast, the control must be made to allow the user to select and play back a required stream upon playback, and to freely switch among streams using a key of a remote controller or the like. In the embodiment of the present invention, grouping information (GPI in FIG. 25) is added to allow the user to select a plurality of contents (among streams).

Figure 70:
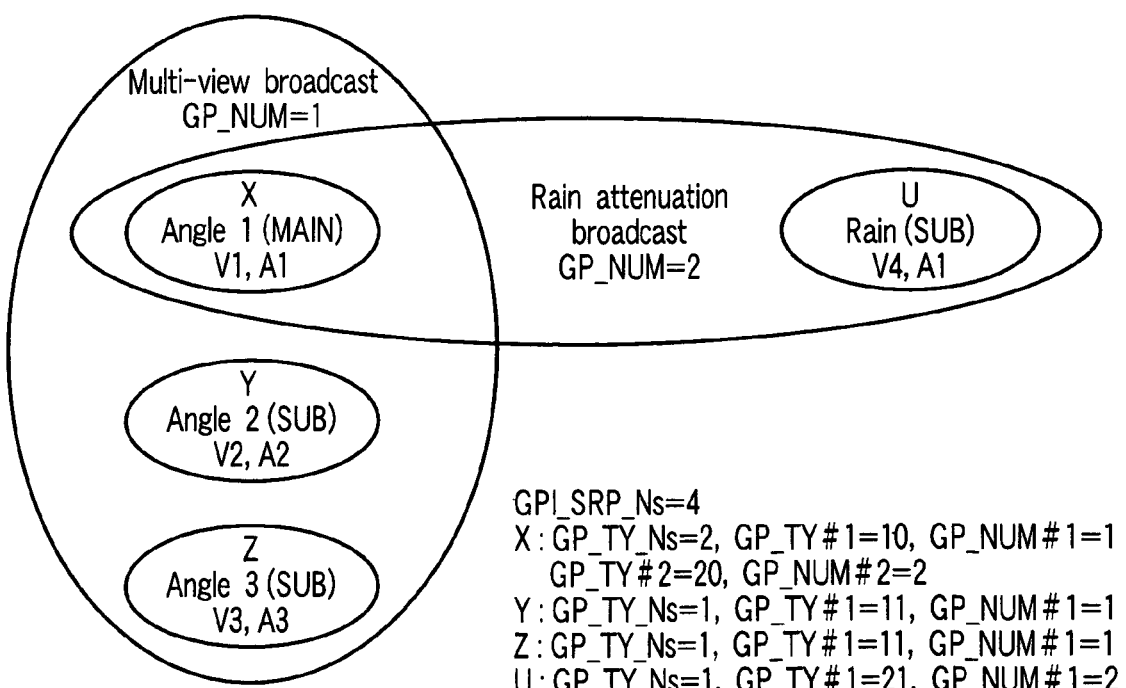
FIG. 70 is a view for explaining an example (example 1) of the group configuration of streams upon broadcasting a plurality of kinds of broadcast data.

FIG. 70 is a view for explaining an example (example 1) of the group configuration of streams upon broadcasting a plurality of kinds of broadcast data. Streams shown in FIG. 69 will be examined below. That is, when broadcast information which includes streams X (MAIN), Y, and Z as multi-view broadcast and rain attenuation stream U is recorded, if the method according to the embodiment of the present invention is applied, GPI_SRP_Ns=4 since there are four groups X, Y, Z, and U, as shown in FIG. 70; GP_TY_Ns=2 since there are two different pieces of GPI of X in correspondence with multi-view and rain attenuation; GP_TY#1=10 and GP_NUM#1=1 for X of multi-angle since X corresponds to a main group; GP_TY#2=20 and GP_NUM#2=2 for X of rain attenuation; GP_TY_Ns=1, GP_TY#1=11, and GP_NUM#1=1 in GPI of Y since Y corresponds to only a sub group of multi-view broadcast; GP_TY_Ns=1, GP_TY#1=11, and GP_NUM#1=1 in GPI of Z since Z corresponds to only a sub group of multi-view broadcast; and GP_TY_Ns=1, GP_TY#1=21, and GP_NUM#1=2 in GPI of U since U corresponds to only a sub group of rain attenuation broadcast.

For this reason, upon playback, GPI whose playback is in progress is checked depending on the type of a pressed remote controller key (multi-angle key in case of multi-view broadcast) to determine if that GPI includes GP_TY of that target type. If such GP_TY is included, a GP with the same number as the GP_NUM assigned to that GP_TY and the same GP_TY is searched. If the GP is found, a process for switching the current GP to that GP is executed.

If broadcast data always has only one GP_TY, a method of describing only GP_TY without any GP_NUM, and switching GPs between those with identical GP_TY may be used as a modification of the method according to the embodiment of the present invention.

FIG. 71 is a view for explaining another example (example 2) of the group configuration of streams upon broadcasting a plurality of kinds of broadcasts. Streams shown in FIG. 69 will be examined below. When the method according to the embodiment of the present invention is applied, since there are two broadcast types, i.e., multi-view broadcast and rain attenuation broadcast, as shown in FIG. 71, MAINGP_SRP_Ns=2, and the number of streams is four (X, Y, Z, and U). For this reason, SUBGP_SRP_Ns=4; a MAIN group of multi-view broadcast is defined by MAIN_GP#1: MAINGP_TY=1, X (SUB_GP#1), Y (SUB_GP#2), and Z (SUB_GP#3); and a MAIN group of rain attenuation broadcast is defined by MAIN_GP#2: MAINGP_TY=2, X (SUB_GP#1), and U (SUB_GP#4).

In this way, upon playback, MAINGPI whose playback is in progress is checked depending on the depending on the type of a pressed remote controller key (multi-angle key in case of multi-view broadcast) to determine if that MAINGPI includes GP_TY of that target type, and SUB_GP whose playback is in progress is registered. If the SUB_GP is registered, a process for switching to a GP other than the GP whose playback is in progress is executed based on the SUB_GPs registered in that MAIN_GP.

With the above process, flexible control operations suited to digital broadcast can be implemented.

Furthermore, points of another embodiment of the present invention will be explained first. Point 1. PL_RSM_MRKI (playlist resume-mark mark information, and PG_RSM_MRKI (program resume-mark mark information) are assured.

Point 2. SOB_ESI (stream object element stream information (a part of attribute information required for display associated with an SOB)) has detailed items. Point 3. SOB_ADR_OFS (SOB address offset) can be handled for each number of packet groups in association with SOB_T-MAPI (SOB time map information) to allow easy access.

Point 4. PKT_GRP_GI (packet group general information) is available. This information includes PKT_GROUP_TY, VERSION, PKT_GRP_SS, ERR, STUF, WRAP, DISCON, and CCI_TY (these pieces of information will be described later, and are convenient when a display menu is generated upon editing or confirming contents). Point 5. STR_FI (stream file information) is prepared as an independent file, thus improving adaptability upon editing or the like. Point 6. A TMAP (time map) of PATS (packet arrival time timestamp) base of type B is available, and playback can be made independently of the type of timestamp used. Point 7. A packet group header includes First-PATS_EXT information.

In an embodiment of the present invention, objects and their management information will be explained with reference to FIGS. 72 to 111, and the arrangement and operation of a recording/playback apparatus will be explained with reference to FIGS. 112 to 143.

Figure 72:
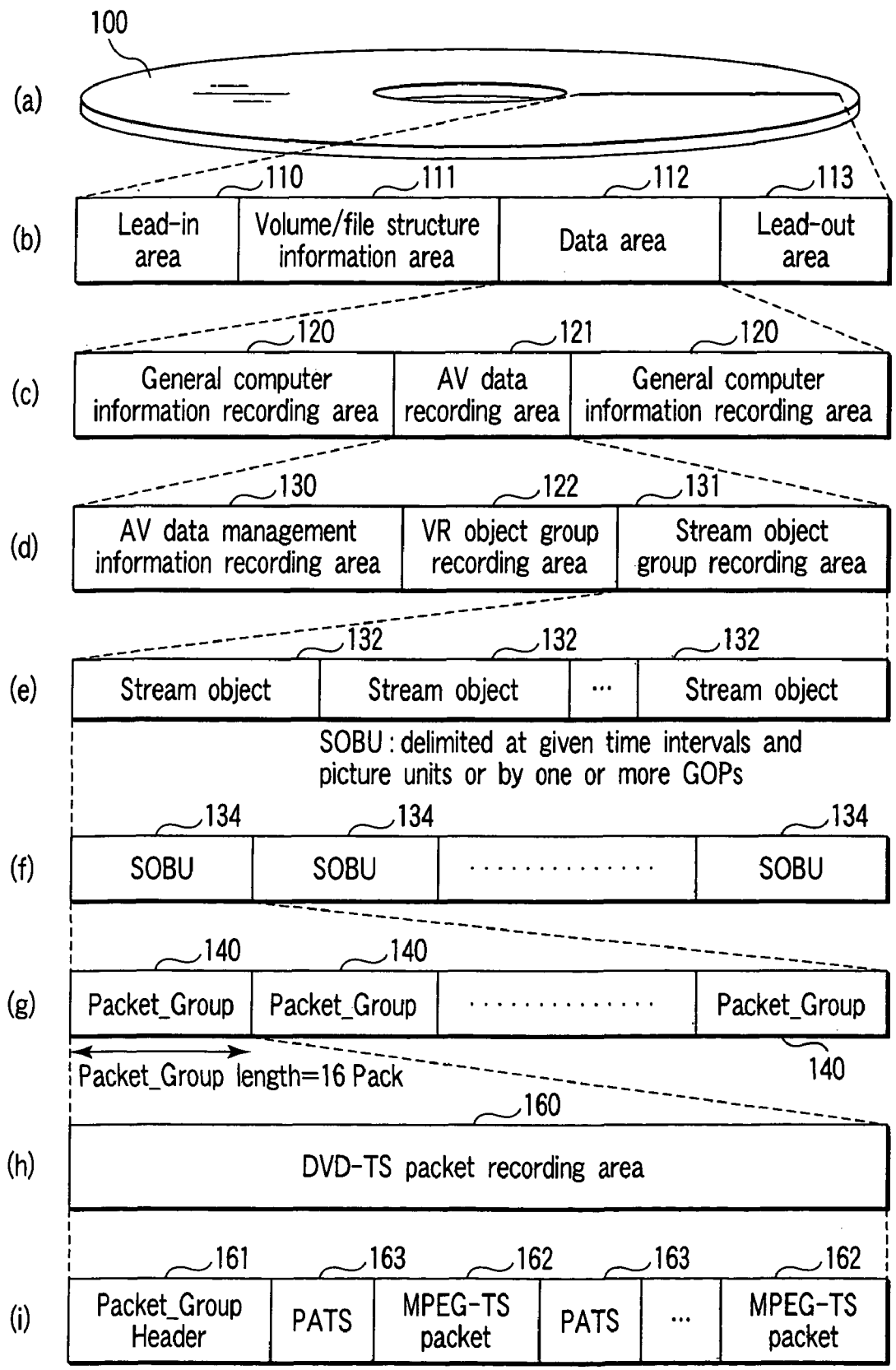
FIG. 72 is a view for explaining the data structure according to an embodiment of the present invention.

FIG. 72 is a view for explaining the data structure according to an embodiment of the present invention. As disc-shaped information-recording medium 100 (FIG. 72(*a*)), recordable optical discs such as a DVD-RAM using blue laser, existing DVD-RAM, DVD-RW, DVD-R, and the like, and recordable magnetic discs such as a hard disc and the like are available. The following explanation will be given taking an optical disc such as a DVD-RAM or the like using a laser of 405 nm to 650 nm as an example.

Disc 100 has lead-in area 110, volume/file structure information area 111, data area 112, and lead-out area 113 from its inner periphery side toward the outer periphery side (FIG. 72(b)). Volume/file structure information area 111 stores a file system. The file system includes information indicating the recording locations of files (details will be described later with reference to FIG. 74). Recorded contents are stored in data area 112.

Data area 112 is divided into areas 120 that record general computer data, and area 121 that records AV data (see FIG. 72(c)). AV data recording area 121 includes AV data management information area 130 that stores a file (VMG file) used to manage AV data, VR object group recording area 122 that records object data (VOBS) files (VRO files) complying with the video recording standard, and Stream object group recording area 131 that records stream objects (SOBS: Stream object Set) compatible to digital broadcast (FIG. 72(d)). That is, in this embodiment, stream objects of digital broadcast are recorded as stream objects 132 (SOBS) as files independent from VR objects (FIG. 72(e)).

Each stream object 132 is formed of one or more data units (SOBU: Stream object Unit) 134 each of which serves as an access unit to disc 100 (FIG. 72(f)). Note that one SOBU is a data unit delimited by pictures at given time intervals which are designated by a value in object management information. Alternatively, one SOBU may be a data unit delimited by one or more GOPs. Each data unit (SOBU) 134 includes one or more packet groups (Packet Group) 140, each of which includes a group of a plurality of TS packets (FIG. 72(g)).

In this embodiment, each packet group 140 includes, e.g., a group of 16 packs (or 16 LBs (Logical Blocks)). If one pack size (or one LB size) is 2 kbytes, the size of each packet group 140 is 32 kbytes. This size is equal to the ECC block size in the video recording standard.

Each packet group 14.0 forms packet recording area (DVD-TS packet recording area) 160 in stream recording (SR) (FIG. 72(h)). DVD-TS packet recording area 160 is formed of packet group header 161 and packet arrival time information (PATS) 162 that forms a pair with header 161, MPEG-TS packet 163 and packet arrival time information (PATS) 162 that forms a pair with that packet, . . . (FIG. 72(i)). The contents of packet group 140 will be described in detail later with reference to FIG. 103.

Figure 73:
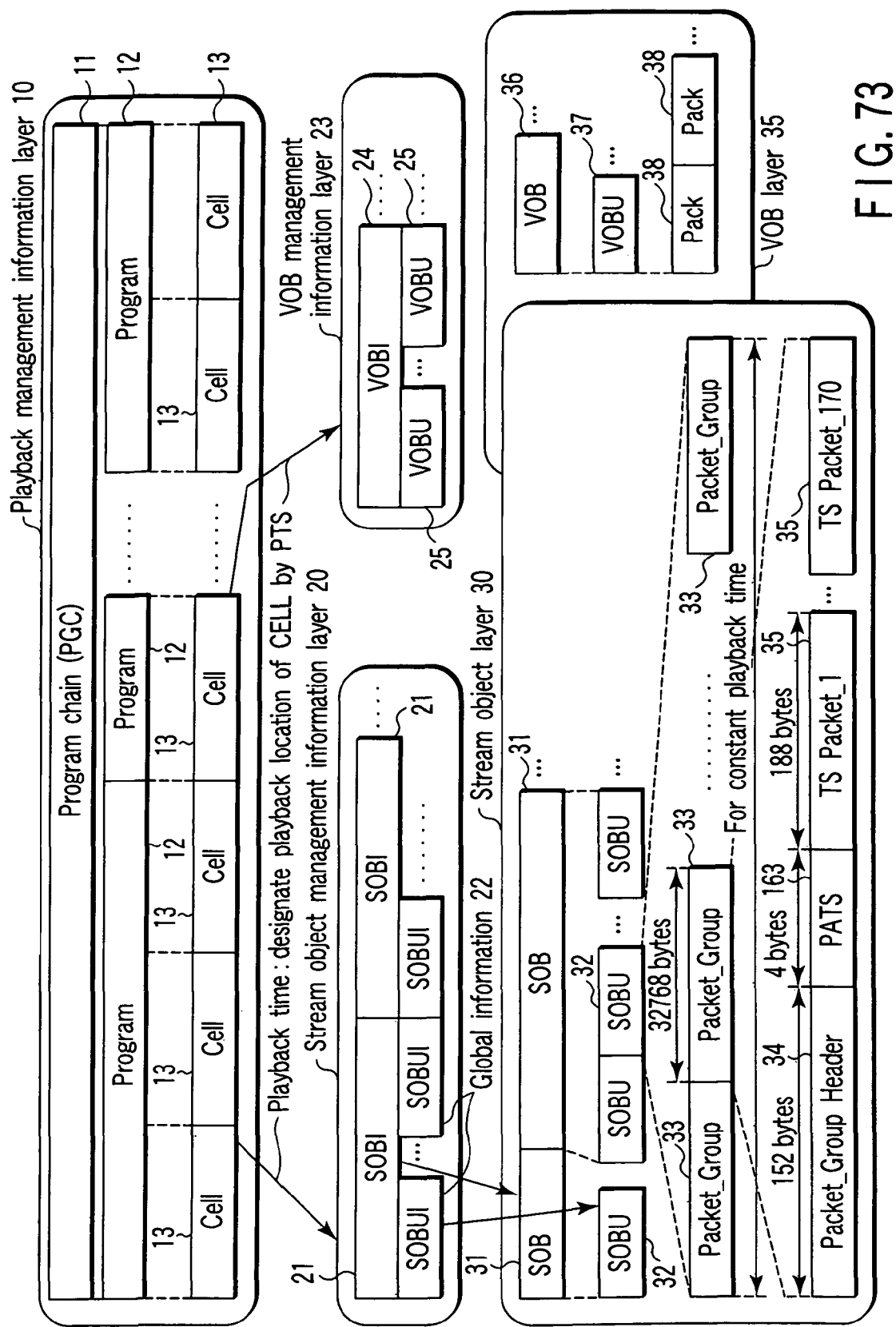
FIG. 73 is a view for explaining the relationship among a playback management information layer, object management information layer, and object layer in the data structure according to the embodiment of the present invention.

FIG. 73 is a view for explaining the relationship among a playback management information layer, object management information layer, and object layer in the data structure according to the embodiment of the present invention. Management information (VMG file) recorded on AV data management information recording area 130 in FIG. 72 has playback management information layer 10 used to manage the playback sequences of both the recorded contents based on the video recording standard and the stream recording recorded contents based on the present invention. That is, a group of one or more cells 13 each of which serves as a playback unit of stream-recorded objects form program 12, and a group of one or more cells 13 each of which serves as a playback unit of video-recorded objects form another program 12. A sequence (playback sequence) of these programs 12 is managed by management information (PGCI) of program chain (PGC) 11.

Even when the user wants to start playback from the middle of either cell 13 on the stream recording side or cell 13 on the video recording side, he or she can designate the playback location using a playback time (PTS). That is, when playback is to start from the middle of cell 13 on the stream recording side using the playback time (PTS), stream object SOB 31 in stream object layer 30 is designated via stream object information SOBI 21 in stream object management information layer 20, and stream object unit SOBU 32 in stream object layer 30 is designated via stream object unit information SOBUI 22 in stream object management information layer 20. When SOB 31 and its SOBU 32 are designated, the playback start location is specified. (SOBUI 22 in this case may be restated as global information 22.) However, when a recorded stream is non-cognizant, a TMAP is generated to be designated by an arrival time in place of the playback time.

This SOBU 32 is formed of one or more packet groups 33. SOBU 32 is a data unit corresponding to, e.g., 1 or more GOPs (groups of picture). Alternatively, SOBU 32 may be delimited by units each corresponding to a data size for a given playback time designated by a value in object management information. In this way, overflow of each information field is prevented.

Each packet group 33 includes 16 packs (or 16 LBs (LB: logical block)) (32768 bytes), and has packet group header 34 at its head position. After packet group header 34, a plurality of pairs (170 pairs in this example) of PATS 35 and TS packets 36 are allocated. These TS packets 36 store stream recording recorded contents.

On the other hand, when playback is to start from the playback time (PTS) position corresponding to the middle of cell 13 on the video recording side, video object VOB 38 in video object layer 37 is designated via video object information VOBI 24 in video object (VOB) management information layer 23, and video object unit VOBU 39 in video object layer 37 is designated via video object unit information VOBUI 25 in video object management information layer 23. When VOB 38 and its VOBU 39 are designated, the playback start location is specified. VOBU 39 includes a plurality of packs 40, which store video recording recorded contents.

When playback is to start from the middle of cell 13 on the stream recording side, the playback start location can be designated using a time in units of the number of fields by SOBU_PB_TM (stream object unit playback time). On the other hand, when the playback is to start from the middle of cell 13 on the video recording side, the playback start location can be designated by VOBU_PB_TM (details will be described later using FIG. 93) in time map information (TMAPI) specified by the video recording standard.

The contents of FIG. 73 can be summarized as follows. That is, the structure of each SOBU (Stream Object Set) includes one or more SOBs (Stream objects). Each SOB corresponds to, e.g., one program. The SOB includes one or more SOBUs (Stream object Units), each of which corresponds to object data for a given time interval (see VOBU/SOBU_PB_TM_RNG in FIG. 90/FIG. 88 (which changes depending on the value of VOBU/SOBU PlayBack Time Range)) or one or more GOP data.

When the transfer rate is low, one GOP data cannot often be sent within 1 sec (is) (DVD-VR that MPEG-encodes an analog video input inside the apparatus can freely set the data unit configuration since it adopts internal encoding, but digital broadcast cannot specify the next incoming data since encoding is done by a broadcast station). On the other hand, the transfer rate may be high, and intra (I)-picture data may be sent frequently. In such case, SOBU is delimited frequently, and SOBU management information increases accordingly, thus ballooning the whole management information. For this reason, it is appropriate to delimit SOBUs according to the embodiment of the present invention by a given time interval (a minimum limitation is to delimit SOBUs by picture data except for the last SOBU of the SOB) or by one or more GOPs. When management information is formed using PATS base if a stream is non-cognizant, SOBUs are delimited at time intervals indicated by SOBU_PATS_TM_RNG (to be described later). SOBU_PATS_TM_RNG may be designated in two ways, i.e., in units of seconds and using a 27-MHz count value.

One SOBU 32 includes one or more packet groups 33, each of which is basically formed of 16 packs (one Pack=one LB: 2048-byte size) (32,640 bytes). Each packet group 33 includes packet group header 34 and (170) TS packets 36. The arrival time of each TS packet 36 can be detected from PATS (Packet Arrival Times: 4 bytes) 35 which is allocated before each TS packet 36 and forms a pair with that TS packet 36.

Note that the arrival time must be linearly counted up to have zero (or a predetermined value) as a video recording start time until the end of video recording. For this reason, if a plurality of programs are recorded at the same time, or in case of an edited program, STC discontinuity is likely to occur during video recording. In such case, an STC must be adjusted. Even in such case, since the transfer time must increase linearly, a method of processing the transfer time using an internal counter without being influenced by STC transfer and a method of forming a new SOB upon switching are available. In case of linear counting, the count time interval of the internal counter must be synchronized with the STC count interval between neighboring PCR fetch timings in a playback synchronized state. When a new SOB is formed, a discontinue timing must be accurately detected. However, a packet group can include a maximum of two SOBs. That is, no align process is done for each SOB.

Figure 74:
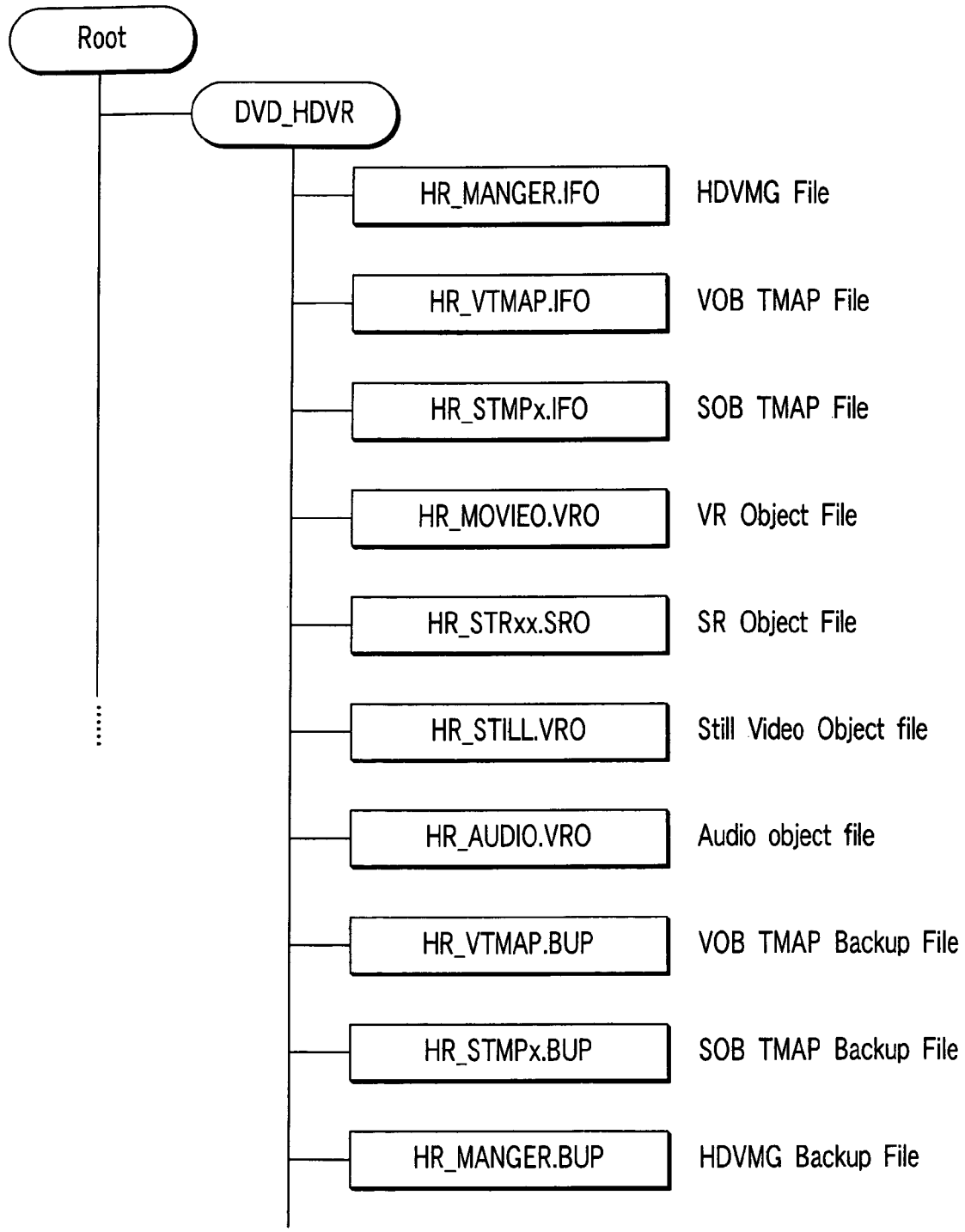
FIG. 74 is s a view for explaining the file structure according to the embodiment of the present invention.

The management information will be described below with reference to FIGS. 74 to 112. FIG. 74 is a view for explaining the file structure according to the embodiment of the present invention. As has been explained using FIG. 72, data in disc 100 includes volume/file structure information area 111 which stores a file system, and data area 112 which actually records data files. The file system stored in volume/file structure information area 111 includes information indicating the recording locations of files, as shown in FIG. 74. Data area 112 is divided into areas 120 that record general computer data, and area 121 that records AV data. AV data recording area 121 includes AV data management information area 130 that stores an HDVMG file (and its backup file) used to manage recorded AV data, VR object group recording area 122 that records object data (VOBS) files (VRO files) complying with the video recording standard, and Stream object group recording area 131 that records stream objects (SOBS) compatible to digital broadcast.

Note that different directories are prepared in correspondence with formats (e.g., VIDEO-TS for DVD-Video (ROM Video) and DVD-RTAV for DVD-RTR (recordable/reproducible DVD), and the digital broadcast compatible DVD standard to be described below is recorded in, e.g., a DVD_HDVR directory.

That is, as shown in FIG. 74, the DVD_HDVR directory records a VMG file (HR_MANGER.IFO and its backup HR_MANGER.BUP) used to manage data, a VRO file (HR_MOVIEO.VRO) as an object file used to record analog AV information such as analog broadcast, analog line input data, and the like, an SRO file (HR_STRxx.SOR; x=0, 1, 2, ... ) as a digital broadcast object, a still object file (HR_STILL.VRO), and an audio object file (HR_AUDIO.VRO). Note that the SRO file records SOBS.

In FIG. 74, a time map file (HR_VTMAP.IFO) and its backup file (HR_VTMAP.BUP) as example 1 are also assured as independent files. These files (HR_VTMAP.IFO and HR_VTMAP.BUP) can store information of time map table TMAPT (that is, TMAPT can undergo file management independently of other kinds of management information).

As shown in FIG. 74, SR management data is recorded in the HDVMG file common to VR, and undergoes control common to VR. As shown in FIG. 73, SR and VR management data are linked for respective CELLs, and their playback locations can be designated by playback times.

Note that the DVD_HDVR directory can store HR_THNL.DAT (not shown) as a thumbnail (reduced-scale picture) file which can be used in a chapter menu and the like. Furthermore, the DVD_HDVR directory can store an additional text file: HR_TEXT.DAT independent from item text (IT_TXT) and HR_EXEP.DAT used to save information added to entry points (EP), as needed (neither of them are shown).

Figure 75:
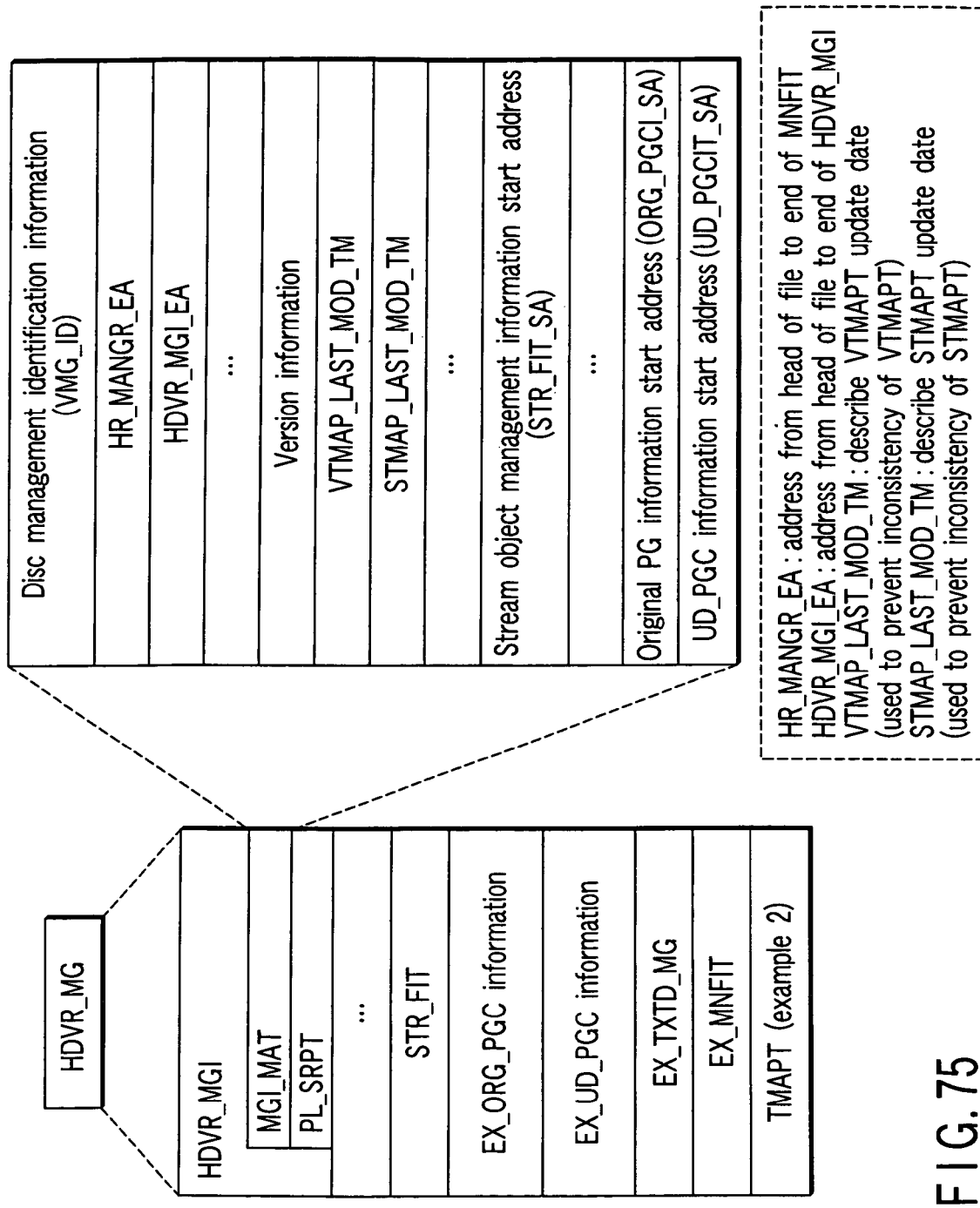
FIG. 75 is a view for explaining an example of the configuration of a field (MGI_MAT in HDVR_MGI) of one management information (HDVR_MG) recorded on AV data management information recording area 130.

Note that TMAPT may be added to the end of HDVR_VMG (example 2), as shown in FIG. 75, in place of storing TMAPT as an independent file, as shown in FIG. 74.

FIG. 75 is a view for explaining an example of the configuration of a field (HDVR_VMGI) of HDVR_VMG as one management information recorded on AV data management information recording area 130. Note that stream recording in this embodiment will be abbreviated as SR, and video recording will be abbreviated as VR. Then, management information (STR_FIT; Stream File Information Table) of SR data is saved in HDVR_MG (in HR_MANGER.IFO in FIG. 74), and is managed in the same way as VR data.

HDVR_MG includes video manager information (HDVR_VMGI), a stream file information table (STR_FIT), program chain information, playlist information (user-defined program chain information (EX_UD_PGCI)), and a time map table (TMAPT (example 2)). Note that STR_FIT (Stream File Information Table) is added to management information of the conventional DVD-VR standard.

Note that it is important to locate the TMAPT at the end of HDVR_MG. That is, since TMAPT 1370 is located at the end of MG, even when TMAP is frequently rewritten and its data size increases/decreases, VMGI to MNFIT need not be rewritten in each case.

In other words, a DVD recorder normally has time map information (TMAPI) as VOB management information. This information is used to divide object data (VOB/SOB) for each data unit (VOBU/SOBU) and to implement playback, special playback, and the like for that unit, and one information is required per a maximum of 0.5 s. For this reason, if the disc size increases in the future or a compression method with high compression efficiency is adopted, the number of pieces of time map information TMAPI increases, and complicated management is required when an edit process or the like is made. If this TMAPI is stored in the management information file (HR_MANGER.IFO in FIG. 74), management data in other non-related fields must be moved or rewritten every time TMAPI is changed, resulting in poor efficiency.

Hence, in the embodiment of the present invention, in order to improve such situation, TMAPI is recorded in an independent field (HR_TMAP.IFO in FIG. 74, TMAPT allocated at the end of HDVR_MG in FIG. 75, or the like).

In FIG. 75, HDVR_MGI has a manager information table (MGI_MAT) and playlist search pointer table (PL_SRPT).

The MGI_MAT includes disc management identification information (VMG_ID), version information (VERN), stream object management start addresses (STR_FIT_SA), an original program chain information start address (ORG_PGCI_SA), and a user-defined program information table start address (UD_PGCIT_SA). Furthermore, the MGI_MAT includes VTMAP_LAST_MOD_TM that describes the update date and time of VTMAPT, and STMAP_LAST_

MOD_TM that describes the update date and time of STMAPT. SR stream management information is saved in STR_FIT.

As shown in the example of FIG. 75, since respective TMAPs are stored in files independent from VMG, respective files can be independently altered by a personal computer or the like. In order to prevent such alteration, update date information of VTMAPT as TMAP (Time Map) for Video Recording (VR) for self recording/playback, and that of STMAPT as TMAP (Time Map) for Stream Recording (SR) for digital broadcast recording are described, and these values are compared with update date information (not shown) described in each TMAPT file. If these values match, a process can be done since it is determined that stored data are consistent. This update date information can also be compared with recording date information of other related files (related like an audio file and a video file or test file). Furthermore, the update date information can be used in a search process and the like.

Figure 76:
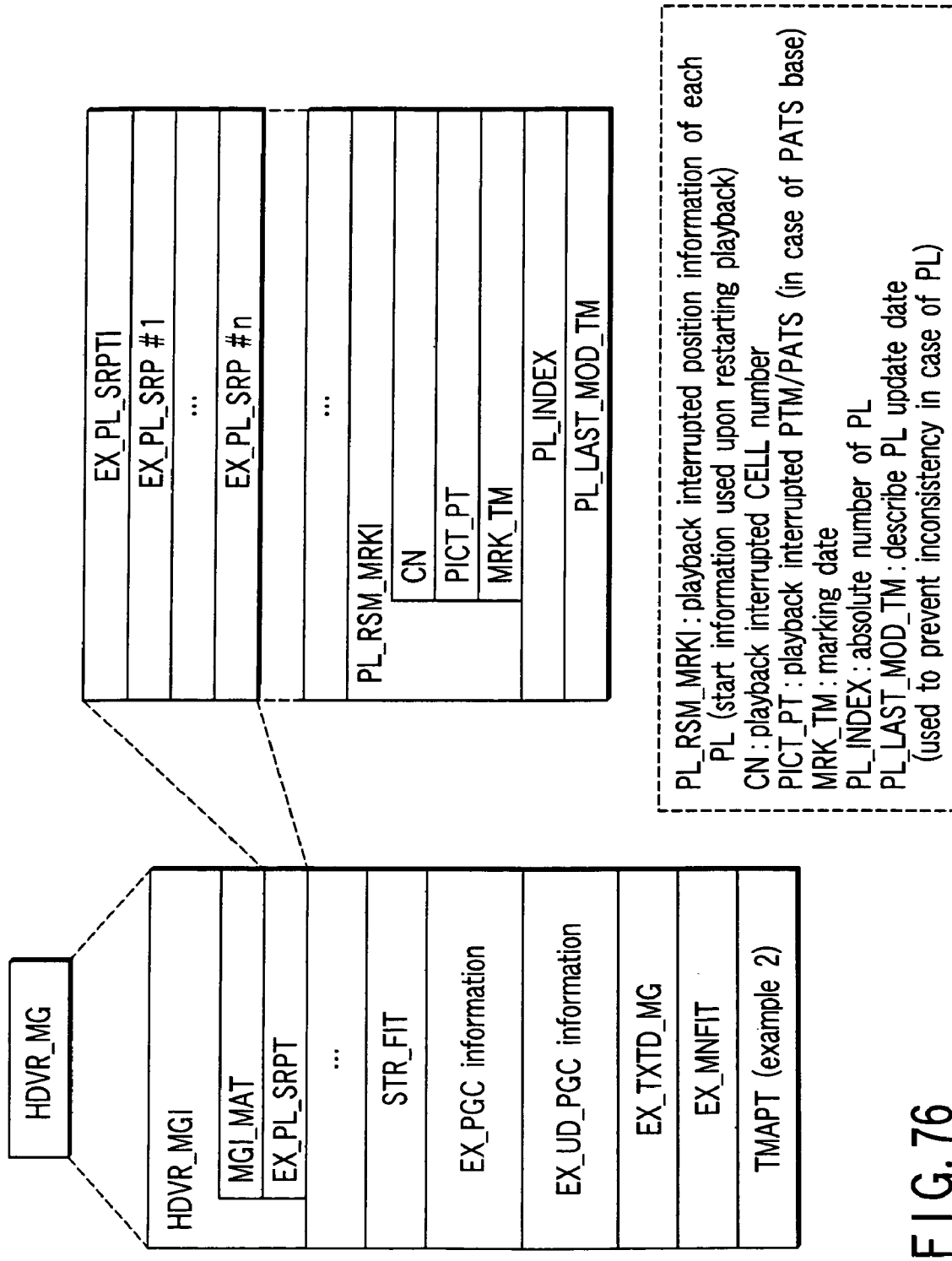
FIG. 76 is a view for explaining an example of the configuration of a field (PL_SRPT in HDVR_MGI) of one management information (HDVR_MG) recorded on AV data management information recording area 130.

FIG. 76 shows details of the contents of EX_PL_SRPT (playlist search pointer table) included in HDVR_MGI.

EX_PL_SRPTI (playlist search pointer table information) describes the number of search pointers and the like. After this information, EX_PL_SRPs (playlist search pointers) #1, #2, ... are described. Furthermore, a description field of PL_RSM_MRKI (playlist resume-mark mark information) is assured.

PL_RSM_MRKI is location information upon interrupting playback of each playlist (PL), and serves as reference information upon starting playback for the next time. This information includes CN ... CELL number at which playback was interrupted, PICT_PT ... PTM (in case of PTM base) or PATS (in case of PATS base) at which playback was interrupted, and MRK_TM ... marked date information.

Also, PL_INDEX ... an absolute number of a playlist, and a playlist update date (PL_LAST_MOD_TM) are recorded. By recording this update date information, it is compared with the update date information described in each time map file. If the two values match, it is determined that the playlist and time map have consistency. PL_RSM_MRK$_1$, PL_INDEX, and PL_LAST_MOD_TM are provided for each playlist.

Figure 77:
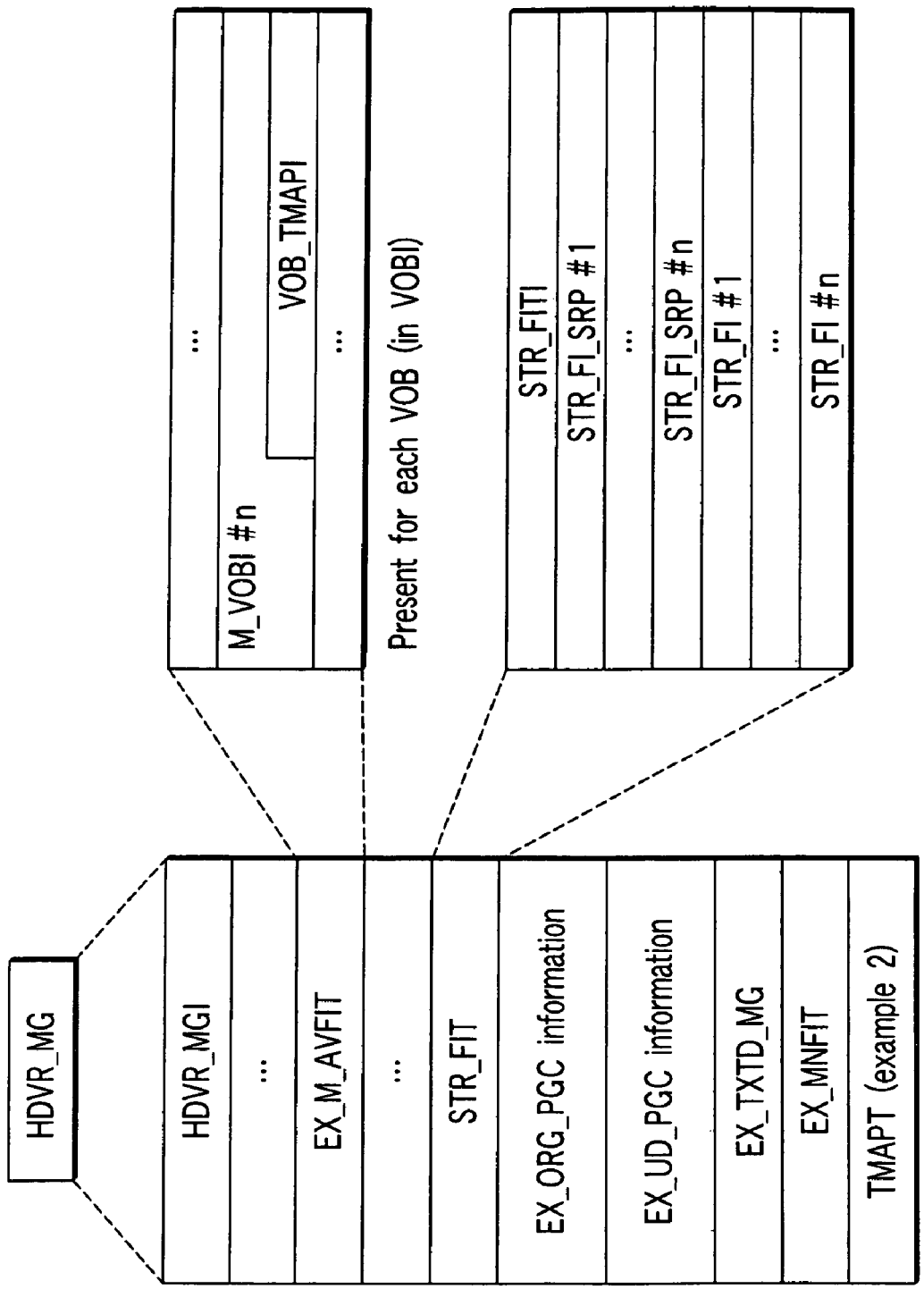
FIG. 77 is a view for explaining an example of the configuration of other fields (EX_M_AVFIT and STR_FIT) of one management information (HDVR_MG) in the data structure according to the embodiment of the present invention.

FIG. 77 is a view for explaining an example of other fields (M_AVFIT 1380 and STR_FIT 1320) in one management information (HDVR_VMG 130) in the data structure according to the embodiment of the present invention. VR data management information and SR stream management information are saved in HDVR_VMG 130, thus managing stream data in the same way as VR data.

That is, the VR data management information is saved in EX_M_AVFIT (Movie AV File Information Table), which includes MVOB_TMAPI (Movie Video Object Timemap Information) in M_VOBI (Movie Video Object Information) for each VOB.

The stream management information (STR_FIT: Stream File Information Table) includes STR_FITI (STR_FIT Information), one or more STR_FI_SRPs, and one or more pieces of STR_FI (Stream File Information) indicated by these SRPs. Each STR_FI includes SOB_TMAPI having functions corresponding to MVOB_TMAPI in its data layer (to be described later with reference to FIG. 78).

Note that HDVR_MG may include original program chain (ORG_PGC) information, user-defined program chain (UD_PGC) information, a text data manager (TXTTD_MG), and a time map table (TMAPT (example 2)).

Figure 78:
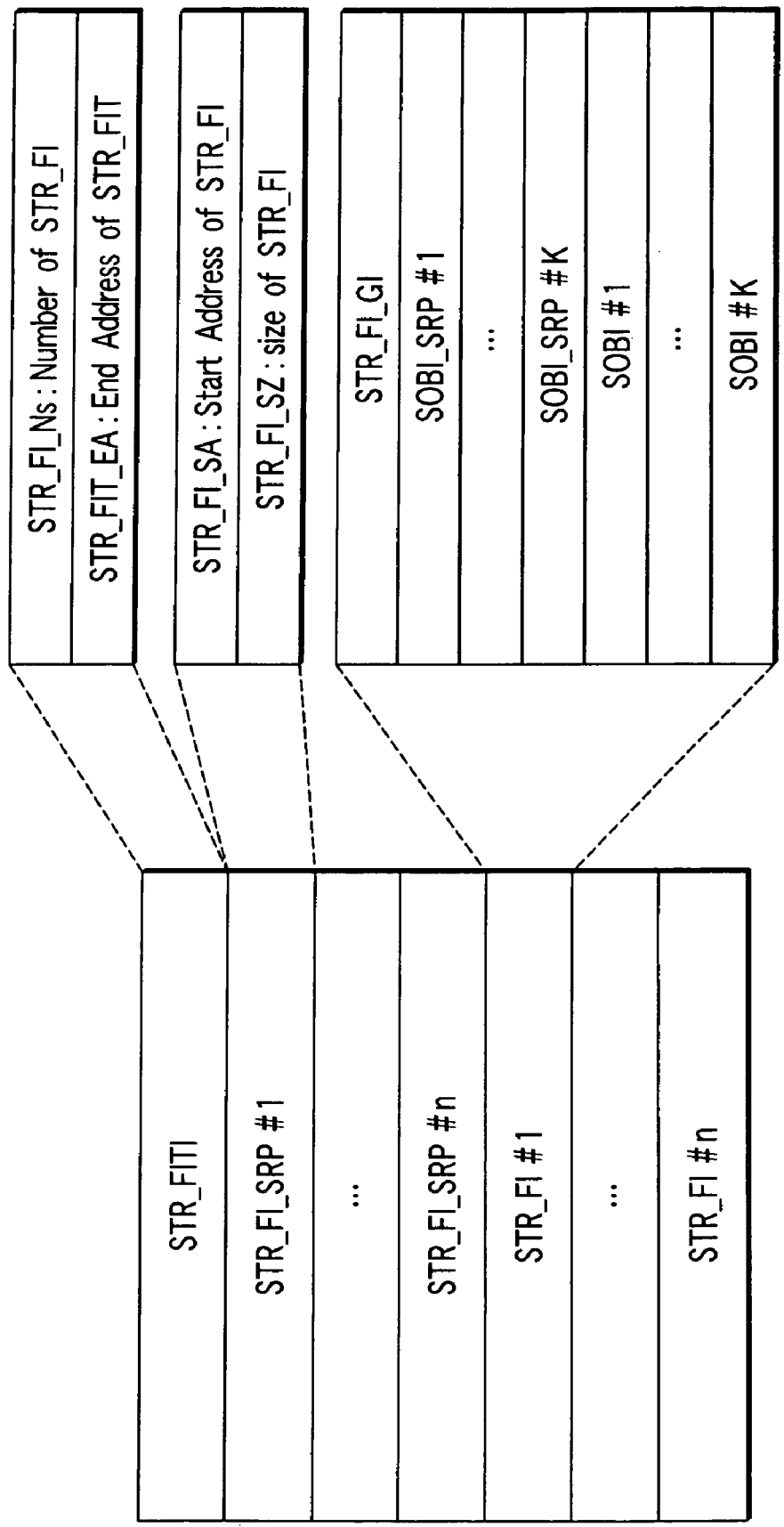
FIG. 78 is a view for explaining an example of the configuration of STR_FITI, STR_FI_SRP, and STR_FI in FIG. 77.

FIG. 78 is a view for explaining an example of the configuration of STR_FITI and STR_FI in FIG. 77. That is, STR_FITI includes the total number of pieces of STR_FI (STR_FI_Ns), and the end address (STR_FIT_EA) of this table (STR_FIT).

Each STR_FI_SRP (search pointer) includes the start address (STR_FI_SA) and total size information (STR_FI_SZ) for a plurality of pieces of STR_FI.

STR_FI includes STR_FI_GI (STR_FI General Information), one or more SOBI_SRPs (Stream Object Information Search Pointers), and one or more pieces of SOBI (SOB Information) which are as many as the SOBI_SRPs and are indicated by these SRPs.

Figure 79:
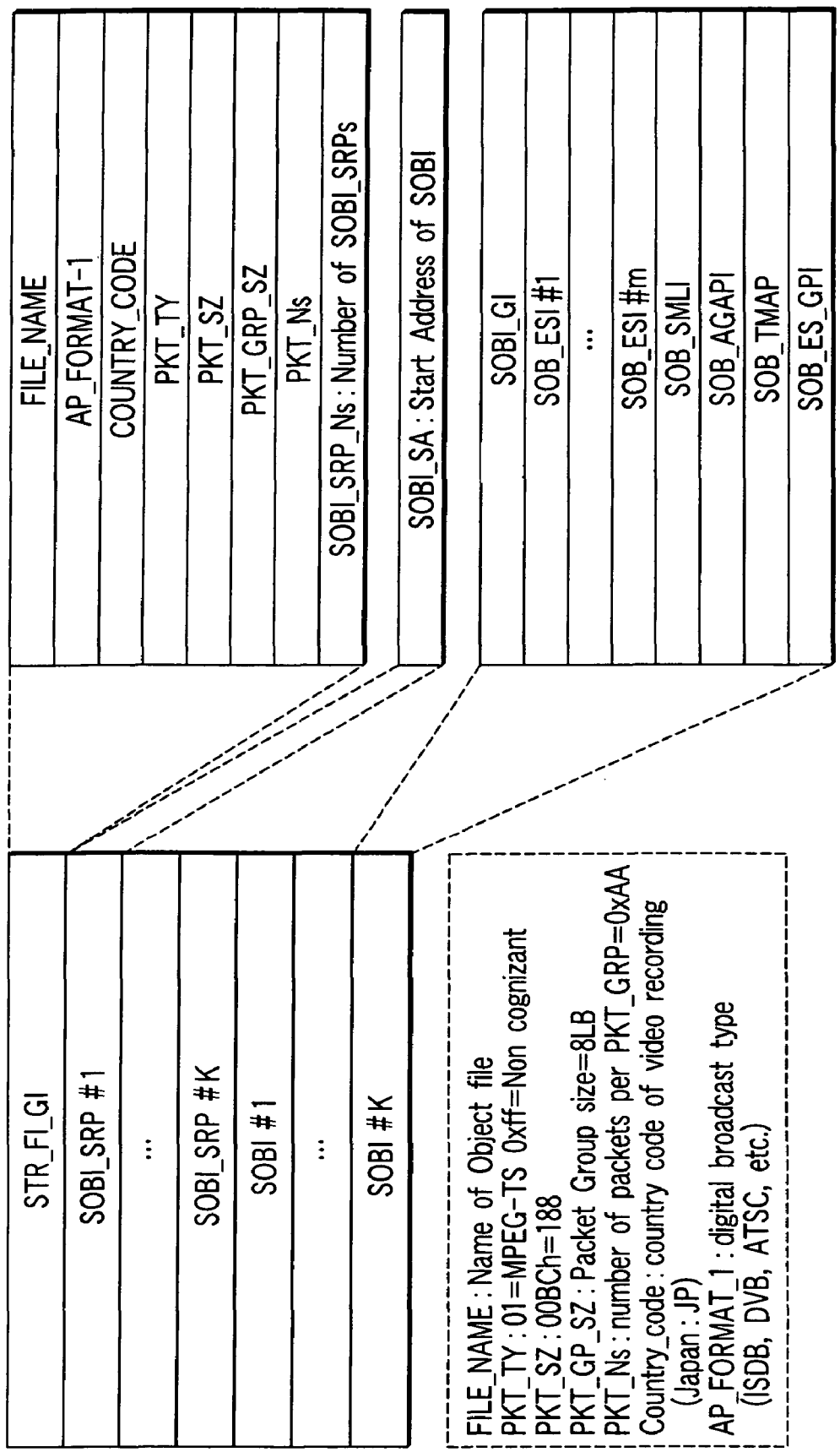
FIG. 79 is a view for explaining an example of the configuration of STR_FI_GI, SOBI_SRP, and SOBI in FIG. 78.

FIG. 79 is a view for explaining an example of the configuration of STR_FI_GI, SOBI_SRP, and SOBI in FIG. 78. STR_FI_GI includes a file name/file number (FILE_NAME) of an object managed by this STR_FI, the type of digital broadcast (AP_FORMAT_1) as a source of the contents to be recorded, COUNTRY_CODE as the country code of a country where video recording was done, PKT_TY (1=MPEG-TS) indicating a packet type, PKT_SZ indicating the packet size, PKT_GRP_SZ (16 Logical blocks (fixed)) indicating the packet group size, PKT_Ns (0xAA: 170 TS packets (fixed)), and the number of SOBI_SRPs (SOBI_SRP_Ns) in this STR_FI.

Note that the packet type (PKT_TY) indicates (that a stream included in a packet is) MPEG-TS if its contents are 01; and (that a stream included in a packet is) non-cognizant if the contents are 0xff. PKT_SZ indicates the packet size=188 bytes if it is 00Bch.

PKT_GRP_SZ indicates a packet group size (e.g., an 8-logical block size, 16-logical block size, or the like). According to the example of FIG. 72(g), PKT_GRP_SZ=16 Logical Blocks is fixed. PKT_Ns indicates the number of packets (e.g., 0xAA: 170 TS packets (fixed)) in one packet group. COUNTRY_CODE indicates a code (e.g., JPN=Japan) of a country where an apparatus (DVD recorder or the like) used in video recording is marketed or distributed. AP_FORMAT_1 indicates ARIB (ISDB) if its contents are 1; ATSC if its contents are 2; and DVB if its contents are 3.

SOBI# indicated by the SOBI_SRP# with the corresponding number (#) includes SOBI_GI (SOBI General Information), one or more pieces of SOB_ESI (SOB Elementary Stream Information) #, SOB_SMLI (SOB Seamless Information), SOB_AGAPI (SOB Audio GAP Information), SOB_T-MAPI (SOB Time Map Information), and SOB_ES_GPI (SOB Elementary Stream Group Information).

Each SOBI_SRP indicates SOBI_SA (the start address of SOBI).

Note that SOB_ESI further includes SOB_V_ESI (SOB Video ESI) and SOB_A_ESI (SOB Audio ESI) (see FIG. 83).

In this case, the object management information (STR_FI) shown in FIG. 79 is provided and managed for each broadcast format. Furthermore, a method of managing each STR_FI as an independent file is available as will be described using FIGS. 108 to 111. This method will be described later.

Figure 80:
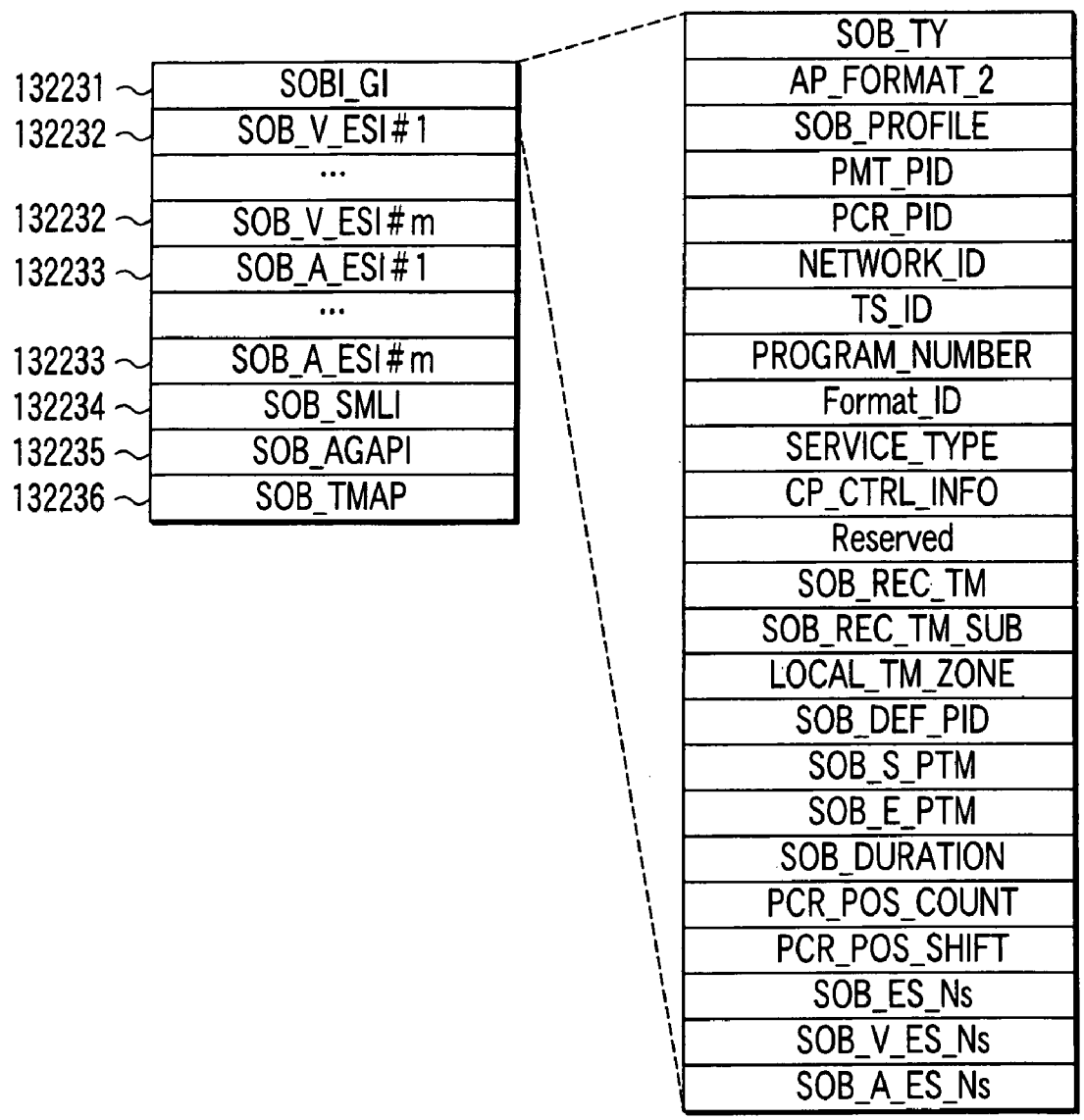
FIG. 80 is a view for explaining an example of the configuration of SOBI_GI in FIG. 79.

FIG. 80 is a view for explaining an example of the configuration of SOBI_GI included in SOBI in FIG. 79. As shown in FIG. 80, SOBI_GI includes SOB_TY indicating a type and AP_FORMAT_2 (when ARIB is designated by AP_FORMAT_1: 1=ISDB-S (BS/CS broadcast, 2=ISDB-T (terrestrial digital broadcast)). Furthermore, SOBI_GI includes PROGRAM_NUMBER (SERVICE_ID), PMT_PID (packet ID of PMT), PCR_PID (packet ID of PCR), NETWORK_ID (network ID), TS_ID (transport stream ID), and FORMAT_ID (format ID) on the basis of PSI and SI values, and also SOB_ES_Ns (the number of ESs selected for video recording), SOB_V_ES_Ns (the number of ESs, TMAPs of which are prepared, of recorded video ESs), SOB_A_ES_Ns (the number of ESs, TMAPs of which are prepared, of recorded audio ESs), PCR_POS_COUNT (indicating the location of a PCR to be referred to by the number of PCRs before the head of Packet_Group), and PCR_POS_SHIFT (exponential part of 2 of an LB which indicates the PCR packet position).

Moreover, SOBI_GI includes CP_CTL_IFO (copy control information), profile information (including a decode function support state, region number, and Option support flag: to be described later with reference to FIG. 81), and MNF_ID_TBL_N. MNF_ID_TBL_N corresponds to the number of the TBL set in the layer of STR_FI, and is set with the number of the TBL used by SOB.

In addition, SOBI_GI includes SOB_TY (SOB type), SOB_DEF_PID (default PID of SOB), SOB_REC_TM (SOB recording time), SOB_REC_TM_SUB (SOB sub-recording time), LOCAL_TM_ZONE (local time zone), SOB_DURATION (information indicating an SOB period: a playback time period in case of PTM base, an arrival time period in case of PATS base), SOB_S_PTM/PATS (SOB playback start time/start Packet arrival time), SOB_E_PTM/PATS (SOB playback end time/end Packet arrival time), and the like.

FIG. 81 is a view for explaining various kinds of information included in SOBI_GI 132231 in FIG. 80. SOB_TY indicates a normal SOB if its bit b13=0; a temporary erase SOB if bit b13=1; the absence of GPI if bit b12=0; and the presence of GPI if bit b12=1. Also, bits b15 and b14 of SOB_TY record the TMAP type: PTM (presentation time map) base when they are 00; and PATS (packet arrival time stamp) base when they are 10. In case of PATS base, management is made based on the time stamps upon arrival of packets.

SOB_ES_Ns, SOB_V_ES_Ns, SOB_A_ES_Ns, and ES_TMAP_GI_Ns (see FIG. 88) have the following relations:

SOB_ES_Ns≧SOB_V_ES_Ns+SOB_A_ES_Ns

SOB_V_ES_Ns+SOB_A_ES_Ns≧ES_TMAP_GI_Ns

In addition, PCR_POSCOUNT indicates the location of PCR to be referred to by the number of PCRs before the head of a packet group, PCR_POS_SHIFT indicates an exponential part of 2 of an LB which indicates the PCR packet position, and CP_CTRL_INFO allows copy control for the copyright protection and the like.

Note that the default PID (SOB_DEF_PID) indicates a PID with a smaller component tag value (the value of a component group descriptor is preferentially used) in case of ARIB. SOB_DURATION indicates a playback time of SOB in case of PTM base, and corresponds to a total of the playback times of SOBU_ENTs which belong to an ES indicated by the default PID. In case of PATS base, SOB_DURATION indicates a time from the head Packet to the last Packet of the SOB.

In FIG. 80 (and FIG. 81), each SOB in a disc has profile information in place of that included in each disc.

Details of profile information (SOB_PROFILE) included in FIG. 80 will be described below using FIG. 82 (and will be described later using FIG. 116), and can be used to indicate the support states of various decode functions. FIG. 82 is a view for explaining a practical example of the profile information in FIG. 80 (and FIG. 81). This profile information includes an 8-bit option support flag and 16-bit region number. This region number indicates Japan (ARIB) when it is 00; U.S.A. (ATSC) when it is 01; Europe (DVB) when it is 02; and universal when it is 0xffff. Of the recorded contents, data of a region corresponding to the region number can be played back.

Normally, DVD has a playback must principle of all registered compression formats, thus assuring compatibility among DVD recorders of respective manufacturers. However, in next-generation DVDs, a plurality of different video formats are registered, and if the all-format playback must in principle is followed, all DVD recorders become very expensive.

In order to solve such price appreciation problem, format support functions are classified into BASE and a plurality of options, and options to be supported are selectively used depending on their purposes and price range. In this case, in order to allow the apparatus to compare the self support state and that of a stream upon reception of data of an unsupported option, contents store that information. In the embodiment of the present invention, since VMGI stores that option state (option support flag in FIG. 82), a DVD recorder that can support variations of a plurality of options can be provided.

Different digital broadcast formats are adopted in respective countries: for example, ARIB (Association of Radio Industries and Businesses) in Japan; DVB (Digital Video Broadcasting) in Europe; and ATSC (Advanced Television Systems Committee) in U.S.A. [1] In ARIB, the video format is MPEG2, the resolutions are 1080i, 720p, 480i, and 480p, the frame rates are 29.97 Hz and 59.94 Hz, the audio format includes AAC (MPEG-2 Advanced Audio Coding), and the sampling frequencies are 48 kHz, 44.1 kHz, 32 kHz, 24 kHz, 22.05 kHz, and 16 kHz. [2] In DVB, the video format is MPEG2, the resolutions are 1152*1440i, 1080*1920(i, p), 1035*1920, 720*1280, (576, 480)*(720, 544, 480, 352), and (288, 240)*352, the frame frequencies are 30 Hz and 25 Hz, the audio format includes MPEG-1 audio and MPEG-2 Audio, and the sampling frequencies are 32 kHz, 44.1 kHz, and 48 kHz. [3] In ATSC, the video format is MPEG2, the resolutions are 1080*1920(i, p), 720*1280p, 480*704(i, p), and 480*640(i, p), the frame frequencies are 23.976 Hz, 24 Hz, 29.97 Hz, 30 Hz, 59.94 Hz, and 60 Hz, the audio format includes MPEG1 Audio Layer 1 & 2 (DirecTV) and AC3 Layer 1 & 2 (Primstar), and the sampling frequencies are 48 kHz, 44.1 kHz, and 32 kHz.

In this manner, since different decoders must be equipped in recorders depending on regions where they are used, information indicating a recorder used to record a disc and its supported functions is saved in VMGI, thus identifying the recorder used to write data on a disc and its supported functions.

Also, streams to be decoded by the apparatus side have many different variations for respective areas, and if all these variations are supported, the arrangement of a recording/playback apparatus (e.g., a DVD recorder) becomes considerably heavy (or completed). As a result, the apparatus cost increases. To solve such problem, this embodiment supports many variations of streams to be processed, and can relatively simplify the apparatus arrangement by devising support methods, as will be described later.

FIG. 83 is a view for explaining an example of the configuration of SOB_ESI included in SOBI in FIG. 79. In this example, SOB_ESI is classified into three types (SOB_V_ESI, SOB_A_ESI, and SOB_OTHER_ESI).

Figure 84:
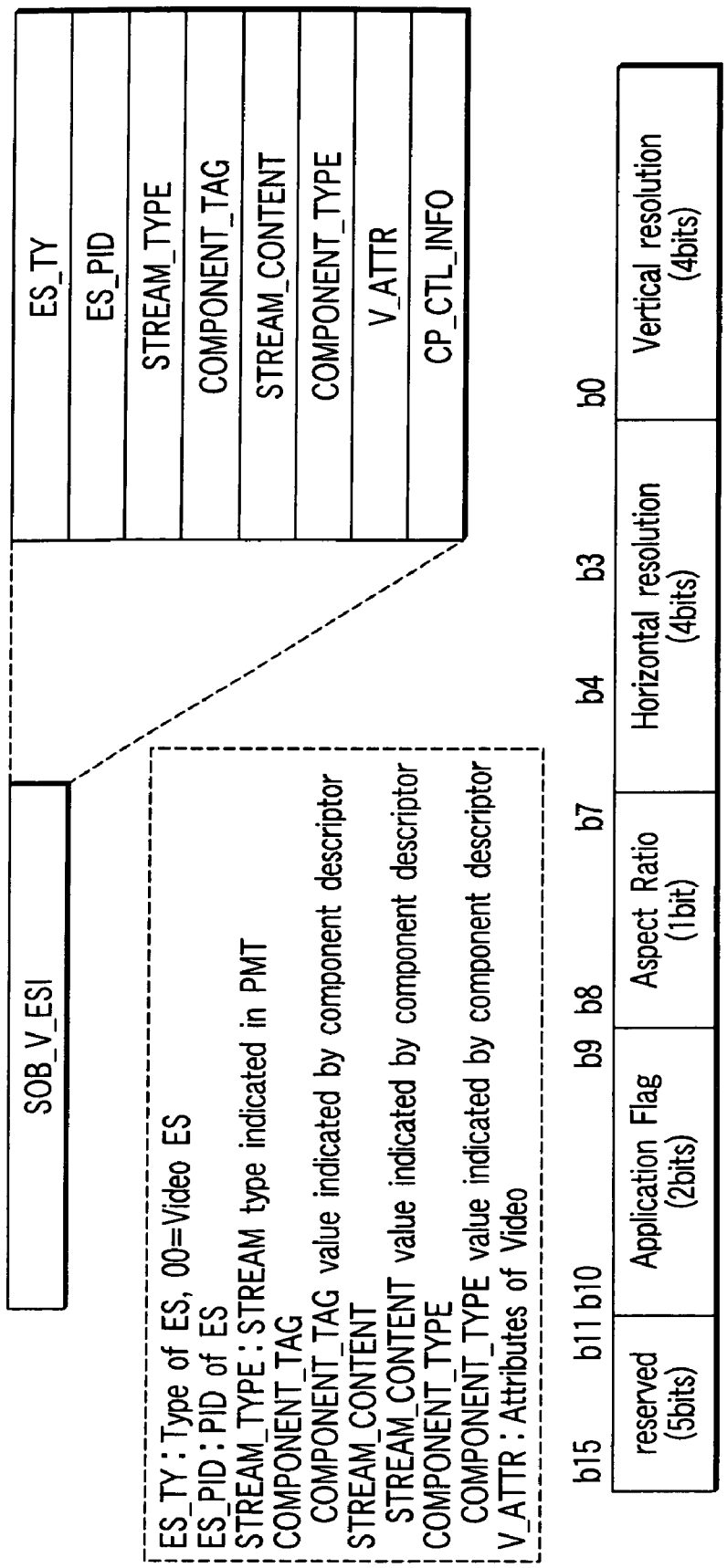
FIG. 84 is a view for explaining an example of the configuration of SOB_V_ESI included in each SOB_ESI (SOB_ESI#m in this case) in FIG. 83 and an example of the configuration of video attribute V_ATTR included in this SOB_V_ESI.

FIG. 84 is a view for explaining an example of the configuration of SOB_V_ESI included in each SOB_ESI (SOB_ESI#m in this case) in FIG. 83, and an example of the configuration of video attribute V_ATTR included in this SOB_V_ESI.

SOB_V_ESI includes ES_TY indicating an ES type, ES_PID indicating the PID of an ES, STREAM_TYPE (STREAM type indicated in PMT), COMPONENT_TAG (the value of COMPONENT_TAG indicated by the component descriptor), COMPONENT_TYPE (the value of COMPONENT_TYPE indicated by the component descriptor), V_ATTR indicating video attributes, and CP_CTL_INFO ((copy control information/copyright management information).

V_ATTR (16 bits) includes an application flag that designates a video aspect ratio, data indicating a horizontal resolution, vertical resolution, and the like. That is, V_ATTR is set with an Application flag (0=this V_ATTR designates an Aspect ratio, 1=this V_ATTR may designate an Aspect ratio; an actual Aspect ratio is recorded in a stream), an Aspect ratio (0=4:3, 1=16:9), a Horizontal resolution (00=1920, 01=1440, 02=1280, 03=720, 04=544, 05=480), and a Vertical resolution (00=1080, 01=720, 02=480).

Normally, playback is made according to such attributes. However, if a change has been made in the middle of an SOB, DCI values in a packet header are preferentially used.

Figure 85:
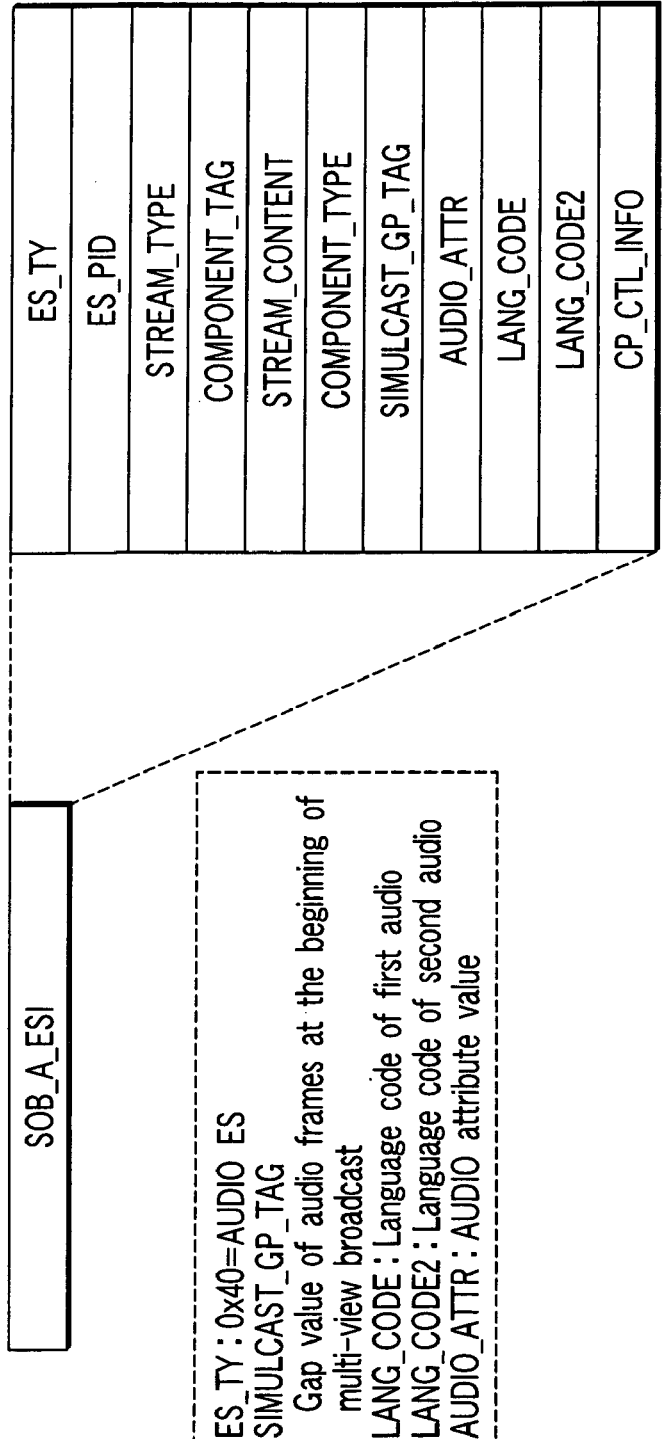
FIG. 85 is a view for explaining an example of the configuration of SOB_A_ESI included in each SOB_ESI (SOB_ESI#m in this case) in FIG. 83 and an example of the configuration of audio attribute A_ATTR included in this SOB_A_ESI.

FIG. 85 is a view for explaining an example of the configuration of SOB_A_ESI included in each SOB_ESI (SOB_ESI#m in this case) in FIG. 83, and an example of the configuration of audio attribute AUDIO_ATTR included in this SOB_A_ESI.

SOB_A_ESI includes ES_TY indicating an ES type, ES_PID indicating the PID of an ES, STREAM_TYPE (STREAM type indicated in PMT), COMPONENT_TAG (the value of COMPONENT_TAG indicated by the component descriptor), STREAM_CONTENT (the value of STREAM_CONTENT indicated by the component descriptor), COMPONENT_TYPE (the value of COMPONENT_TYPE indicated by the component descriptor), SIMULCAST_GP_TAG (a gap value of audio frames at the beginning of multi-view broadcast), AUDIO_ATTR (audio attribute values), LANG_CODE (a language code of first audio), LAND_CODE2 (a language code of second audio), and CP_CTL_INFO (copy control information/copyright management information).

AUDIO_ATTR includes Simulcast_GP_tg (0=non-simulcast, 1=simulcast), Multi_1 ng (1=DUAL mono, 0=other), Main_Comp (1=main audio, 0=other), Quality_Indicator (indicating audio quality), and Sampling_Rate (001=16 kHz, 010=22.05 kHz, 011=24 kHz, 101=32 kHz, 111=48 kHz). These values are set based on the values of an audio component descriptor.

Figure 86:
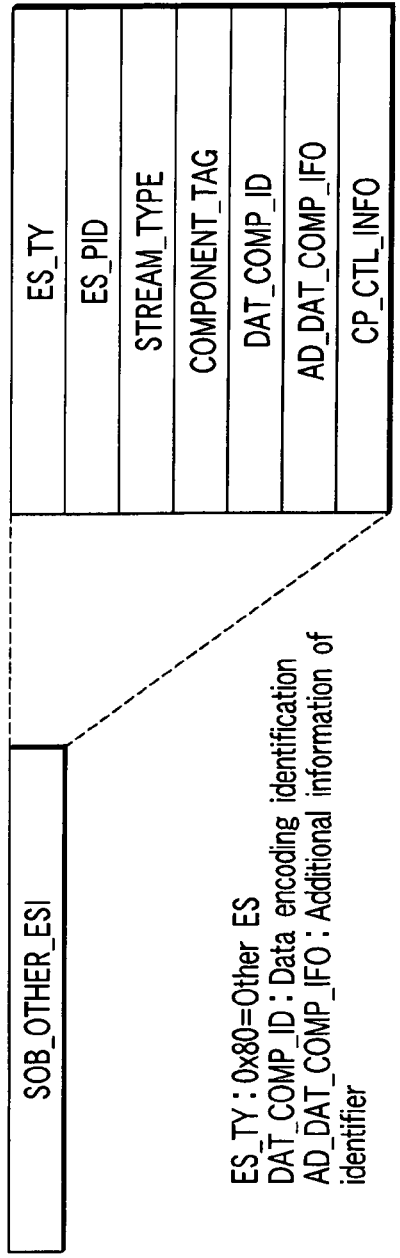
FIG. 86 is a view for explaining an example of the configuration of SOB_OTHER_ESI included in each SOB_ESI (SOB_ESI#m in this case) in FIG. 83.

FIG. 86 is a view for explaining an example of the configuration of SOB_OTHER_ESI included in each SOB_ESI (SOB_ESI#m in this case) in FIG. 83.

SOB_OTHER_ESI includes DAT_COMP_ID (data contents encoding identifier) and AD_DAT_COMP_IFO (Additional data Component Information) in addition to ES_TY, ES_PID, STREAM_TYPE, COMPONENT_TAG, and CP_CTL_INFO.

Figure 87:
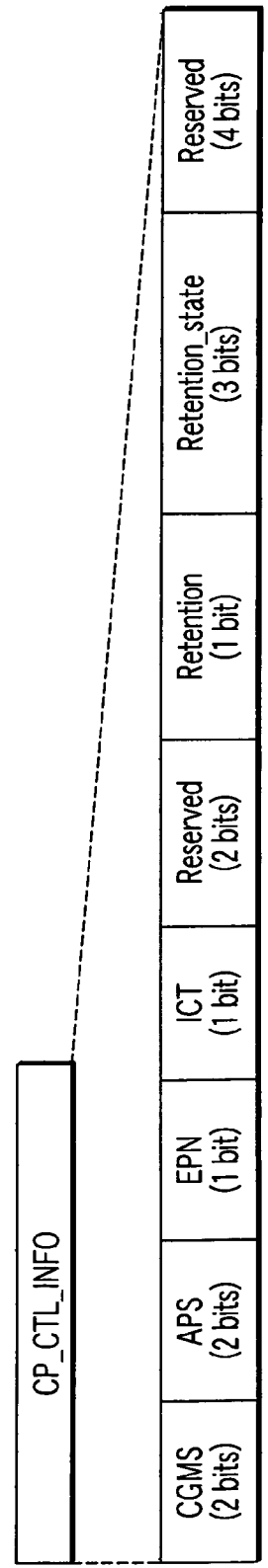
FIG. 87 is a view for explaining another example of the configuration of copy control information (copyright protection information) CP_CTL_INFO included in SOB_OTHER_ESI in FIG. 86.

FIG. 87 is a view for explaining another example of the configuration of copy control information (copyright protection information) CP_CTL_INFO included in SOB_OTHER_ESI in FIG. 86. CP_CTL_INFO is stored in CPI of SOBI_GI, SOB_V_ESI, SOB_A_ESI, and a Packet Group Header. CPI of SOBI_GI makes the overall copy control, CPI of ESI makes copy control of each ES, and copy control of each Packet Group is made based on CPI of the Packet Group Header. The CPI values of ESI are used in preference to those of SOBI_GI, and CPI of the Packet Header Group is assigned top priority. These CPI values are set based on a digital copy control descriptor, content use descriptor, and the like.

The contents of CP_CTL_INFO are: CCI or CGMS (0=copy never; 1=copy free); APS (0=no APS, 1=append APS type 1, 2=append APS type 2, 3=append APS type 3); EPN (0=contents protection (Internet output protection), 1=no contents protection); ICT (0=resolution constraint, 1=no constraint); Retention (1=none, 0=valid within a temporary storage time); and Retention_State (0=no limitation, 1=1 week, 2=2 days, 3=1 day, 4=12 hours, 5=6 hours, 6=3 hours, 7=1.5 hours). Of these contents, Retention allows temporary storage only for a time indicated by Retention_State when Retention=0 and a copy inhibition mode is set, and the stored contents must be erased after an elapse of that time.

Figure 88:
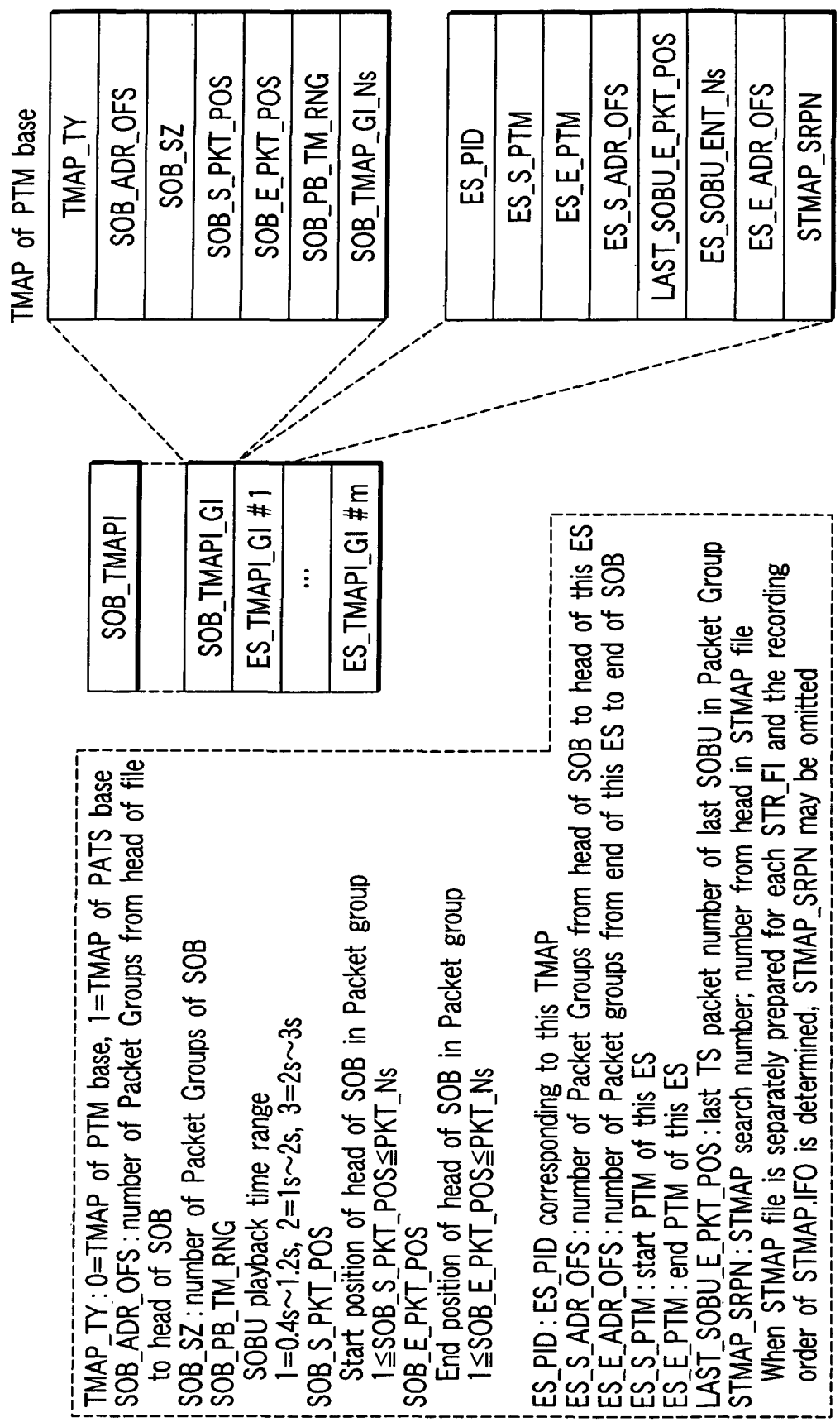
FIG. 88 is a view for explaining an example of the configuration of SOB_TMAP on PTM base included in SOBI in FIG. 78.

FIG. 88 is a view for explaining an example of the configuration of SOB_TMAPI included in SOBI in FIG. 80. SOB_TMAPI includes SOB_TMAPI_GI and one or more pies_of ES_TMAPI. SOB_TMAPI_GI includes SOB_ADR_OFS (a Packet Group number or LB address (logical address) from the head of a file to the head of an SOB). Also, in case of PTM base, SOB_TMAPI_GI includes SOBU_PB_TM_RNG (SOBU playback time range: 1=0.4 s to 1.2 s, 2=1 s to 2 s, 3=2 s to 3 s), SOB_S_PKT_POS (the start position of the head of an SOB in a Packet group: 1≦SOB_S_PKT_POS≦170), SOB_E_PKT_POS (the end position of the head of an SOB in a Packet group: 1≦SOB_E_PKT_POS≦170), ES_T-MAP_Ns (the number of ES_TMAPs), and the like. Furthermore, SOB_TMAPI_GI includes SOB_SZ (the size of a stream object).

Each ES_TMAPI includes ES_PID (the PID of a target ES of this TMAP), ES_S_ADR_OFS (a Packet group number (or LB address) from the head of an SOB file to the head of this ES) and ES_E_ADR_OFS (a Packet group number (or LB address) from the head of an SOB file to the end of this ES), ES_S_PTM (start PTM), ES_E_PTM (end PTM), ES_SOBU_ENT_Ns (the number of SOBU_ENTs), LAST_SOBU_E_PKT_POS (the position of the last SOBU in a Packet Group), STMAP_N (the number of a TMAP in the TMAPT, which belongs to this ES: this number may be omitted when the TMAPTs are recorded in independent areas for VR and SR or TMAPs are recorded in turn in each TMAPT), and the like.

A stream time map table (STMAPT) is recorded in an independent area (as an independent file or at the end of IFO), and includes STMAPTI (stream time map table information), one or more STMAPI_SRPs (stream time map search pointers), and one or more pieces of STMAPI (stream time map information) which are as many as the SRPs.

STMAPTI includes end address information of the STMAPT, version information of this TMAP, STMAP_SRP_Ns (the number of pieces of TMAP_SRPI=the number of pieces of TMAPI), and update date information (equal to the value of VMGI) of STMAP. Each STMAP_SRP includes address information to STMAPI as an element of each STMAPT. Each STMAPI includes a required number of pieces of ES_TMAPI_GI and a required number of SOBU_ENTs. STMAPI_GI includes SOBU_ENT_Ns (the number of ENTRIES). Note that garbage data may be included among SOBU_ENTs.

FIG. 89 shows an example of information included in SOB_TMAP_GI in case of PATS base. SOB_TMAP_GI includes SOBU_PATS_TM_RNG (SOBU arrival time interval: 1=1.5 s, 2=1 s or a 27-MHz count value), SOB_S_PATS/SOB_E_PATS (arrival time of the start/end Packet), and TM_OFS (a difference time from the TM range of the first SOBU; an example without TM_OFS is available). An edit process is done for respective SOBUs, and adjustment is made using the PATS playback start/end time (CELL (cell information)). Other elements are the same as those in case of PTM base above. Note that the SOBU time approximately matches the value indicated by TM_RNG, and indicates the arrival time of the first Packet after this TM_RNG. Only for the last Packet of an SOB, a value equal to or smaller than TM_RNG is permitted.

In case of PTM base, TMAPI information can be prevented from becoming extremely large by appropriately setting SOBU_PB_TM_RNG even when the video recording time increases. However, in such case, since the time interval between neighboring ENTRIES broadens, smooth double-speed playback and the like is more likely to be disturbed.

As for the lower limit of the SOBU recording time, for example, when a value equal to or smaller than 0.4 s is not permitted, the heads of an SOBU and GOP may be misaligned, I (intra) picture data may not be extracted, video data may not be extracted in a special playback mode or the like, or a displayed video may jump. For this reason, when an SOBU without any I-picture data is formed since the SOBU is delimited due to time-out, an SOBU equal to or smaller than 0.4 s (minimum time) is permitted. However, in such case, as a limitation on an SOBU, the SOBU must include one or more frames, and must be formed of frames, fields, or pictures. If no I-picture is available in an SOBU, "00" is set in 1ST_REF_SZ upon video recording.

Figure 90:
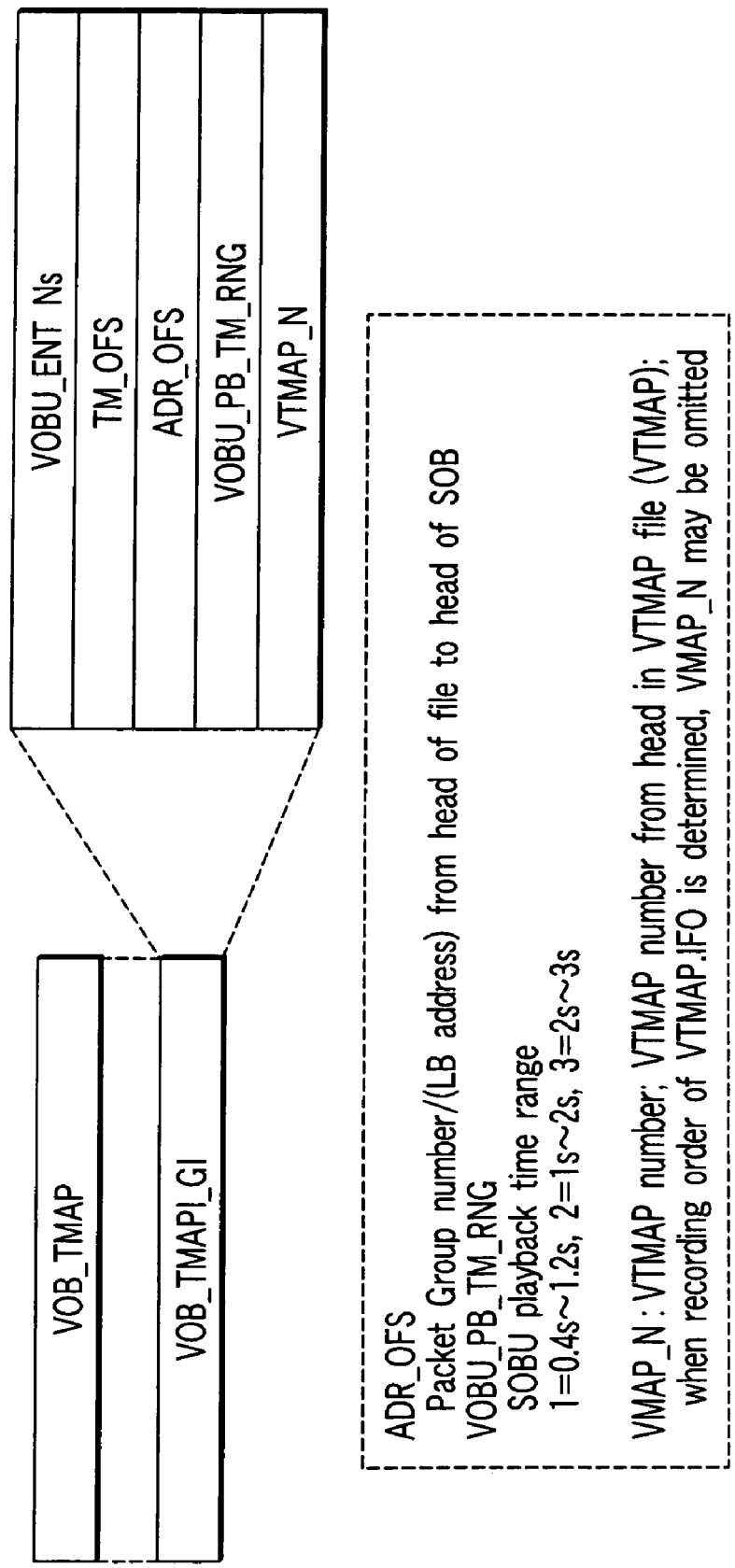
FIG. 90 is a view for explaining an example of the configuration of MVOB_TMAP_GI included in MVOB_TMAP in FIG. 76.

FIG. 90 is a view for explaining an example of the configuration of MVOB_TMAP_GI included in MVOB_TMAP (FIG. 77). MVOB_TMAP_GI includes the number of VR movie VOBU entries MVOBU_ENT_Ns, time offset TM_OFS, address offset ADR_OFS, VOBU playback time range VOBU_PB_TM_RNG (1=0.4 s to 1.2 s, 2=1 s to 2 s, 3=2 s to 3 s), and TMAP number VTMAP_N.

Figure 91:
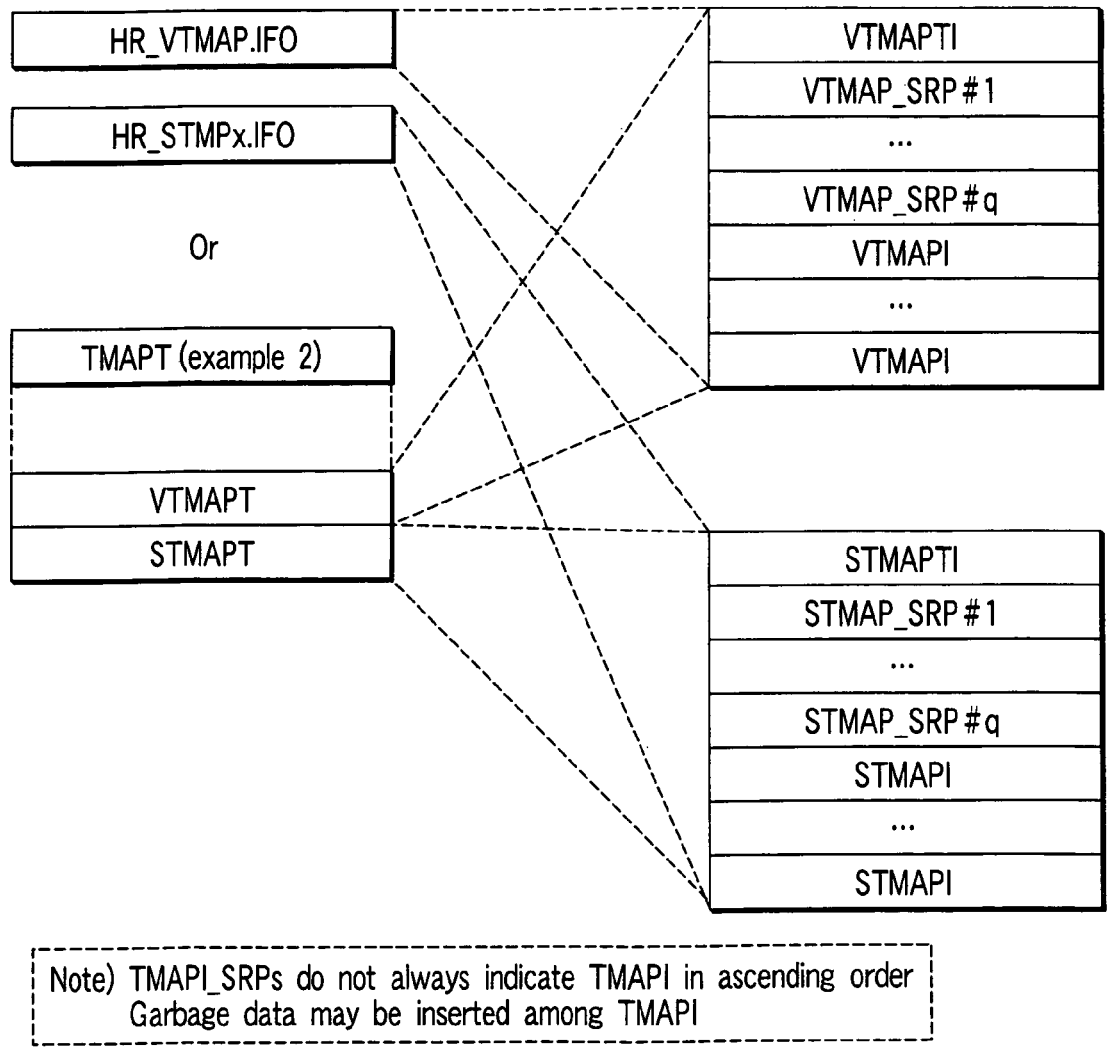
FIG. 91 is a view for explaining an example of the configuration of time map file HR_TMAP.IFO (example 1) included in a DVD_HDVR directory in FIG. 74 or time map table TMAPT (example 2) allocated at the end of HDVR_MG.

FIG. 91 is a view for explaining an example of the configuration of time map file HR_TMAP.IFO (example 1) included in the DVD_HDVR directory in FIG. 74 or time map table TMAPT (example 2) allocated at the end of HDVR_VMG in FIG. 76. TMAPT is recorded in an independent area (independent file (FIG. 74 and the like) or at the end of IFO (FIG. 75 and the like)).

FIG. 92 is a view for explaining an example of the configuration of various kinds of information included in VTMAPT in FIG. 91. As shown in FIG. 92, VTMAPT includes VTMAPTI and VTMAP_SRPT, and VTMAP#1 to VTMAP#n. VTMAPI includes VMG_ID (the same value as VMG_ID as that allocated at the head of VMGI), VTMAPT_EA (the end address of VTMAP), VERN (version information of TMAP), IFO_LAST_MOD_TM (update date information of TMAPT; the same value as HR_MANGR.IFO), and VTMAP_SRP_Ns (the total number of pieces of search information). VTMAP_SRPT includes one or more VTMAP_SRPs (search information of respective VTMAPs). Furthermore, each VTMAP_SRP includes VTMAP_SA (the start address of VTMAP) and VOBU_ENT_Ns (total number of VOBU_ENTs). VTMAP includes one or more VOBU_ENTs.

In case of PATS base, ES_TMAPI_Ns is fixed to 1 since there is only one Map.

Respective ENTRIES are classified into those for SOBU and those for VOBU, and the ENTRIES for SOBU are further classified into those for PTM base and those for PATS base.

Figure 96:
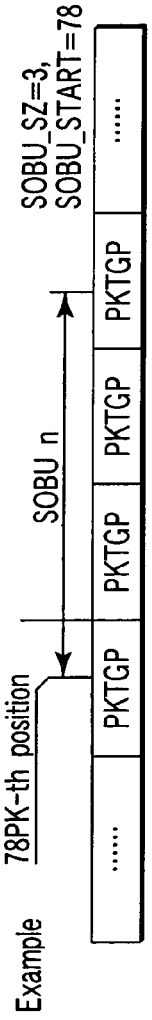
FIG. 96 is a view for explaining an example of the configuration for PMT base of the contents of each SOBU/VOBU_ENT# (in case of SOBU_ENTRY) in FIG. 95.

In case of SOBU_ENT on PTM base, as shown in FIG. 96, there are three types of entries, i.e., an entry which includes video data, an entry which does not include any video data but includes audio data, and an entry which includes only other kinds of information, and these types are respectively 00, 01, and 02.

FIG. 93 is a view for explaining an example of the configuration of the contents of each VOBU_ENT# in FIG. 92. In case of VOBU_ENT, the same structure (1STREF_SZ; VOBU_PB_TM; VOBU_SZ) as in normal VR is adopted. However, in a next-generation optical disc, the numbers of bits of respective fields increase due to an increase in recording capacity.

Figure 94:
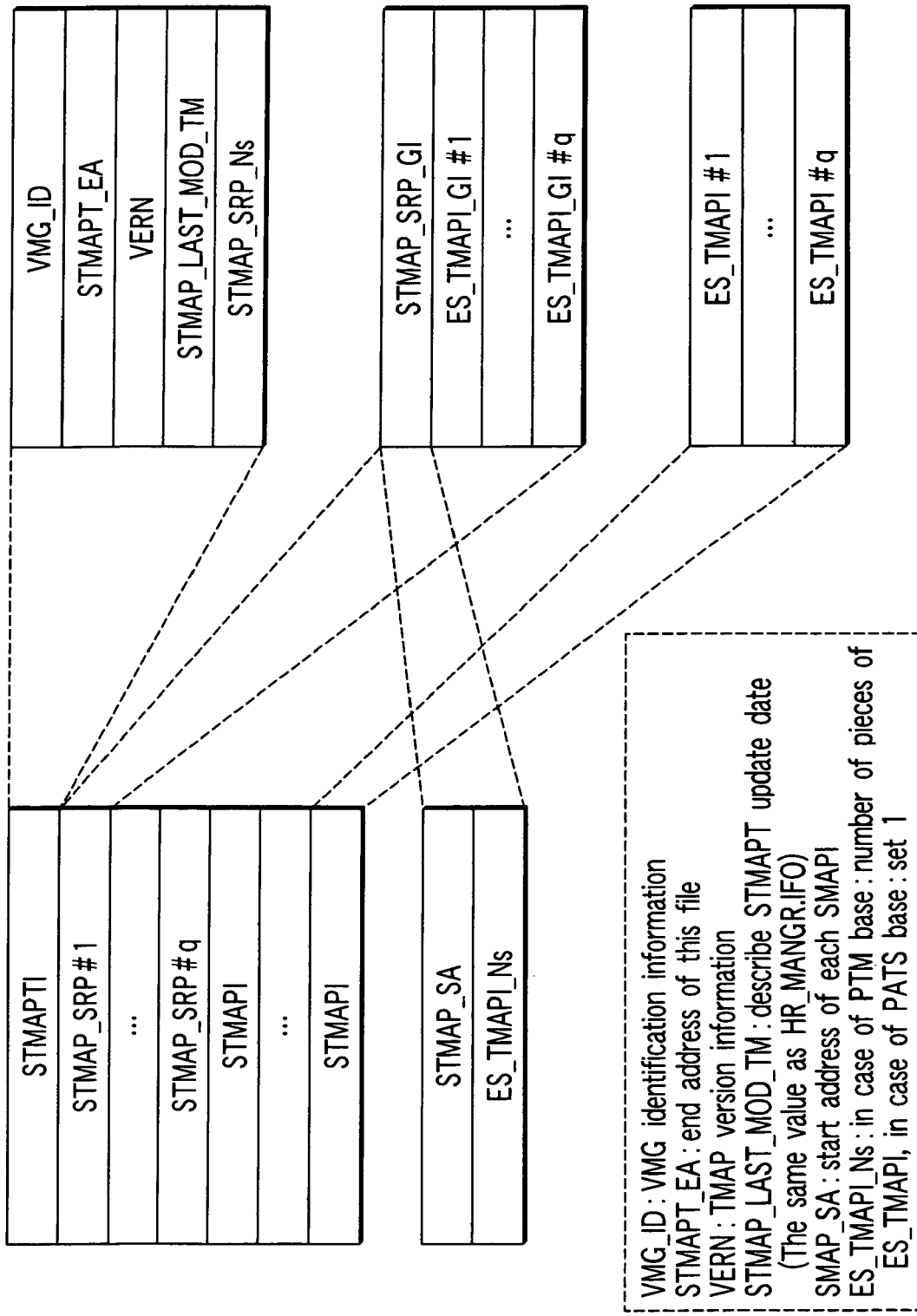
FIG. 94 is a view for explaining an example of the configuration of various kinds of information included in STMAPT in FIG. 91.

FIG. 94 is a view for explaining an example of the configuration of various kinds of information included in STMAPT in FIG. 91. Referring to FIG. 94, STMAPTI includes VMG_ID, STMAPT_EA (the end address of STMAP), VERN, and IFO_LAST_MOD_TM. Furthermore, STMAP_SRPTI includes STMAP_SRP_Ns. Each STMAP_SRP includes STMAP_SA (the start address of STMAP), ES_TMAPI_Ns (the total number of ES_TMAPs), and ES_TMAPI_GI. STMAP includes one or more ES_TMAPs.

FIG. 95 is a view for explaining an example of information stored in ES_TIMAPI_GI and ES_TMAP# included in STMAP_SRP# and STMAP in FIG. 94. ES_TMAP_GI includes SOBU_ENT_Ns (the total number of SOBU_ENTs), and each ES_TMAP includes one or more SOBU_ENTs. Note that TMAP_SRPs do not always designate TMAPs in ascending order, but SRP points to each individual TMAP. Hence, garbage data may be included among TMAPs (e.g., insignificant data may be stored between TMAP#1 and TMAP#3).

FIG. 96 is a view for explaining an example of the configuration of the contents of each SOBU_ENT in FIG. 95. Each SOBU_ENT# includes 1st_Ref_PIC_SZ 13703301, SOBU_PB_TM 13703302, SOBU_SZ 13703303, and the like.

Also, FIG. 96 is a view for explaining an example of the contents of an SOBU depending on the availability of video and audio data. There are three cases, i.e., a case wherein video data is available, a case wherein no video data is available but audio data is available, and a case of only other kinds of information. These types are respectively expressed by (1), (2), and (3). That is, there are three types of SOBU entry information (SOBU_ENT) in accordance with the aforementioned types. The following explanation will be given with reference to FIG. 96.

(1) When video data is available, SOBU entry information includes end address information (unit: LB) 1st_Ref_P IC_SZ 13703301 of the first reference picture (I-picture or the like) in an entry from the head of SoBU, SOBU playback time (the number of fields) SOBU_PB_TM 13703302, SOBU_SZ (the size expressed by the number of packet groups, i.e., the number of packet groups which belong to that SOBU) 13703303, SOBU_S_PKT_POS (the number of packets from the head of a packet group that stores the head of SOBU) 13703304, and PCR_POS 13703305.

Note that PCR_POS 13703305 indicates the position of PCR at a position indicated by PCR_POS_COUNT using the number of addresses from the head of SOBU. If no PCR is available, PCR_POS=0xffff. The number of LBs of PCR_POS 13703305 can also be expressed by PCR_POSx2^PCR_POS_SHIFT. Note that the PCR is a position of the PCR which is located several minutes indicated by the PCR interval before the reference picture position.

In this manner, in case of a time search, the SOBU at a target timing is obtained by accumulating SOBU_PB_TM 13703302, and the playback start PTM can be calculated using the number of fields from the head of that SOBU. Let K be the target SOBU that is to undergo a time search, and A be the target address. Then, A is given by aforementioned equation:

$$A = \Sigma^{k-1}_{N=1}\{SOBU\_SZ(N)\} \times 8 + 1$$

Furthermore, the first packet is indicated by the value of SOBU_S PKT_POS 13703304 to access this address.

(2) When video data is not available and audio data is available, SOBU entry information includes the end address information (the same as that described above) of the first audio frame in an entry from the head of SOBU, SOBU playback time (the number of fields), SOBU size (the same as that described above), and PCR_POS 13703305.

(3) When only other kinds of information are available, since entry information cannot be formed, all data are padded with "FF"s.

As shown in the lower column of FIG. 96, there are two different types of SOBU_ENTs of PATS base, i.e., those for respective Packets, and those for Packet Groups. If SOBU_ENTs are prepared for respective packets, an accurate address can be obtained, but the number of SOBU_ENT data increases. However, if SOBU_ENTs are prepared for respective packet groups, the number of SOBU_ENT data is small, but an address can be obtained for respective packet groups.

Each SOBU_ENT for each packet includes SOBU_SZ and SOBU_POS. SOBU_S_PKT_POS indicates the position of the head of an SOBU in a packet group by the number of packets. Each SOBU_ENT for each packet group includes SOBU_SZ, and SOB_S_PKT_POS (start position) and SOB_E_PKT_POS (end position) are fixed to zero.

FIG. 140 shows the relationship between the data structure and an actual SOBU structure. FIG. 140 shows an SOB image upon recording multi-view broadcast.

Referring to FIG. 140, SOB_TMAP_GI (see FIG. 88) in the upper column describes ADR_OFS, SOB_SZ, and SOB_E_PKT_POS as values associated with those for the entire SOB. Each of other columns indicates the contents of TMAPI for respective ES. ES_TMAPI (see FIG. 88) describes ES_ADR_S_OFS (the address (PKT_PG) from the head of the SOB to the first SOBU of this ES), ES_ADR_E_OFS (the address (PKT_PG) from the last SOBU of this ES to the end of the SOB), ES_LAST_SOBU_E_PKT_POS (the number of Packets up to the last Packet in a Packet Group of the last SOBU), SOBU_ENTN (the total number of SOBU_ENTs), default PID of this ES, and the like as values for the entire ES_TMAP. Each SOBU_ENT (see FIG. 96) in each STMAPI describes ES_SOBU_S_PKT_POS and SOBU_SZ as values which belong to the SOBU.

Furthermore, if SOB_SZ is available, ES_ADR_E_OFS is given by:

$$ES\_ADR\_E\_OFS = SOB\_SZ - \left(ES\_ADR\_S\_OFS + \sum_{N=1}^{k-1} SOBU\_SZ(N) + 1\right) \quad (2)$$

Hence, either of these addresses need only be available.

Note that SOB_SZ>ES_ADR_S_OFS, SOB_SZ>SOBU_SZ, and the like hold.

FIG. 142 shows an actual SOBU structure of PATS base.

FIG. 142 shows the structure for each Packet, and FIG. 143 shows the structure for each Group.

In case of the structure for each Packet, the upper column corresponds to an example immediately after video recording, and the lower column corresponds to an example after an edit process.

SOB_SZ=7 (Packet Groups) from a Packet Group to which the head of an SOB belongs to a Packet Group to which the end of the SOB belongs. SOBU1_SZ=2, i.e., two packet groups whose ends belong to SOBU1, and likewise, SOBU2_SZ=2, SOBU3_SZ=3, and SOBU4_SZ=1. Each SOBU_S_PKT_POS represents the difference between the division of an SOBU and that of a Packet Group by the number of Packets. Since time information is PATS base, the SOB start time is expressed by SOB_S_PATS, and the end time is expressed by SOB_E_PATS. Note that SOB_E_PATS is PATS (arrival start time) of the last Packet of the last Packet Group, and is not the last reception end time. An edit process is done for respective SOBUs, and is done by designating the playback start time (CELL_S_PATS of CELLI). Since the edit process is done for respective SOBUs, SOB_S_PATS always matches the head of each SOBU.

TM_OFS represents an actual difference between PATS of the head of an SOB and the TM range designated TM_RNG by a 27-MHz count value. Note that an example without this value is also available.

Upon executing a process for respective Packet Groups, since the division of an SOBU matches that of a Packet Group, SOBU_S_PKT_POS can be omitted. Also, SOB_S_PKT_POS and SOB_E_PKT_POS are fixed to zero.

Figure 98:
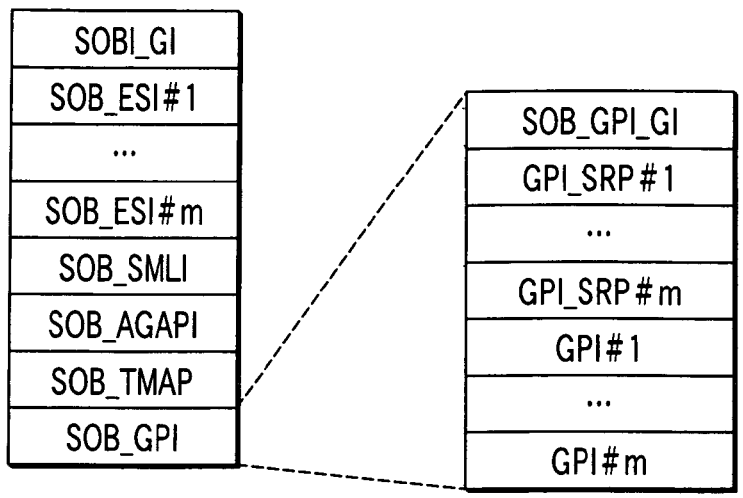
FIG. 98 is a view for explaining an example of the configuration of SOB_GPI included in SOBI# in FIG. 79 (GPI structure example 1)
Figure 99:
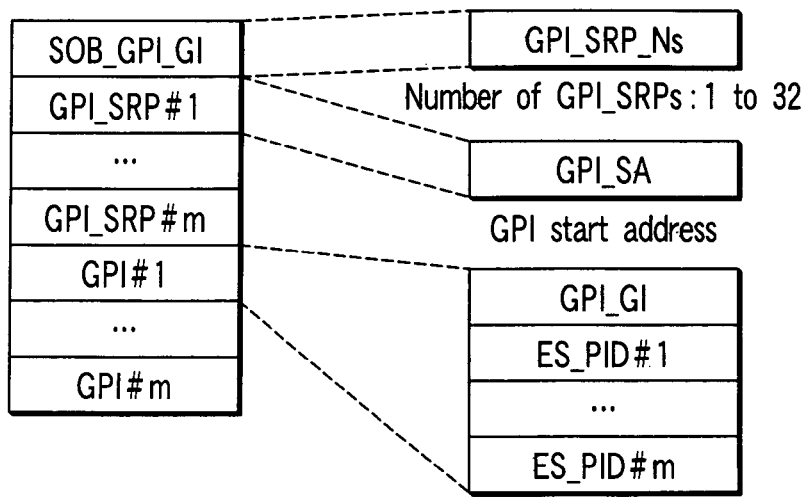
FIG. 99 is a view for explaining an example of the configuration of SOB_GPI in FIG. 98.
Figure 100:
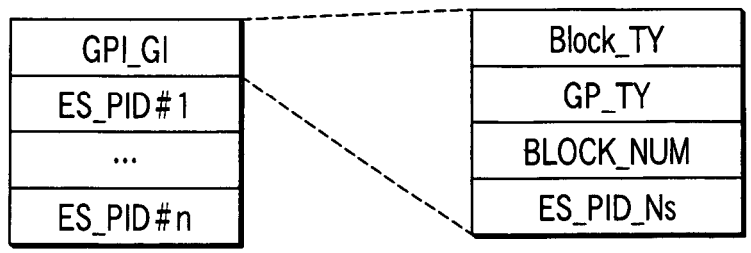
FIG. 100 is a view for explaining an example of the configuration of GPI_GI in FIG. 99.

FIGS. 98 to 100 are views for explaining an example of the configuration of SOB_ES_GPI included in SOBI# in FIG. 78 (GPI structure example 1). FIG. 99 is a view for explaining an example of the configuration of SOB_ES_GPI_GI, GPI_SRP#, and GPI# included in SOB_ES_GPI in FIG. 98 (the GPI structure of example 1). FIG. 100 is a view for explaining an example of the configuration of GPI_GI included in GPI# in FIG. 98 (the GPI structure of example 1).

SOB includes SOB_ES_GPI (SOB_ES Group Information) to support multi-view broadcast, rain attenuation broadcast, and multi-program simultaneous video recording, and two different structures are available. The first structure is shown in FIGS. 98 to 100, and GPI includes a plurality of pieces of type information, which are used to make control.

GPI includes SOB_ES_GPI_GI, GPI_SRP#, and GPI# (FIG. 98). SOB_ES_GPI_GI stores GPI_SRP_Ns (the number of ES_GPI_SRPs) (FIG. 100). Each GPI_SRP# includes GPI_SA (the start address of GPI), and GPI_SZ (GPI size) (or PID_Ns indicating the number of PIDs may be used instead) (FIG. 99).

Each GPI# includes GPI_GI and one or more ES_PIDs (FIG. 100). GPI_GI includes ES_PID_Ns (the number of ESs of this group), BLOCK_TY (upper 4 bits: 1=multi-view broadcast, 2=rain attenuation, 3=multi-channel recording, lower 4 bits: 0=MainGP, 1=SUB), GP_TY (4 bits: 0=MainGP, 1=SUB), and BLOCK_NUM (BLOCK number: an identical BLOCK number allows switching) (FIG. 100).

Note that BLOCK_TY 132236311 specifies the type of this group, and it is determined whether groups are to be switched using an angle button or rain button (if available), or if switching is not allowed (groups cannot be freely switched if different programs are recorded at the same time). Also, the BLOCK number (BLOCK_NUM) specifies a GP to which the current group can be switched. Such information is effective if two different multi-view broadcast programs are recorded. Furthermore, when one ES belongs to a plurality of GPs, for example, an angle is switched by pressing a multi-angle button, and the current group is switched to a rain GP by a rain button when a picture is disturbed by rain. Such cases can be coped with by registering an identical ES to a plurality of GPs.

The following explanation will be given taking a practical example. FIG. 137 is a view for explaining an outline of the configuration of streams upon broadcasting a plurality of kinds of broadcast data. As one of features of digital broadcast, for example, multi-view broadcast is known. In multi-view broadcast, a plurality of videos are broadcasted at the same time (by time sharing), and the user can play back one of these videos of his or her choice. In this manner, the user can select one of a plurality of contents according to his or her favor or the like. For example, when a recorder (an apparatus to be described later or the like) receives, as one TS, streams X (main), Y, and Z as multi-view broadcast and stream U as rain attenuation broadcast that can replace X, the control must be made to allow the user to select and play back a required stream upon playback, and to freely switch among streams using a key of a remote controller or the like.

In the embodiment of the present invention, grouping information (GPI) is added to allow the user to arbitrarily select a plurality of contents (among streams).

The streams shown in FIG. 137 will be examined below. More specifically, a case will be examined below wherein broadcast information which includes streams X (MAIN), Y, and Z as multi-view broadcast and rain attenuation stream U of X are recorded. FIG. 138 shows an example which is coped with by the method according to the embodiment of the present invention. In an example of the group configuration of streams upon broadcasting a plurality of types of broadcast data (example 1), as shown in FIG. 138, GPI_SRP_Ns=5 since there are five groups X1 (for multi-view), X2 (for rain attenuation), Y, Z, and U. GPI for X1 includes BLOCK_TY=1, GP_TY=1, and BLOCK_NUM=1 since X1 corresponds to multi-angle broadcast and a main group. GPI for X2 includes BLOCK_TY=3, GP_TY=1, and BLOCK_NUM=2 since X2 corresponds to rain attenuation broadcast and a main group. GPI of Y includes BLOCK_TY=1, GP_TY=2, and BLOCK_NUM=1 since Y corresponds to only a sub-group of multi-view broadcast. GPI of Z includes BLOCK_TY=1, GP_TY=2, and BLOCK_NUM=1 since Z corresponds to only a sub-group of multi-view broadcast. GPI of U includes BLOCK_TY=3, GP_TY=2, and BLOCK_NUM=2 since U corresponds to only a sub-group of rain attenuation broadcast.

For this reason, upon playback, GPI whose playback is in progress is checked depending on the type of a pressed remote controller key (multi-angle key in case of multi-view broadcast) to determine if that GPI includes BLOCK_TY of that target type. If such BLOCK_TY is included, a GP with the same number as the BLOCK_NUM assigned to that GP_TY and the same BLOCK_TY is searched. If the GP is found, a process for switching the current GP to that GP is executed.

If broadcast data always has only one GP_TY, a method of describing only GP_TY without any BLOCK_NUM, and switching GPs between those with identical GP_TY may be used as a modification of the method according to the embodiment of the present invention.

In this way, by preparing TMAP for each video stream corresponding to a GP, TMAP for each GP can be provided. Note that GPs (example: main groups of rain attenuation and multi-view) which share a video stream use the same TMAP.

FIG. 101 is a view for explaining an example of the configuration of PGC information (ORG_EX_PGC information and EX_playlist information/UD_EX_PGCT information) included in HDVR_MG in FIG. 78. Original PGC information ORG_EX_PGCI 11331 is stored in EX program chain information 1330. EX playlist information (or user-defined information table information) 1340 includes user-defined PGC table information UD_EX_PGCTI 1341 and one or more UD_EX_PGC_SRP#1 to. UD_EX_PGC_SRP#r 1342, and one or more pieces of user-defined PGC information UD_EX$_{13}$ PGCI#1 to UD_EX_PGCI#s 1343.

PGC information as playback information has the same format as a normal VR format, and ORG_PGC information 1331 is automatically generated by an apparatus (recorder) upon video recording and is set in the order of video recording. UD_PGC information 1341 is generated according to a playback order which is freely added by the user, and is called a playlist (PL). These two formats (original PGC information and playlist) have a common format in PGC level, and FIG. 102 shows that PGC format.

Figure 102:
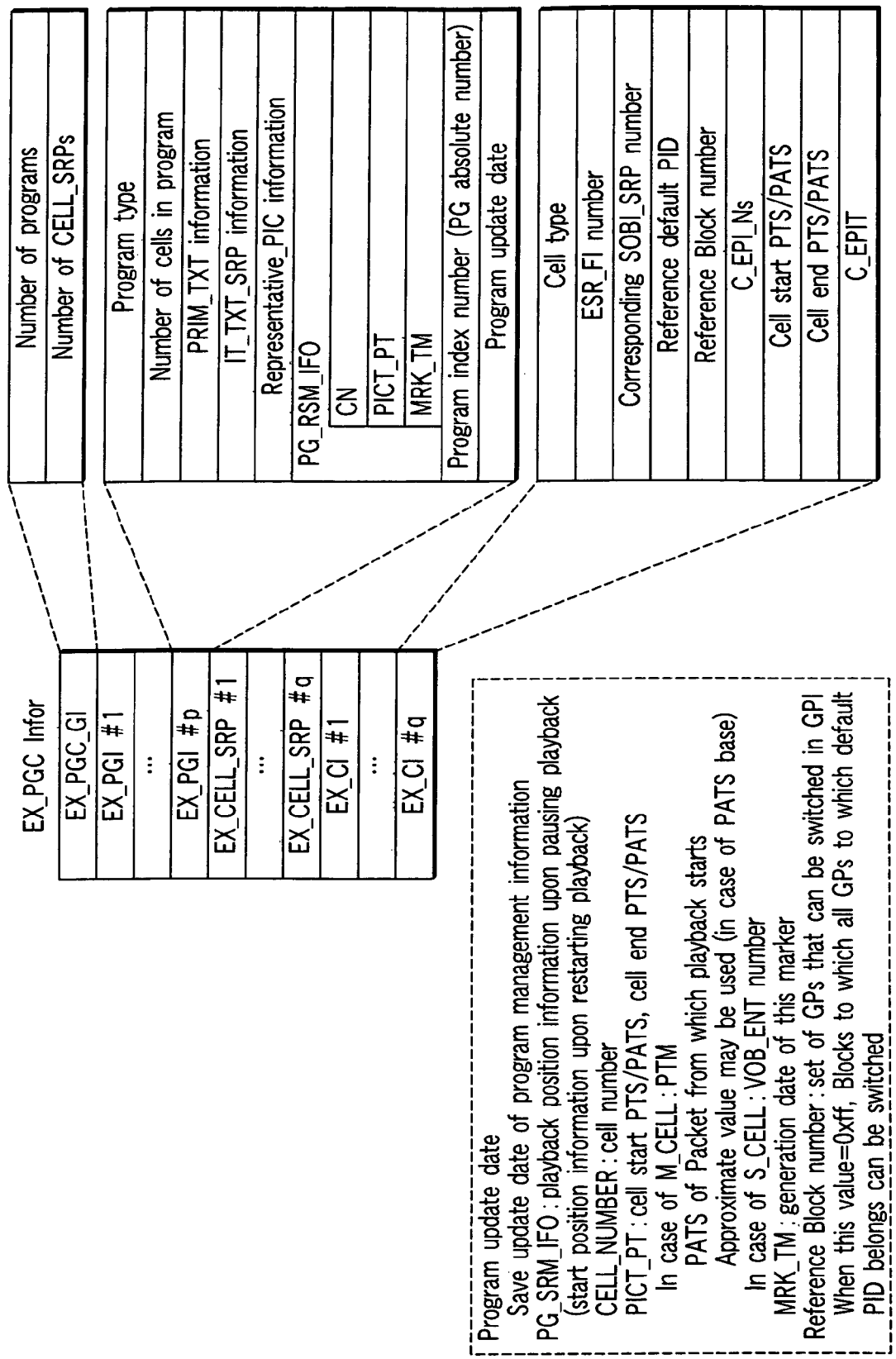
FIG. 102 is an explanatory view showing an example of the configuration of PGC information in FIG. 101.

FIG. 102 is a view for explaining an example of the configuration of EX_PGC information shown in FIG. 101. EX_PGC information (original PGCI) 1331 includes its general information EX_PGC_GI 1335, one or more pieces of program information EX_PGI #1332, one or more cell search pointers EX_CELL_SRP #1333, and one or more pieces of cell information EX_CI #1334.

Note that PG information (EX_PGI#) 1332 saves update date information 13328 of this PG. This information can identify when this PG was edited. A program name as text information uses PRM_TXT 13323, and an IT_TXT field saves other kinds of information (director name, leading actor name, . . . ) to save other kinds of text information. This PGI is set with SRP number 13324 of the IT_TXT field which saves these kinds of information to establish a link. Furthermore, a PG number is set in IT_TXT data. Note that the PG number is an absolute number from the beginning of recording on this disc, and is an index number which remains unchanged even after other PGs are deleted.

Furthermore, the PG includes RSM_MRKI to assure a resume marker (a marker indicating the last playback position upon interrupting playback) for each program. As information used to resume playback, a CELL number, playback start PTM or PATS, and date information upon preparing that marker are set. This marker is also used for title resume.

In order to use MNFI 13329 which is assured to implement functions unique to each manufacturer, the SRP number of such MNFI is set in PGI. Also, the PG number is set in the MNFI information to link with data in MNFI information.

Furthermore, PG update date information is set in both MNF$_1$ and IT_TXT. By checking if two times match upon displaying a menu, whether or not the contents have been edited by another manufacturer can be verified.

Moreover, in CELL information (EX_CI#) 1334, an SOB type is added to CELL type 13341 to designate an SOB number, start time, end time, and GP number to be played back (or SUB-GP number to be played back). Note that the start and end times can be expressed by either of two methods, i.e., PTS units (playback time) and PATS units (transfer time).

When a time is designated by a playback time (real time upon playback), the same access method as in the conventional VR is allowed, and the user can designate a desired access position using a playback time. Hence, a user's desire can be perfectly reflected. However, this method can be designated only when the stream contents can be sufficiently cognizable. If the contents cannot be sufficiently cognizable, a time must be designated using a transfer time. (That is, if a time is designated using a playback time in such case, playback cannot always be started from the head of I-picture data.) If a frame at the playback start position is not I-picture, decoding starts from immediately preceding I, and display starts when the target frame is decoded, thus presenting a picture to the user as if playback were started from the designated frame.

As for a reference ID, a method of setting the PID (or component tag value) of a representative one of streams to be played back, and a method of setting the ID of a component group in case of multi-view TV or the like are available. Also, a method of inputting a reference Block number to switch within a Block is also available.

Unique ID numbers are assigned to PG and CELL data, so that PG and CELL data can be designated using numbers which remain unchanged even when middle PG and CELL data are deleted. CELL data is set with the STR_FI number and SOB number to be played back.

Figure 103:
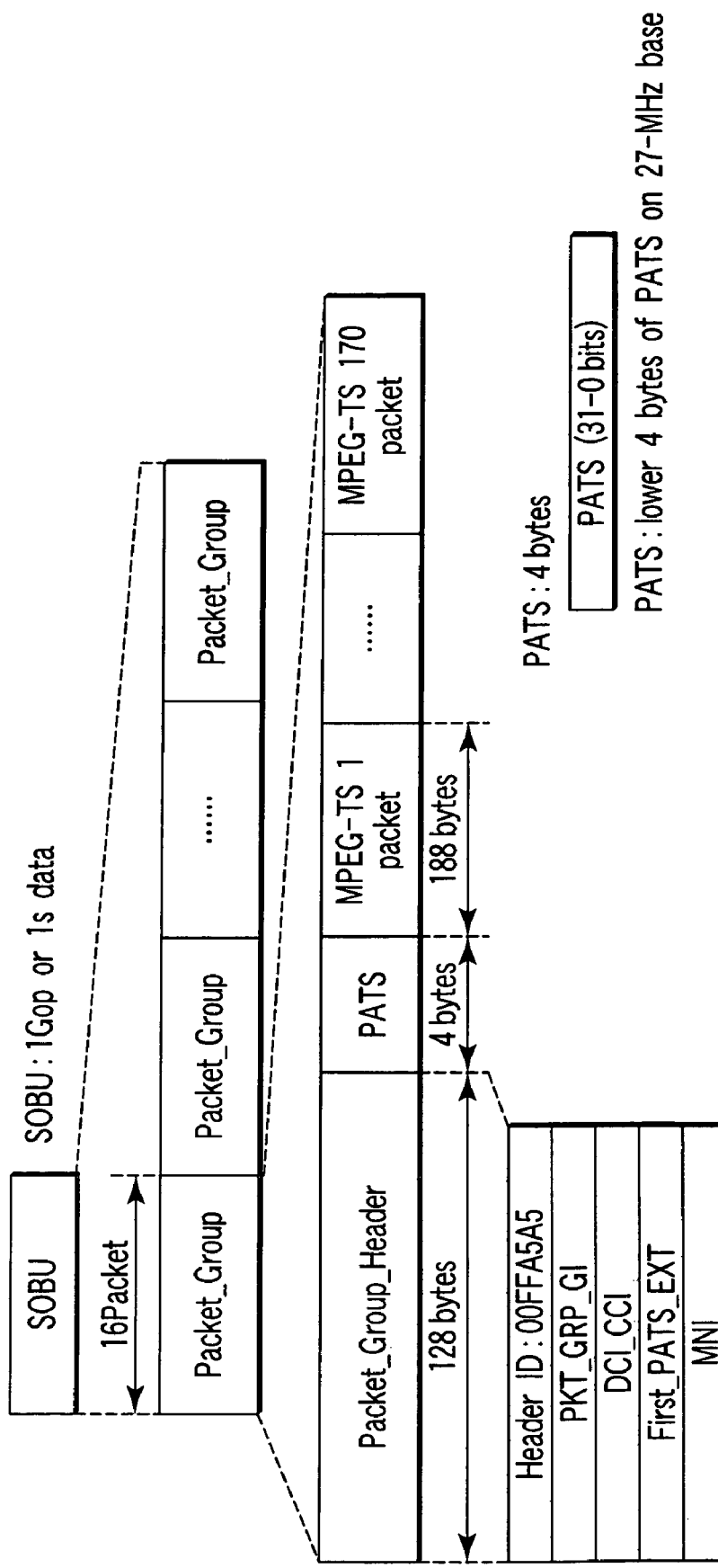
FIG. 103 is an explanatory view showing an example of the configuration of a packet group header included in SOBU.

FIG. 103 is a view for explaining an example of the configuration of the stream object data unit (SOBU) shown in FIG. 72 or 73. One SOBU includes one or more packet groups (Packet_Groups), each of which includes, e.g., 16 packs (1 pack=1 sector: 2048 bytes).

Each packet group includes a packet group header (Packet_Group_Header; e.g., 128 bytes), one or more (170 in this case) packet arrival time PAT (4 bytes) data, and one or more (170 in this case) MPEG-TS packets (188 bytes) 162 as many as the PAT data.

Each MPEG-TS packet has PATS data to be paired at its head position, and this PATS allows to detect the arrival time of each MPEG-TS (at the apparatus) by the upper 4 bytes of this PATS data and the upper 2 bytes of PATS data of the Packet Header.

The packet group header (Packet_Group_Header) includes header identification information (Header ID) 00FFA5A5 (sync pattern), packet group general information (PKT_GI), display control information (DCI) and copy generation management information (or copy control information CCI), and manufacturer's information (MNI) (or manufacturer's information MNFI).

The PATS data includes 6 bytes (48 bits), and is, e.g., a 27-MHz count value. Each MPEG-TS packet includes 4-byte header 170 and an adaptation field and/or payload. Note that header 170 includes information such as sync byte 171, a transport error indicator, payload unit start indicator, transport priority, packet identifier (PID), transport scramble control, adaptation field control, continuity index, and the like.

FIG. 104 shows the configuration of PKT_GRP_GI included in the packet group header shown in FIG. 103. PKT_GRP_TY indicates the type of packet group: an MPEG_TS packet group when it is 01, or other when it is other than 01. VERSION indicates the version number of a packet group: version 1 (Ver1) when it is 10, or version 1.1 (Ver1.1) when it is 11. For example, the version number of a DVD book is used. PKT_GRP_SS indicates status of this packet group.

Note that status information uses, e.g., 1 byte, which includes ERR (1 bit) indicating if any error has occurred from reception until recording, and STUF (1 bit) indicating if a packet group is not full of packets, but undergoes stuffing. Also, WRAP (1 bit) which is used to set 1 when the transfer time information (PATS) reaches the end in this packet group and starts from zero is assured. Furthermore, DISCON (discontinue; 1 bit) indicating if discontinuity between playback times has occurred is assured.

Moreover, PKT_GRP_GI includes an information area of Valid_Packet_Ns indicating the number of valid packets.

Figure 105:
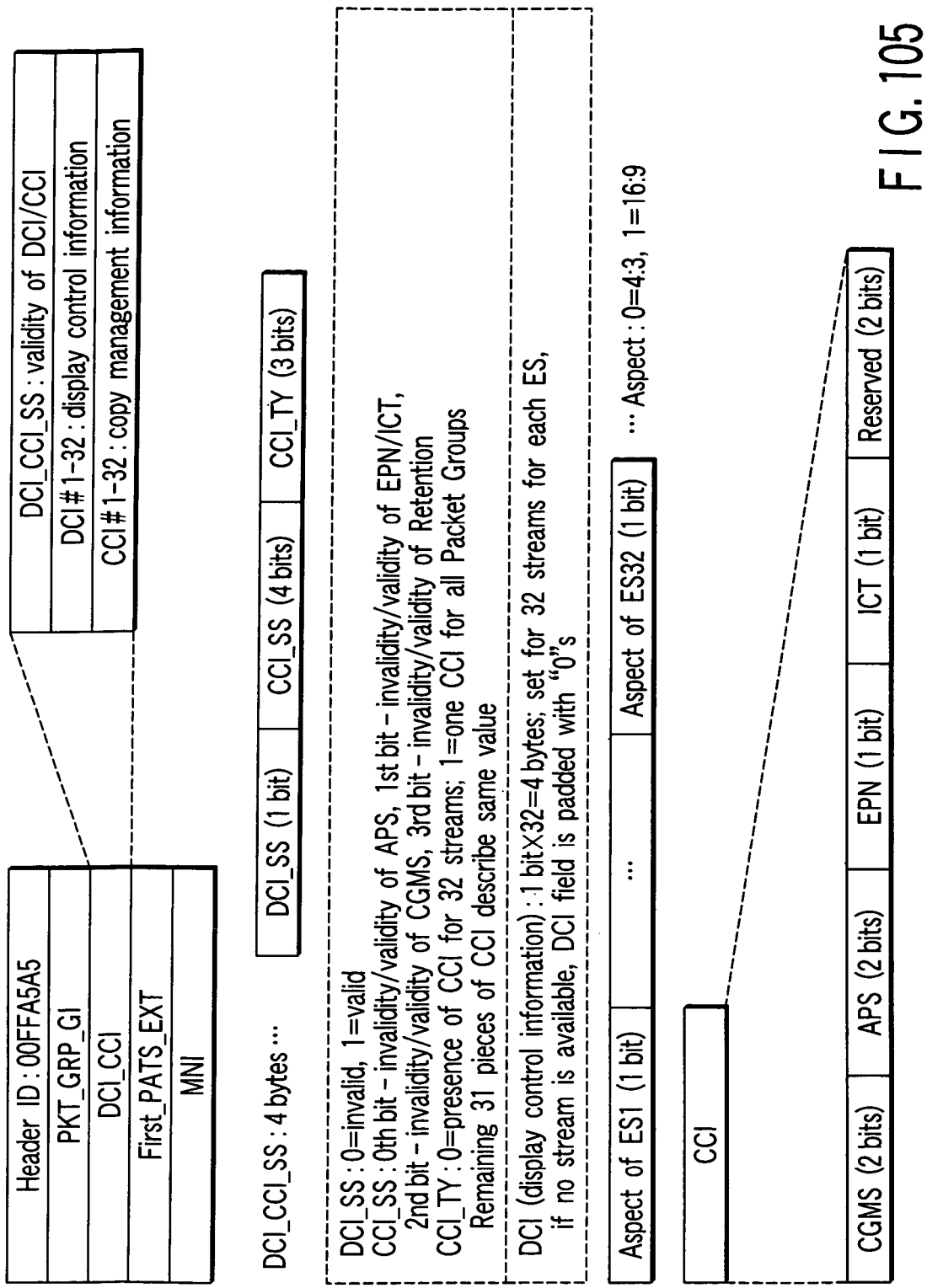
FIG. 105 is an explanatory view showing an example of the configuration of copy control information included in the packet group header in FIG. 103.

FIG. 105 is a view for explaining an example of the configuration of DCI_CCI included in the packet group header shown in FIG. 103. Validity information (DCI_CCI_SS) has 1 byte: 1-bit DCI_SS data indicates invalid if it is "0"; and valid if it is "1". The 0th bit of 4-bit CCI_SS data indicates the invalidity/validity of APS; the 1st bit indicates the invalidity/validity of EPN and ICT; the 2nd bit indicates the invalidity/validity of CGMS; and the 3rd bit indicates the invalidity/validity of Retention.

Four bytes are assigned to the display control information (DCI), and DCI for 32 streams is set for each ES. If no stream is available, this DCI field is padded with "0"s. In the contents of this DCI, aspect flags ("0" indicates an aspect ratio=4:3, "1" indicates an aspect ratio=16:9) of ES1 to ES32 are allocated in turn from the head.

FIG. 105 also shows examples of the configuration of each copy control information CCI included in DCI_CCI in FIGS. 103 and 104. The copy control information (CCI) may include, with the same contents as those in ESI, digital copy control (00=copy never, 01=copy once, 11=copy free), analog copy control (00=no APS, 01=APS type 1, 10=APS type 2, 11=APS type 3), EPN (0=contents protection, 1=no contents protection), and ICT (Image_Constraint_Token: 0=analog video output resolution constraint, 1=no constraint).

When a change in CCI/DCI may take place in a single packet group of a single ES, that packet group is temporarily delimited, and the remaining data of the packet group are padded with dummy data to set the next packet group. In other words, an align process is executed to prevent CCI/DCI from changing in a packet group.

FIG. 106 shows the upper 2 bytes of PATS as information indicating the arrival time of the first packet in the packet group header (Packet_Group_Header). That is, FIGS. 103 to 105 show this area as a reserved area, but the present invention describes PATS (arrival time stamp) in this area. The lower 4 bytes of this information are described before each TS packet as PATS of 27-MHz base, and the upper 2 bytes are described in this area. In FIG. 106, the upper 2 bytes of PATS of, e.g., the first packet of the packet group are described.

FIG. 107 is a view for explaining an example of the configuration of MNI included in the packet group header shown in FIG. 103 (lower right box). MNI includes MNF_ID and MNF_DATA. MNF_ID is an ID which is, e.g., 32-byte data, and is determined for each individual corporation. MNF_DATA is a user data area which is freely used by each individual corporation.

In the present invention, the object management information (STR_FI) shown in FIG. 79 is provided and managed for each broadcast format. In this case, a method of managing each STR_FI as an independent file is available, as shown in FIGS. 108 to 111. In this way, since a recorder can handle only an STR_FI file of a broadcast format supported by itself, and need not handle other non-related files, STR_FI information of other methods is unlikely to be destroyed due to operation errors, bugs, and the like.

Figure 109:
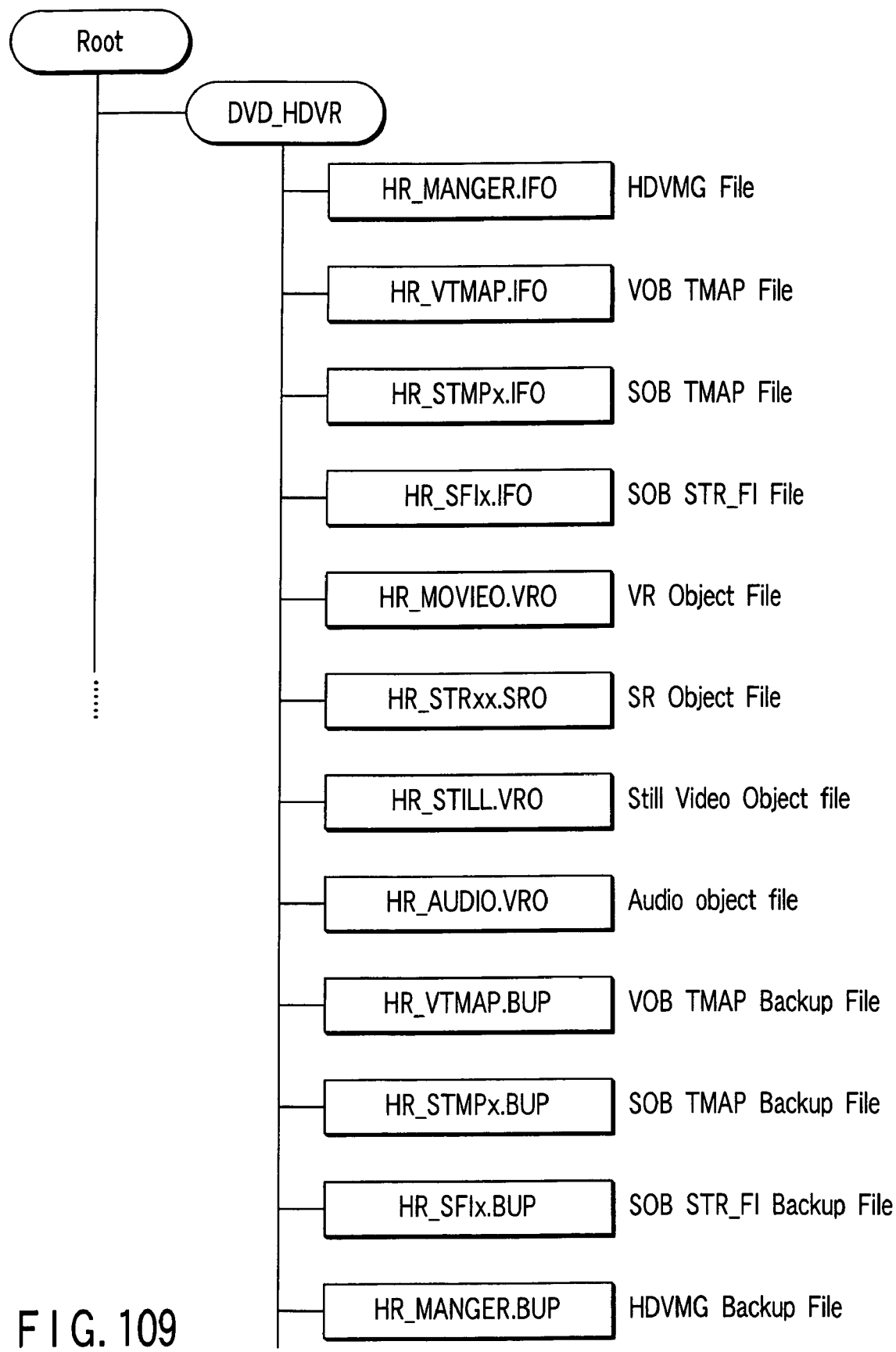
FIG. 109 is a view for explaining a file structure according to another embodiment of the present invention.
Figure 110:
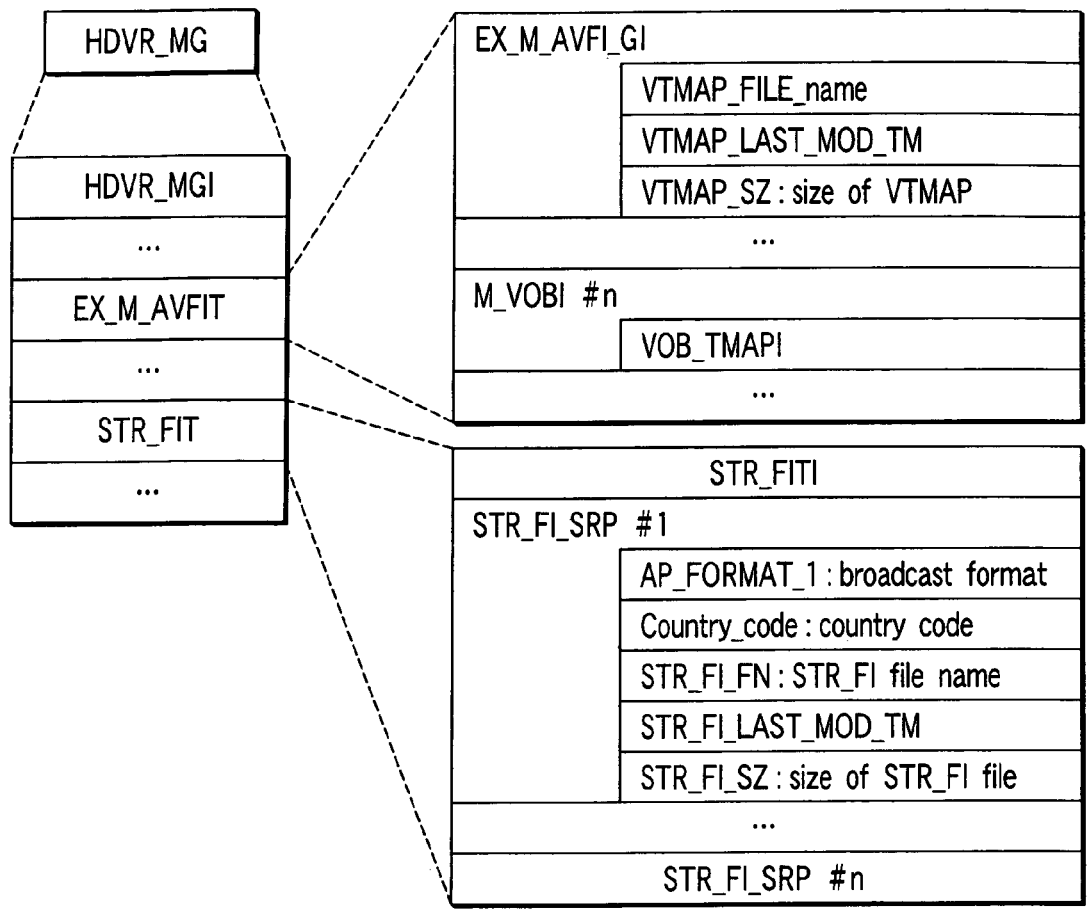
FIG. 110 is an explanatory view showing an example of the format of HDVR_MG when STR_FI according to the present invention is prepared as an independent file.

For this purpose, files to be added to the existing file configuration are HR_SFIx.IFO and HR_SFIx.BUP (x indicates that a plurality of files can exist), as shown in FIG. 109. These files are added for respective broadcast formats.

In order to designate an STR_FI file to be used, STR_FI_SRP information (FIGS. 78 and 79) is present. Each STR_FI_SRP information includes, as its structure, AP_FORMAT_1 (the same value as that in FIG. 79) as broadcast format information, a Country code (the same value as that in FIG. 79), an STR_FI file name: STR_FI_FN, STR_FI file update date information: $STR\_FI_{13}$ LAST_MOD_TM, and an STR_FI file size: STR_FI_SZ.

Note that the update date information is also set in the STR_FI file. When STR_FI has been changed in an edit process, the value of the update date information is changed. Upon playback, this value is compared with that in the STR_FI file, and if the two values are equal to each other, playback is permitted. FIG. 108 shows the relationship among management information in HDVR_VMG, STR_FI files, TMAP files, and Object files, and the corresponding files and management information are managed so that their update date information matches.

If the two values are different, it is determined that the STR_FI is changed by an apparatus which does not support the present specification, and playback or the like is inhibited.

The STR_FI file has the same configuration as that of normal STR_FI, as shown in FIG. 111.

Furthermore, in case of cognizable streams, TMAP data can be generated on PTM base. However, in case of non-cognizable streams (streams cannot be descrambled, data of a format different from that of the assumed broadcasting station is input, and so forth), TMAP data can be generated on reception time (PATS) base in place of PTM base. In this case, however, since the playback time is not used, an accurate special playback or the like cannot be done, but most of special playback processes are allowed.

Figure 112:
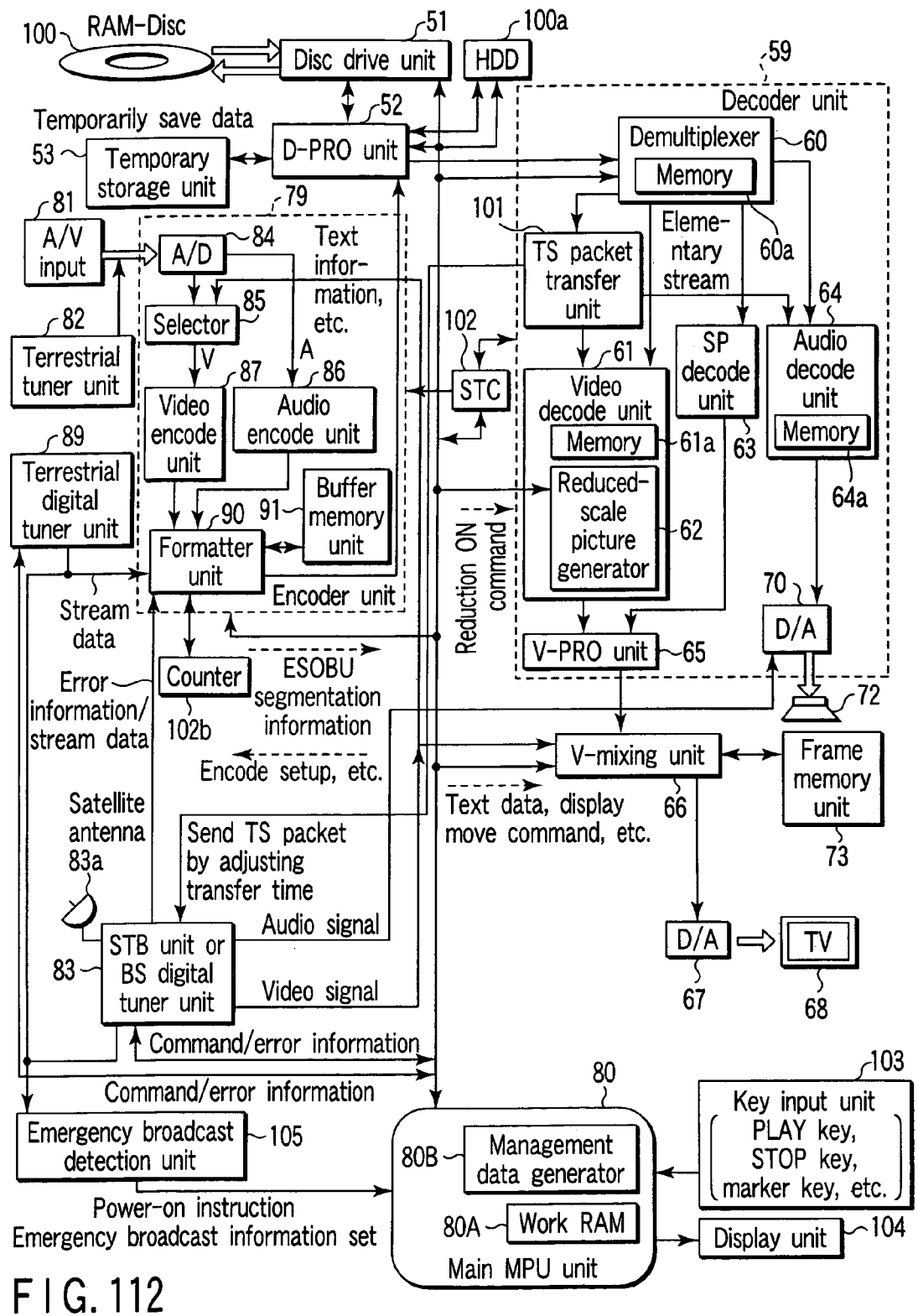
FIG. 112 is a block diagram for explaining an example of an apparatus for recording and playing back AV information (digital TV broadcast program and the like) on and from an information recording medium (optical disc, hard disc, or the like) using a data structure according to still another embodiment of the present invention.

FIG. 112 is a block diagram for explaining an example of the apparatus which records and plays back AV information (digital TV broadcast program or the like) on an information recording medium (optical disc, hard disc, or the like) using the data structure according to the embodiment of the present invention. As shown in FIG. 112, this apparatus (digital video recorder/streamer) comprises MPU unit 80, key input unit 103, display unit 104, decoder unit 59, encoder unit 79, system time counter (STC) unit 102a, data processor (D-PRO) unit 52, temporary storage unit 53, disc drive unit 51 for recording/playing back information on/from recordable optical disc 100 (e.g., a DVD-RAM or the like), hard disc drive (HDD) 100a, video mixing (V-mixing) unit 66, frame memory unit 73, analog TV D/A converter 67, analog TV tuner unit 82, terrestrial digital tuner unit 89, and STB (Set Top Box) unit 83 connected to satellite antenna 83a.

Note that STC unit 102a counts clocks on a 27-MHz basis in correspondence with PAT_Base.

STB unit 83 decodes received digital broadcast data to generate an AV signal (digital). STB unit 83 sends the AV signal to TV 68 via encoder unit 79, decoder unit 59, and D/A converter 67 in the streamer, thus displaying the contents of the received digital broadcast. Alternatively, STB unit 83 directly sends the decoded AV signal (digital) to V-mixing unit 66, and can send an analog AV signal from it to TV 68 via D/A converter 67.

The apparatus shown in FIG. 112 forms a recorder comprising both the video and stream recording functions. Hence, the apparatus comprises components which are not required in video recording, and those (AV input A/D converter 84, audio encode unit 86, video encode unit 87, and the like) which are not required in stream recording.

Encoder unit 79 includes A/D converter 84, video encode unit 87, input selector 85 to video encode unit 87, audio encode unit 86, a sub-picture encode unit (as needed although not shown), formatter unit 90, and buffer memory unit 91.

Decode unit 59 comprises demultiplexer 60 which incorporates memory 60a, video decode unit 61 which incorporates memory 61a and reduced-scale picture (thumbnail or the like) generator 62, sub-picture (SP) decode unit 63, audio decode unit 64 which incorporates memory 64a, TS packet transfer unit 101, video processor (V-PRO) unit 65, and audio D/A converter 70. An analog output (monaural, stereo, or AAC 5.1CH surround) from this D/A converter 70 is input to an AV amplifier or the like (not shown) to drive a required number of loudspeakers 72.

In order to display contents, whose video recording is in progress, on TV 68, stream data to be recorded is sent to decoder unit 59 simultaneously with D-PRO unit 52, and can be played back. In this case, MPU unit 80 makes setups upon playback in decoder unit 59, which then automatically executes a playback process.

D-PRO unit 52 forms ECC groups by combining, e.g., every 16 packs (or 32 packs or 64 kbytes), appends ECC data to each group, and sends them to disc drive unit 51. When disc drive unit 51 is not ready to record on disc 100, D-PRO unit 52 transfers the ECC groups to temporary storage unit 53 and waits until disc drive unit 51 is ready to record. When disc drive unit 51 is ready, D-PRO unit 52 starts recording. As temporary storage unit 53, a large-capacity memory is assumed since it must hold recording data for several minutes or longer by high-speed access. Temporary storage unit 53 may be assured by using a given area of HDD 100a. Note that MPU unit 80 can make read/write access to D-PRO unit 52 via a dedicated microcomputer bus, so as to read/write the file management area and the like.

The apparatus shown in FIG. 112 assumes optical disc 100 such as DVD-RAM/-RW/-R/Blue media (recordable media using blue laser) and the like as primary recording media, and hard disc drive (HDD) 100a (and/or a large-capacity memory card (not shown) or the like) as its auxiliary storage device.

These plurality of types of media can be used as follows. That is, stream recording is done on HDD 100a using the data structure (format) shown in FIGS. 72 to 111. Of stream recording contents which are recorded on HDD 100a, programs that the user wants to preserve directly undergo stream recording (direct copy or digital dubbing) on disc 100 (if copying is not inhibited by copy control information CCI). In this manner, only desired programs having quality equivalent to original digital broadcast data can be recorded together on disc 100. Furthermore, since the stream recording contents copied onto disc 100 exploit the data structure of the present invention, they allow easy special playback processes such as time search and the like, although these contents are recorded by stream recording.

A practical example of a digital recorder having the aforementioned features (a streamer/video recorder using a combination of DVD-RAM/-RW/-R/Blue media and HDD) is the apparatus shown in FIG. 112. The digital recorder shown in FIG. 112 is configured to roughly include a tuner unit (82, 83, 89), disc unit (100, 100a), encoder unit 79, decoder unit 59, and controller 80.

Satellite digital TV broadcast data is delivered from a broadcast station via a communication satellite. The delivered digital data is received and played back by STB unit 83. This STB 83 expands and plays back scrambled data on the basis of a key code distributed from the broadcast station. At this time, scramble from the broadcast station is descrambled. Data is scrambled to prevent users who are not subscribers of the broadcast station from illicitly receiving broadcast programs.

In STB unit 83, the broadcast digital data is received by a tuner system (not shown). When the received data is directly played back, it is descrambled by a digital expansion unit and is decoded by an MPEG decoder unit. Then, the decoded received data is converted into a TV signal by a video encoder unit, and that TV signal is externally output via D/A converter 67. In this manner, the digital broadcast program received by STB unit 83 can be displayed on analog TV 68.

Terrestrial digital broadcast data is received and processed in substantially the same manner as satellite broadcast data except that it does not go through any communication satellite (and is not scrambled if it is a free broadcast program). That is, terrestrial digital broadcast data is received by terrestrial digital tuner unit 89, and the decoded TV signal is externally output via D/A converter 67 when it is directly played back. In this way, a digital broadcast program received by terrestrial digital tuner unit 89 can be displayed on analog TV 68. Terrestrial analog broadcast data is received by terrestrial tuner unit 82, and the received analog TV signal is externally output when it is directly played back. In this way, an analog broadcast program received by terrestrial tuner unit 82 can be displayed on analog TV 68.

An analog video signal input from external AV input 81 can be directly output to TV 68. Also, after the analog video signal is temporarily A/D-converted into a digital signal by A/D converter 84, and that digital signal is then re-converted into an analog video signal by D/A converter 67, that analog video signal may be output to the external TV 68 side. In this way, even when an analog VCR playback signal that includes many jitter components is input from external AV input 81, an analog video signal free from any jitter components (that has undergone digital time-base correction) can be output to the TV 68 side.

A bitstream (MPEG-TS) input from satellite digital broadcast or terrestrial digital broadcast can undergo stream recording in stream object group recording area 131 (see FIG. 72(d)) of disc 100 (and/or HDD 100a) as stream object 132 in FIG. 72(e). An analog video signal from terrestrial analog broadcast or AV input 81 can undergo video recording on VR object group recording area 122 (see FIG. 72(d)) of disc 100 (and/or HDD 100a).

Note that the apparatus may be configured to temporarily A/D-convert an analog video signal from terrestrial analog broadcast or AV input 81 into a digital signal, and to make stream recording of the digital signal in place of video recording. Conversely, the apparatus may be configured to make video recording of a bitstream (MPEG-TS) input from satellite digital broadcast or terrestrial digital broadcast (after it undergoes required format conversion) in place of stream recording.

Recording/playback control of stream recording or video recording is done by firmware (control programs and the like corresponding to operations shown in FIGS. 113 to 141 to be described later) written in a ROM (not shown) of main MPU unit 80. MPU unit 80 has management data generation unit 80B for stream recording and video recording, generates various kinds of management information using work RAM 80A as a work area, and records the generated management information on AV data management information recording area 130 in FIG. 72(d) as needed. MPU unit 80 plays back management information recorded on AV data management information recording area 130, and executes various kinds of control (FIGS. 113 to 141) on the basis of the played back management information. Note that the manufacturer ID information and the like of the apparatus shown in FIG. 112 can be written on the ROM (not shown) of MPU unit 80.

The features of medium 100 (100a) used in the apparatus of FIG. 112 will be briefly summarized below. That is, this medium has management area 130 and data area 131. Data is separately recorded on the data area as a plurality of object data (SOB), and each object data includes a group of data units (SOBU). One data unit (SOBU) includes packet groups each of which is formed by converting an MPEG-TS compatible digital broadcast signal into TS packets and packing a plurality of packets. On the other hand, management area 130 has PGC information (PGCI) as information used to manage the playback sequence. This PGC information includes cell information (CI). Furthermore, management area 130 has information used to manage object data (SOB).

The apparatus shown in FIG. 112 can make stream recording on medium 100 (100a) with the above data structure in addition to video recording. In this case, in order to extract program map table PMT and service information SI from a TS packet stream, MPU unit 80 has a service information extraction unit (not shown; firmware that forms management data generation unit 80B). Also, MPU unit 80 has an attribute information generation unit (not shown; firmware that forms management data generation unit 80B) that generates attribute information (PCR_pack number, PCR_LB count number, and the like) on the basis of information extracted by the service information extraction unit.

In the apparatus shown in FIG. 112, the flow of signals upon recording are, for example, as follows. That is, TS packet data received by STB unit 83 (or terrestrial digital tuner 82) are packed into packet groups by formatter unit 90 and the packet groups are saved on a work area (buffer memory unit 91). When the saved packet groups reach a predetermined size (for one or an integer multiple of CDA size), they are recorded on disc 100. As the operations to be executed at that time, upon reception of TS packets, a group is formed every 170 packets, and a packet group header is generated.

The arrival times of TS packets are counted by a PATS counter, and are buffered at the head of each of TS packets. This counter 102b finely adjusts count intervals based on an SCR (system clock reference), but never loads an SCR value unlike the STC (system time clock) unit 102a.

As the operations to be executed at that time, upon reception of TS packets, a group is formed every 170 packets, and a packet group header is generated. In this case, the upper 2 bytes of PATS data of the first packet of the Packet Group are stored in the header, and only the lower 4 bytes of each of other PATS data are saved together with the corresponding TS packet (before the TS packet).

On the other hand, an analog signal input from terrestrial tuner 82 or line input is converted into a digital signal by A/D converter 84. That digital signal is input to respective encoder units 86 and 87. That is, a video signal is input to video encode unit 87, an audio signal is input to audio encode unit 86, and text data of, e.g., teletext broadcasting is input to an SP encode unit (not shown). The video signal is compressed by MPEG, the audio signal is compressed by AC3 or MPEG audio, and the text data is compressed by runlength coding.

Each of encoder units 86 and 87 packs compressed data (or segments into blocks) to form 2084-byte packets (or blocks) and inputs them to formatter unit 90.

Formatter unit 90 multiplexes the packets (or blocks) as a program stream, and sends that stream to D-PRO unit 52.

D-PRO unit 52 forms ECC blocks for every 16 or 32 packets (16 or 32 blocks), appends error correction data to them, and records the ECC packets (or blocks) on disc 100 via disc drive unit 51.

When disc drive unit 51 is busy due to seek, track jump, and the like, data are stored in HDD buffer unit 100a, and wait until disc drive unit 51 is ready. Furthermore, formatter unit 90 generates segmentation information during video recording, and periodically sends it to MPU unit 80 (GOP head interrupt or the like). The segmentation information includes the number of packs (or the number of LBs) of VOBU (SOBU), the end address of I-picture data from the head of VOBU (SOBU), the playback time of VOBU (SOBU), and the like.

In the flow of signals upon playback, data are read out from disc 100 by disc drive unit 51, undergo error correction by D-PRO unit 52, and are then input to decode unit 79. MPU unit 80 determines the type of input data (i.e., VR or SR data) (based on cell type), and sets that type in decoder unit 59 before playback.

In case of SR data, MPU unit 80 determines PMT_ID to be played back based on cell information CI to be played back, determines the PIDs of items (video, audio, and the like) to be played back based on that PMT, and sets them in decoder unit 59. In decoder unit 59, demultiplexer 60 sends TS packets to respective decode units 61, 63, and 64 based on the PIDs. Furthermore, the TS packets are sent to TS packet transfer unit 101, and are transmitted to STB unit 83 in the form of TS packets. The respective decode units execute decoding, and decoded data are converted into an analog signal by D/A converters 67 and 70, thus making video display on TV 68 and audio output via loudspeakers 72. In case of VR data, demultiplexer 60 sends data to respective decode units 61, 63, and 64 according to the fixed IDs. Respective decode units 61, 63, and 64 execute decoding, and decoded data are converted into an analog signal by D/A converters 67 and 70, thus making video display on TV 68 and audio output via loudspeakers 72.

Upon playback, pack data read out from disc 100 are interpreted by demultiplexer 60. Packs that store TS packets are sent to TS packet transfer unit 10-1, and are then sent to the decoders, thus playing back data. When pack data are transferred to STB 83 (or are transmitted to an external apparatus such as a digital TV or the like), TS packet transfer unit 101 transfers only TS packets at the same time intervals as they arrived. STB unit 83 makes decoding to generate an AV signal, which is displayed on TV 68 via the video encoder unit in the streamer.

An MPEG-TS scheme as a basic format common to broadcast schemes which broadcast (distribute) compressed moving picture data such as digital TV broadcast, broadcast uses a wired network such as the Internet or the like, and so on is divided into a packet management data field and payload. The payload includes data to be played back in a scrambled state. According to ARIB, a PAT (Program Association Table), PMT (Program Map Table), and SI (Service Information) are not scrambled. Also, various kinds of management information can be generated using the PMT and SI (SDT: Service Description Table, EIT: Event Information Table, BAT: Bouquet Association Table).

The contents to be played back include MPEG video data, Dolby (registered mark; the same applies to the following description) AC3 audio data, MPEG audio data, data broadcast data, and the like. Also, the contents include information required upon playback (e.g., PAT, PMT, SI, and the like) although they are not directly related to the contents to be played back. The PAT includes the PID (Packet Identification) of the PMT for each program, and the PMT records the PIDs of video data and audio data.

A normal playback sequence of STB (Set Top Box) 83 is as follows. That is, when the user determines a program based on EPG information, the PAT is loaded at the start time of the target program. The PID of a PMT, which belongs to the desired program, is determined on the basis of that data. The target PMT is read out in accordance with that PID, and the PIDs of video and audio packets to be played back, which are included in the PMT, are determined. Video and audio attributes are read out based on the PMT and SI and are set in respective decoders. The video and audio data are extracted and played back in accordance with their PIDs. Note that the PAT, PMT, SI, and the like are transmitted at intervals of several 100 ms since they are used during playback.

FIG. 113 is a flowchart (overall operation process flow) for explaining an example of the overall operation of the apparatus shown in FIG. 112. In this case, data processes include five different processes, i.e., a video recording process, playback process, data transfer process (a digital output process to the STB or the like), program setting process, and edit process, as shown in FIG. 113.

For example, when the power switch of the apparatus in FIG. 112 is turned on, MPU unit 80 makes initial setups (upon factory shipment or after user's setups) (step ST10). MPU unit 80 also makes display setups (step ST12) and waits for a user's operation. If the user has made a key input from key input unit 103 (step ST14), MPU unit 80 interprets the contents of that key input (step ST16). The following five data processes are executed as needed in accordance with this input key interpretation result.

That is, if the key input is, for example, a key operation made to set timer program recording, a program setting process starts (step ST20). If the key input is a key operation made to start video recording, a video recording process starts (step ST22). If the key input is a key operation made to start playback, a playback process starts (step ST24). If the key input is a key input made to output digital data to the STB, a digital output process starts (step ST26). If the key input is a key operation of an edit process, the edit process starts (step ST28).

The processes in steps ST20 to ST28 are parallelly executed as needed for respective tasks. For example, the process for outputting digital data to the STB (ST26) is parallelly executed during the playback process (ST24). Or a new program setting process (ST20) can be parallelly executed during the video recording process (ST22) which is not timer program recording. Or by utilizing the feature of disc recording that allows high-speed access, the playback process (ST24) and digital output process (ST26) can be parallelly executed during the video recording process (ST22). Also, the disc edit process (step ST28) can be executed during video recording on the HDD.

FIG. 114 is a flowchart (edit operation process flow) for explaining an example of the contents of the edit process (ST28) shown in FIG. 113. When the control enters the edit process, the flow branches to one of four processes (one of A to D) in accordance with the edit contents. Upon completion of one of an entry point edit process, copy/move process, delete process, and playlist generation process, the program update date by this edit process is set in respective pieces of management information (EX_PGI, EX_IT_TXT, EX_M-NFI) (step ST284). In the playlist generation process, an initial value is set in playlist resume information (PL_RSM_INFO). That is, a value indicating the head of a playlist is set.

When one of program information PGI, cell information CI, or VOB/SOB has been changed, this program update date may be set. When VOBI and/or SOBI have/has been changed, the edit times/time (EDIT_TIME) of the VOBI and/or SOBI can be set in SOB_EDIT_TIME (not shown) or the like.

In this connection, in the process in step ST284, the manufacturer ID of the apparatus that has made the operation in one of steps ST282A to ST282D may be set in the last editor ID (LAST_MNF_ID). Every time one of PGI, CI, and SOB (or VOB) has been changed, this editor ID can be set (or updated) to the ID information of the apparatus used at that time.

Figure 116:
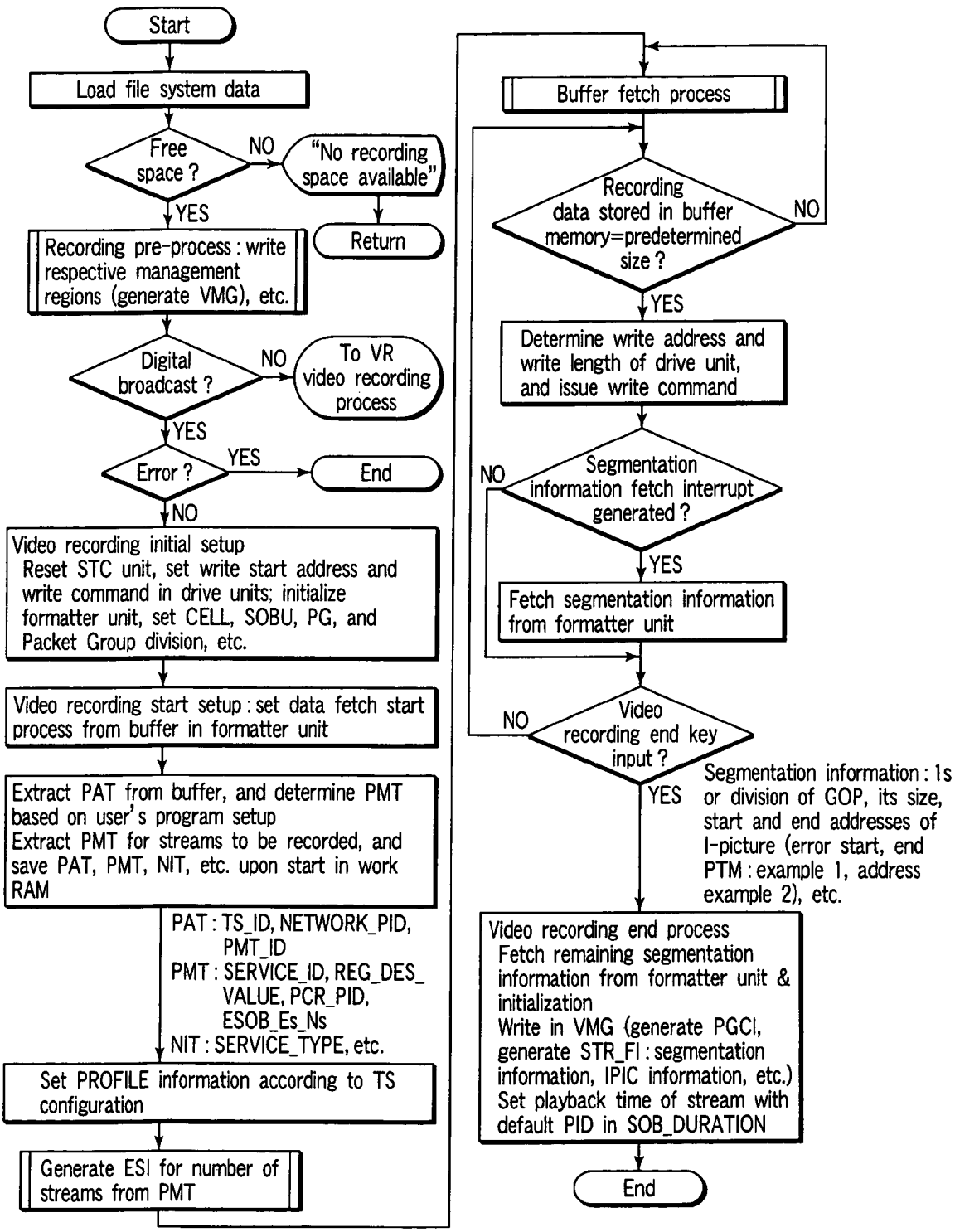
FIG. 116 is a flowchart showing an example of the video recording operation of the apparatus shown in FIG. 112.

FIG. 115 is a flowchart (initial setup process flow example 1) for explaining an example of the initial setup (ST10) shown in FIG. 113. This initial setup process is executed as follows:

a1) A disc check process is made, and if an error is found, this process ends (step ST40).

a2) If a disc is set (YES in step ST42), and if VMG is recorded, VMG is read (step ST44).

a3) Profile information is extracted (step ST46), and it is checked if a region code of the information matches that of the apparatus (step ST48). If they do not match (NO in step ST48), a setup is made not to play back SOB (step ST50).

a4) If the two region codes match (YES in step ST48), option information is read, and a setup is made to operate the apparatus according to the operation table shown in FIG. 116 (step ST52).

Figure 123:
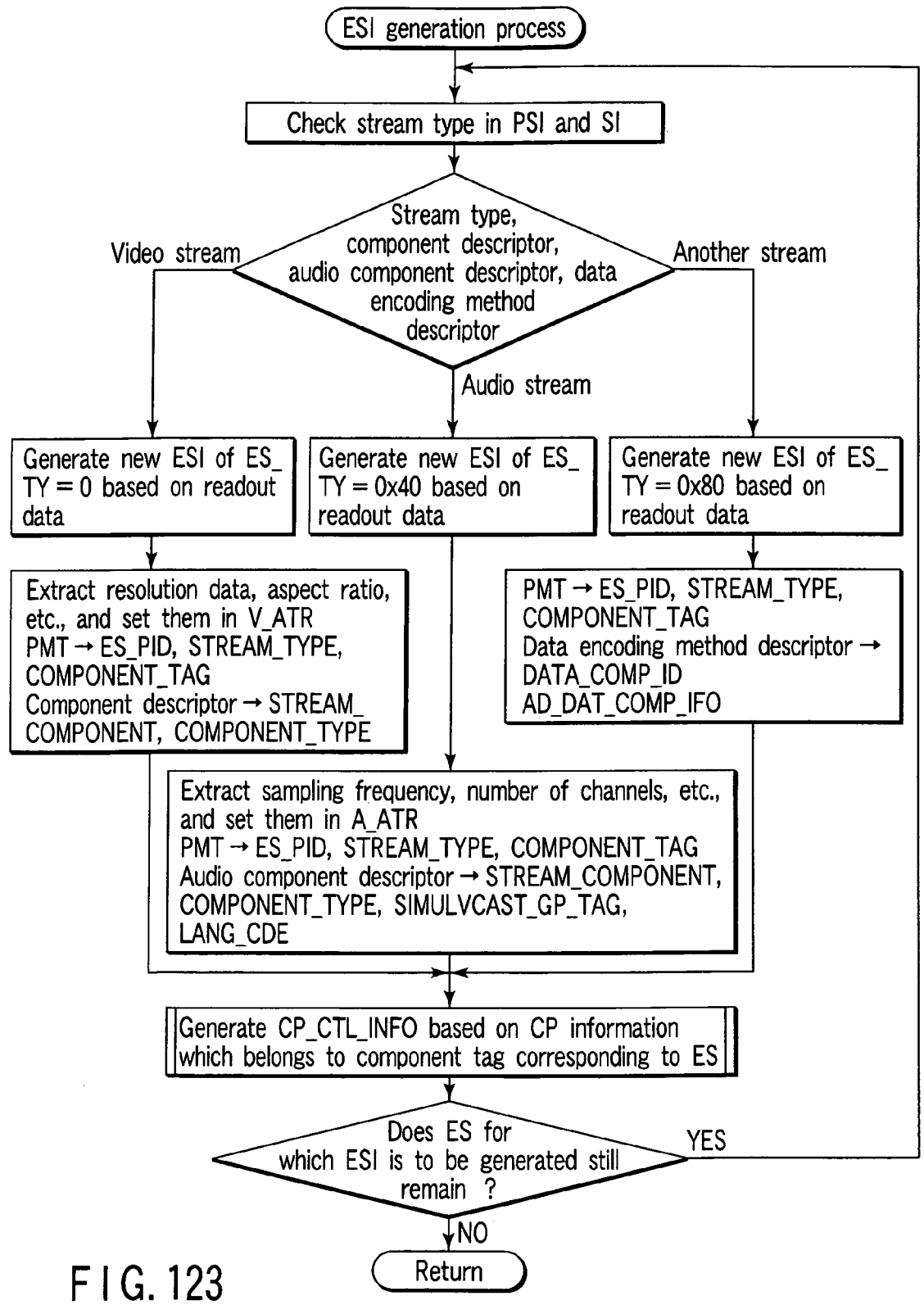
Figure 124:
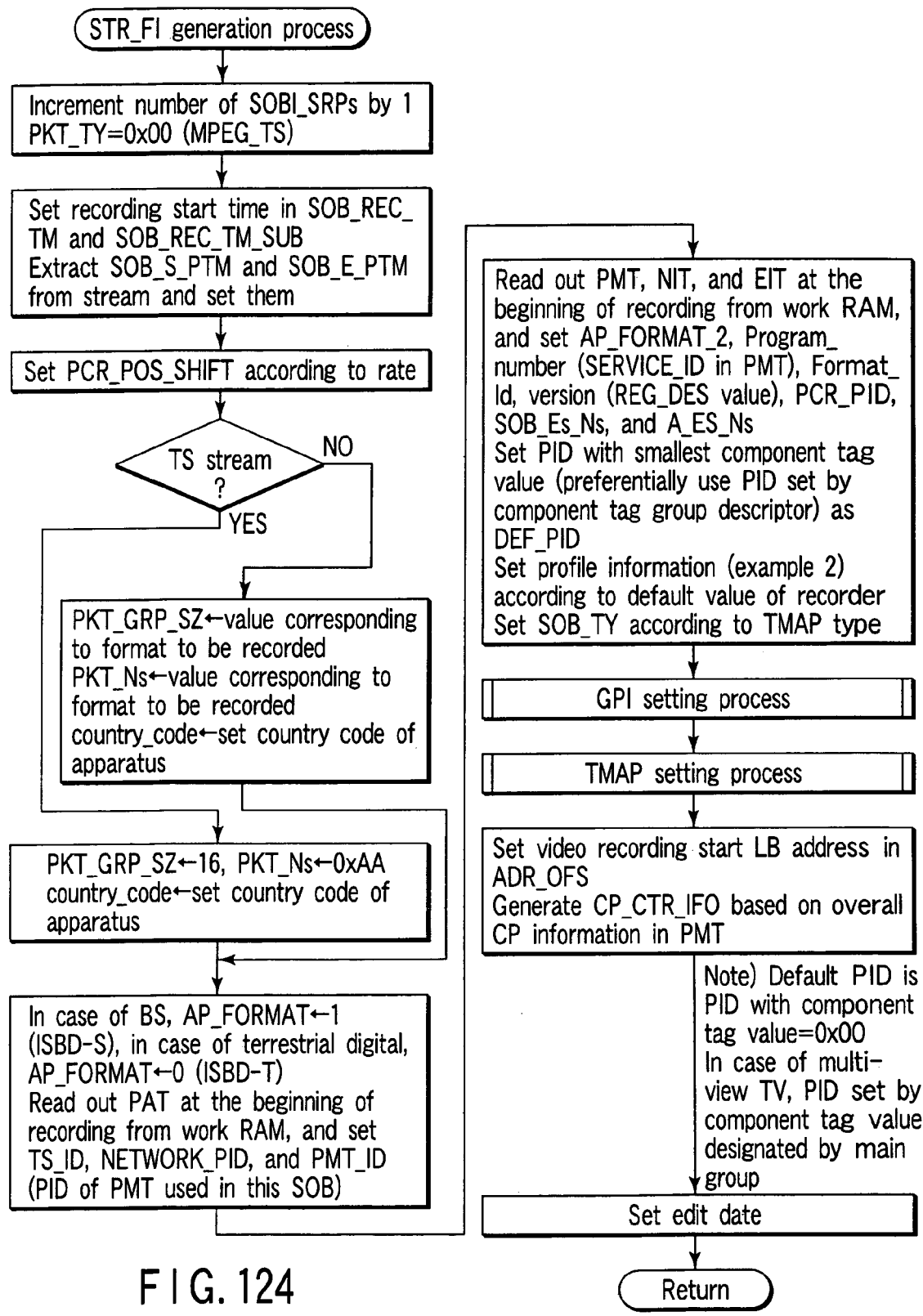

FIG. 116 is a flowchart for explaining the video recording operation of the apparatus in FIG. 112. The data process upon stream video recording is executed as follows (see FIGS. 116 to 129).

b1) A program to be recorded is determined using EPG (Electronic Program Guide) in the program setting process, reception of that program starts, and the determined program is recorded.

b2) Upon reception of a recording command from key input unit 103, MPU unit 80 loads management data from disc drive unit 51 and determines a write area. At this time, the MPU unit checks the file system to determine whether or not recording can be proceeded. If recording can be proceeded, the MPU unit determines a recording position; otherwise, a message that advises accordingly is displayed for the user, thus aborting the recording process (END).

b3) If data to be recorded is digital broadcast data, and if no error is found, contents of the management area are set to write data in the determined area, and the write start address of video data is set in disc drive unit 51, thus preparing for data recording (video recording initial setup).

b4) The time of STC unit 102*a* is reset. Note that STC unit 102*a* is a system timer, and recording/playback is done with reference to the count value of this timer.

b5) The PAT of a program to be recorded is loaded to determine the PID required to fetch the PMT of the target program. Then, the target PMT is loaded to determine the PIDs of data (video, audio) to be decoded (to be recorded). At this time, the PAT and PMT are saved in work RAM 80A of MPU unit 80, and are written in the management information. VMG file data is written in the file system, and required information is written in VMGI.

b6) Video recording setups are made in respective units. At this time, a segmentation setup of data and a reception setup of TS packets are made in formatter unit 90. Also, the PID of data to be recorded is set to record only a target video stream. Furthermore, buffer 53 is set to start holding of TS packets. Then, formatter unit 90 starts operation, as shown in FIG. 112.

b7) SOB_ESI is generated based on the PMT (see FIG. 123).

b8) If data stored in the buffer reaches a predetermined size, an ECC process is done via D-PRO unit 52, thus recording the data on disc 100.

b9) During video recording, segmentation information is saved in work RAM 80A of MPU unit 80 periodically (before buffer RAM 91 of formatter unit 90 becomes full of data). The segmentation information to be saved is that of SOBUs, i.e., the SOBU start address, SOBU pack length, I-picture end address, the Packet arrival time (PATS), and the like may be saved.

b10) It is checked if video recording is to end (if the user has pressed a video recording end key or if no recordable space remains). If video recording is to end, remaining segmentation information is fetched from formatter unit 90, and is added to work RAM 80A. These data are recorded in management data (VMGI), and the remaining information is recorded in the file system.

b11) If video recording is not to end, the control returns to b7) to continue the data fetch and playback processes.

In order to display data on the TV, data is sent to the decoder unit simultaneously with the D-PRO unit, thus playing back data.

In this case, the MPU unit makes a setup upon playback in the decoder unit and, after that, the decoder automatically executes a playback process.

The D-PRO unit forms ECC groups by combining, e.g., every 16 packs, appends ECC data to each group, and sends them to the disc drive unit. When the disc drive unit is not ready to record on the disc, the D-PRO unit transfers the ECC groups to the temporary storage unit and waits until the disc drive unit is ready to record. When the disc drive unit is ready, the D-PRO unit starts recording. As the temporary storage unit, a large-capacity memory is assumed since it must hold recording data for several minutes or longer by high-speed access.

Note that the MPU unit can make read/write access to the D-PRO unit via the microcomputer bus, so as to read/write the file management area and the like.

Figure 117:
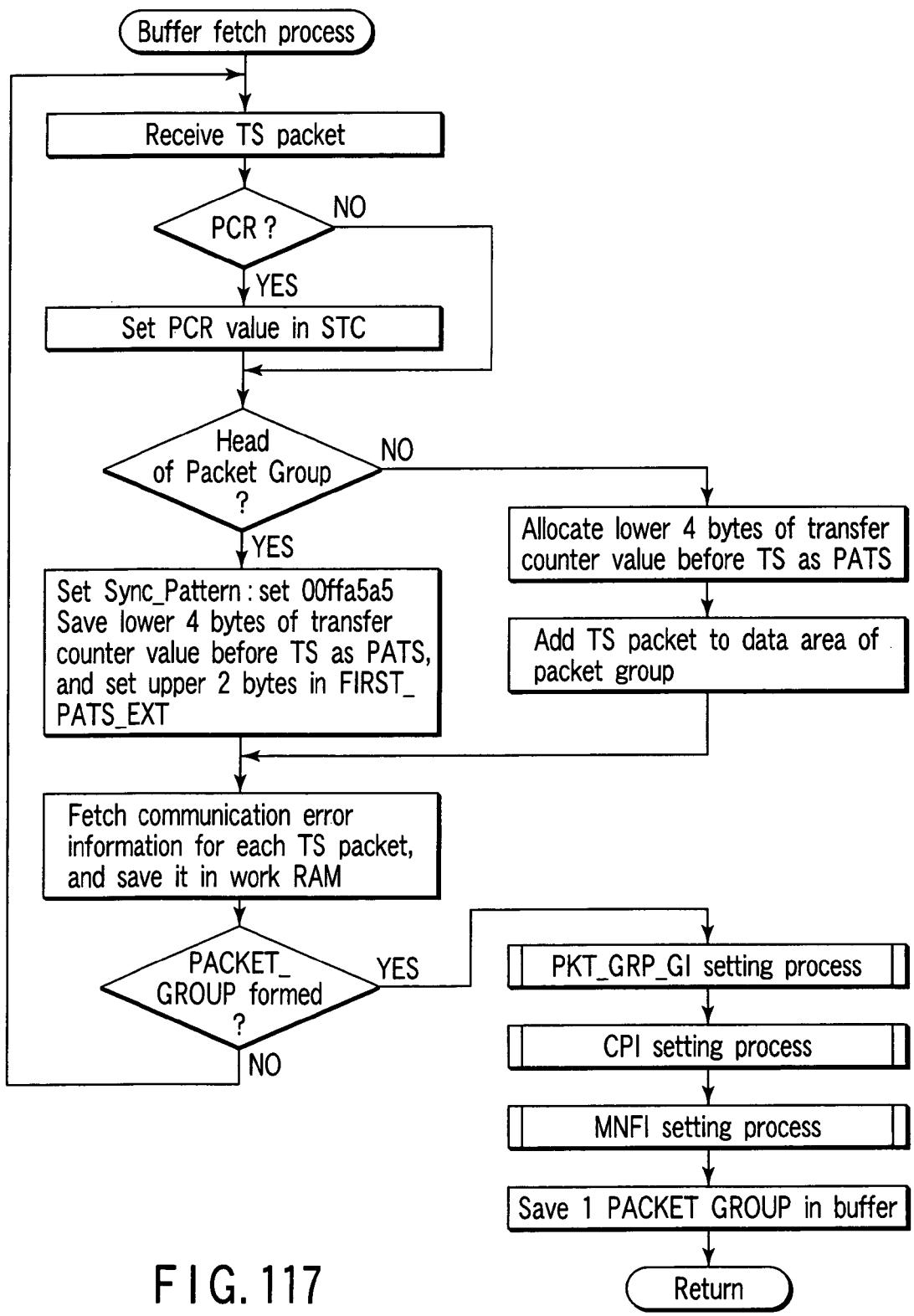
FIG. 117 is a flowchart for explaining an example of a buffer fetch process (ST130) shown in FIG. 116.

FIG. 117 is a flowchart (buffer fetch process flow) for explaining an example of the contents of the buffer fetch process (video recording initial setup) shown in FIG. 116. In the flow of signals upon recording, TS packet data received by STB unit 83 (or terrestrial digital tuner 89) are converted into packet groups by formatter unit 90, and are saved in work RAM 80A. When data saved in the work RAM reach a predetermined size (for one or an integer multiple of CDA size), they are recorded on disc 100. As the operations at that time, upon reception of TS packets, a group is formed every 170 packets, and a packet group header is generated. This process is done, as shown in FIG. 117.

c1) A TS packet is received.

c2) If the fetched TS packet includes a PCR, the STC unit is corrected.

c3) If the packet of interest corresponds to the head of a packet group, Sync_Pattern: 00ffa5a5 is set.

c4) The arrival times of the TS packets are saved as PATS data: the upper 2 bytes of the first packet are allocated in the Packet Group Header, and the lower 4 bytes of PATS of each packet are allocated before that TS packet.

c5) The fetched TS packet is set in the TS packet data area.

c6) It is checked if a packet group is formed (if 170 TS packets are grouped). If the packet group is not formed yet, the control returns to c1); otherwise, a PKT_GRP_GI setting process and CPI process are executed, and an MNFI process is then executed. The group data is temporarily saved in the buffer RAM (step ST1332).

Figure 118:
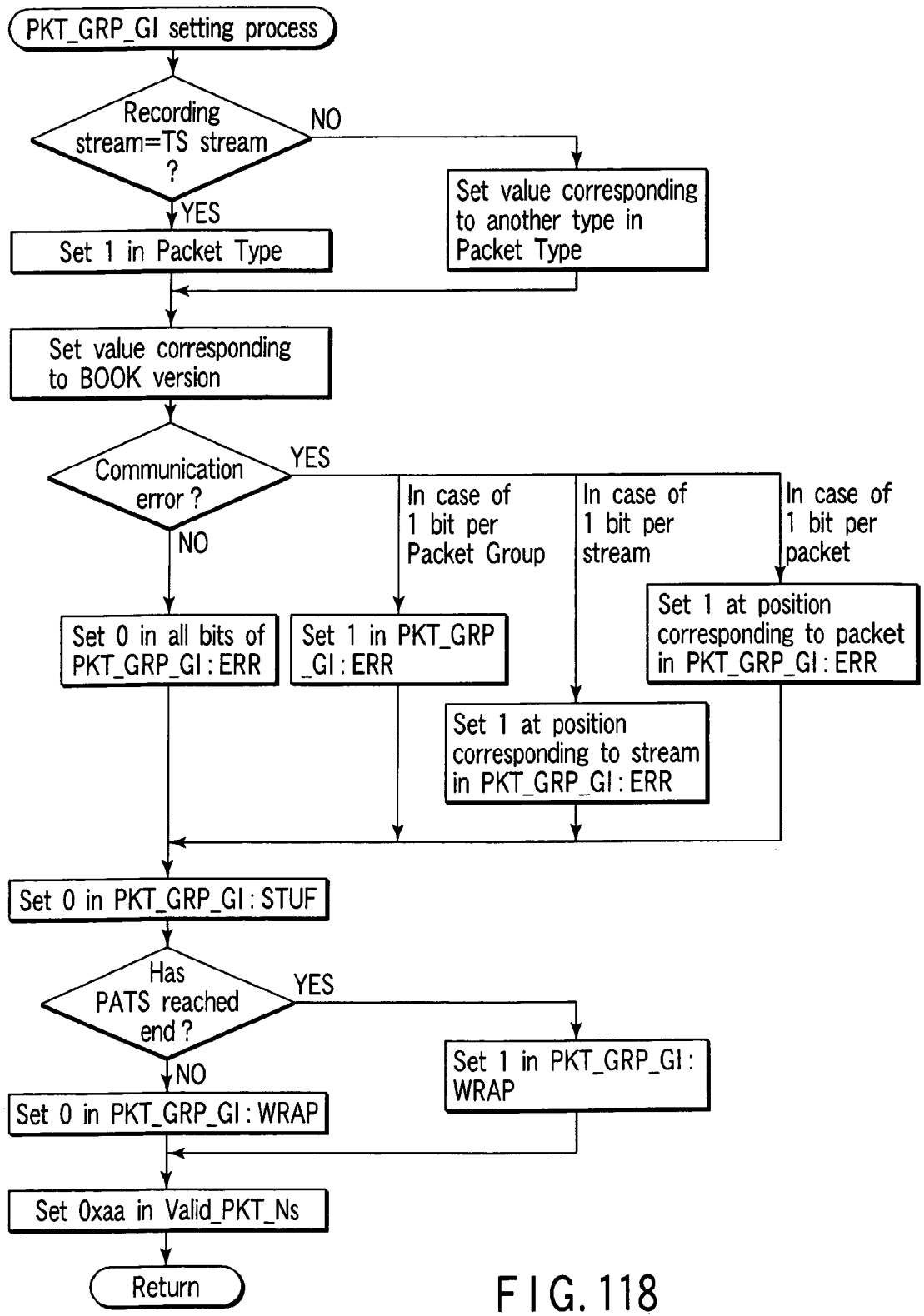
FIG. 118 is a flowchart for explaining an example of a packet group general information (PKT_GRP_GI) setting process in a video recording process shown in FIG. 117.

The PKT_GRP_GI setting process will be described below with reference to FIG. 118.

(1) A packet type is checked. If the packet type indicates an MPEG_TS packet, 1 is set; otherwise, a value corresponding to the type is set in Packet Type.

(2) A value corresponding to the BOOK version of this standard is set in VERSION.

(3) It is checked for each Packet on the basis of information from the tuner if a communication error has occurred. If no error is found, the flow jumps to (5).

(4) If an error is found, the three different error setting methods are available.

When 1 bit is set for the overall Packet Group: 1 is set in ERR.

When 1 bit is set for each stream (a total of 32 bits are required): a stream that suffers an error is checked, and 1 is set in a bit in ERR corresponding to the errored stream.

When 1 bit is set for each Packet (a total of 170 bits are required): a packet that suffers an error is checked, and 1 is set in a bit in ERR corresponding to the errored packet.

(5) In this stage, since no dummy data is inserted, "0" is set in STUF, and "170" (0xAA) is set in VALID_PKT_Ns.

(6) It is checked if PATS reaches an end in this Packet Group. If PATS reaches an end, "1" is set in WRAP.

Figure 119:
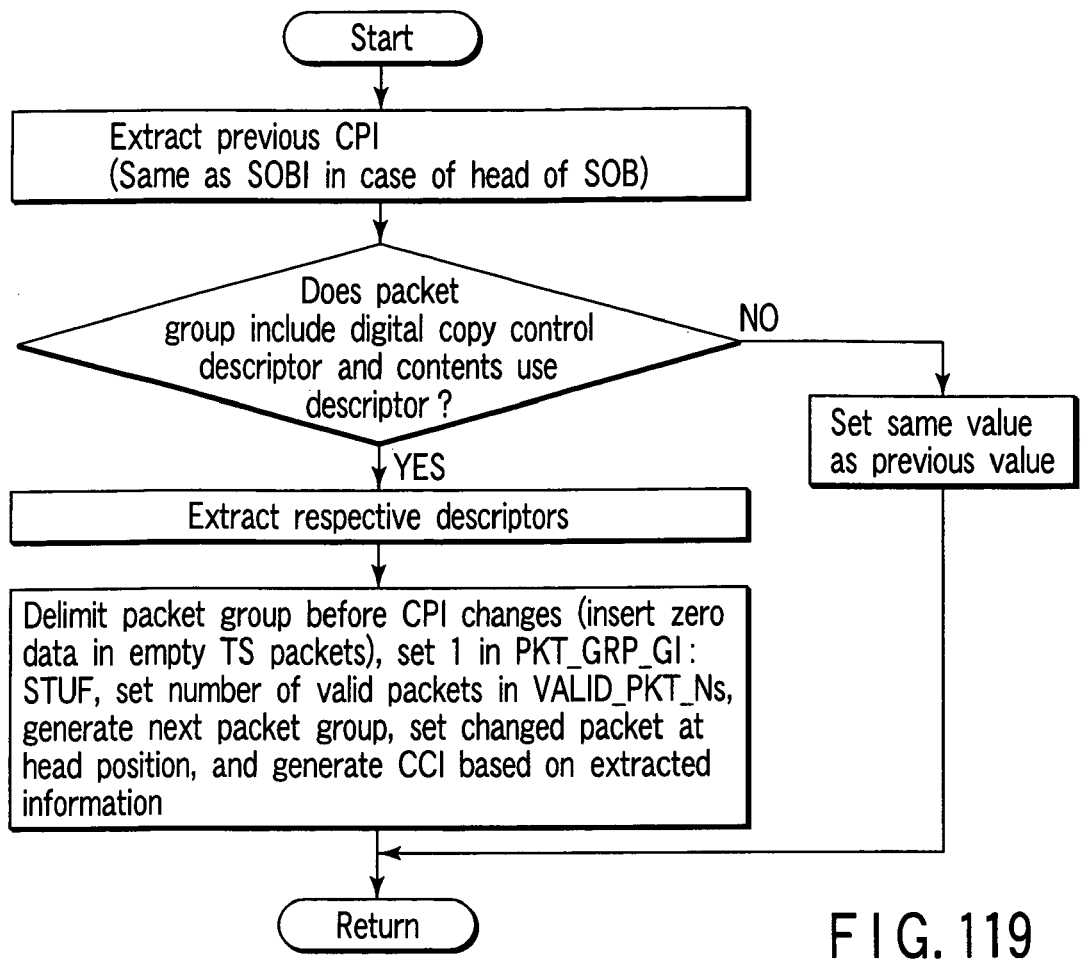
FIG. 119 is a flowchart for explaining an example of a CPI setting process (ST1330) shown in FIG. 117.

FIG. 119 is a flowchart (CPI generation process flow) for explaining an example of the CPI setting process shown in FIG. 117. The CPI setting process will be described below.

d1) It is checked if the latest PMT and EIT include copy information. If copy information is found, copy information is formed and set based on that information. After that, the control advances to d3).

d2) If the received TS packet does not include any copy information, the same information as that in the previous pack is formed as copy information.

d3) If the contents of CPI information have changed in the middle of a packet group, dummy data (see FIG. 120) is inserted in the previous packet group to form a new packet group after the changed position, and CCI is set based on that information.

d4) If the received TS packet does not include any copy information, CCI is formed as "copy free". At this time, "1" is set in PKT_GRP_GI: STUF, and the number of valid Packets is set in PKT_GRP_GI: VALID_PKT_Ns.

Figure 120:
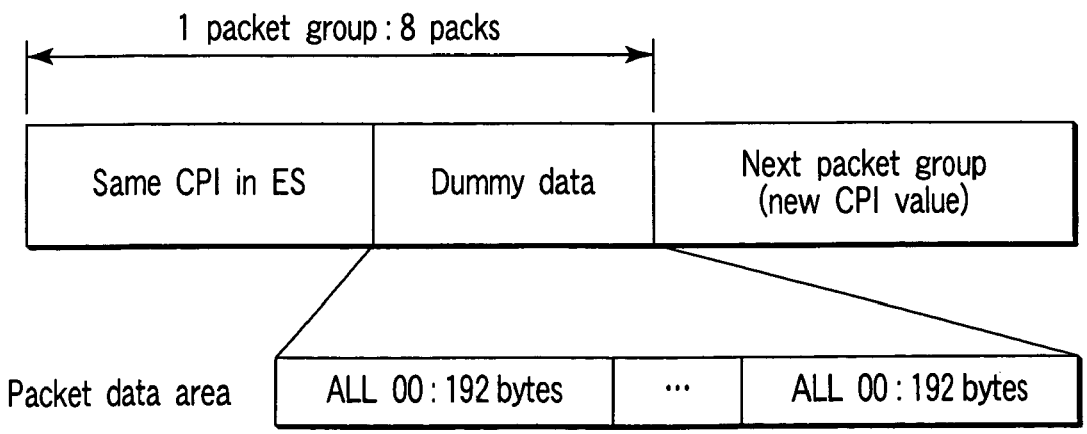

FIG. 120 is a view for explaining an example of the data structure of packet groups in the packet group align process. When a change in CCI/DCI may take place in a single packet group of a single ES, that packet group is temporarily delimited, and the remaining data of the packet group are padded with dummy data to set the next packet group. In other words, an align process is executed to prevent CCI/DCI from changing in a packet group.

FIG. 121 is a flowchart (MNFI generation process flow) for explaining an example of details of the MNFI setting process (step shown in FIG. 117).

e1) It is checked if MNFI to be saved is present. If no such MNFI is present, "0" is set in MNF_ID and MNF_DATA, thus ending this process.

e2) If MNFI to be saved is present, the ID of each manufacturer is set in MNF_ID.

e3) Data to be recorded is set in MNF_DATA, thus ending this process.

Upon playback, pack data read out from the disc are interpreted by the demultiplexer. Packs that store TS packets are sent to the TS packet transfer unit, and are then sent to the decoders, thus playing back data. When pack data are transferred to the STB (or are transmitted to an external apparatus: a digital TV or the like), the TS packet transfer unit transfers only the lower 4 bytes of PATS data and TS packets at the same time intervals as they arrived.

The STB unit makes decoding to generate an AV signal, which is displayed on the TV via the video encoder unit in the streamer.

Figure 122:
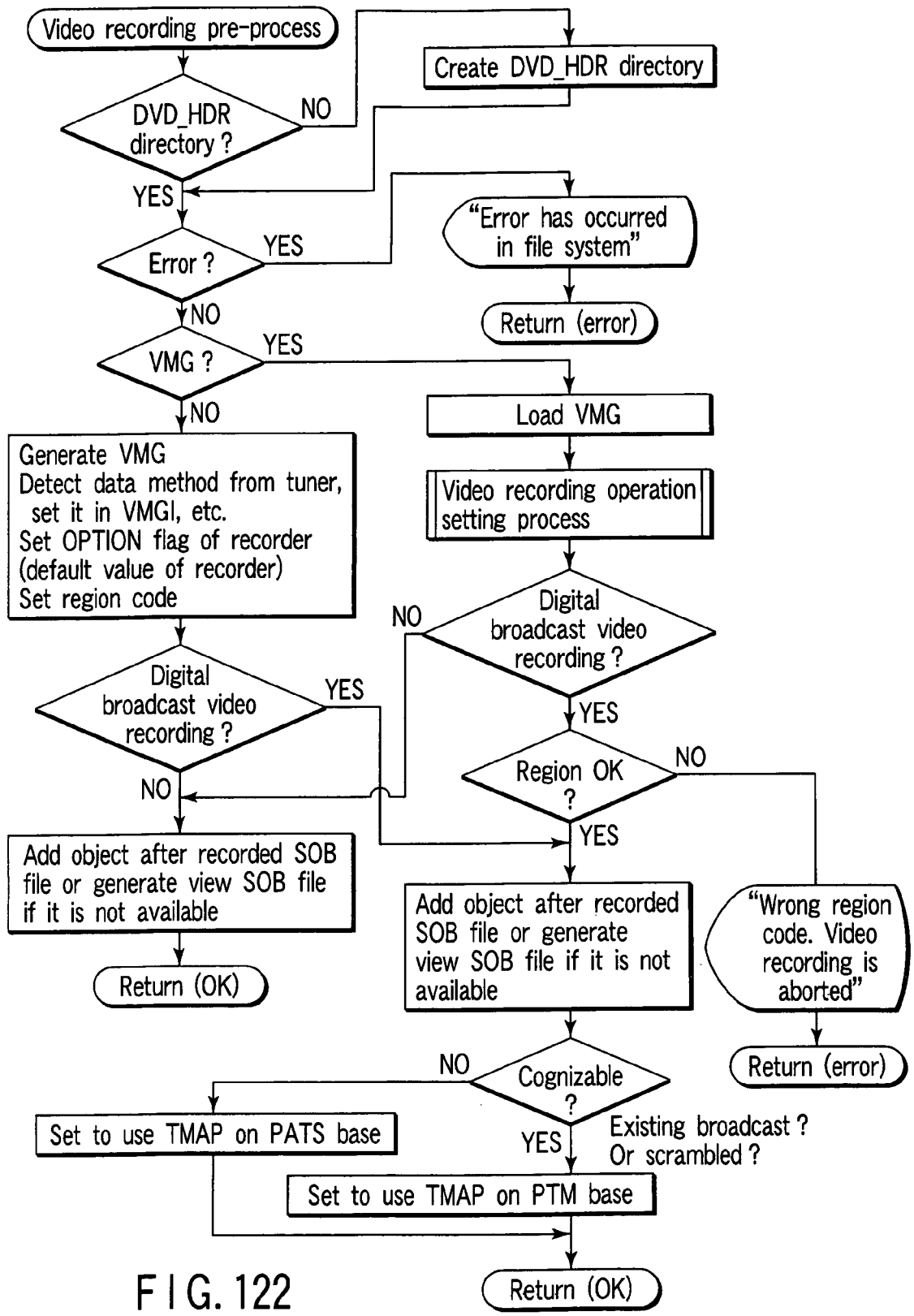

FIG. 122 is a flowchart (video recording pre-process flow) for explaining an example of a process before the beginning of video recording on the disc-shaped information storage medium (e.g., an optical disc using blue laser). The pre-process for video recording is executed as follows.

f1) A DVD_HDR directory is searched for (a directory that stores new VR). If no such directory is found, one is created; otherwise, the control advances to the next step.

f2) It is checked if data has already been recorded in the directory. If the data has already been recorded, VMGI as its management information is loaded onto the work RAM, and profile information is loaded. Then, a video recording operation setting process is executed. If no data is recorded (NO), the control advances to f5).

f3) It is checked if contents to be recorded are <digital broadcast contents>. If the contents to be recorded are not <digital broadcast contents>, the control advances to f9).

f4) If the contents to be recorded are digital broadcast contents, a region code is checked <region OK?>. If the region code of the contents does not match a region value which is set as a default in this apparatus (that shown in FIG. 112), video recording ends (for example, a message "Wrong region code. Recording cannot be done"; otherwise, the control advances to f7).

f5) VMG is generated, and default values of this apparatus are recorded in profile information (FIGS. 79, 81, and the like).

f6) It is checked if contents to be recorded are digital broadcast contents. If the contents to be recorded are not digital broadcast contents, the control advances to f9).

f7) If an SOB file is available, a setup is made to record an object after that file; if no SOB file is available, a new SOB file is generated, and a setup is made to record an object after that file.

f8) It is checked if a stream is cognizable. If the stream is cognizable, a setup is made to form TMAP data on PTM base; otherwise, a setup is made to form TMAP data on PATS base.

f9) If a VOB file is available, a setup is made to record an object after that file; if no VOB file is available, a new VOB file is generated, and a setup is made to record an object after that file, thus ending this process.

FIG. 123 is a flowchart (ESI setting process flow) for explaining an example of the contents of the stream information (ESI) generation process. SOB_ESI can be set as follows.

g1) PSI and SI are examined to check the number of set streams.

g2) g4) and g5) are repeated in correspondence with the number of set streams;

g3) A stream type is checked based on PSI and SI to determine if the stream of interest is a video/audio stream or another type of stream to branch the control to the next stream check processes.

g4) The stream type is categorized to MPEG1 video, MPEG2 video, MPEG1 audio, MPEG2 audio, . . . , and internal data are checked depending on the determined type to read out respective kinds of attribute information.

g5) In case of a video stream, ES_TY=0, and respective kinds of attribute information are set (especially, resolution data, aspect information, and the like are extracted) to generate V_ATTR. The control then advances to g8).

g6) In case of an audio stream, ES_TY=0x40, and respective kinds of attribute information are set (especially, the sampling frequency, the number of channels, and the like are extracted) to generate A_ATTR. The control then advances to g8).

g7) In case of another kind of stream, ES_TY=0x80, and respective kinds of attribute information are set. The control then advances to g8).

g8) Copy information is extracted to generate CP_CTL_INFO.

g9) New ESI is set based on the attribute information, and the control returns to check the next stream.

FIGS. 124 to 128 are flowcharts (stream file information generation process flow with a GPI setting process and TMAP setting process) for explaining an example of a stream file information (STR_FI) generation process in the video recording end process.

h1) The number of SOBI_SRP# data is increased by one to add another SOBI, an area for that SOBI is assured, and 0: MPEG_TS is set in PKT_TY.

h2) The video recording time is set in SOB_REC_TM and SOB_REC_TM_SUB. Note that the internal clock of the apparatus (FIG. 112) is set and corrected based on TDT (Time Data Table; not shown), so that an accurate time can always be obtained.

h3) In case of PTM base, start PTM (SOB_S_PTM/PATS) and end PTMs (SOB_E_PTM/PATS) are extracted from a stream and are set. In case of PATS base, PATS of the first packet of SOB is set in SOB_S_PTM/PATS, and that of the last packet of SOB is set in SOB_E_PTM/PATS.

h4) PCR_POS_SHIFT is set according to the recording rate.

h5) It is checked if the stream type is a TS stream. If the stream type is a TS stream (ARIB, DVB), "188" is set in AP_PKT_SZ and "16" is set in PKT_GRP_SZ. Also a country code of the apparatus is set.

If the stream type is not a TS stream, values according to the broadcast format are set. Values corresponding to the video recording format are set in PKT_GRP_SZ and PKT_Ns, and a country code of the apparatus is set in Country_code.

h6) MPEG_TS is set in PKT_TY.

h7) In case of BS, AP_FORMAT+1 (ISDB-S); in case of terrestrial digital, AP_FORMAT→1 (ISDB-T) The PAT (packet association table) at the beginning of recording is read out from the work memory, and TS_ID, NETWORK_PID, and PMT_ID (the PID of PMT used by this SOB) are set.

h8) PMT, NIT, and EIT at the beginning of recording are read out from the work memory, and Program_Number (SERVICE_ID in PMT), Format_Id (REG_DES value), PCR_PID, ESOB_ES_Ns, V_ES_Ns, and A_ES_Ns are set on the basis of AP_FORMAT_2 and PMT. As DEF_PID, a PID with a smallest component tag value (the value of a component group descriptor is preferentially used) is set. Also, profile information is set according to the default values of the recorder (example 2). SOB_TY is set according to the TMAP type.

Furthermore, as for FORMAT_ID and VERSION, default values in the apparatus (in case of the built-in tuner) or Registration_Descriptor values sent via a digital input (in case of an external digital input) are set. SOB_TY is set according to the TMAP type.

h9) Moreover, the number of recorded ESs is set. (The PMT is set with information and number of all broadcasted ESs, but since not all ESs are always recorded upon video recording, the number of recorded ESs is set.)

h10) The video recording start LB address is set in ADR_OFS (FIG. 90) (step ST1550), and a default PID is set. Note that the default video PID corresponds to that with a component tag value=00 or that of a stream corresponding to a component tag described in a main component group in case of multi-view TV.

h11) If profile information (FIG. 81) is stored for each SOBI, default values of this apparatus are set in this process.

h12) A GPI setting process (to be described later) is executed, and TMAPI is generated for each stream on the basis of segmentation information.

h13) An edit date is set.

Figure 125:
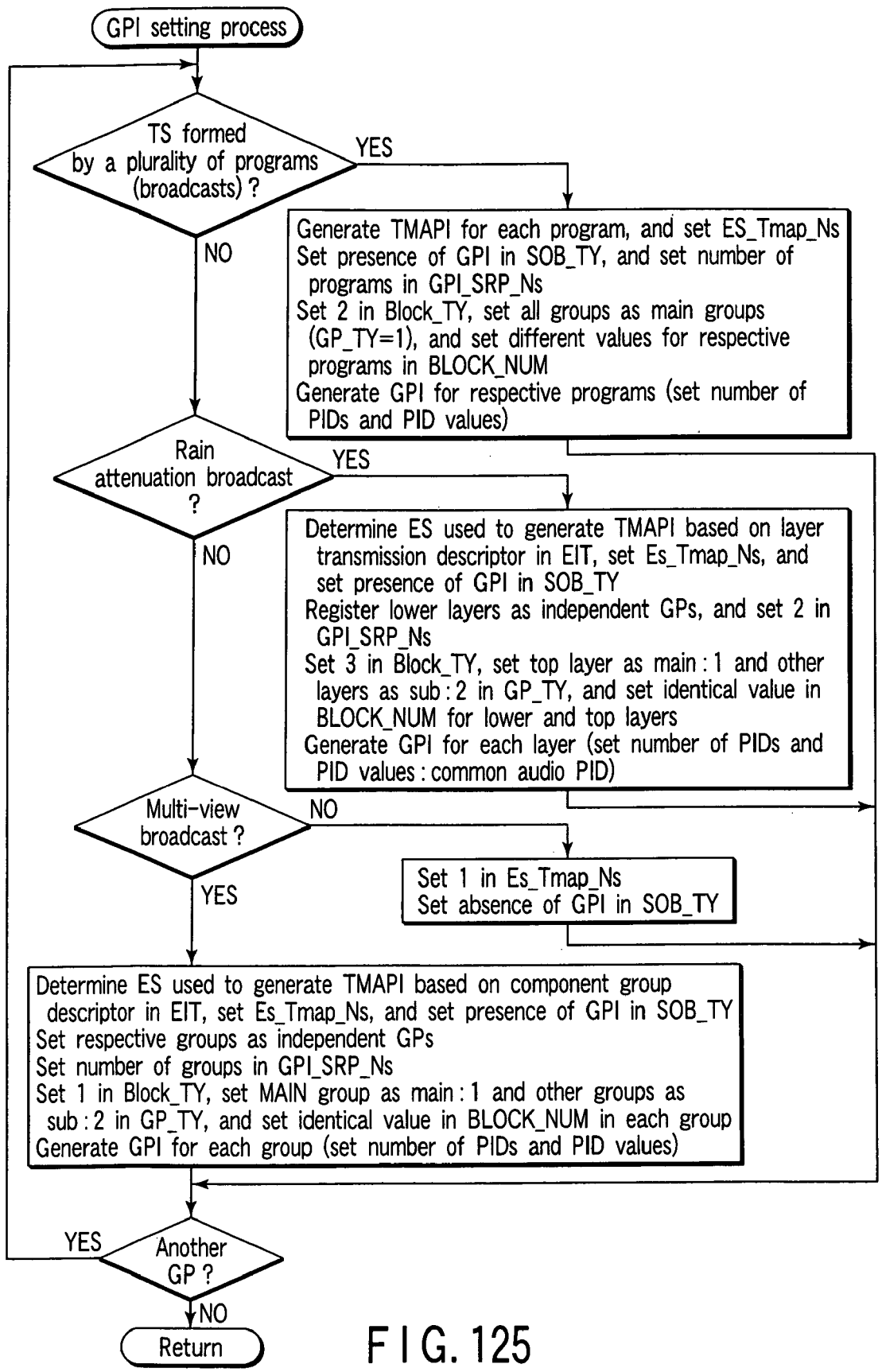

FIG. 125 is a flowchart for explaining an example (example 1) of the GPI setting process.

(i1) A stream type is checked.

(i2) If a plurality of programs form one stream, information indicating the presence of GPI is set in SOB_TY, BLOCK_TY=2, GP_TY=1 (all GPs are set as main groups), different numbers are set in BLOCK_NUM in correspondence with programs, and one GPI is generated per program, thus ending this process (store the PID to be played back).

(i3) In case of rain attenuation broadcast, information indicating the presence of GPI is set in SOB_TY, BLOCK_TY=3, and the top layer is set as main: 1 and other layers are set as sub: 2 in GP_TY. An identical number is set in BLOCK_NUM, and one GPI is generated per layer, thus ending this process (store the PID to be played back).

(i4) In case of multi-view broadcast, information indicating the presence of GPI is set in SOB_TY, BLOCK_TY=01, and a MAIN group is set as main: 1 and other groups are set as sub: 2 in GP_TY. An identical number is set in BLOCK_NUM, and one GPI is generated per view. It is checked if an ES to be set as another GP still remains. If such ES still remains, the control returns to i1); otherwise, this process ends (store the PID to be played back).

(i5) If no target GP is found, information indicating the absence of GPI is set in SOB_TY, and this process ends.

FIG. 126 is a flowchart for explaining the TMAP setting process. The TMAP setting process is executed as follows.

j1) The SOB/VOB structure is determined.

j2) In case of SOB, TMAP_TY is determined. In case of PTM base, ESs for which STMAPs are to be generated are determined in consideration of the number of GPs, the number of ESs (the number of video ESs) is set as the number of TMAPs, and ES_PIDs to be generated are set for respective TMAPs. (However, one TMAP need not always be assigned to one GP. If no TMAP is available, that of a GP with the same MAIN_GP or BLOCK_NUMBER is used to execute playback, search, special playback, and the like.) In case of PATS base and VOB, ITMAP is added.

j3) The SOB (PTM base)/VOB start and end times, the start and end times for each TMAP, the number of ENTRIES, the arrival time of the first packet of SOB (PATS base), the arrival time of the last packet, and the like are set based on segmentation information.

j4) TMAPT data is added, and ENTRY information is generated based on segmentation information. Note that the TMAPT information is stored as an independent file (FIG. 74 and the like) or is added to the end of the IFO file (FIG. 75 and the like).

FIG. 127 is a flowchart for explaining the VOB/SOB structure setting process. The VOB/SOB structure setting process will be described below.

m1) The recorded time is checked. If the recorded time is equal to or shorter than two hours, the control advances to m2); if it falls within the range from two to four hours, the control advances to m3); or if it is equal to or longer than four hours, the control advances to m4).

m2) "0" is set in VOB/SOB_PB_TM_RNG, and VOBU/SOBU_ENT data are generated based on segmentation information (information of 0.4 s to is) so that each SOBU has a time range of 0.4 s to is (step ST154002). The control then advances to m5).

m3) "1" is set in VOB/SOB_PB_TM_RNG, and VOBU/SOBU_ENT data are generated based on segmentation information (information of 0.4 s to is) so that each SOBU has a time range of 1.0 s to 2.0 s (step ST154003). The control then advances to m5).

m4) "2" is set in VOB/SOB_PB_TM_RNG, and VOBU/SOBU_ENT data are generated based on segmentation information (information of 0.4 s to 1 s) so that each SOBU has a time range of 2 s to 3 s (step ST154004). The control then advances to m5).

m5) This process ends.

Figure 128:
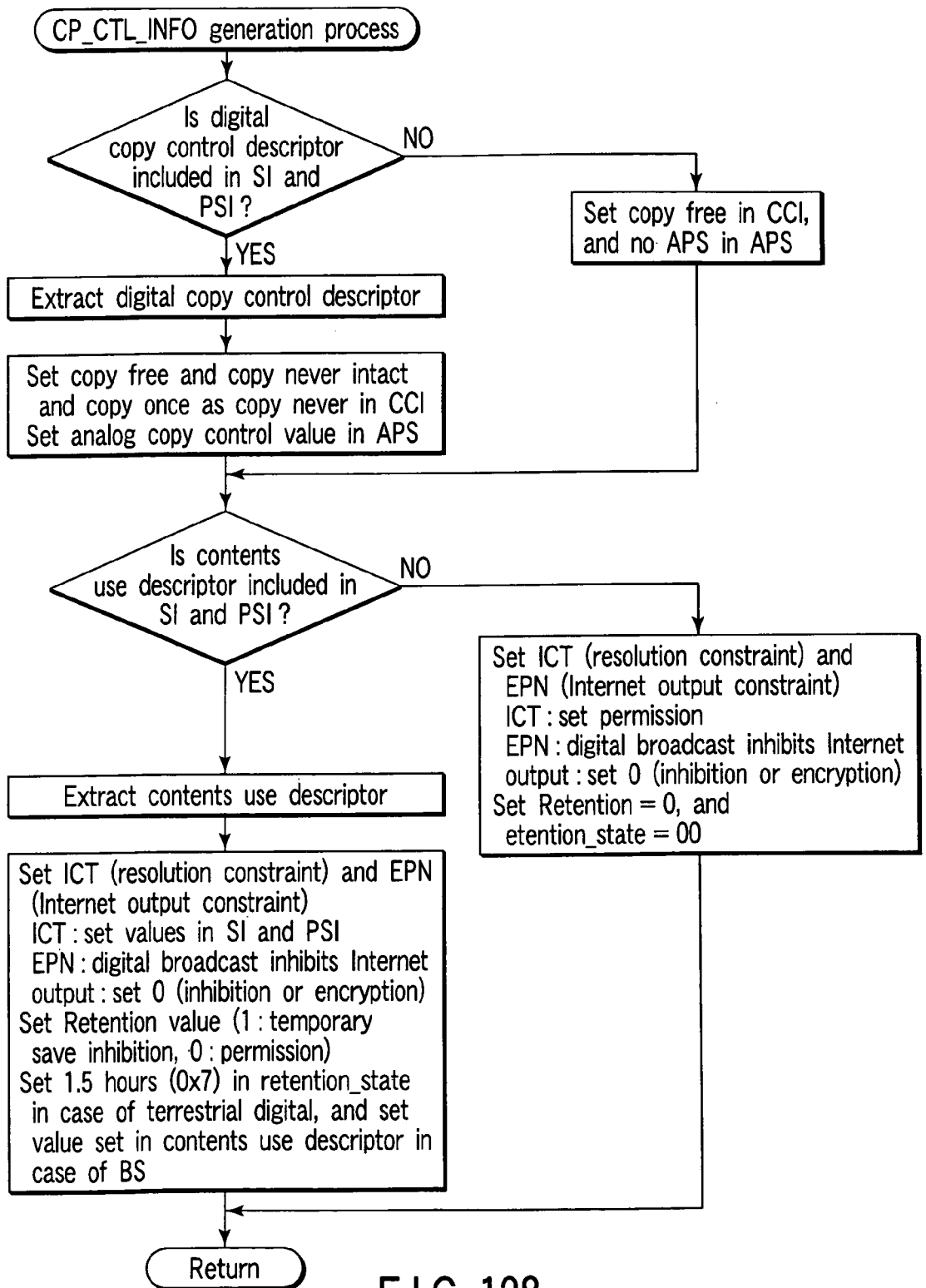

FIG. 128 is a flowchart for explaining the CP_CTL_INFO generation process. The CP_CTL_INFO setting process will be described below.

n1) It is checked if the latest PMT and EIT include copy information. If copy information is found, copy information is generated and set based on that information. The control then advances to n3).

n2) If no copy information is found, "copy free" is set.

n3) It is checked if the latest PMT and EIT include contents use descriptors. If the contents use descriptors are found, ICT and EPN are set based on their values.

n4) If the received TS packet does not include any copy information, ICT and EPN are formed as "copy free".

Figure 129:
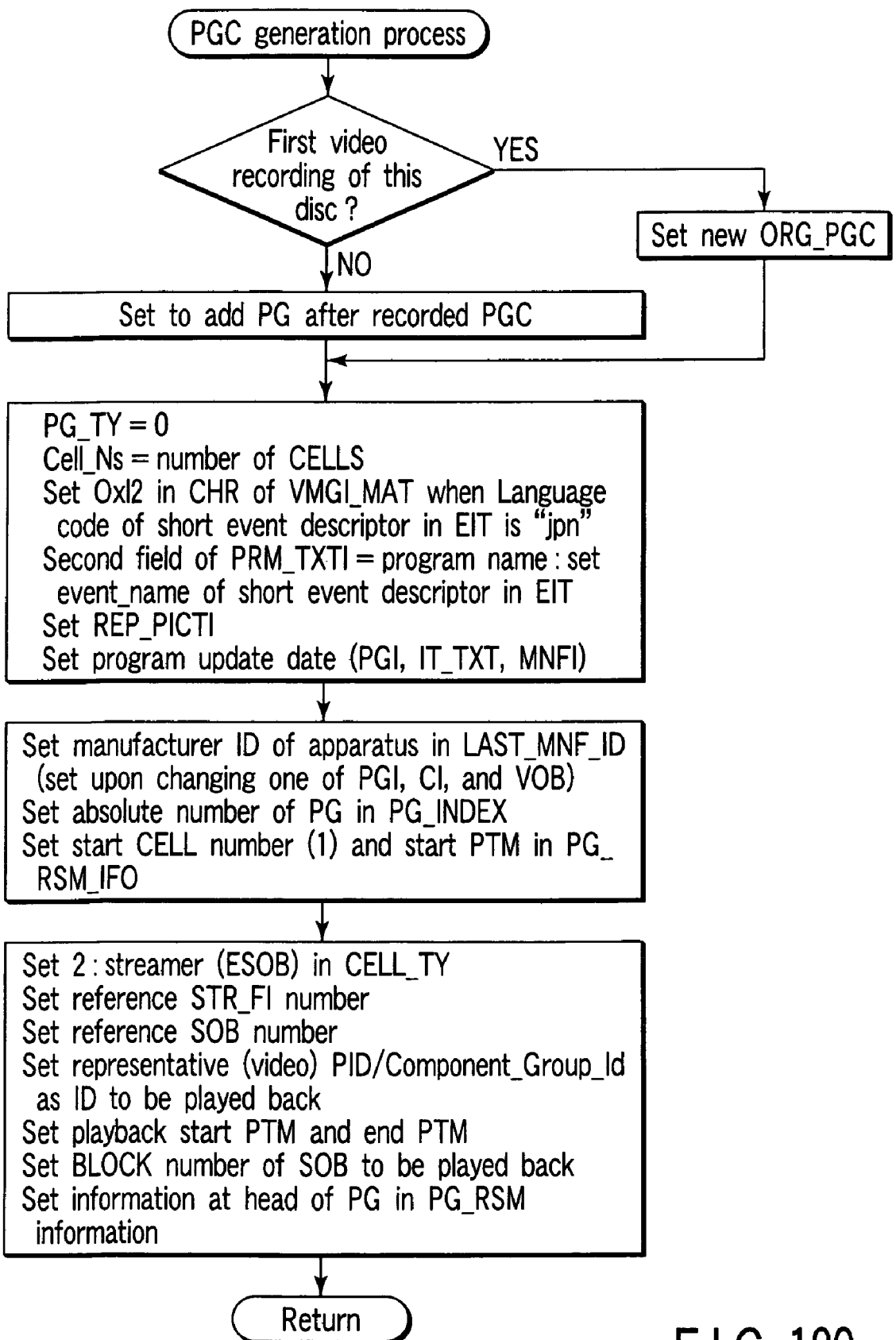

FIG. 129 is a flowchart (program setting process flow) for explaining an example of the program chain (PGC) generation process (including a program setting process) in the video recording end process. The PG generation process in this process will be described below.

p1) It is checked if a disc of interest undergoes the first video recording. If the disc of interest undergoes the first video recording, ORG_PGC is generated; otherwise, a setup is made to add PG information after the ORG_PGC.

p2) Erase permission: 0 is set in PG_TY, and the number of cells is set in Cell_Ns.

p3) In case of ARIB, if language_code in a short event descriptor in EIT is "jpn", "0x12" is set in text information CHR in management information VMG_MAT, EVENT_NAME is set in the second field of primary text information PRM_TXTI, and representative picture information is set in REP_PICTI.

p4) The manufacturer ID of this apparatus (FIG. 112) is set in LAST_MNF_ID. As for this value, when PGI, CI, or VOB has been changed, the manufacturer ID of the apparatus used to change such information is set to identify the manufacturer of the last apparatus used to execute edit and record processes. In this way, when the apparatus of another manufacturer is used to change the recorded contents of a disc, an action can be easily taken.

p5) The absolute number of PG is set in PG_INDEX to allow another application software or the like to refer to each PG. Furthermore, this PG update date information is recorded. At this time, if $MNF_1$ and IT_TXT (with the same manufacturer code) supported by this apparatus are found, the update date information of corresponding data is also set.

p6) Information unique to each manufacturer is set in MNFI.

p7) Information (CELLI) indicating a streamer is set in CELL_TY (step ST1704X).

p8) The reference SOB number is set, the representative (video) PID or Component_Group_Id is set as the ID to be played back, and the number of pieces of EPI, playback start and end PTM/PATS data, and EPs are set.

Note that EPI is designated by the playback time on PTM base like in playback start PTM/PATS and end PTM/PATS, and is designated by PATS on PATS base. (However, approximate PATS data may be used in place of accurate PATS data, and the recorder may designate a Packet with PATS closest to this value.)

p9) Information is set at the head of the PG in PG_RSM_INF so as to play back the PG from the beginning.

FIG. 130 is a flowchart (overall playback operation flow) for explaining an example of the playback operation of the apparatus in FIG. 112. The data processes upon playback are executed as follows (see FIGS. 130 to 135).

q1) Prior to the playback process, a disc check process is made to check if the disc of interest is a write-once or rewritable disc (R, RW, RAM; to be simply referred to as a "rewritable Disc" hereinafter). If the disc of interest is not a rewritable Disc, a message that advises accordingly is returned, and the process ends.

q2) The file system of the disc is read out to check if data has already been recorded. If no data is recorded, a message "no data is recorded" is displayed, thus ending the process.

q3) The VMG file is loaded to determine programs and cells to be played back (by prompting the user to select them). If a playback process in the recorded order is selected, playback is made according to ORG_PGCI; if a playback process for respective programs is to be made, playback is made according to UD_PGC with a number corresponding to the program to be played back.

That is, the VMG information is stored in work RAM 80A in FIG. 112. Profile information (FIGS. 79, 81, and the like) is read out from this work RAM 80A to compare a region code in the readout profile information with the default region value of the recorder (apparatus of FIG. 112). If the region codes do not match, a message that advises accordingly is displayed, and playback of the SOB whose region code does not match is inhibited.

On the other hand, if the region codes match and playback is permitted, the playback mode is set according to the operation table. After that, cells to be played back are determined (by prompting the user to select them). If a playback process in the recorded order is selected, playback is made according to ORG_PGCI; if a playback process for respective programs is to be made, playback is made according to UD_PGC with a number corresponding to the program to be played back.

q4) The value of PKT_TY is read out to check if the broadcast format is supported. If the broadcast format is unsupported, a message that advises accordingly is displayed, and the process ends (or the control advances to process the next CELL).

q5) The SOB/VOB to be played back, playback start PTM/PATS, and the like are determined based on title information, resume information (PL_RSM_IFO, PG_RSM_IFO, and the like) to be played back, and a playback start file pointer (logical address) is determined based on the playback start PTM/PATS. Furthermore, respective decoder units are set based on STI values to prepare for playback. Also, APS setups (e.g., APS=ON/OFF, APS type, and the like) are set in the video decoder based on CCI in the packet group header at the head position, and CGMSA setups are made in the video recorder based on digital copy control. Furthermore, if a digital output (IEEE1394, Internet, or the like) is available, 0: scramble ON or output inhibition or 1: direct output is set in the output IC based on the EPN value. If ICT=0, the image resolution is constrained, i.e., HD is converted into SD; if ICT=1, "direct output" is set in the output IC. At this time, if the playback start frame is not I-picture data, decoding starts from immediately preceding I, and display starts when the target frame is decoded, thus starting normal playback.

q6) A process upon playback start is executed.

q7) Setups of respective decoders (to be described later) are made.

q8) A cell playback process (to be described later) is executed, and it is then checked if playback is to end. If playback is to end, an error check process is executed. If any error is found, a message that advises to that effect is displayed; otherwise, a playback end process is executed, thus ending this operation.

q9) The next cell is determined based on PGCI, and it is checked if setups of decoders are changed. If the setups are changed, change attributes are set in the decoders so as to change decoder setups in response to the next sequence end code.

q10) It is checked if playback is to end. If playback is not to end, the control returns to q6).

FIG. 131 is a flowchart for explaining the decoder setting process.

r1) A group to be played back is determined, and ESs to be played back are determined in accordance with GPI.

r2) VOB/SOB attribute information (STI or ESI) is loaded.

r3) It is checked if the recorder supports the formats of the ESs to be played back. If the recorder supports the formats, corresponding setups are made; otherwise, mute setups are made.

p4) CCI is set.

It is checked if audio ESs to be played back support playback. If the audio ESs do not support playback, the demultiplexer is set not to play back audio data, and the audio decoder is set to mute. If the audio ESs support playback, the PID of audio data to be played back is set in the demultiplexer, and an initial value is set in the audio decoder. APS setups (e.g., APS=ON/OFF, APS type, and the like) are set in the video decoder based on CCI, and CGMSA setups are made in the video recorder by digital copy control based on CCI. Furthermore, if a digital output (IEEE1394, Internet, or the like) is available, 0: scramble ON or output inhibition or 1: direct output is set in the output IC based on the EPN value. If ICT=0, the image resolution is constrained, i.e., HD is converted into SD; if ICT=1, "direct output" is set in the output IC.

FIG. 132 is a flowchart for explaining an example of the process upon cell playback. The cell playback process is executed as follows.

s1) Start file pointer FP (logical block number LBN) and end address FP of a cell are determined on the basis of the contents of TMAPI. Furthermore, start SOBU_ENTRY and end SOBU_ENTRY are determined based on the start and end times in CELLI, and the data lengths of ENTRIES until target SOBU_ENTRY are accumulated in ADR_OFS, thus obtaining a start address (LB=FP) and end address. The remaining cell length is calculated by subtracting the start address from the end address, and the playback start time is set in the STC. The PID to be played back is determined and is set in the decoder (STB, digital tuner).

s2) A read process during playback is executed to determine the read address and read size based on the start file pointer.

s3) The read unit size to be read out is compared with the remaining cell length. If the remaining cell length is larger than the read unit size (YES), a value obtained by subtracting the read unit size to be read out from the remaining cell length is set as the remaining cell length. If the remaining cell length is smaller than the read unit size (NO), the read unit size is set to be the remaining cell length, and the remaining cell length is set to be zero.

s4) The read length is set to be a read unit length, and the read address, read length, and read command are set in the disc drive unit.

s5) The control waits until data for one SOBU are stored. If data for one SOBU are stored, a buffer decoder transfer process is executed, and the read file pointer is updated. The control advances to the next step.

s6) It is checked if transfer is complete. If transfer is complete, the control advances to the next step.

s7) It is checked if an angle key or the like has been pressed. If the angle key has been pressed, it is checked if GPI is available. If GPI is available, a GP switching process is executed; otherwise, the control advances to the next process without any process.

s8) If a stop switch (Stop SW) has not been pressed, the remaining cell length is checked. If the remaining cell length is not "00", the control returns to s2); if it is "00", this process ends.

If the Stop SW has been pressed, resume information is generated. More specifically, if playback of an original tile is now in progress, the current CELL number and PTM/PATS are set in PG_RSM_IFO; if playback is in progress based on a playlist (PL), the current CELL number and PTM/PATS are set in PL_RSM_IFO. After that, this process ends.

FIG. 133 is a flowchart for explaining the buffer data decoder transfer process. The buffer data decoder transfer process will be described below.

t1) The number of packet groups in the buffer RAM is checked. If no packet group is found, this process ends. If one or more packet groups are stored, a setup is made to process the first packet group.

t2) A target packet group is read out from the buffer RAM. The head of the packet group is detected based on the packet group length and Sync_Pattern.

t3) STUF in the packet group header is checked. If STUF=1, valid Packets are extracted according to the value of VALID_PKT_Ns. If STUF≠1, 170 Packets are valid.

t4) The transfer time of TS packets is calculated based on PATS and WRAP values, and respective TS packets are sent to the decoder unit (STB unit) at that time.

t5) It is checked if MNF is available. If MNF is found, it is determined if its ID matches that of the manufacturer. If the ID matches that of the manufacturer, that data is loaded to execute a predetermined process (unique to each manufacturer).

APS setups (e.g., APS=ON/OFF, APS type, and the like) are set in the video decoder based on CCI, and CGMSA setups are made in the video recorder by digital copy control based on CCI. Furthermore, if a digital output (IEEE1394, Internet, or the like) is available, 0: scramble ON or output inhibition or 1: direct output is set in the output IC based on the EPN value. If ICT=0, the image resolution is constrained, i.e., HD is converted into SD; if ICT=1, "direct output" is set in the output IC.

t6) A reception error process (to be described later is executed).

t7) A discontinue process is executed.

t8) The control waits for the end of transfer. It is checked if packet groups to be transferred still remain in the buffer RAM. If no packet group remains, this process ends.

t9) A setup is made to process the next packet group, and the control returns to t2).

FIG. 134 is a flowchart for explaining the reception error process. A received signal includes an error, and such signal including the error is often recorded on a disc. Even when such signal can be played back, the error cannot be erased. If such error is present, the user may misunderstand the system performance.

The reception error process will be described below (FIGS. 134 and 135).

(1) ERR information in the Packet Group Header is checked. If ERR is found, a message that advises accordingly is displayed for the user (when that function is enabled by an apparatus setup); otherwise, message display is turned off.

(2) If ERR is set for each Packet or stream, the number of errors in a video stream, playback of which is in progress, or if ERR is set for each Packet Group, the number of errors for each Packet Group is counted. If no error is found, no process is done.

(3) If the number of errors per unit time is equal to or larger than a predetermined value, and if a rain attenuation GP is available, the video stream is switched to its SUB video (or video of a lower layer).

As a result, communication errors can be distinguished from disc errors. In case of a disc error, indications of exchange of discs and cleaning of a pickup can be given. In case of a communication error, since the control shifts to low-layer broadcast, the user can continue to watch a video (although the resolution drops). Also, in case of a chronic communication error, an indication of antenna adjustment or the like can be given. The error contents may be displayed either on a monitor (TV) or the display unit of the recorder main body.

FIG. 135 shows a display example of "communication error" on a display. Alternatively, a player may have an LED used to indicate a communication error. Furthermore, both the display and player may display such error message.

FIG. 141 is a flowchart for explaining the discontinue process. (1) A DISCON bit is checked. If DISCON=1, the playback mode of the decoder is switched to an internal clock mode (an operation mode that ignores PTS values, plays back using internal clock values alone, and enables PTS again upon reception of PCR: external sync mode), thus ending this process.

(2) If DISCON=0, this process ends without any process.

In this way, a playback process upon successively recording different titles can be coped with.

In the above embodiment, an information recording medium (optical disc) has a data area that records one or more digital broadcast data (for example: transport stream data) and analog signal data (program stream data). That is, one or more program stream signals and other stream signals can be recorded.

A management information area that records stream management information corresponding to digital broadcast data (stream signals other than program stream signals) and video management information corresponding to analog signal data (program stream signals), and playback management information used to manage playback of these data are assured. The playback management information includes original playback management information used to make playback in the recording order, and playlist playback management information for temporary edit. Program information in the original management information includes an area for recording resume mark information indicating playback start position information after pausing, and each search pointer information in the playlist management information also includes an area for recording resume mark information indicating playback start position information after pausing.

An information recording method records the resume mark information in the area of management information corresponding to a signal whose playback is in progress when playback of a title is paused. An information playback method refers to the resume mark information and executes playback from a position corresponding to the playback start position information when playback of that title starts.

In the area for recording a plurality of pieces of stream management information of the information recording medium, an area for recording attribute information (SOB_ESI) associated with display of video data of respective streams is assured. The information recording method records attribute information (SOB_ESI) associated with display of video data of a given stream signal. The information playback method plays back the attribute information (SOB_ESI) associated with display of video data of that stream signal.

In the information recording medium of the present invention, the stream signal is stored while being segmented into a plurality of packets. Packet groups are formed for every predetermined number of packets. A group header area that manages the number of packet groups is assured in the middle of the stream signal and can be used to access a desired packet.

The information recording medium records a packet group type in the group header area. The information playback method plays back and confirms the packet group type recorded in the group header area.

In the management information area of the information recording medium, time map files are recorded as independent files corresponding to respective broadcast formats so as to play back individual objects.

The information recording method of the present invention records a corresponding time map file upon recording a signal. The information playback method selects and plays back an independent arbitrary file as a time map, and plays back a stream signal corresponding to this file.

The time map files are classified into those for analog video and those for digital broadcast stream recording, and two different types of time map files for digital broadcast stream recording are prepared. Stream TMAP data for cognizable data are on playback time (presentation time: PTM) base, and those for non-cognizable data are on arrival time (packet arrival time: PATS) base. This time base is determined for each broadcast format, and is recorded in the time map. Also, a time base is determined for each SOB, and is recorded in the time map.

A time base is determined for each SOB, and is recorded in the time map. The information playback method generates respective TMAP data according to the type of source signal, and records them in a file. Upon playback, the source format is checked, and a target file is played back.

In the information recording medium, a digital broadcast signal is stored while being segmented into a plurality of packets. Packet groups are formed for every predetermined number of packets. Each packet group includes a header, which includes packet group general information that can describe a type, version, packet group status, and the number of valid packets. The information recording medium of the present invention records stream object information (one or more pieces of SOBI), serving as time information used to manage a playback time, as independent files in correspondence with respective broadcast formats so as to play back respective digital broadcast signals.

The information recording medium of the present invention has the data area for recording digital broadcast signals and analog signals, and the management information area for recording stream management information corresponding to digital broadcast, and video object management information corresponding to the analog signals. Each of the plurality of stream management areas includes an area for saving communication error information which indicates whether or not existing error information is present upon fetching a digital broadcast signal.

Summary of Embodiment

01. Whether or not a stream in a disc can be played back is determined based on the option support level of the recorder (FIGS. 5, 44, 45, and the like).

02. A decodable stream is detected based on a region code to determine whether or not that disc can be played back (FIGS. 5, 44, and the like).

03. Time map (TMAP) information is recorded in an independent area to reduce the load upon changing TMAP information (TMAP file in FIG. 3, TMAPT at the end in HDVR_VMG in FIG. 4, and the like).

04. A group type (number) is added to group information to check if a group can be switched (FIG. 27 and the like).

Effects According to Embodiment

11. The decode type range of streams to be supported is narrowed down to a combination (of functions limited to some extent) as shown in, e.g., FIG. 45, and the combination is written in profile information (FIGS. 5, 9, and the like) in the management information. Then, the recording/playback apparatus (DVD recorder or the like) need only implement decoders corresponding to its use purpose, and the arrangement of the apparatus can be relatively simplified. For example, an apparatus for a target user who has a use purpose "no AC3® is required if AAC audio is installed" need only implement an AAC decoder.

12. Since a use region can be specified by a region code, an apparatus need not always have hardware compatible to all regions. For example, even when a recorder to be used in Japan supports ATSC decoding (digital broadcast standard in U.S.A.), that hardware part is rarely used. Hence, it is efficient to implement a decoder that supports only ARIB (digital broadcast standard in Japan).

In this manner, the decoder to be implemented is selected according to the use purpose and/or use region, and the apparatus cost can be reduced. In other words, an optimal recorder can be built according to the purpose of a product.

More specifically, commercialization of decoders which have different regional characteristics and grades can be facilitated with their suited product prices.

13. In a recordable/reproducible disc (especially, a large-capacity disc), the data size of its management information tends to increase. In such case, when time map (TMAP) information is stored in an independent file, frequent TMAP rewrite processes can be quickened. Alternatively, when TMAP information is allocated at the end of the management information (VMG), only TMAP information can be changed independently of other kinds of management information allocated before the TMAP information upon frequently rewriting the TMAP information. Hence, the rewrite process can be quickly done.

More specifically, by recording TMAP in an independent area of a recording medium, the process on the side of the apparatus which uses this medium can be reduced.

14. The management area (HDVR_VMG in FIG. 6) of a disc includes a stream file information table (STR_FIT), and data layers (SOBI in FIG. 7, SOB_ES_GPI in FIG. 8, SOB_ES_GPI in FIG. 25, GPI in FIG. 26, GPI_GI in FIG. 27) in this STR_FIT can have group type information (GP_TY, GP_NUM, and the like). Using such information (GP_TY, GP_NUM, and the like in FIG. 27), various broadcast types (multi-view, rain attenuation, multi-channel, and the like) can be identified, and groups that allow switching (e.g., multi-channel broadcast) can be switched based on their numbers (GP_NUM).

More specifically, by changing group information (GPI), a plurality of different groups can exist together.

Note that the present invention is not limited to the aforementioned embodiments intact, and various modifications may be attained by modifying required constituent elements when it is practiced.

Various inventions can be formed by appropriately combining a plurality of required constituent elements disclosed in the embodiments. For example, some required constituent elements may be deleted from all the required constituent elements disclosed in the embodiments. Also, required constituent elements associated with different embodiments may be combined as needed.

What is claimed is:

1. A non-transitory computer-readable information recording medium or a non-transitory computer-associated-machine-readable information recording medium configured to have data recorded thereon by a computer-associated recording apparatus and/or data reproduced therefrom by a computer-associated reproducing apparatus, said data including management information and digital stream information, wherein the digital stream information includes a first stream corresponding to an MPEG transport stream or a second stream obtained via an IEEE 1394 interface corresponding to a non-MPEG transport stream, the first stream comprising one or more elementary streams carried by data packets, the one or more elementary streams including at least one of a video elementary stream and an audio elementary stream, and the management information comprises type information indicating whether the digital stream information includes an MPEG transport stream or not the MPEG transport stream, number information describing a number of the elementary streams defined in a portion of the digital stream information, time map information showing a relation between a presentation time and a position of one of the elementary streams, packet ID information indicating a packet ID of the data packets, which carry a target elementary stream relating to the time map information, video attribute information indicating a video format of the video elementary stream relating to the packet ID information; and audio attribute information indicating an audio format of the audio elementary stream relating to the packet ID information, when a content of the type information indicates the MPEG transport stream, the first stream is configured to be recorded with a first data size being not less than a packet size of the MPEG transport stream, and when another content of the type information indicates the non-MPEG transport stream, the second stream is configured to be recorded with a second data size being not less than the MPEG transport stream packet size, the second data size being different from the first data size.

2. A method of recording digital stream information on an information recording medium configured to have data recorded thereon by a computer-associated recording apparatus and/or data reproduced therefrom by a computer-associated reproducing apparatus, said data including management information and digital stream information, wherein the digital stream information includes a first stream corresponding to an MPEG transport stream or a second stream obtained via an IEEE 1394 interface corresponding to a non-MPEG transport stream, the first stream comprising one or more elementary streams carried by data packets, the one or more elementary streams including at least one of a video elementary stream and an audio elementary stream, and the management information comprises type information indicating whether the digital stream information includes an MPEG transport stream or not the MPEG transport stream, number information describing a number of the elementary streams defined in a portion of the digital stream information, time map information showing a relation between a presentation time and a position of one of the elementary streams, packet ID information indicating a packet ID of the data packets, which carry a target elementary stream relating to the time map information, video attribute information indicating a video format of the video elementary stream relating to the packet ID information; and audio attribute information indicating an audio format of the audio elementary stream relating to the packet ID information, when a content of the type information indicates the MPEG transport stream, the first stream is configured to be recorded with a first data size being not less than a packet size of the MPEG transport stream, and when another content of the type information indicates the non-MPEG transport stream, the second stream is configured to be recorded with a second data size being not less than the MPEG transport stream packet size, the second data size being different from the first data size, the method comprising:

generating the digital stream information;

recording the generated digital stream information on the medium by a recorder;

generating the management information; and recording the generated management information on the medium by the recorder.

3. A method of reproducing digital stream information from an information recording medium configured to have data recorded thereon by a computer-associated recording apparatus and/or data reproduced therefrom by a computer-associated reproducing apparatus, said data including management information and digital stream information, wherein the digital stream information includes a first stream corresponding to an MPEG transport stream or a second stream obtained via an IEEE 1394 interface corresponding to a non-MPEG transport stream, the first stream comprising one or more elementary streams carried by data packets, the one or more elementary streams including at least one of a video elementary stream and an audio elementary stream, and the management information comprises type information indicating whether the digital stream information includes an MPEG transport stream or not the MPEG transport stream, number information describing a number of the elementary streams defined in a portion of the digital stream information, time map information showing a relation between a presentation time and a position of one of the elementary streams, packet ID information indicating a packet ID of the data packets, which carry a target elementary stream relating to the time map information, video attribute information indicating a video format of the video elementary stream relating to the packet ID information; and audio attribute information indicating an audio format of the audio elementary stream relating to the packet ID information, when a content of the type information indicates the MPEG transport stream, the first stream is configured to be recorded with a first data size being not less than a packet size of the MPEG transport stream, and when another content of the type information indicates the non-MPEG transport stream, the second stream is configured to be recorded with a second data size being not less than the MPEG transport stream packet size, the second data size being different from the first data size, the method comprising:

reproducing the management information from the medium by a player; and reproducing the digital stream information from the medium by the player, based on the reproduced management information.

4. An apparatus for recording digital stream information on an information recording medium configured to have data recorded thereon by a computer-associated recording apparatus and/or data reproduced therefrom by a computer-associated reproducing apparatus, said data including management information and digital stream information, wherein the digital stream information includes a first stream corresponding to an MPEG transport stream or a second stream obtained via an IEEE 1394 interface corresponding to a non-MPEG transport stream, the first stream comprising one or more elementary streams carried by data packets, the one or more elementary streams including at least one of a video elementary stream and an audio elementary stream, and the management information comprises type information indicating whether the digital stream information includes an MPEG transport stream or not the MPEG transport stream, number information describing a number of the elementary streams defined in a portion of the digital stream information, time map information showing a relation between a presentation time and a position of one of the elementary streams, packet ID information indicating a packet ID of the data packets, which carry a target elementary stream relating to the time map information, video attribute information indicating a video format of the video elementary stream relating to the packet ID information; and audio attribute information indicating an audio format of the audio elementary stream relating to the packet ID information, when a content of the type information indicates the MPEG transport stream, the first stream is configured to be recorded with a first data size being not less than a packet size of the MPEG transport stream, and when another content of the type information indicates the non-MPEG transport stream, the second stream is configured to be recorded with a second data size being not less than the MPEG transport stream packet size, the second data size being different from the first data size, the apparatus comprising:

a first generator configured to generate the digital stream information;

a first recorder configured to record the generated digital stream information on the medium;

a second generator configured to generate the management information; and a second recorder configured to record the generated management information on the medium.

5. An apparatus for reproducing digital stream information from an information recording medium configured to have data recorded thereon by a computer-associated recording apparatus and/or data reproduced therefrom by a computer-associated reproducing apparatus, said data including management information and digital stream information, wherein the digital stream information includes a first stream corresponding to an MPEG transport stream or a second stream obtained via an IEEE 1394 interface corresponding to a non-MPEG transport stream, the first stream comprising one or more elementary streams carried by data packets, the one or more elementary streams including at least one of a video elementary stream and an audio elementary stream, and the management information comprises type information indicating whether the digital stream information includes an MPEG transport stream or not the MPEG transport stream, number information describing a number of the elementary streams defined in a portion of the digital stream information, time map information showing a relation between a presentation time and a position of one of the elementary streams, packet ID information indicating a packet ID of the data packets, which carry a target elementary stream relating to the time map information, video attribute information indicating a video format of the video elementary stream relating to the packet ID information; and audio attribute information indicating an audio format of the audio elementary stream relating to the packet ID information, when a content of the type information indicates the MPEG transport stream, the first stream is configured to be recorded with a first data size being not less than a packet size of the MPEG transport stream, and when another content of the type information indicates the non-MPEG transport stream, the second stream is configured to be recorded with a second data size being not less than the MPEG transport stream packet size, the second data size being different from the first data size, the apparatus comprising:

a first reproducer configured to reproduce the management information from the medium; and a second reproducer configured to reproduce the digital stream information from the medium based on the reproduced management information.

* * * * *